United States Patent
Kim et al.

(10) Patent No.: US 11,330,480 B2
(45) Date of Patent: May 10, 2022

(54) ACCESS CONTROL METHOD AND APPARATUS FOR USE IN MOBILE COMMUNICATION

(71) Applicant: Samsung Electronics Co., Ltd., Suwon-si (KR)

(72) Inventors: Sangbum Kim, Suwon-si (KR); Donggun Kim, Seoul (KR); Alexander Sayenko, Seoul (KR); Jaehyuk Jang, Suwon-si (KR); Soenghun Kim, Suwon-si (KR); Gert Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/453,867

(22) Filed: Jun. 26, 2019

(65) Prior Publication Data

US 2019/0320354 A1    Oct. 17, 2019

Related U.S. Application Data

(63) Continuation of application No. 15/649,558, filed on Jul. 13, 2017, now Pat. No. 10,349,318.

(30) Foreign Application Priority Data

Jul. 13, 2016    (KR) ........................ 10-2016-0088758

(51) Int. Cl.
*H04W 36/00* (2009.01)
*H04W 72/04* (2009.01)
*H04W 74/08* (2009.01)

(52) U.S. Cl.
CPC ..... *H04W 36/0055* (2013.01); *H04W 72/042* (2013.01); *H04W 74/0833* (2013.01); *H04W 36/0072* (2013.01); *H04W 36/0077* (2013.01)

(58) Field of Classification Search
None
See application file for complete search history.

(56) References Cited

U.S. PATENT DOCUMENTS

| | | |
|---|---|---|
| 2008/0090573 A1 | 4/2008 | Kim et al. |
| 2011/0058529 A1 | 3/2011 | Uemura |

(Continued)

FOREIGN PATENT DOCUMENTS

| | | |
|---|---|---|
| CN | 101998543 A | 3/2011 |
| EP | 2742732 A1 | 6/2014 |

(Continued)

OTHER PUBLICATIONS

International Search Report dated Oct. 24, 2017 in connection with International Patent Application No. PCT/KR2017/007530, 3 pages.

(Continued)

*Primary Examiner* — Saumit Shah

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on 5G communication technology and IoT-related technology, such as smart home, smart building, smart city, smart car, connected car, health care, digital education, smart retail, security and safety services. A handover method of a terminal in a mobile communication system according to the present disclosure includes transmitting UE capability information including a random access-free handover indicator to a first base station, receiving a handover command message from the first base station, and transmitting, when the handover command message (Continued)

includes uplink resource information, a handover complete message to a second base station based on the uplink resource information.

11 Claims, 82 Drawing Sheets

(56) References Cited

U.S. PATENT DOCUMENTS

| | | | |
|---|---|---|---|
| 2011/0105122 A1 | 5/2011 | Wu | |
| 2011/0235558 A1* | 9/2011 | Diachina | H04W 48/02 370/310 |
| 2013/0045706 A1* | 2/2013 | Hsu | H04W 48/02 455/404.1 |
| 2013/0155951 A1 | 6/2013 | Hapsari et al. | |
| 2013/0322325 A1 | 12/2013 | Hahn et al. | |
| 2014/0171096 A1 | 6/2014 | Hwang et al. | |
| 2015/0119015 A1 | 4/2015 | Gai et al. | |
| 2015/0289195 A1* | 10/2015 | Gogic | H04W 74/0833 370/230 |
| 2015/0305065 A1 | 10/2015 | Bai et al. | |
| 2015/0319774 A1 | 11/2015 | Cai et al. | |
| 2016/0050615 A1 | 2/2016 | Fong et al. | |
| 2016/0174124 A1 | 6/2016 | Basu Mallick et al. | |
| 2016/0381611 A1 | 12/2016 | Uchino et al. | |
| 2017/0006442 A1 | 1/2017 | Lee | |
| 2017/0325282 A1 | 11/2017 | Hong et al. | |
| 2018/0213457 A1 | 7/2018 | Tang et al. | |
| 2018/0359681 A1* | 12/2018 | Futaki | H04W 88/10 |
| 2019/0037420 A1 | 1/2019 | Fujishiro et al. | |
| 2019/0069160 A1 | 2/2019 | Byun et al. | |
| 2019/0082490 A1 | 3/2019 | Zhang et al. | |
| 2019/0132900 A1 | 5/2019 | Hong et al. | |

FOREIGN PATENT DOCUMENTS

| | | | | |
|---|---|---|---|---|
| KR | 10-2016-0054936 A | 5/2016 | | |
| KR | 10-2016-0054937 A | 5/2016 | | |
| WO | WO-2012146101 A1 * | 11/2012 | ............ | H04W 48/08 |
| WO | 2015/036017 A1 | 3/2015 | | |
| WO | 2015/111929 A1 | 7/2015 | | |
| WO | 2015/127987 A1 | 9/2015 | | |
| WO | 2016/031779 A1 | 3/2016 | | |

OTHER PUBLICATIONS

Supplementary European Search Report dated Feb. 12, 2019 in connection with European Patent Application No. 17 82 7974, 10 pages.
Office Action dated Dec. 28, 2020 in connection with U.S. Appl. No. 16/453,844, 18 pages.
USPTO, "Non-Final Office Action" dated Aug. 3, 2020, in connection not U.S. Appl. No. 16/453,844, 14 pages.
Notice of Allowance dated Jun. 23, 2021 in connection with U.S. Appl. No. 16/453,844, 9 pages.
"3rd Generation Partnership Project; Technical Specification Group Services and System Aspects; Study on Architecture for Next Generation System (Release 14)", 3GPP TR 23.799 V0.5.0 (May 2016), 179 pages.
Huawei, "RAN configuration of network slices", RAN WG3 Meeting #92, May 23-27, 2016, R3-161135, 5 pages.
Samsung, "Design principles and considerations for the LTE light connection", 3GPP TSG-RAN WG2 Meeting #94, May 23-27, 2016, R2-163450, 4 pages.
Kyocera, "Details of paging enhancements and Light Connection", 3GPP TSG-RAN WG2 #94, May 23-27, 2016, R2-164047, 5 pages.
European Search Report dated Oct. 12, 2021 in connection with European Patent Application No. 21 17 5672, 17 pages.
Office Action dated Oct. 8, 2021 in connection with Chinese Patent Application No. 201780043793.7, 30 pages.
Decision of Patent dated Nov. 24, 2021 in connection with Korean Patent Application No. 10-2021-0111248, 4 pages.

* cited by examiner (a) Access Barring Check (b) Access Barring Skip

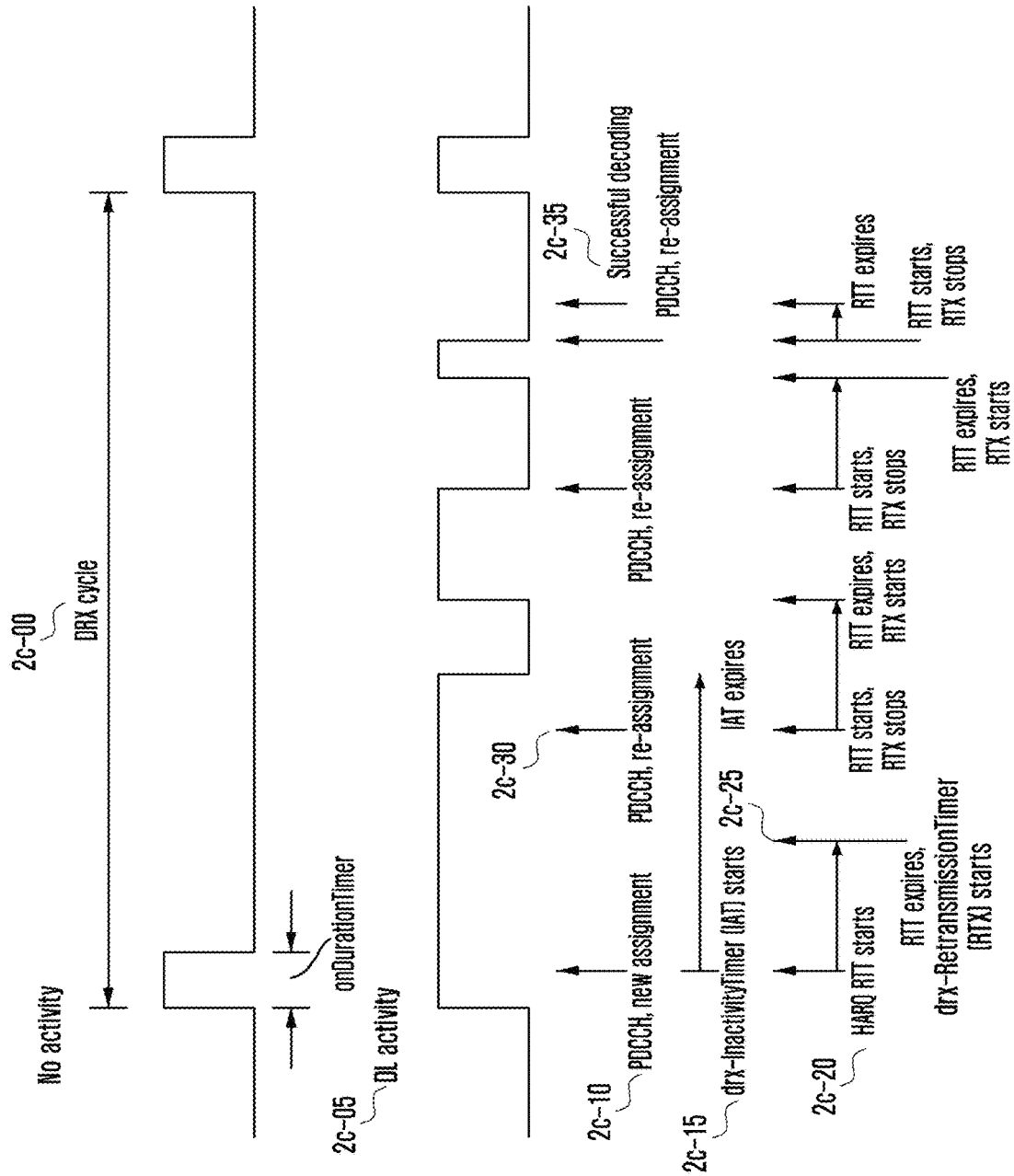

Option A 1-Byte structure

Option B 2-Byte structure

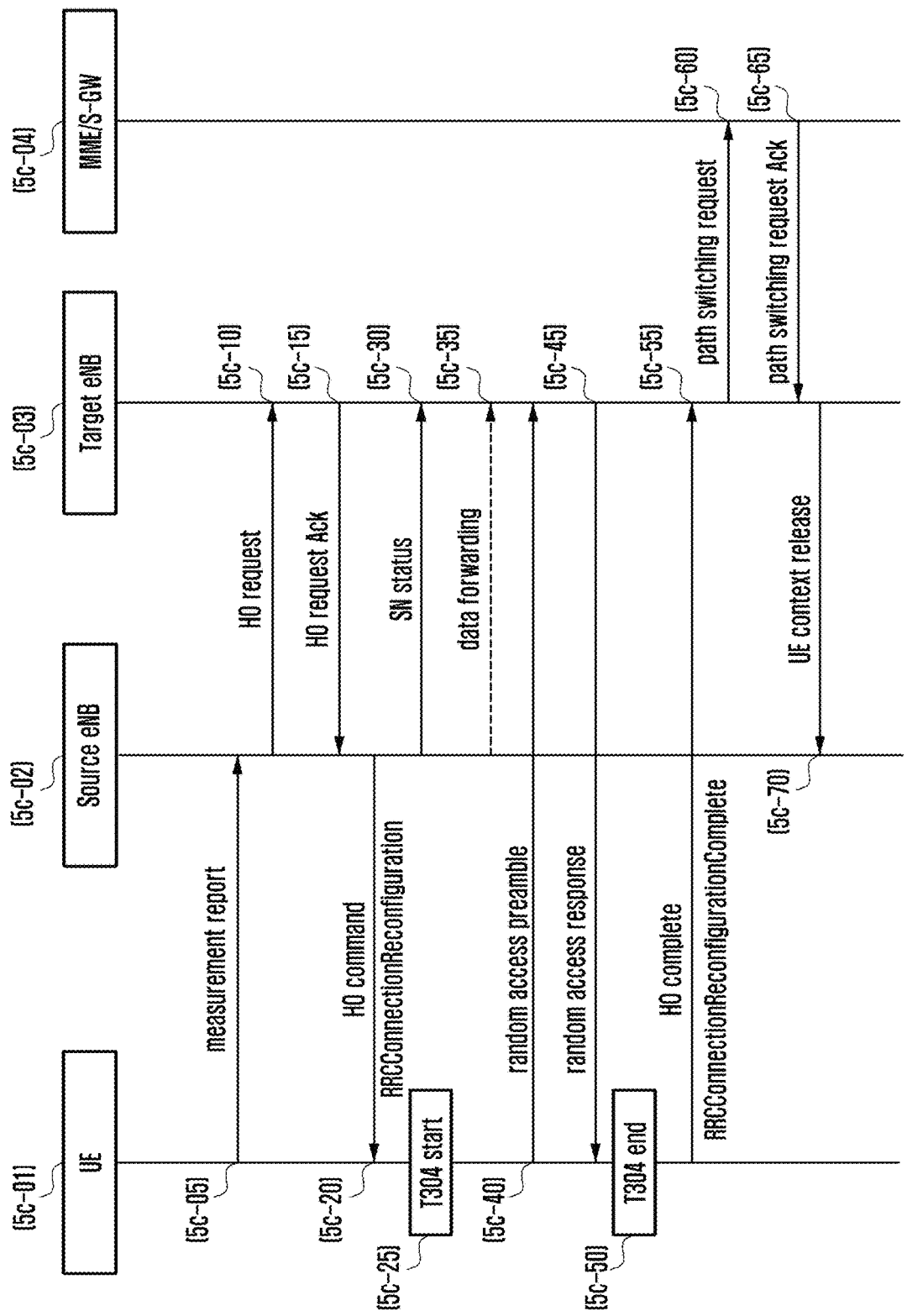

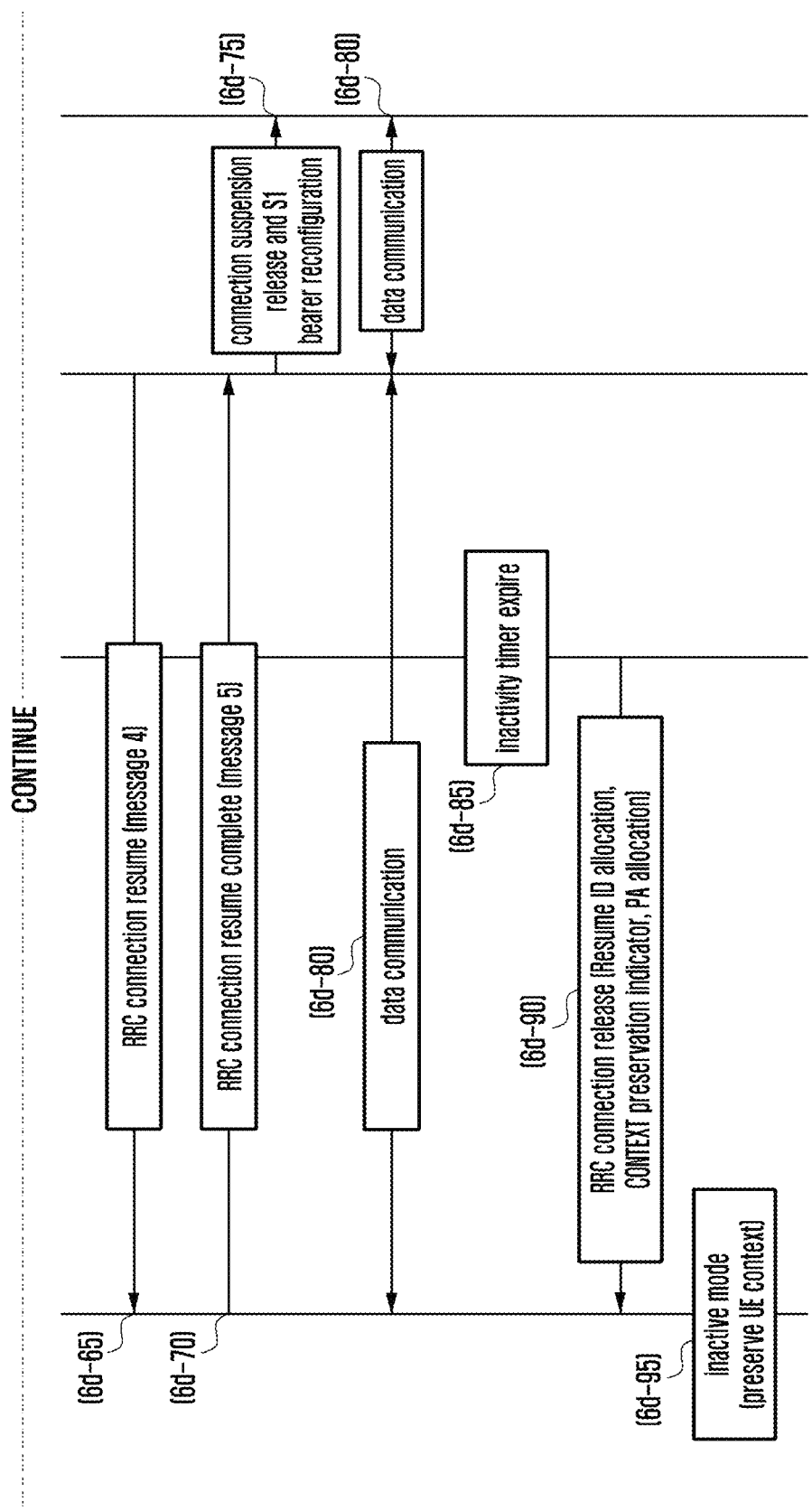

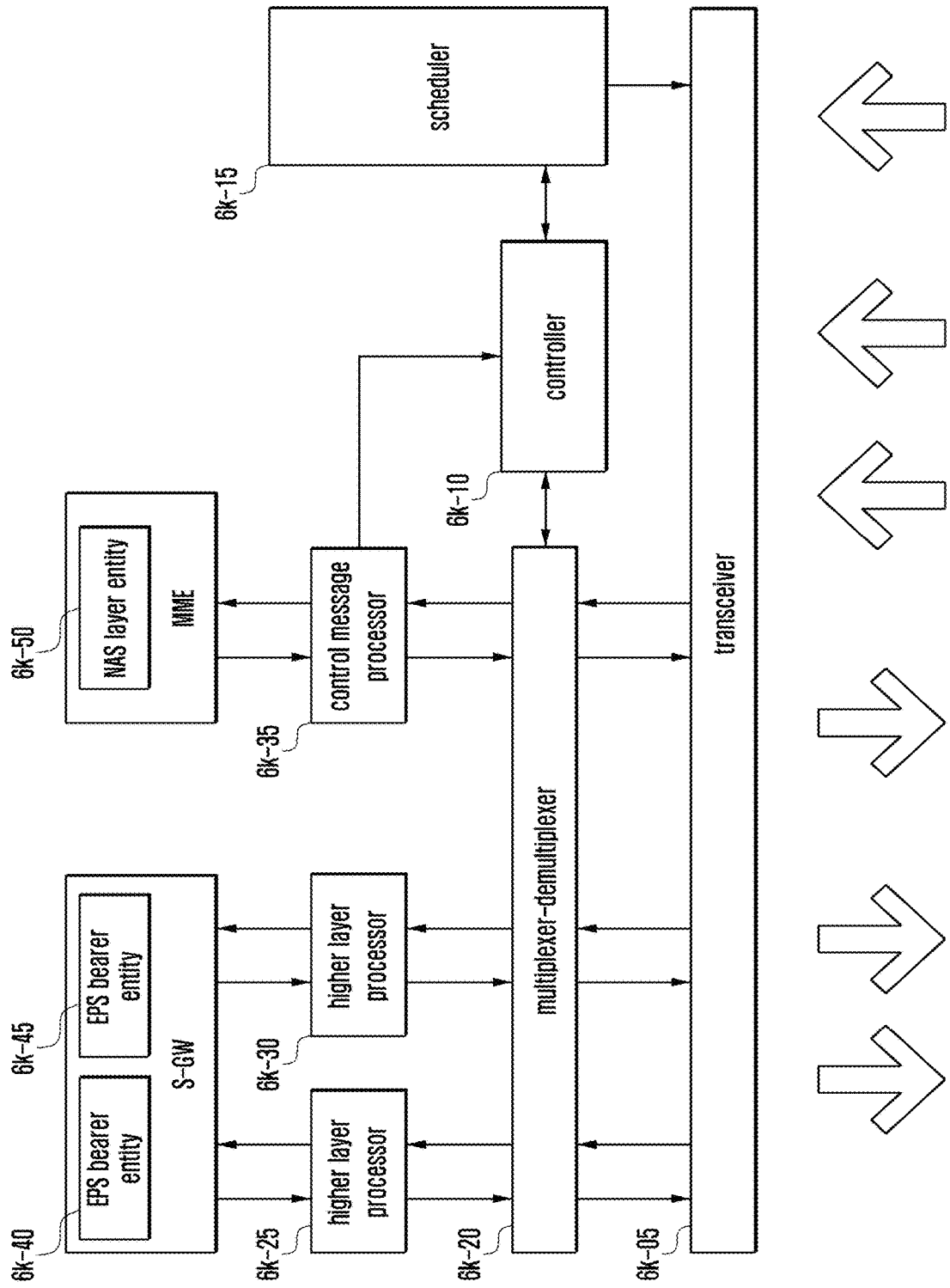

ACCESS CONTROL METHOD AND APPARATUS FOR USE IN MOBILE COMMUNICATION

CROSS-REFERENCE TO RELATED APPLICATIONS

This application is a continuation of U.S. patent application Ser. No. 15/649,558 filed on Jul. 13, 2017, now U.S. Pat. No. 10,349,318, which is related to and claims priority to Korean Patent Application No. 10-2016-0088758 filed on Jul. 13, 2016, the disclosures of which are herein incorporated by reference in their entirety.

BACKGROUND

1. Field

The present disclosure relates to a mobile communication system and, in particular, to a method for determining whether to bar an access in a mobile communication system.

Also, the present disclosure relates to a method for configuring Discontinuous Reception (DRX) in a mobile communication system.

Also, the present disclosure relates to a method for transmitting a paging signal to a terminal in a mobile communication system.

Also, the present disclosure relates to a data transmission and reception method for Ultra-Reliable and Low-Latency Communication (URLLC) service in a mobile communication system.

Also, the present disclosure relates to a method for reducing data interruption time during a handover procedure and handling failure of data interruption time reduction in a mobile communication system.

Also, the preset disclosure relates to a method and apparatus for a terminal to switch autonomously to a large paging area preference mode and updating the paging area in a mobile communication system.

Also, the present disclosure relates to a paging message-based mode transition method and apparatus of a terminal for use in a mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology. Meanwhile, an LTE system may determine whether to perform application-specific access barring and control accesses per application. However, the complicating application-specific access barring mechanism gives rise to the necessity of a consistent access control mechanism.

Meanwhile, with two DRX cycles (long DRX cycle and short DRX cycle) specified in LTE standard, it may be impossible to adjust the DRX cycle dynamically according to Data Radio Bearer (DRB) characteristics, traffic pattern, and buffer status. Thus, there is a need of a method for adjusting the length of the DRX cycle efficiently.

In LTE, a new operation mode, called light connection mode, has been proposed to define a state where a base station (evolved Node B: eNB) and a terminal (User Equipment: UE) maintain the UE information (e.g., context information) even when the connection therebetween is disconnected in addition to the idle mode and the connected mode. In an LTE system, if the tracking area of a UE in the light connection mode is changed, the UE may transition to the connected mode and transmit a tracking area update message to the core network. This means that the UE has to transition to the connected mode despite no data to transmit.

For next generation mobile communication systems, it may be considered to use Ultra Reliable (packet error rate of 10-5) Low-Latency Communication (URLLC) services. Examples of the URLLC services may include an automated vehicle service, an e-health service, and a drone service. In the LTE system, the negative acknowledgement (NACK) corresponding to a packet transmission trigger retransmission and thus may cause transmission latency. There is therefore a need of specifying detailed operation for retransmitting URLLC service packets efficiently.

In a case where a UE is handed from one eNB to another in the LTE system, the UE cannot communicate data with the network during a period between the time point when it receives a handover command message from the source eNB and the time point when the UE transmits a handover complete message to the target eNB. Here, the period during which data transmission is impossible is called data interruption time. Typically, the data interruption time lasts at least a few dozen milliseconds (ms), resulting in data cutoff. Thus, there is a need of a method for minimizing the data interruption time.

In a network supporting the light connection mode, the UE in the idle mode may report UE location on the move in the paging area configured by the network. In this case, a large amount of signaling is required between the UE and the eNB in order for the UE to transition to a large paging area preference mode for battery power saving.

Also, in the case that the UE stays in the light connected mode for a long time, the network has to store and maintain the UE context and S1-U bearer information. This means that the network cannot manage the UEs in the light connected mode continuously but controls them to transition to the RRC Idle mode. This operation for transitioning the UE operation mode from the light connected mode to the RRC Idle mode may cause significant signaling overhead.

SUMMARY

To address the above-discussed deficiencies, it is a primary object to provide a method and apparatus for adopting a consistent access control mechanism.

Also, the present disclosure aims to provide a method and apparatus for changing the DRX cycle dynamically according to DRB characteristics, traffic pattern, and buffer status.

Also, the present disclosure aims to provide a method and apparatus for paging UEs within a cell in a heterogeneous network environment with the eNBs having different cell sizes.

Also, the present disclosure aims to provide a data transmission/reception method and apparatus for URLLC service.

Also, the present disclosure aims to provide a method and apparatus for reducing the data interruption time during the handover of a UE and handling failure data interruption time reduction.

Also, the present disclosure aims to provide an operation mode transition method and apparatus of a UE for transitioning to a large paging area preference mode autonomously to reduce signaling overhead.

Furthermore, the present disclosure aims to provide a paging message-based operation mode transition method and apparatus of a UE for reducing signaling overhead.

In accordance with an aspect of the present disclosure, a method of a user equipment (UE) in a mobile communication system, the method comprising transmitting UE capability information including a random access-free handover indicator to a first base station, receiving a handover command message from the first base station, and transmitting, if the handover command message includes uplink resource information, a handover complete message to a second base station based on the uplink resource information.

In accordance with another aspect of the present disclosure, a method of a first base station in a mobile communication system, the method comprising receiving user equipment (UE) capability information including a random access-free handover indicator from a UE, transmitting a handover request message to a second base station, receiving a handover request acknowledgement (ACK) message, and transmitting, if the handover request ACK message includes uplink resource information, a handover command message including the uplink resource information to the UE, wherein the uplink resource information is used for transmission of a handover complete message from the UE to the second base station.

In accordance with another aspect of the present disclosure, a method of a second base station in a mobile communication system, the method comprising receiving a handover request message from a first base station, transmitting a handover request acknowledgement (ACK) message, and receiving, if the handover request ACK message includes uplink resource information, a handover complete message from a user equipment (UE) based on the uplink resource information.

In accordance with another aspect of the present disclosure, a user equipment (UE) in a mobile communication system, the UE comprising a transceiver configured to transmit or receive signals and a controller configured to transmit user equipment (UE) capability information including a random access-free handover indicator to a first base station, receive a handover command message from the first base station, and transmit, if the handover command message includes uplink resource information, a handover complete message to a second base station based on the uplink resource information.

In accordance with another aspect of the present disclosure, a first base station in a mobile communication system, the first base station comprising a transceiver configured to transit or receive signals; and a controller configured to receive user equipment (UE) capability information including a random access-free handover indicator from a UE, transmit a handover request message to a second base station, receive a handover request acknowledgement (ACK) message from the second base station, and transmit, if the handover request ACK message includes uplink resource information, a handover command message including the uplink resource information to the UE, the uplink resource information being used for transmission of a handover complete message from the UE to the second base station.

In accordance with still another aspect of the present disclosure, a second base station in a mobile communication system, the second base station comprising a transceiver configured to transit or receive signals; and a controller configured to receive a handover request message from a first base station, transmit a handover request acknowledgement (ACK) message, and receive, if the handover request ACK message includes uplink resource information, a handover complete message from a user equipment (UE) based on the uplink resource information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2C illustrates a DRX operation;

FIG. 2FB illustrates a DRX operation of an eNB according to the present disclosure;

FIG. 2KB illustrates eNB operations in the beam measurement result report procedure according to the present disclosure;

FIG. 4DB illustrates another transmission scheme proposed in the present disclosure;

FIG. 4DC illustrates another transmission scheme proposed in the present disclosure;

FIG. 4EB illustrates a base station operation according to the present disclosure:

FIG. 5C illustrates a handover procedure in a legacy LTE system;

FIG. 6K illustrates a configuration of an eNB including an MME part and an S-GW part according to an embodiment of the present disclosure;

DETAILED DESCRIPTION

Figure 1A:
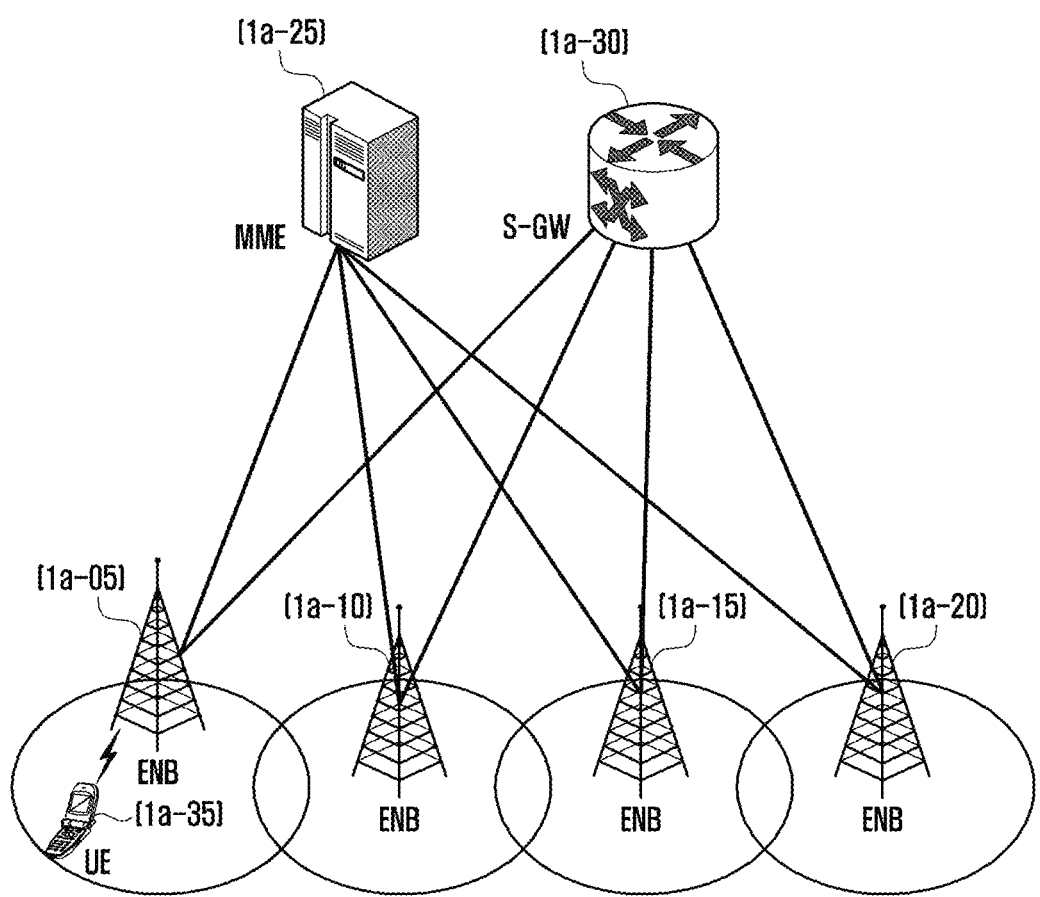
FIG. 1A illustrates an architecture of an LTE system to which the present disclosure is applied.

FIGS. 1A through 7M, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Although the description is mainly directed to Long-Term Evolution (LTE) and Evolved Packet Core (EPC) for Radio Access Network (RAN) and Core Network (CN) that are standardized by the 3rd Generation Partnership Project (3GPP), it will be understood by those skilled in the art that the present disclosure can be applied even to other communication/computing systems having the similar technical background and channel format, with a slight modification, without departing from the spirit and scope of the present disclosure.

Detailed description of well-known functions and structures incorporated herein may be omitted to avoid obscuring the subject matter of the present disclosure. This aims to omit unnecessary description so as to make the subject matter of the present disclosure clear.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

It is to be appreciated that those skilled in the art can change or modify the embodiments without departing the technical concept of this disclosure. Accordingly, it should be understood that above-described embodiments are essentially for illustrative purpose only but not in any way for restriction thereto.

In the above described embodiments of the present disclosure, the steps and message transmissions may become the targets of being selectively carried out or omitted. In each embodiment of the present disclosure, the operations are not necessary to be performed in the sequential order as depicted but may be performed in a changed order. Each step and message may be performed independently.

Some or all of the tables exemplified in the above-description are provided to help understand the present disclosure. Accordingly, the detailed description of the table is to express part of the method and apparatus proposed in the present disclosure. That is, it is preferred to approach the content of the table of the specification semantically rather than syntactically. Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce manufacture articles embedding instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

First Embodiment

Detailed description of well-known functions and structures incorporated herein may be omitted to avoid obscuring the subject matter of the present disclosure. Exemplary embodiments of the present disclosure are described with reference to the accompanying drawings in detail.

FIG. 1A illustrates an LTE system to which the present disclosure is applied.

In reference to FIG. 1A, the Radio Access Network (RAN) of the LTE system includes evolved Node Bs (eNBs) 1a-05, 1a-10, 1a-15, and 1a-20; a Mobility Management Entity (MME) 1a-25; and a Serving Gateway (S-GW) 1a-30. The User Equipment (UE) 1a-35 connects to an external network via the eNBs 1a-05, 1a-10, 1a-15, and 1a-20 and the S-GW 1a-30.

The eNBs 1a-05, 1a-10, 1a-15, and 1a-20 are equivalent to the legacy node Bs of the universal mobile telecommunications system (UMTS).

The UE 1a-35 connects to one of the eNBs via a radio channel, and the eNB has more control functions than the legacy node B. In the LTE system where all user traffic including real time services such as Voice over IP (VoIP) is served through share channels, it is necessary to schedule UEs based on scheduling information such as buffer status, power headroom status, and channel status collected from the UEs, an eNB serving the UEs takes charge of this function.

It is typical that one eNB hosts a plurality of cells. For example, the LTE system adopts Orthogonal Frequency Division Multiplexing (OFDM) as a radio access technology to secure a data rate of up to 100 mega-bits per second (Mbps) in a bandwidth of 20 megaHertz (MHz). The LTE system also adopts Adaptive Modulation and Coding (AMC) to determine the modulation scheme and channel coding rate in adaptation to the channel condition of the UE.

The S-GW 1a-30 as an entity handling bearers establishes and releases data bearers under the control of the MME 1a-25.

The MME 1a-25 takes charge of various control functions and maintains connections with a plurality of eNBs.

The present disclosure proposes an access control method for determining whether to bar an access in a mobile communication system.

If network congestion occurs, the network may limit the number of initial access attempts. This is called access barring. The network broadcasts predetermined access barring configuration information (hereinafter, referred to as barring configuration information in order for each UE to determine its access is barred. On the basis of the barring configuration information, a UE which wants to access the network determine whether to attempt the access. The present disclosure proposes a service-specific (application-specific) access barring determination method of a UE.

Figure 1B:
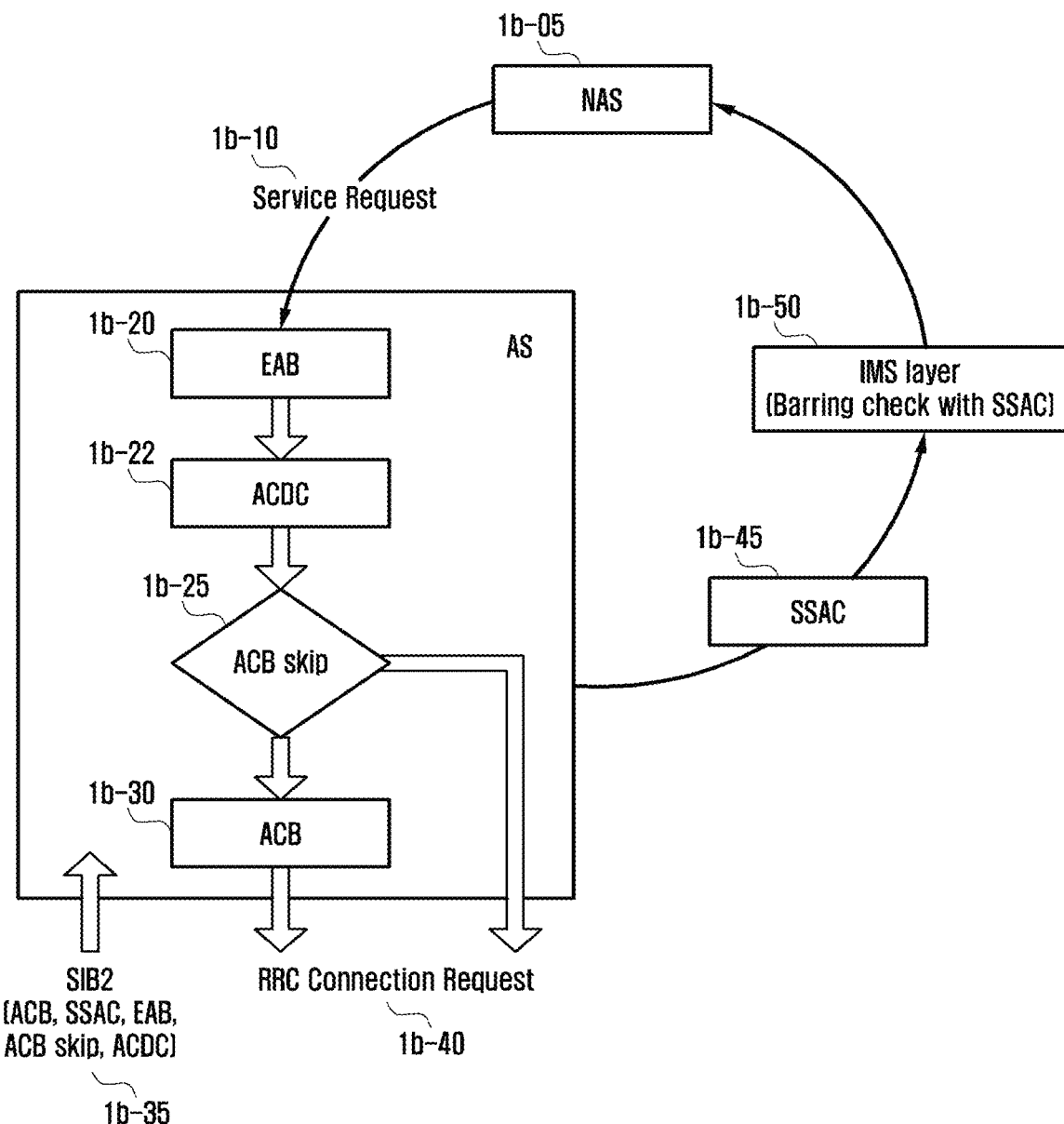
FIG. 1B illustrates an access barring determination method in an LTE system.

FIG. 1B illustrates an access barring determination method in an LTE system.

Protocols resided in an LTE UE may be split into first and second layers. For example, the first layer may denote an Access Stratum 1b-15, and the second layer may denote a Non-Access Stratum (NAS).

The AS may take charge of all access-related functions. The NAS may take charge of the other functions such as a service request regardless of access. The access barring determination may be made at the AS of the UE.

As described above, if network congestion occurs, the network may limit initial accesses by broadcasting access barring configuration information to help each UE to make an access attempt decision at step 1b-35. For example, the configuration information may be broadcast in system information and include at least one of barring configuration information, Access Class Barring (ACB) configuration information, ACB skip indicator, Application specific Congestion control for Data Communication (ACDC) configuration information, and Service Specific Access Class (SSAC) configuration information.

In order to meet the requirements newly added to LTE standard, a new access barring mechanism has been proposed for performing multiple-access barring check processes.

The UE NAS may generate a service request to the UE AS at step 1b-10. If the service request is received, the UE AS determines whether network access is barred.

In detail, if the establishment cause of the service request is set to "delay tolerant access" or a value indicating "delay tolerant access", the UE AS performs an Extended Access Barring (EAB) check at step 1b-20.

The EAB mechanism is applicable only for Machine Type Communication (MTC). If passing the EAB check, the UE AS performs Application Specific Congestion control for Data Communication (ACDC) check at step 1b-22.

The application which requests for a service is assigned an ACDC category, and the ACDC category value is included in the service request being transferred to the UE AS.

The network may provide the barring configuration information per ACDC category. That is, the barring configuration information may include the information on the category of the application as a target of the access control.

Accordingly, the UE may perform the access check process on the application group categorized by the ACDC category. That is, the UE may perform the access check process based on the category of the application which requests for the service. If the barring configuration information for the ACDC category is not provided to the network, the UE AS may skip the ACDC access check process.

If passing the ACDC check, the UE AS performs Access Class Barring (ACB). The ACB may denote an access check process performed by the UE AS using the barring configuration information provided according to Mobile Originating (MO) data or MO signaling. The barring configuration information for ACB may be transmitted in the ACB configuration information or an SIB to the UE.

In the case of MMTEL voice/video/SMS, however, the UE AS may skip the ACB process at step 1b-25. In this case, the network may transmit an ACB skip indicator to skip the ACB check process. Accordingly, the UE AS may skip the ACB check process based on the ACB skip indicator at step 1b-25.

If it is determined that the access is permitted through the multiple access check processes, the UE AS may attempt access to the network. That is, the UE AS performs the random access procedure by transmitting a Radio Resource Control (RRC) Connection Request message at step 1b-40.

There may be an access check process which is not performed by the UE AS. If MMTEL voice/video access barring information (SSAC) is received from the network at step 1b-45, the UE AS transfers the access barring information to the IMS layer of the UE at step 1b-50. Here, the SSAC barring information may be transmitted in the SSAC configuration information or a SIB to the UE. If the barring configuration information is received, the IMS layer performs an access barring check process when the service is triggered. The SSAC has been designed such that the UE AS perform the function regardless of type of application or service. Accordingly, in order to control the access barring for a specific service such as MMTEL voice/video, it is necessary to transfer the barring configuration information to the layer which manages the corresponding service, thereby the corresponding layer performing the access check process.

In the next generation mobile communication system, such complex procedure is not required. This is because it is possible to implement a consistent access check process including all requirements introduced in LTE from the initial design stage.

Figure 1C:
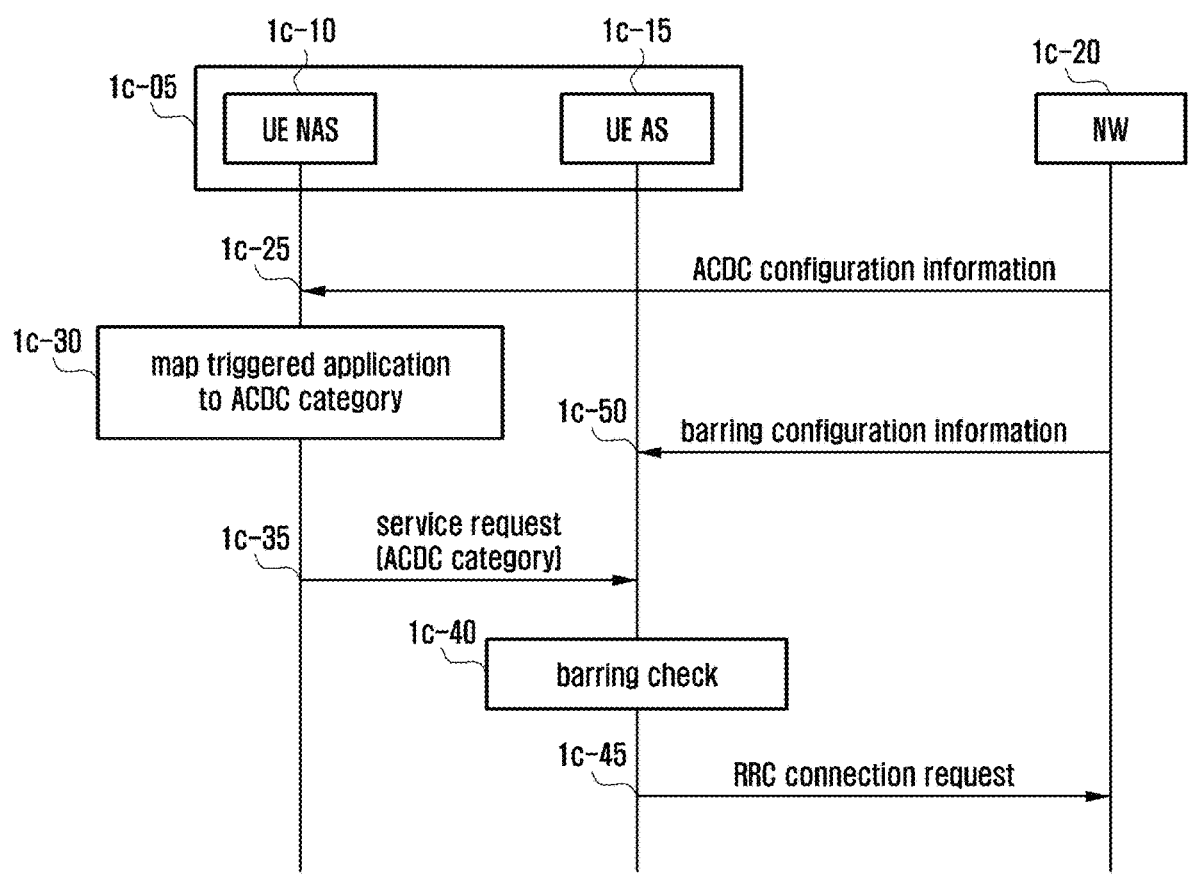
FIG. 1C illustrates an ACDC procedure in an LTE system.

FIG. 1C illustrates an ACDC procedure in an LTE system.

In the LTE system, the ACDC is proposed for the purpose of application-specific (service-specific) access barring determination. Every application is assigned at least one ACDC category value. For example, there may be ACDC categories 1 to 16.

The network 1c-20 may provide the UE 1c-05 with the application-specific ACDC category information using a NAS message. In detail, the ACDC category information may be delivered to the UE NAS 1c-10 at step 1c-25. The CDC category information may be included in the ACDC configuration information.

The network may transmit ACDC barring configuration information to the UE 1c-05 at step 1c-50. In detail, the network 1c-20 may transmit the ACDC category-specific barring configuration information using SIB2.

The barring configuration information may include at least one of ac-BarringFactor Information Element (IE) and an ac-Barringtime IE. Here, the ac-BarringFactor α is selected in the range of $0 \le \alpha < 1$.

The UE 1c-05 (AS) selects a random value (rand) in the range of $0 \le rand < 1$, the random value less than the ac-BarringFactor for indicating access barring and equal to or greater than the ac-BarringFactor for indicating access permission. If it is determined that the access is barred, the UE AS delays access during a predetermined period calculated using equation (1).

$$\text{"Tbarring"}=(0.7+0.6*\text{rand})*\text{ac-BarringTime} \quad (1)$$

If a service request is triggered, the UE (NAS) deduces an ACDC category value corresponding to the application requesting for the service at step 1c-30. The UE NAS may transmit the service request including the ACDC category value to the UE AS at step 1c-35.

Upon receipt of the service request, the UE (AS) may perform the barring check. The UE 1c-05 determine whether the access is barred based on the barring configuration information included in the SIB2 and the ACDC category value of the application requested for the service at step 1c-40.

If the SIB2 includes no barring configuration information corresponding to the ACDC category, it is assumed that the application corresponding to the ACDC category has passed the ACDC process and permitted to access the network. If it is permitted to access the network through the access barring check process, the UE (AS) transmits an RRC Connection Request message for random access to the network at step 1c-45.

Figure 1D:
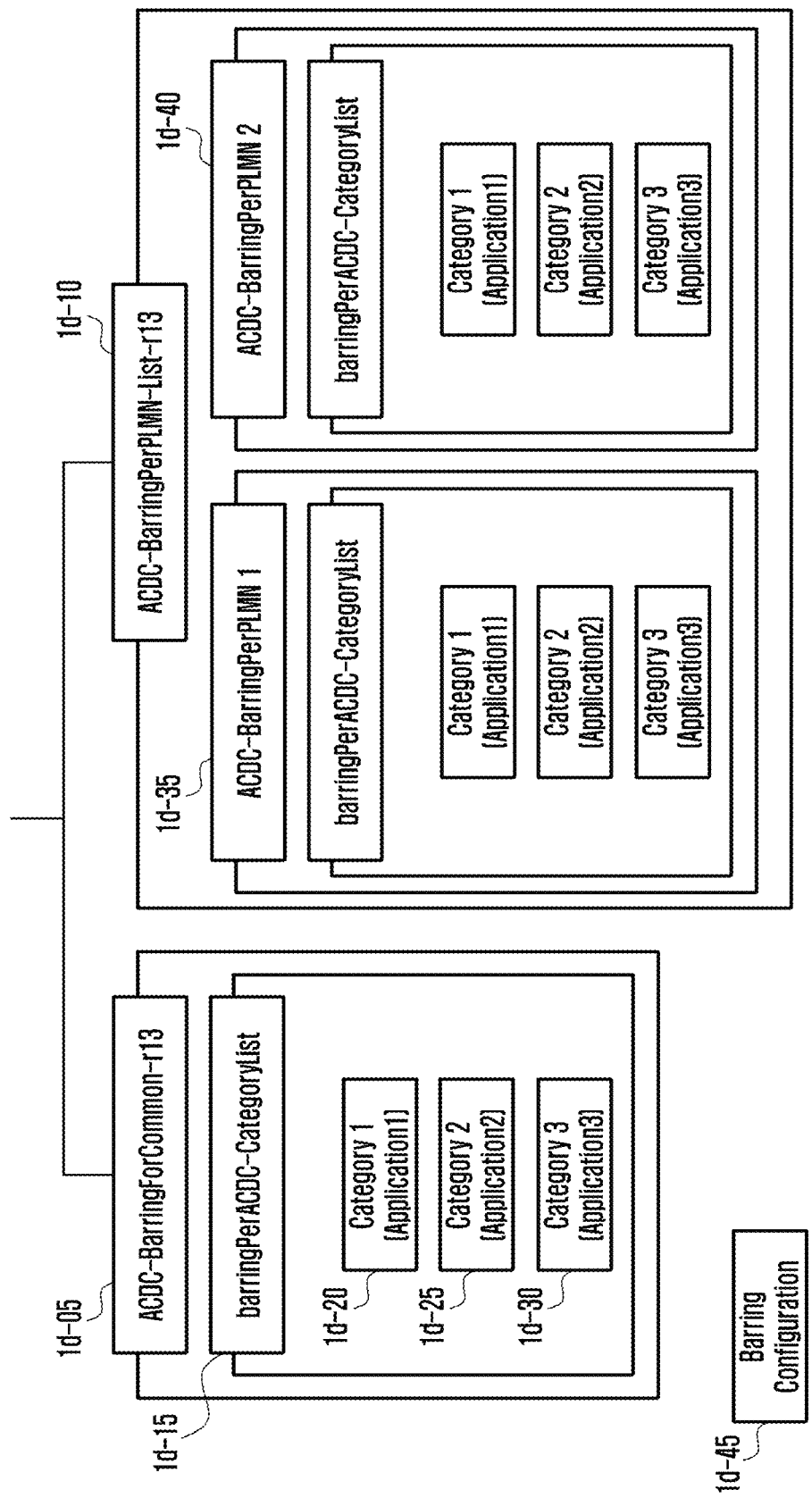
FIG. 1D illustrates a structure of ACDC configuration information for sue in an LTE system.

FIG. 1D illustrates a structure of ACDC configuration information for sue in an LTE system.

The ACDC configuration information may include PLMN-specific barring configuration information sets (ACDC-BarringPerPLMN 1, ACDC-BarringPerPLMN 2, . . . ) 1d-35 and 1d-40. If all PLMNs have the same barring configuration information set, the network may broadest common barring configuration information set (ACDC-BarringForCommon-r13) 1d-05.

The PLMN-specific barring configuration information set or the common barring configuration information set may include per-category barring configuration informations 1d-20, 1d-25, and 1d-30. As aforementioned, the barring configuration information 1d-45 include the ac-BarringFactor IE and ac-Barringtime IE.

Accordingly, the UE may determine whether the access to the network is permitted based on the barring configuration information and the category of the application which has requested for the corresponding service. If no barring configuration information corresponding to a specific ACDC category is provided, it is assumed that the application with the corresponding ACDC category is allowed to access the network.

Figure 1E:
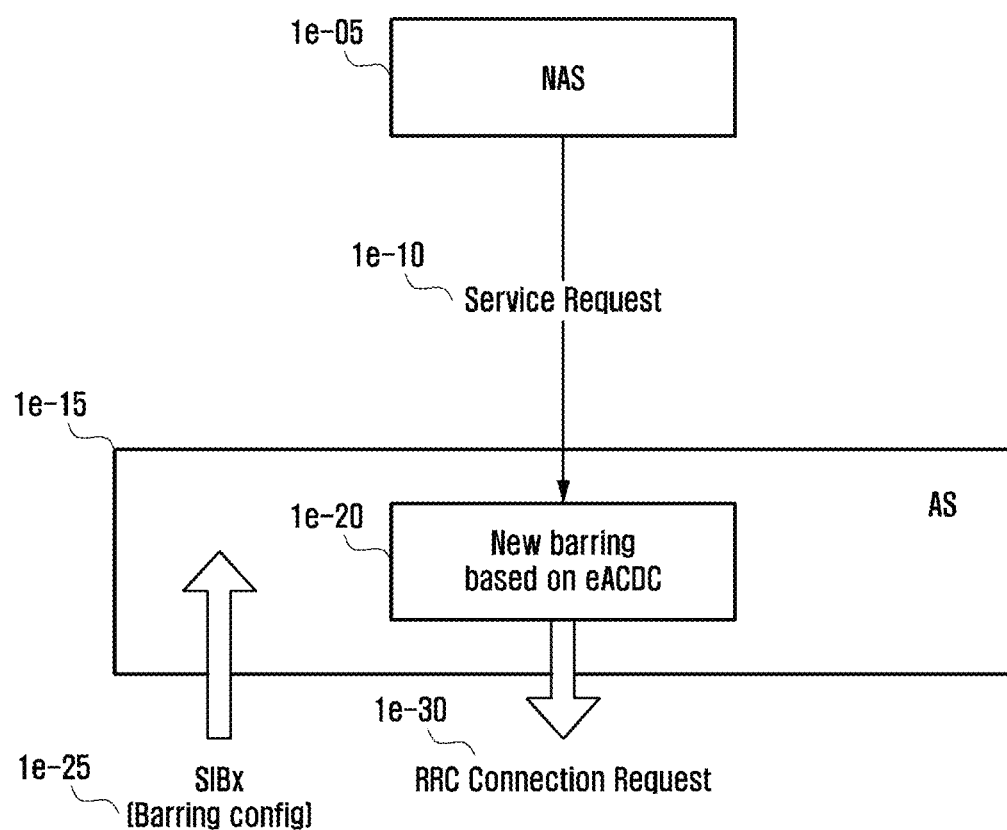
FIG. 1E illustrates an access barring determination method of the present disclosure.

FIG. 1E illustrates an access barring determination method of the present disclosure.

The present disclosure is characterized by use of a single consistent barring mechanism rather than multiple barring mechanism. The proposed barring mechanism 1e-20 is implemented on the basis of a service-specific (application-specific) ACDC.

However, it may also be possible to implement the present disclosure in a such a way of categorizing UE types, call types, or slice types rather than the application types and barring access from the UE based on other factors than application. A detailed description thereof is made later.

The network broadcasts the barring configuration information in the system information at step 1e-25. As described above, the barring configuration information may include category-specific information. The barring configuration information may include category-specific ac-BarringFactor IEs and ac-Barringtime IEs and indicators indicating categories for which access is barred.

If a service request is triggered, the UE NAS 1e-05 may send a service request 1e-10 to the UE AS 1e-15. Here, the UE includes the application category information in the service request. Every legacy service or application is assigned at least one category value.

Accordingly, the UE AS determines at step 1e-20 whether access is barred based on the barring configuration information and the category value. According to the present disclosure, the UE may determine whether access is barred for the application which has triggered the service request.

If access is allowed, the UE AS sends an RRC Connection Request message to the network at step 1e-30.

Figure 1F:
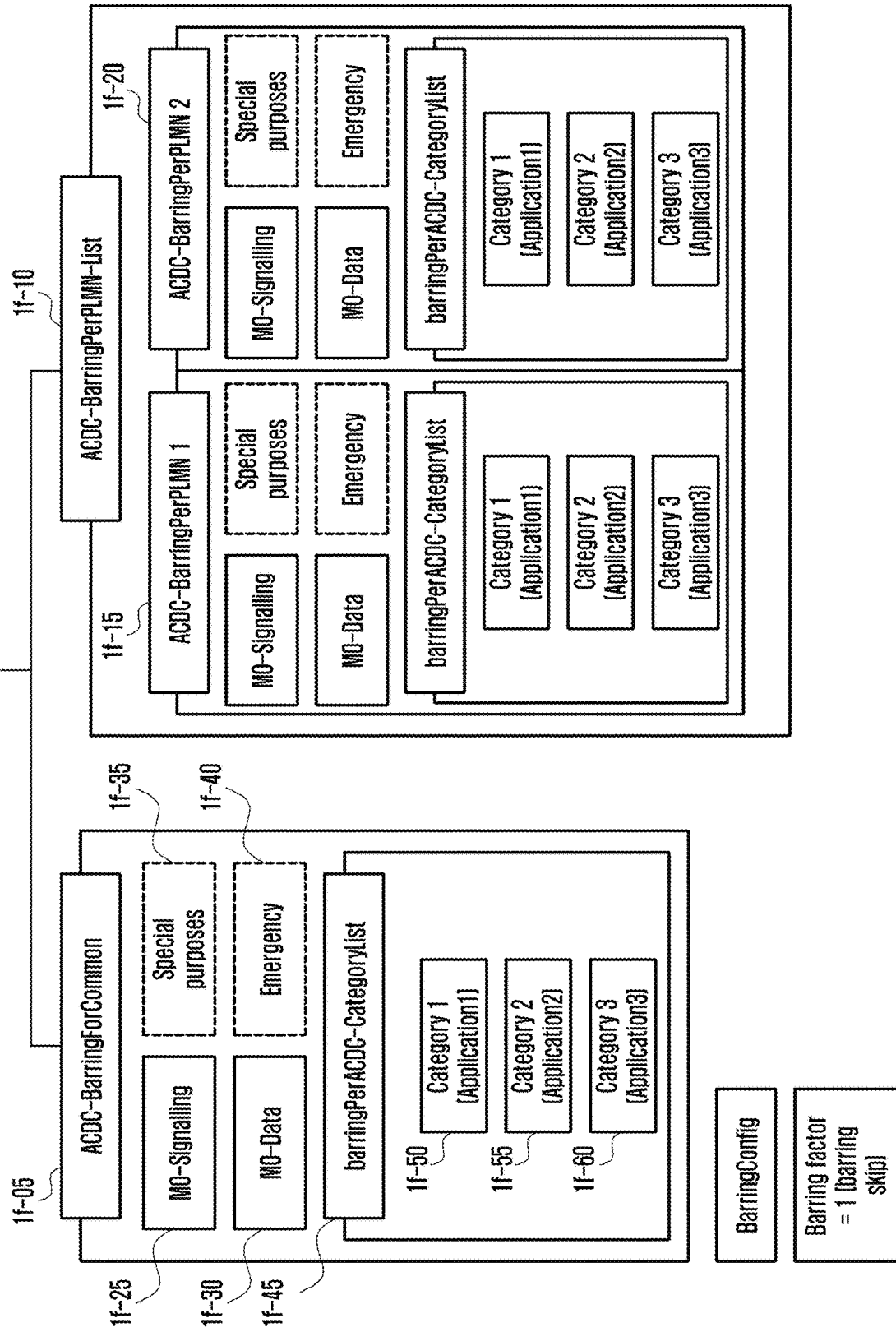
FIG. 1F illustrates a structure of access barring configuration information according to the present disclosure.

FIG. 1F illustrates a structure of access barring configuration information according to the present disclosure.

According to the present disclosure may include PLMN-specific barring configuration information sets (ACDC-BarringPerPLMN 1, ACDC-BarringPerPLMN 2, . . . ) 1f-15 and 1f-20. If all PLMNs have the same barring configuration information set, the network may broadcast a common barring configuration information set (ACDC-BarringForCommon) 1f-05.

The PLMN-specific barring configuration information set or the common barring configuration information set (ACDC-BarringForCommon) may include per-category barring configuration informations 1f-50, 1f-55, and 1f-60.

As aforementioned, it may be possible to implement the present disclosure in such a way of categorizing UE types, call types, or slice types rather than the application types.

For example, the legacy ACDC does not provide any barring configuration information for MO signaling, MO data, and Emergency signaling. The present disclosure is characterized in that the network further provides the MO signaling, MO data, and Emergency barring configuration informations 1f-25, 1f-30, and 1f-40. It may also be possible to provide the special purposes barring configuration information 1f-35. It may be possible to define categories for the MO signaling, MO data, and Emergency; the UE NAS may provide the UE AS with dedicated MO signaling category information when a service request corresponding to the MO signaling is triggered.

If the MO signaling establishment cause value is transmitted in the service request to the UE AS as before, it may be possible to perform the barring check using the dedicated MO signaling barring configuration information.

As described above, in the present disclosure, it may be possible to categorize a certain factor rather than application such that the UE determines whether access is barred based on the corresponding category information.

In the legacy system, there is not barring configuration information for a category of a new barring mechanism, it is assumed that access is barred for the application belonging to the category and thus, although the same barring configuration information is applied to multiple categories, all per-category configuration informations should be included in the system information. This may cause signaling overhead.

The present disclosure is characterized in that if the same barring configuration information is applied to multiple categories the common barring configuration information 1f-30 is provided for the multiple categories to reduce signaling overhead. In the present disclosure, the barring configuration information which is commonly applied multiple categories is referred to as common barring configuration or default barring configuration information. Accordingly, the network may include the common barring configuration information in the system information.

For example, if category 1 and category 2 have the same barring configuration information, the network does not include all barring configuration informations for the category 1 and category 2 in the system information. Instead, the network includes only the common barring configuration information in the system information. This is useful in terms of applying the common barring configuration information to a specific service.

The UE operation is characterized by making the access barring determination based on the common barring configuration information unlike the legacy technology in which if no barring configuration information corresponding to the interesting category exists it is assumed that access is permitted.

Accordingly, the UE may check the service (application) request for the category and, if the barring configuration information corresponding to the category, determine whether access is barred based on the barring configuration information; if no barring configuration information exists, the UE may determine whether access is barred based on the common barring configuration information. That is, when there is no barring configuration information defined for a specific category, it may be possible to determine whether access is barred based on the common barring configuration information. The aforementioned MO signaling, MO data, and Emergency barring configuration information may be the common barring configuration information.

The access barring determination is made in such a way of generating a random value as described above, checking the ac-barringFactor value included in the common barring configuration information, and determining whether a random value generated according to a method (to be described later) is less than the ac-barringFactor value.

It may also be possible to make an access barring determination based on a 1-bit indicator (to be described later) or a specific ac-barringFactor included in the common barring configuration information for all service requests.

In the case of using the common barring configuration information, the access barring check process is performed for every category. Accordingly, there is a need of a method for indicating a category for which, if need be, the access barring check process is skipped. The present disclosure proposes a method for indicating the category for which access barring check process is skipped with a 1-bit indicator or a specific barring factor (ac-BarringFactor).

In this case, it may be possible to include a 1-bit indicator, instead of the ac-BarringFactor IE and ac-Barringtime IE, in the barring configuration information of the category for which the access barring check process is skipped. The UE AS skips the access barring check process, for the category of which barring configuration information includes the 1-bit indicator, and assumes that access is permitted. A description is made of the method for configuring a specific ac-BarringFactor value in detail with reference to FIG. 1G.

The network may also include separate barring configuration informations in the system information for special purposes or the emergency service.

Accordingly, it may be necessary to define categories dedicated to the emergency service and special purposes respectively in order for the UE NAS to provide the UE AS with the category information for the emergency call or special purposes when a service request for the emergency call or special purposes is triggered.

The separate barring configuration informations may be provided in the form of the ac-BarringFactor IE and ac-Barringtime IE. The barring configuration information may also include a 1-bit indicator indicating whether to skip the access barring check process. The barring configuration information may also include a specific barring factor for skipping the access barring check process for the special purposes or emergency service. This is because typically such services have a priority higher than those of other services.

Figure 1G:
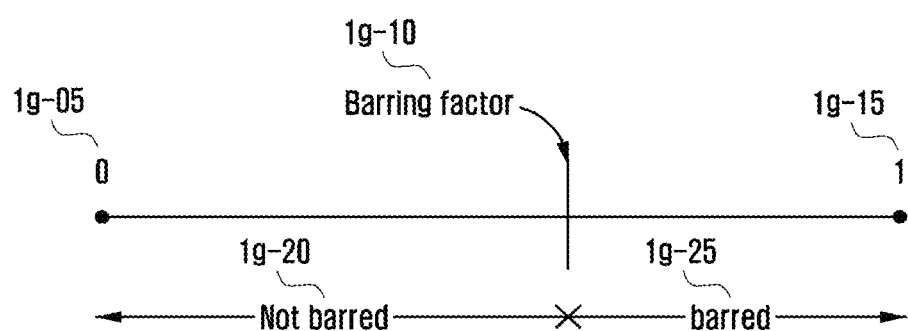
FIG. 1G illustrates an access barring determination method according to the present disclosure.
Figure 1G:
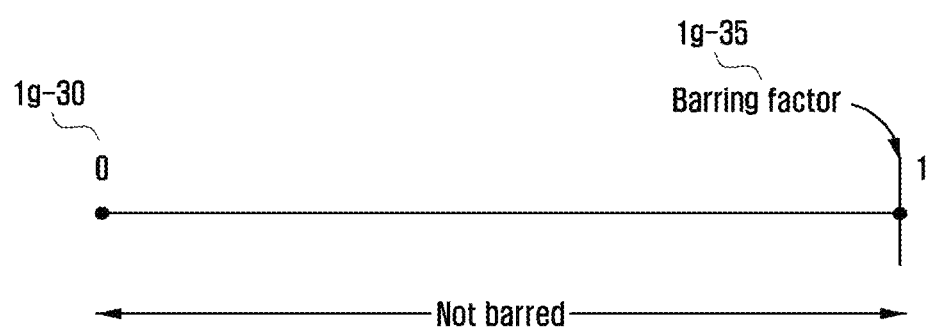

FIG. 1G illustrates an access barring determination method according to the present disclosure.

As described above, it may be considered to use a specific ac-BarringFactor 1g-10 of the category for which the access barring check process is skipped.

Since the legacy ac-BarringFactor α is the range of 0≤α<1 as denoted by reference numbers 1g-05 and 1g-25, it is impossible to skip the access barring check process for access permission with no restriction using the ac-BarringFactor adjustment method. This is because if a random value generated by the UE AS is in the range of 0≤α<ac-BarringFactor as denoted by reference number 1g-20 it is assumed that access is permitted.

In reference to part (a) of FIG. 1G, if the random value generated by the UE is in the range of 1g-20, i.e., equal to or greater than 0 and less than the ac-BarringFactor, access is permitted.

If the random value is in the range of 1g-25, i.e., ac-BarringFactor≤α<1 as denoted by reference number 1g-25, it is assumed that access is barred. In reference to part (b) of FIG. 1G, if the random value generated by the UE is equal to or greater than ac-BarringFactor and less than 1 as denoted by reference number 1g-25, access may be barred.

If ac-BarringFactor is 1 as shown in part (b) of FIG. 1G, the random value generated by the UE is less than ac-BarringFactor and this means that access is permitted without any restriction (which is equivalent to skip access barring check process). In the present disclosure, it is possible to reduce unnecessary ac-BarringTime by skipping the access barring check process for a category in such a way of setting the ac-BarringFactor included in the corresponding barring configuration information to 1. That is, if the barring factor is set to 1, the barring time value (ac-BarringTime) may not be included in the barring configuration information.

Figure 1H:
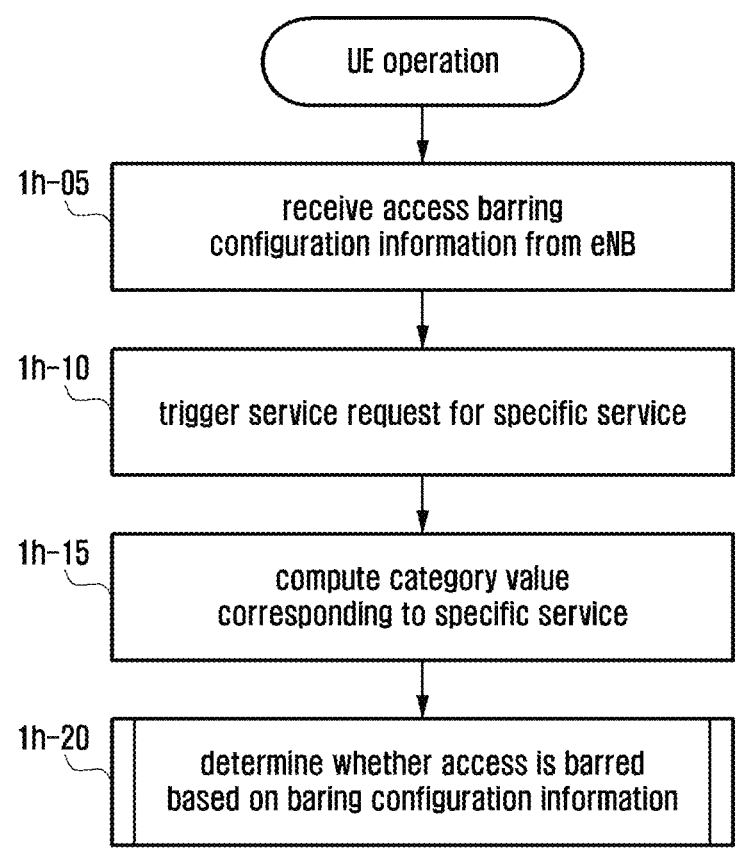
FIG. 1H illustrates UE operations according to the present disclosure.

FIG. 1H illustrates UE operations according to the present disclosure.

In reference to FIG. 1H, the UE may receive the barring configuration information broadcast by an eNB at step 1h-05.

Next, the UE may trigger a service request for a certain service at step 1h-10. Here, the service request may be triggered by the UE NAS.

The UE may retrieve a category value corresponding to the service at step 1h-15. Here, the category value corresponding to the service may be determined by the UE NAS.

Next, the UE may determine whether access is barred based on the barring configuration information at step 1h-20. The access barring determination may be made by the UE AS, and the UE NAS may send the service request to the UE AS. The service request may include the category value.

A description is made of the barring configuration information-based access barring determination method of the UE in detail hereinafter.

Figure 1I:
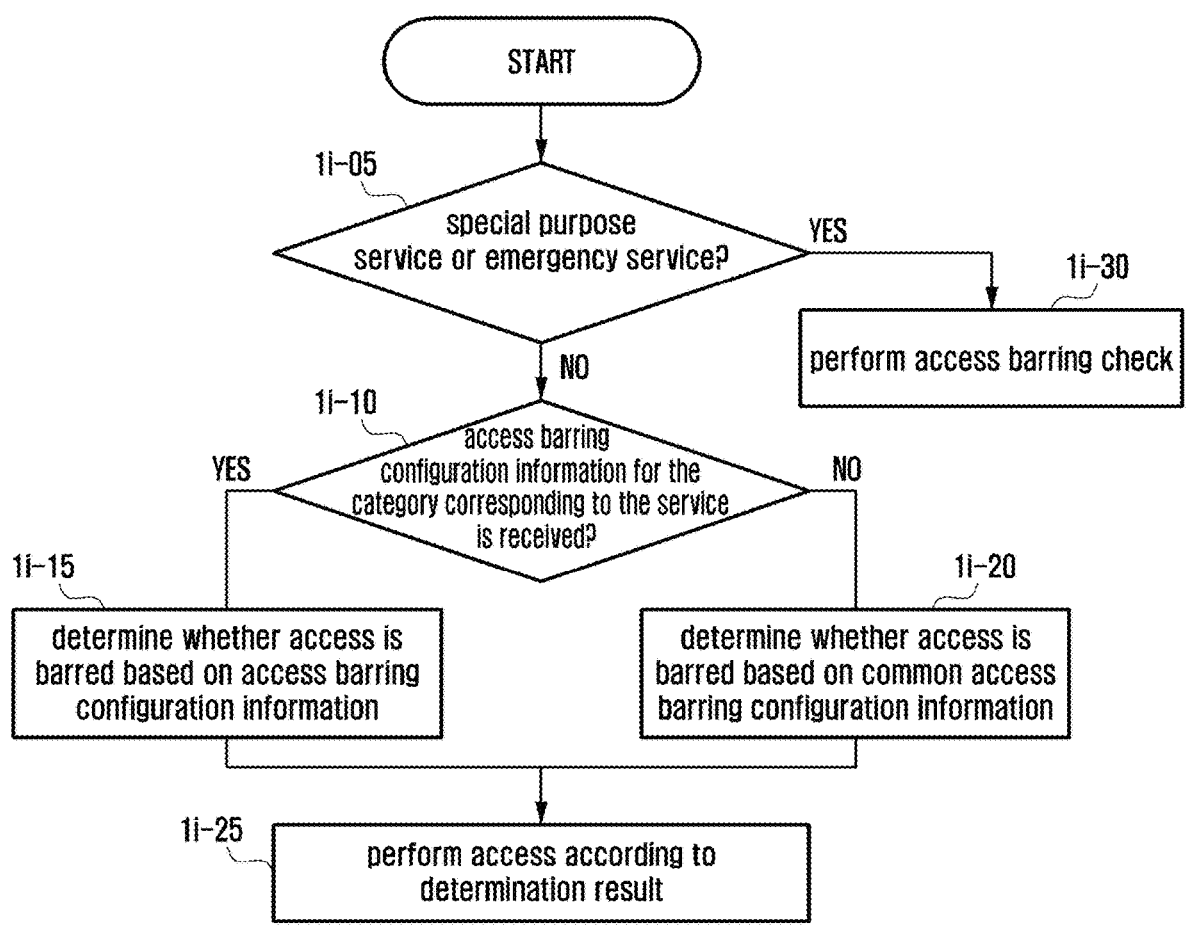
FIG. 1I illustrates an access barring determination method of a UE according to the present disclosure.

FIG. 1I illustrates an access barring determination method of a UE according to the present disclosure.

The UE determines at step 1i-05 whether the triggered service is a special purpose or emergency service.

If so, the UE perform an access barring check process on the service at step 1i-30. As aforementioned, it may be possible to determine whether access is barred based on separate barring configuration information or to make an access barring process skip determination using a 1-bit indicator.

Otherwise, if the triggered service is a normal service, the UE determines at step 1i-10 whether the barring configuration information for the category corresponding to the service has been received from the eNB.

If the barring configuration information for the category corresponding to the service has been received from the eNB, the UE checks the corresponding barring configuration information for access barring indication. The UE may attempt an access to the service based on the access barring indication at step 1i-25.

Otherwise, if the barring configuration information for the category corresponding to the service has not been received from the eNB, the UE checks the common access barring configuration information for access barring indication at step 1i-20. If the common access barring configuration information is not included, the UE skips access barring check process. That is, the UE assumes that access is permitted. Next, the UE may attempt access to the service based on the access barring indication at step 1i-25.

In the present disclosure, steps 1i-05 and 1i-30 may be omitted. As aforementioned, the special purpose or emergency service may be categorized into a dedicated category.

In the present disclosure, the step of determining whether the access barring configuration information for the category corresponding to the service has been received from the eNB may follow step 1i-15 of retrieving the category value corresponding to the service. Then, the UE checks the corresponding configuration information for the case where the barring configuration information for the category corresponding to the service has been received from the eNB and the common access barring configuration information for the case where the barring configuration information for the category corresponding to the service has not been received from the eNB to acquire the access barring indication.

Figure 1J:
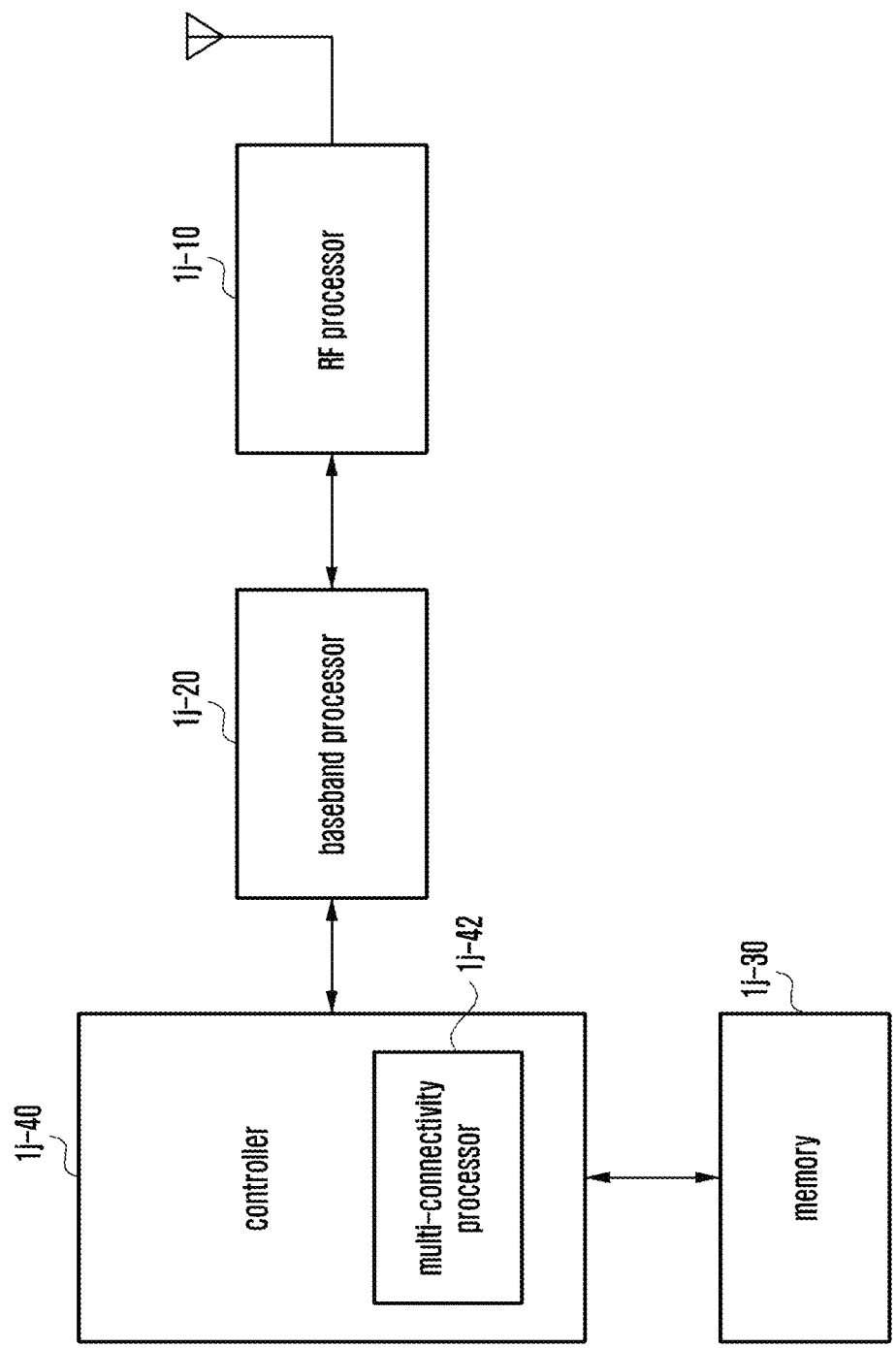
FIG. 1J illustrates a configuration of a UE of the present disclosure.

FIG. 1J illustrates a configuration of a UE of the present disclosure.

In reference to FIG. 1J, the UE includes a Radio Frequency (RF) processing unit 1j-10, a baseband processing unit 1j-20, a memory (storage unit) 1j-30, and a controller 1j-40. In the present disclosure, the controller 1j-40 may be interchangeably referred to as a circuit, an application-specific integrated circuit, and at least one processor, and the controller may be coupled with the transceiver.

The RF processing unit 1j-10 has a function of signal band conversion and amplification for transmitting the signal through a radio channel. That is, the RF processing unit 1j-10 converts a baseband signal from the baseband processing unit 1j-20 to an RF band signal, the RF band signal being transmitted through an antenna, and converts an RF band signal received by the antenna to a baseband signal. For example, the RF processing unit 1j-10 may include a transmit filter, a receive filter, an amplifier, a mixer, an oscillator, a Digital to Analog Converter (DAC), and an Analog to Digital Converter (ADC). Although the drawing depicts one antenna, the UE may be provided with a plurality of antennas. The RF processing unit 1j-10 may also include a plurality of RF chains. The RF processing unit 1j-10 may perform beamforming. For beamforming, the RF processing unit 1j-10 may adjust phases and sizes of the signals transmitted/received through a plurality of antennas or antenna elements. The RF processing unit 1j-10 may perform MIMO signal processing and receive a signal with multiple layers during the MIMO operation.

The baseband processing unit 1j-20 has a function of conversion between the baseband signal and the bitstream according to the physical layer standard of the system. For example, the baseband processing unit 1j-20 performs encoding and modulation on the transmit bitstream to generate complex symbols in the data transmit mode. The baseband processing unit 1j-20 also performs demodulation and decoding on the baseband signal from the RF processing unit 1j-10 to recover the original bitstream in the data receive mode. In the case of using OFDM, the baseband processing unit 1j-20 performs encoding and modulation on the transmit bitstream to generate complex symbols, maps the complex symbols to subcarriers, performs Inverse Fast Fourier Transform (IFFT) on the mapped symbols, and inserts a Cyclic Prefix (CP) to the IFFTed symbols to generate OFDM symbols, in the data transmit mode. In the data receive mode, the baseband processing unit 1j-20 splits the baseband signal from the RF processing unit 1j-10 into OFDM symbols, performs Fast Fourier Transform (FFT) on the OFDM symbols to recover the signals mapped to the subcarriers, and performs demodulation and decoding on the signals to recover the original bitstream.

The baseband processing unit 1j-20 and the RF processing unit 1j-10 are involved in signal transmission and reception. Accordingly, the baseband processing unit 1j-20 and the RF processing unit 1j-10 may be referred to as a transmit unit, a receive unit, a transceiver, or a communication unit. At least one of the baseband processing unit 1j-20 and the RF processing unit 1j-10 may include a plurality of communication modules for supporting different radio access technologies. At least one of the baseband processing unit 1j-20 and the RF processing unit 1j-10 may also include a plurality of communication modules for processing signals in different frequency bands. For example, the radio access technologies may include a Wireless Local Area Network (WLAN) technology such as IEEE 802.11 and a cellular technology such as LTE. The different frequency bands may include a Super High Frequency (SHF) band such as 2.5 GHz band and 5 GHz band and a millimeter wave (mmW) band such as 60 Ghz band.

The memory 1j-30 may store basic programs for operations of the UE, application programs, and setting information. Particularly, the memory 1j-30 may store the information on a secondary access node for performing radio communication using a secondary radio access technology. The memory 1j-30 may provide the stored information in response to a request from the controller 1j-40.

The controller 1j-40 controls overall operations of the UE. For example, the controller 1j-40 transmits/receives signals by means of the baseband processing unit 1j-20 and the RF processing unit 1j-10. The controller 1j-40 writes and reads data to and from the memory 1j-40. For this purpose, the controller 1j-40 may include at least one processor. For example, the controller 1j-40 may include a Communication Processor (CP) for controlling communication and an Application Processor (AP) for controlling higher layer application programs.

In detail, the controller 1j-40 according to the present disclosure may receive the barring configuration information broadcast by an eNB. The controller 1j-40 may retrieve a category value corresponding to the triggered service. The controller 1j-40 may also determine whether access is barred based on the barring configuration information.

In detail, the controller 1j-40 may determine whether the access barring configuration information corresponding to the category of the service is received. The controller 1j-40 may also check, when the access barring configuration information corresponding to the category is received, the access barring configuration information corresponding to the category for the access barring indication and, when the access barring configuration information corresponding to the category is not received, the common access barring configuration information for the access barring indication.

Figure 1K:
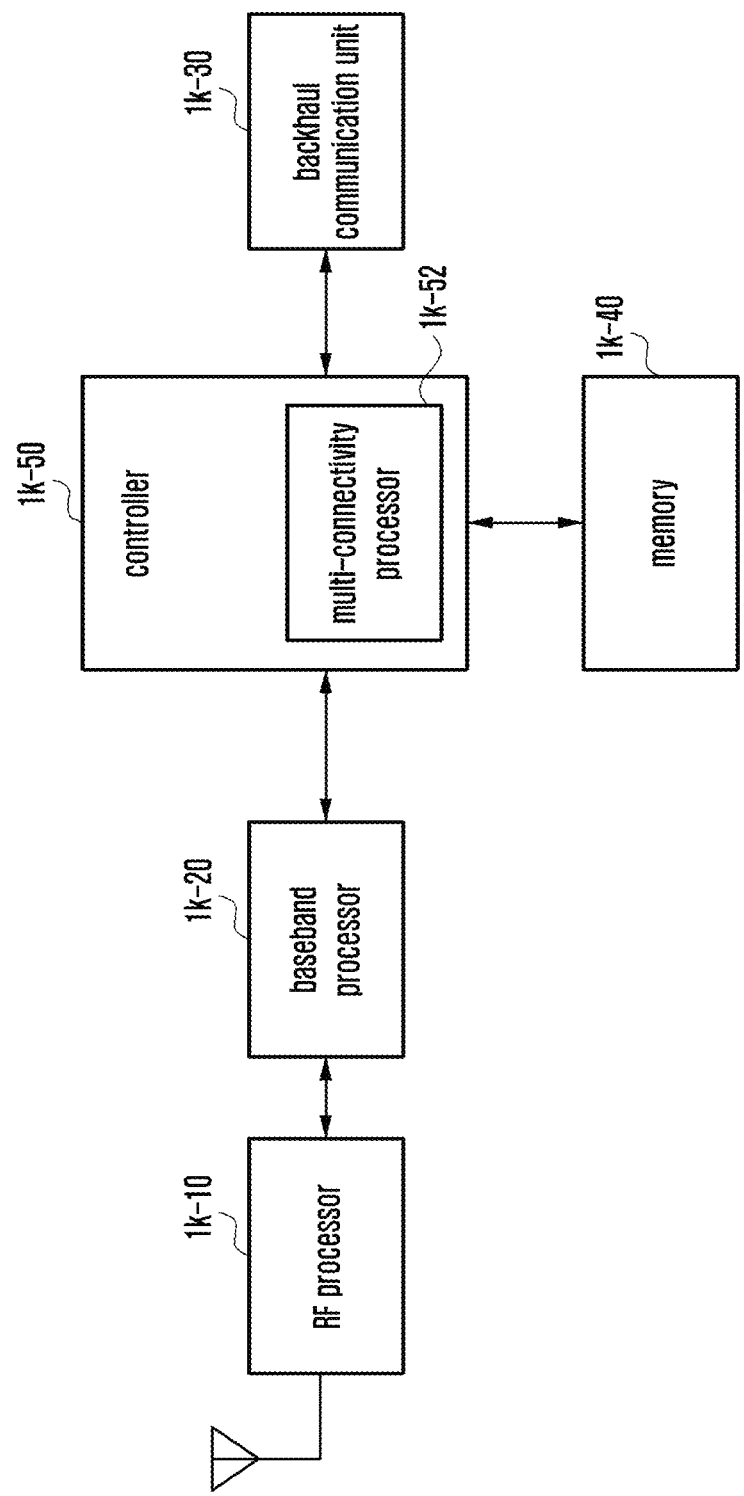
FIG. 1K illustrates a configuration of an eNB of the present disclosure.

FIG. 1K illustrates a configuration of an eNB of the present disclosure.

As shown in FIG. 1K, the eNB includes an RF processing unit 1k-10, a baseband processing unit 1k-20, a backhaul communication unit 1k-30, a memory 1k-40, and a controller 1k-50. In the present disclosure, the controller 1k-50 may be interchangeably referred to as a circuit, an application-specific integrated circuit, and at least one processor and the controller may be coupled with the transceiver.

The RF processing unit 1k-10 has a function of signal band conversion and amplification for transmitting the signal through a radio channel. That is, the RF processing unit 1k-10 up-converts a baseband signal from the baseband processing unit 1k-20 to an RF band signal, the RF band signal being transmitted through an antenna, and down-converts an RF band signal received by the antenna to a baseband signal. For example, the RF processing unit 1k-10 may include a transmit filter, a receive filter, an amplifier, a mixer, an oscillator, a DAC, and an ADC. Although the drawing depicts one antenna, the eNB may be provided with a plurality of antennas. The RF processing unit 1k-10 may also include a plurality of RF chains. The RF processing unit 1k-10 may perform beamforming. For beamforming, the RF processing unit 1k-10 may adjust phases and sizes of the signals transmitted/received through a plurality of antennas or antenna elements. The RF processing unit 1k-10 may perform MIMO signal processing and receive a signal with multiple layers during the MIMO operation.

The baseband processing unit 1k-20 has a function of conversion between the baseband signal and the bitstream according to the physical layer standard of a primary radio access technology. For example, the baseband processing unit 1k-20 performs encoding and modulation on the transmit bitstream to generate complex symbols in the data transmit mode. The baseband processing unit 1k-20 also performs demodulation and decoding on the baseband signal from the RF processing unit 1k-10 to recover the original bitstream in the data receive mode. In the case of using OFDM, the baseband processing unit 1k-20 performs encoding and modulation on the transmit bitstream to generate complex symbols, maps the complex symbols to subcarriers, performs IFFT on the mapped symbols, and inserts a Cyclic Prefix (CP) to the IFFTed symbols to generate OFDM symbols, in the data transmit mode. In the data receive mode, the baseband processing unit 1k-20 splits the baseband signal from the RF processing unit 1k-10 into OFDM symbols, performs Fast Fourier Transform (FFT) on the OFDM symbols to recover the signals mapped to the subcarriers, and performs demodulation and decoding on the signals to recover the original bitstream. The baseband processing unit 1k-20 and the RF processing unit 1k-10 are involved in signal transmission and reception. For this reason, the baseband processing unit 1k-20 and the RF processing unit 1k-10 may be referred to as a transmit unit, a receive unit, a transceiver, or a communication unit.

The backhaul communication unit 1k-30 provides an interface for intra-node communication. That is, the backhaul communication unit 1k-30 converts the bitstream transmitted from a primary eNB to another node (e.g., secondary eNB and core network) to a physical signal and converts a physical signal received from another node to a bitstream.

The memory 1k-40 may store basic programs for operations of the eNB, application programs, and setting information. Particularly, the memory 1k-40 may store the information on the bearer allocated to the connected UE and measurement result reported by the connected UE. The memory 1k-40 may also store the information for use in enabling or disabling multi-connectivity of the UE. The memory 1k-40 provides the store data in response to a request from the controller 1k-50.

The controller 1k-50 controls overall operations of the primary eNB. For example, the controller 1k-50 transmits/receives signals by means of the baseband processing unit 1k-20 and the RF processing unit 1k-10. The controller 1k-50 writes and reads data to and from the memory 1k-40. For this purpose, the controller 1k-50 may include at least one processor.

In detail, the controller 1k-50 according to the present disclosure may broadcast barring configuration information. Here, the controller 1k-50 may determine the category barring configuration information per service category and transmit the per-service category barring configuration information to the UE. The controller 1k-50 may also determine a common barring configuration information for multiple categories and transmit the common barring configuration information to the UE. Here, the common barring configuration information may be applicable to all categories for which no barring configuration information is specified.

The controller 1k-50 may also categorize special purpose or emergency service into a category and determine the barring configuration information for skipping the access barring check process for the corresponding service. Here, the barring configuration information may include a 1-bit indicator or a predetermined barring factor for instructing to skip the access barring check process.

Second Embodiment

This embodiment proposes a DRX operation capable of changing a DRX cycle and an inactivity timer dynamically.

Figure 2A:
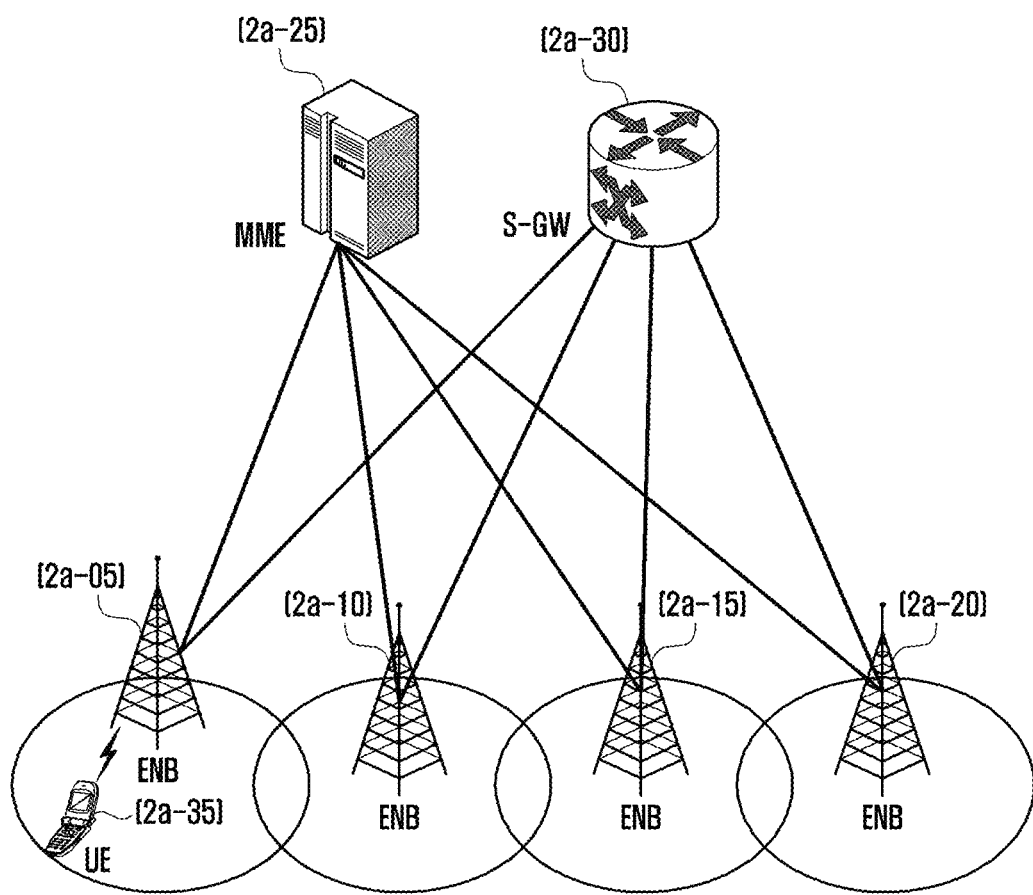
FIG. 2A illustrates an LTE architecture.

FIG. 2A illustrates architecture of an LTE system to which the present disclosure is applied. The detailed description of the LTE system architecture has been made already with reference to FIG. 1A and thus is omitted herein.

Figure 2B:
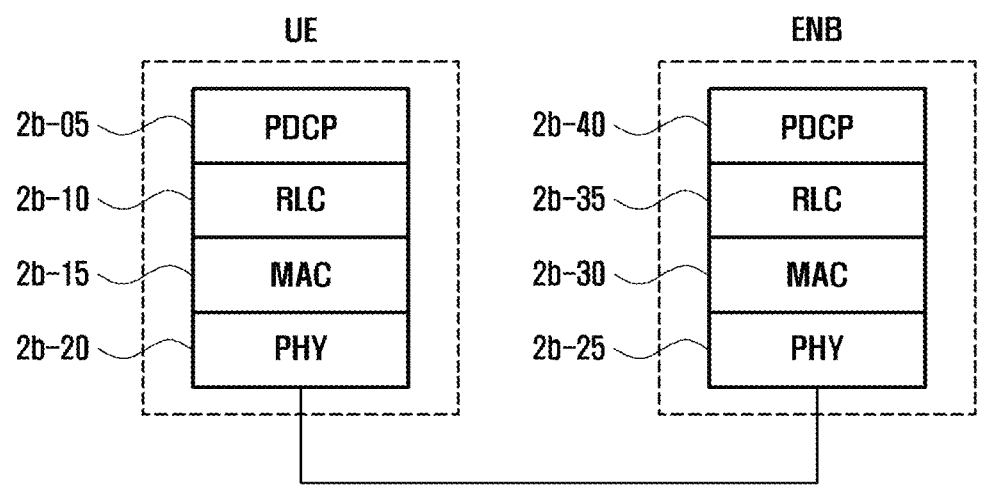
FIG. 2B illustrates a protocol stack of an interface between a UE and an eNB in the LTE system.

FIG. 2B is a diagram illustrating a protocol stack of an interface between a UE and an eNB in the LTE system to which the present disclosure is applied.

In reference to FIG. 2, the protocol stack of the interface between the UE and the eNB in the LTE system includes a plurality of protocol layers stacked from the bottom to the top: physical (PHY) layer denoted by reference numbers 2b-20 and 2b-25, medium access control (MAC) layer denoted by reference numbers 2b-15 and 2b-30, radio link control (RLC) layer denoted by reference numbers 2b-10 and 2b-35, and packet data convergence control (PDCP) layer denoted by reference numbers 2b-05 and 2b-40.

The PDCP layer denoted by reference numbers 2b-05 and 2b-40 takes charge of compressing/decompressing an IP header. The main functions of the PDCP layer are as follows:
  Header compression and decompression (ROHC only);
  Transfer of user data;
  In-sequence delivery of upper layer PDUs at PDCP re-establishment procedure for RLC AM);
  For split bearers in DC (only support for RLC AM);
  PDCP PDU routing for transmission and PDCP PDU reordering for reception);
  Duplicate detection of lower layer SDUs at PDCP re-establishment procedure for RLC AM;
  Retransmission of PDCP SDUs at handover and, for split bearers in DC, of PDCP PDUs at PDCP data-recovery procedure, for RLC AM;
  Ciphering and deciphering;
  Timer-based SDU discard in uplink.

The RLC layer denoted by reference numbers 2b-10 and 2b-35 takes charge of segmenting a PDCP PDU into segments of appropriate size for Automatic Repeat Request (ARQ) operation. The main functions of the RLC layer are as follows:

Transfer of upper layer PDUs;
Error Correction through ARQ (only for AM data transfer);
Concatenation, segmentation and reassembly of RLC SDUs (only for UM and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);
RLC SDU discard (only for UM and AM data transfer);
RLC re-establishment.

The MAC layer denoted by reference number 2b-15 and 2b-30 allows for connection of multiple RLC entities established for one UE and takes charge of multiplexing RLC PDUs from the RLC layer into a MAC PDU and demultiplexing a MAC PDU into RLC PDUs.

Mapping between logical channels and transport channels;
Multiplexing/demultiplexing of MAC SDUs belonging to one or different logical channels into/from transport blocks (TB) delivered to/from the physical layer on transport channels;
Scheduling information reporting;
Error correction through HARQ;
Priority handling between logical channels of one UE;
Priority handling between UEs by means of dynamic scheduling;
MBMS service identification;
Transport format selection;
Padding.

The PHY layer denoted by reference numbers 2b-20 and 2b-25 takes charge of channel-coding and modulation on higher layer data to generate and transmit OFDM symbols over a radio channel, and demodulating and channel-decoding on OFDM symbols received over the radio channel, the decoded data being delivered to the higher layers.

FIG. 2C illustrates a DRX operation.

DRX is a technique of monitoring Physical Downlink Control Channel (PDCCH) for scheduling information only during a predetermined period to minimize power consumption of a UE. DRX is applicable in idle and connected modes but with slight difference. The present disclosure is directed to the operation in the connected mode. However, the present disclosure is not limited thereto but can be applied to the operation in the idle mode.

If a UE stays awake all the time to monitor PDCCH for acquiring scheduling information, this may cause high power consumption. A basic DRX operation has a DRX cycle 2c-00 and the UE monitors PDCCH only during the on-duration period 2c-05 within the DRX cycle 2c-00.

In the connected mode, at least one of a long DRX and short DRX cycles can be configured. In normal operation, the long DRX cycle is applied and, if need be, the eNB may trigger the short DRX cycle using a MAC Control Element (CE). After a predetermined time period, the UE may change the short DRX cycle for the long DRX cycle. The initial scheduling information of a certain UE is transmitted on a predetermined PDCCH. The UE monitors PDCCH periodically to minimize power consumption.

If the scheduling information for a new packet is received on the PDCCH during the on-duration period 2c-05, the UE starts a DRX inactivity timer as denoted by reference number 2c-15. The UE remains in the active state while the DRX inactivity timer is running. That is, the UE continues monitoring PDCCH. The UE also starts a HARQ Round Trip Time (RTT) timer as denoted by reference number 2c-20. The HARQ RTT timer is applied to protect against unnecessary PDCCH monitoring during the HARQ RTT and thus it is not necessary for the UE to monitor PDCCH while the HARQ RTT timer is running. However, while both the DRX inactivity timer and HARQ RTT timer are running, the UE monitors PDCCH until the DRX inactivity timer expires.

If the HARQ RTT timer expires, a DRX retransmission timer starts as denoted by reference number 2c-25. While the DRX retransmission is running, the UE has to monitor PDCCH. Typically, the scheduling information for HARQ retransmission is received while the DRX retransmission timer is running as denoted by reference number 2c-30. If the scheduling information is received, the UE stops the DRX retransmission timer immediately and starts the HARQ RTT timer again. The above process is repeated until the packet is received successfully as denoted by reference number 2c-35.

The configuration information related to the DRX operation in the connected mode is transmitted in an RRC Connection Reconfiguration (RRCConnectionReconfiguration) message to the UE. Each of the on-duration timer, the DRX inactivity timer, and the DRX retransmission timer corresponds to a number of subframes. If a predetermined number of PDCCH subframes arrive after the start of a timer, the timer expires. In Frequency Division Duplex (FDD), all downlink subframes are PDCCH subframes; in Time Division Duplex (TDD), downlink and special subframes are PDCCH subframes. In TDD, the downlink, uplink, and special subframes exist in the same frequency band. Among them, the downlink and special subframes are regarded as PDCCH subframes.

The eNB may configure two DRX states: longDrx and shortDRX. The eNB may use one of the two DRX states in consideration of power preference indication information reported by the UE, UE mobility log information, and characteristic of configured DRB. The transition between the two states is triggered by expiry of a certain timer or transmission of a predetermined MAC CE from the eNB to the UE.

However, only with the two DRX cycles specified in LTE, it is difficulty to adjust the length of the DRX cycle dynamically according to DRB characteristics, traffic pattern, and buffer status.

The present disclosure proposes a DRX operation capable of adjusting the length of the DRX cycle or drx-InactivityTimer dynamically according to the DRB characteristics, traffic pattern, and buffer status. here, the DRB characteristics, traffic pattern, and buffer status may be referred to as data communication information. That is, in the present disclosure, the eNB may adjust the DRX cycle or a timer value dynamically according to the data communication information.

Particularly, the eNB configures a default DRX cycle or a default DRX inactivity timer (drx-InactivityTimer) to the UE and adjust the length of the DRX cycle dynamically using a MAC CE. The present disclosure also proposes a method of stopping DRX operation, upon receipt of a beam measurement report (particularly a new best beam report), and maintaining the active time.

Figure 2D:
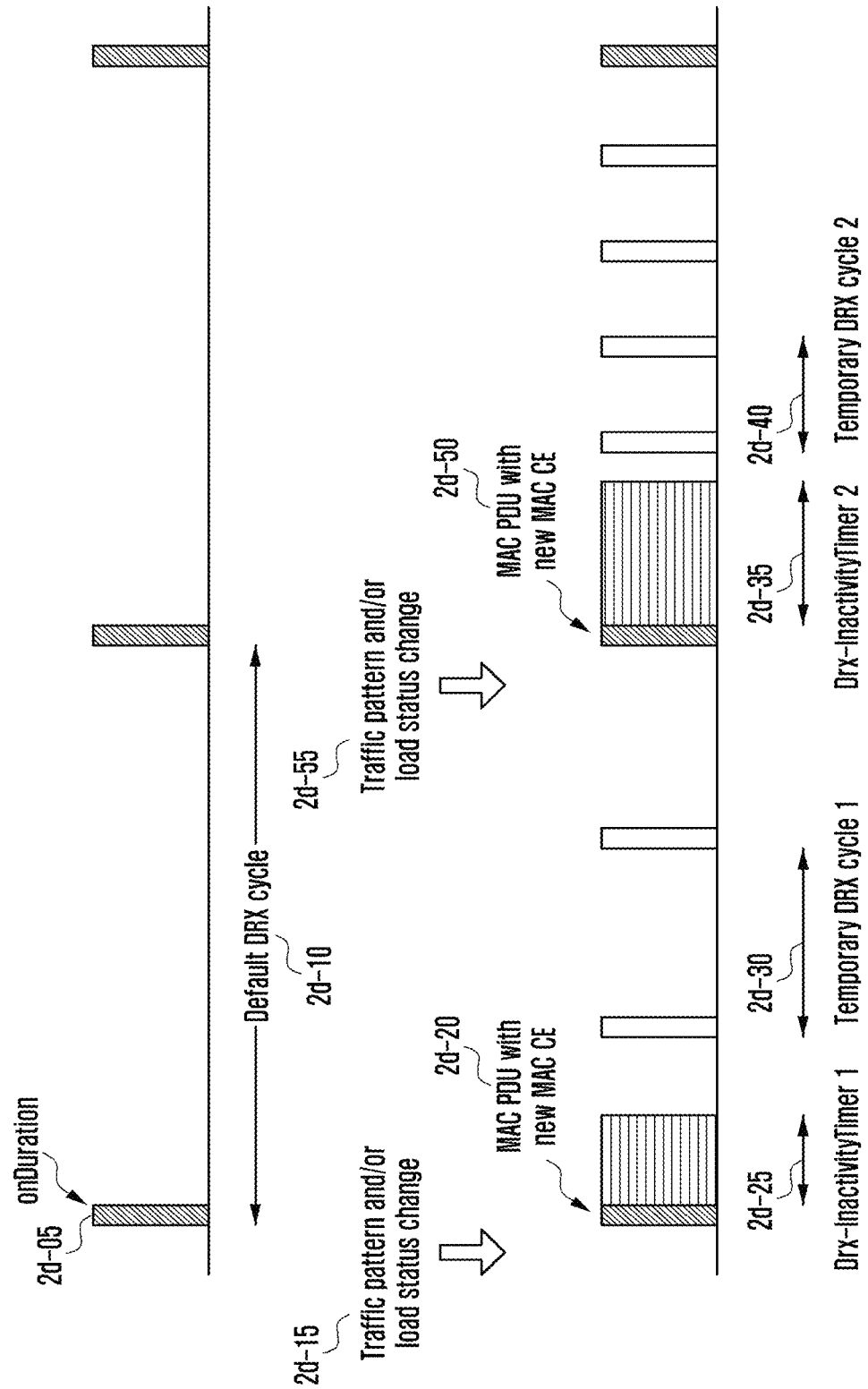
FIG. 2D illustrates the concept of a DRX operation in the connected mode according to the present disclosure.

FIG. 2D illustrates the concept of a DRX operation in the connected mode according to the present disclosure.

In the present disclosure, the eNB may configure a DRX functionality with a default DRX cycle and a default drx-InactivityTimer to the UE. In the present disclosure, the DRX cycle and the DRX-related timer value which the eNB initially configures to the UE may be referred to as initial DRX cycle and initial DRX-related timer, and the eNB may configure at least one initial DRX cycle and at least one initial DRX-related timer to the UE. Here, examples of the DRX-related timer include the aforementioned drx-InactivityTimer and drx-retransmissionTimer.

If the DRX functionality is configured to the UE, the UE starts the DRX operation at a predetermined time point. The DRX operation starts with the default DRX cycle 2d-10. The UE monitors a control channel during the onDuration period 2d-05 of every cycle. The control channel may include downlink or uplink scheduling information for the UE. The onDuration period is also configured by the eNB.

Meanwhile, the eNB may check for DRB characteristics, traffic pattern, buffer status, and frame structure as denoted by reference number 2d-15. If it is necessary to apply a shorter DRX cycle, the eNB may adjust the DRX cycle as denoted by reference numbers 2d-30 and 2d-40 and drx-InactivityTimer values as denoted by reference numbers 2d-25 and 2d-35 using a predetermined MAC CE 2d-20. The MAC CE includes new DRX cycle or drx-InactivityTimer value. Here, the MAC CE carrying the DRX cycle or drx-InactivityTimer value may be referred to as DRX reconfiguration information, and the information being changed by the MAC CE may be referred to as DRX parameters. Although the description is directed to the case where the DRX cycle or DRX-related timer values are changed by means of a MAC CE, the present disclosure is not limited thereto. For example, the eNB may use a MAC CE to change other DRX-related information (DRX parameter) included in the DRX configuration information as well as the DRX cycle and DRX-related timer values.

The new parameter values may be provided in various ways as follows. Although this embodiment is directed to a case where the drx-InactivityTimer value is changed for convenience of explanation, the present disclosure is not limited to this embodiment. That is, the present disclosure can be applied to change any of all DRX-related timer values.

Option 1: The MAC CE may include information on the multiples of the default DRX cycle and default drx-InactivityTimer values, e.g., ¼, ½, 2, 4, 6, and 8 (or indices corresponding to respective multiples) of the default DRX cycle and default drx-InactivityTimer values.

Option 2, The MAC CE may include absolute values of the DRX cycle and default drx-InactivityTimer values to be applied (or indices corresponding to the absolute values).

In the case of applying Option 1, the eNB transmits the information on the multiples of the default DRX cycle and default drx-InactivityTimer or indices corresponding to the multiples in a MAC CE to the UE, and the UE may acquire the DRX cycle and timer values based on the default DRX cycle and default drx-InactivityTimer values and the information contained in the MAC CE. The information on the multiple of the default DRX cycle value and the information on the multiple of the default drx-InactivityTimer value may be configured separately and differently. Also, the information on the multiple of the default DRX cycle value and the information on the multiples of the default drx-InactivityTimer value may be configured identically.

Also, the eNB may change one of the default DRX cycle and default drx-InactivityTimer values by transmitting to the UE the information on the multiples of one of the default DRX cycle and default drx-InactivityTimer values in the MAC CE.

For example, if the MAC CE includes a value of ¼, the UE applies the DRX cycle corresponding to ¼ of the default DRX cycle. If it is configured to apply the information on the multiple to the default DRX cycle and default drx-InactivityTimer values identically, the UE may apply the inactivity timer value of ¼ of the default drx-InactivityTimer.

If the information on the multiple of the default DRX cycle value and the information on the multiples of the default drx-InactivityTimer value are configured separately, the UE may not change the value of the default drx-InactivityTimer.

In the case of applying Option 2, the eNB may include at least one of the DRX cycle and drx-InactivityTimer values in the MAC CE. The UE may operate with the DRX cycle and drx-InactivityTimer values contained in the MAC CE.

In the present disclosure, the eNB may configure two or more DRX-related timer values to the UE and change the DRX-related timer values using the MAC CE.

Typically, if a short DRX cycle is applied, this is the case where the inter-arrival time (difference of arrival times of packets) is shortened in the traffic pattern. In the next generation mobile communication system, even the frame structure may be changed depending the purpose. For example, it is required to shorten the delay time, the Transmission Time Interval (TTI) may decrease. This means the decrease of RRT. Here, it may be possible to reduce power consumption of the UE without performance degradation even when applying the shorter drx-InactivityTimer.

The new parameter values may be applied immediately or at a predetermined time point after the receipt of the MAC CE. It may be possible to define a new MAC CE for triggering the DRX operation.

The predetermined time point may be configured by the eNB or preconfigured at the UE. The time point may be indicated by the number of subframes arriving since the receipt of the MAC CE.

The newly applied values are valid during a predetermined time period or until a predetermined event occurs. If the predetermined period expires or the predetermined event occurs, the parameters are initialized to the default values or updated to new values.

The predetermined time period may be configured by the eNB and transmitted to the UE. The predetermined time period may be provided in the form of a timer or a multiple of the default DRX cycle. The predetermined time period may also be fixed with a predetermined value. The applied value may be initialized to the default value or updated to a new value.

If any of DRB characteristics, traffic pattern, buffer status, and frame structure changes as denoted by reference number (2d-55), and a MAC CE (2d-50) including new values is received, the UE applies the new values as denoted by reference numbers 2d-35 and 2d-40. If a MAC CE instructing to initialized to the default values is received, the UE applies the default values.

Figure 2E:
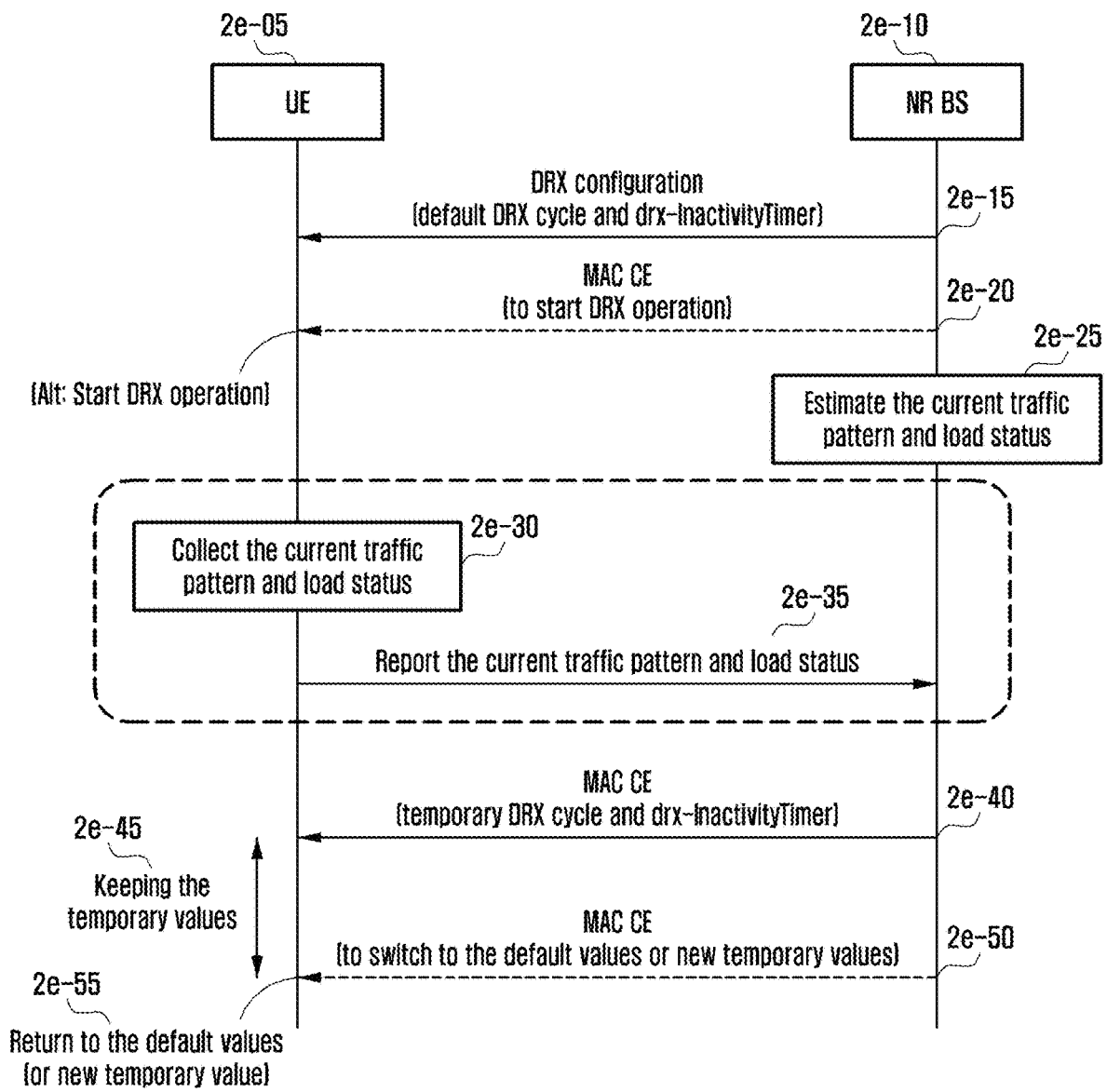
FIG. 2E illustrates signal flows in a DRX procedure for a UE according to the present disclosure.

FIG. 2E illustrates signal flows in a DRX procedure for a UE according to the present disclosure.

The UE 23-05 may receive DRX configuration information from an eNB 2e-10 at step 2e-15.

If the DRX cycle and drx-InactivityTimer values to be applied are not the default DRX cycle and default drx-InactivityTimer values, the DRX configuration information includes at least one of a timer value (or a multiple of the default DRX instead of the timer value) and the start time point for applying the non-default values.

If the DRX configuration information is received, the UE 2e-05 starts the DRX operation based on the configuration information immediately as denoted by reference number 2e-22 or at a predetermined time point. Alternatively, the eNB 2e-10 may transmit to the UE 2e-05 a MAC CE (which is newly defined for triggering the DRX operation) at 2e-20. In this case, the UE may perform the DRX operation immediately upon receipt of the new MAC CE or at a predetermined time point.

Next, the eNB 2e-10 may calculate the best DRX cycle or drx-InactivityTimer values based on various informations such as DRB characteristics, traffic pattern, buffer status, and frame structure at step 2e-25.

The UE 2e-05 may collect the information on the DRX characteristics, traffic pattern, and buffer status at step 2e-30 and transmits the information to the eNB 2e-10 at step 2e-35 in order to help the eNB to generate the best DRX configuration information.

If it is determined to reset the DRX cycle or DRX-related time to a new value instead of the current default value, the eNB 2e-10 transmits a MAC CE including the new value to the UE 2e-05 at step 2e-40.

As described above, the eNB 2e-10 may transmit the MAC CE including the information on a multiple of at least one of the DRX cycle and DRX-related timer values to the UE 2e-05. As described above, the multiple of the DRX cycle value and the multiple DRX-related timer value may be configured independently. The eNB 2e-10 may transmit to the UE 2e-05 the MAC CE including at least one of the DRX cycle value and the DRX-related timer value.

If the MAC CE is received, the UE 2e-05 applies the newly configured value immediately or at a predetermined time point. The information on the predetermined time point may be configured based on the DRX configuration information or preconfigured by the UE 2e-05.

The UE 2e-05 applies the newly configured value to the DRX operation at step 2e-45 during a predetermined time period or until a predetermined event occurs. Here, the values configured newly based on the information included in the MAC CE may be referred to as temporary DRX cycle value and temporary DRX-related timer value.

The eNB 2e-10 may transmit to the UE 2e-05 the MAC CE to apply the default values or newly configured values at step 2e-50. If the MAC CE is received from the eNB 2e-10, the UE 2e-05 updates the DRX cycle or initialize the DRX cycle to the default value at step 2e-55.

Figure 2F:
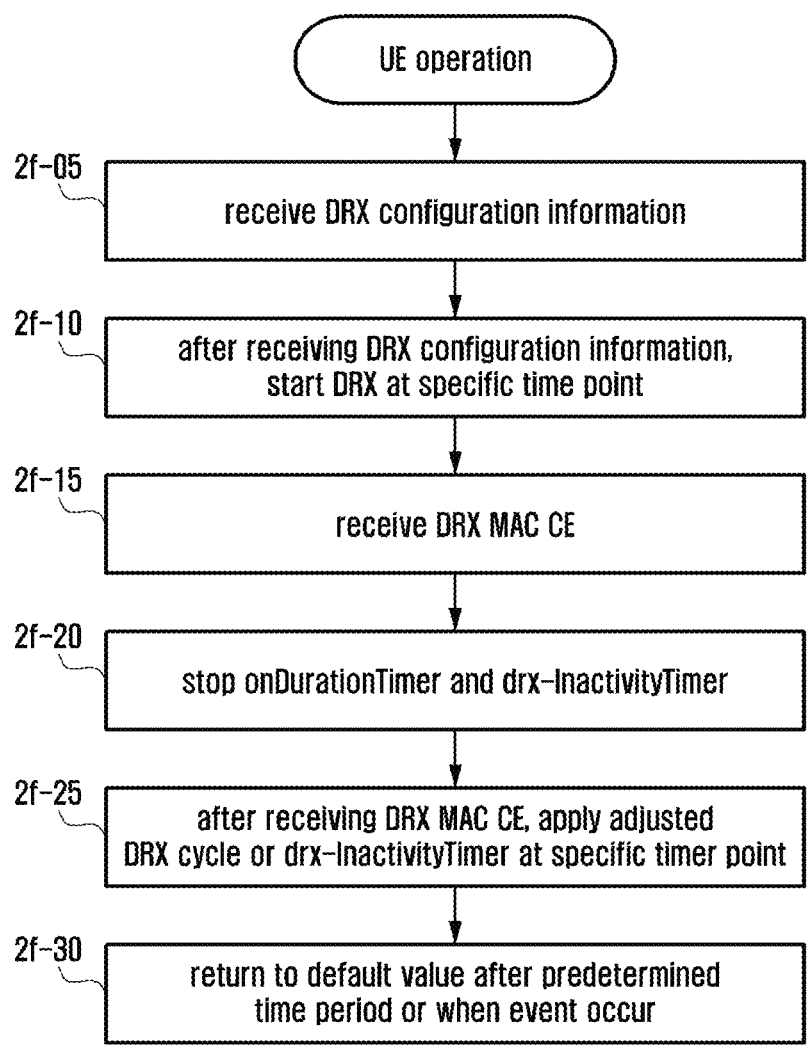
FIG. 2FA illustrates a DRX operation of a UE according to the present disclosure.
Figure 2F:
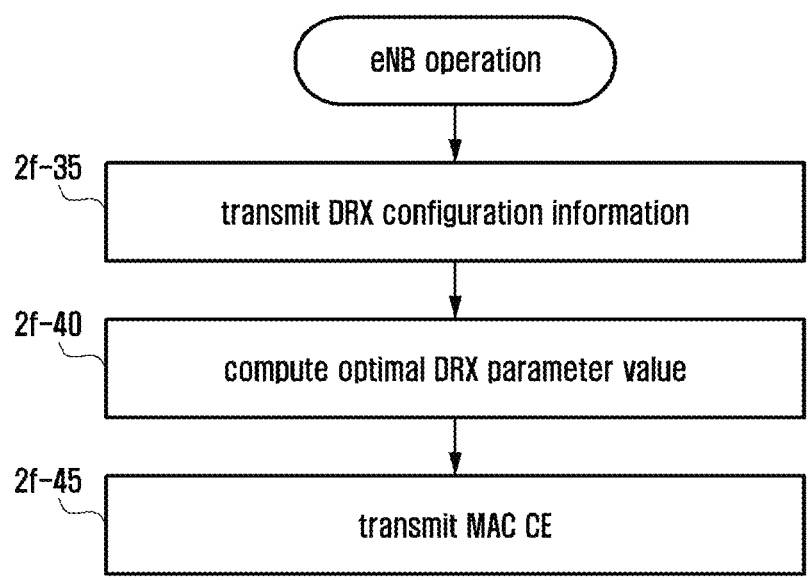

FIG. 2FA illustrates a DRX operation of a UE according to the present disclosure.

The UE receives the DRX configuration information from the eNB at step 2f-05. As described above, if the DRX cycle and drx-InactivityTimer values to be applied are not the default DRX cycle and default drx-InactivityTimer values, the DRX configuration information includes at least one of a timer value (or a multiple of the default DRX instead of the timer value) and the start time point for applying the non-default values.

After receiving the DRX configuration information, the UE starts the DRX operation at a predetermined time point at step 2f-10. The eNB may transmit a MAC CE for triggering the DRX operation, and the UE may perform the DRX operation immediately upon receipt of the MAC CE or at a predetermine time point.

The UE receives a DRX MAC CE (or DRX configuration information) at step 2f-15. This MAC CE may include the configuration information for updating DRX parameters. This MAC CE may include a multiple of at least one of the DRX cycle and DRX-related timer values or new DRX cycle and drx-InactivityTimer values.

If the new DRX configuration information is received, the UE stops the currently-running onDurationTimer and drx-InactivityTimer at step 2f-20.

The UE applies the new parameter values immediately upon receipt of the MAC CE or at a predetermined time point. Here, the predetermined time point may be configured based on the DRX configuration information or preconfigured by the UE, and detailed description thereof has been made above and thus is omitted herein.

The UE initializes the parameters to the default values or updates the parameters to new values at step 2f-30 after a predetermined time period or when a predetermined event occurs. In detail, the UE may initialize the DRX cycle and drx-related timer to default values when a predetermined time period expires. The eNB may transmit a MAC CE, and the UE may update or initialize the DRX cycle and DRX-related timer to default values based on the information included in the MAC CE.

FIG. 2FB illustrates a DRX operation of an eNB according to the present disclosure.

The eNB transmits DRX configuration information to the UE at step 2f-35. As described above, if the DRX cycle and drx-InactivityTimer values to be applied are not the default DRX cycle and default drx-InactivityTimer values, the DRX configuration information includes at least one of a timer value (or a multiple of the default DRX instead of the timer value) and the start time point for applying the non-default values.

The eNB calculates the best DRX parameters (DRX cycle and drx-InactivityTimer) values based on various informations such as DRB characteristics, traffic pattern, buffer status, and frame structure at step 2f-40.

The eNB may transmit a DRX MAC CE (or DRX configuration information) to the UE. This MAC CE may include the configuration information for updating DRX parameters. This MAC CE may include a multiple of at least one of the DRX cycle and DRX-related timer values or new DRX cycle and drx-InactivityTimer values.

The UE applies new the parameter values immediately upon receipt of the MAC CE or at a predetermined time point. If a predetermined time period elapses or an event occurs, the UE applies the default values or new values. Here, the eNB may update or initialize the DRX parameters to default values by transmitting a MAC CE to the UE.

It may be considered for the eNB to transmit the DRX configuration information including two or more timer values for updating the DRX-related timer and instruct the UE to select and use one of the timer values by transmitting a MAC CE.

Figure 2G:
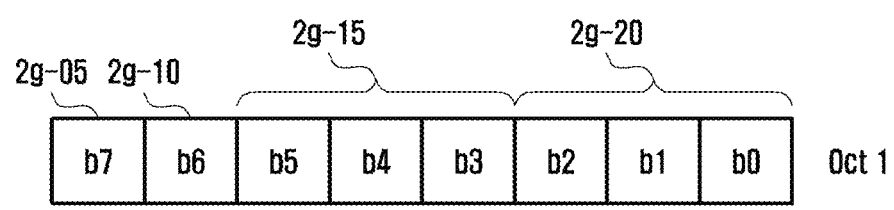
FIG. 2G illustrates MAC CE formats according to the present disclosure.
Figure 2G:
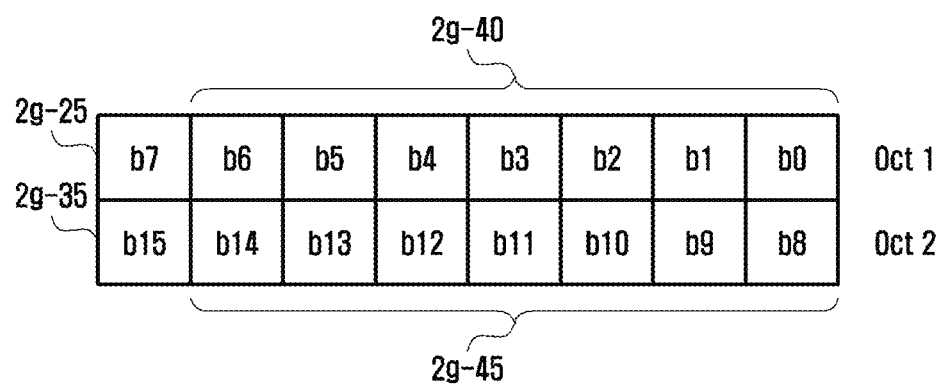

FIG. 2G illustrates MAC CE formats according to the present disclosure. The present disclosure proposes new MAC CE formats for providing new values.

Option A—1-Byte Structure

The first method is to use a 1-byte (8-bit) MAC CE format as shown in upper part of FIG. 2G. The 8-bit MAC CE format carries relative values of the DRX cycle and drx-InactivityTimer.

In detail, the first bit 2g-05 of the 8 bits indicates whether the MAC CE carries a relative DRX cycle value. For example, this bit is set to 0 for indicating no inclusion of the relative DRX cycle value or 1 for indicating inclusion of the relative DRX cycle value.

The second bit 2g-10 of the 8 bits indicates whether the MAC CE carries a relative drx-InactivityTimer value. For example, this bit is set to 0 for indicating no inclusion of the relative drx-InactivityTimer value or 1 for indicating inclusion of the relative drx-InactivityTimer value.

In this way, the eNB may configure the DRX cycle and drx-InactivityTimer values respectively. Three bits among the remaining bits are used to indicate the relative DRX cycle value. For example, if the new value is one of the multiples (i.e., ⅛, ⅙, ¼, ½, 2, 4, 6, and 8) of the default value, the index of each multiple may be indicated by 3 bits. That is, the multiples may be mapped to the respective indices as follows.

| b5 (b2) | b4 (b1) | b3 (b0) | New value |
|---------|---------|---------|-----------|
| 0 | 0 | 0 | Default × ⅛ |
| 0 | 0 | 1 | Default × ⅙ |
| 0 | 1 | 0 | Default × ¼ |
| 0 | 1 | 1 | Default × ½ |
| 1 | 0 | 0 | Default × 2 |
| 1 | 0 | 1 | Default × 4 |
| 1 | 1 | 0 | Default × 6 |
| 1 | 1 | 1 | Default × 8 |

The remaining 3 bits 2g-20 are used to indicate the relative drx-InactivityTimer value. For example, if the new value is one of the multiples (i.e., ⅛, ⅙, ¼, ½, 2, 4, 6, and 8) of the default value, the index of each multiple may be indicated by 3 bits.

If the two bits which are designated for use in determining whether the MAC CE carries the relative DRX cycle and drx-InactivityTimer values are all set to 0, this may indicate initialization to the default values.

The bit positions designated for the respective purposes may be changed in the 1-byte structure. The reason for use of the two most significant bits 2g-05 and 2g-10 for the purpose of indicating inclusion/non-inclusion of the relative DRX cycle and drx-InactivityTimer values in the MAC CE format is to determine, with priority, whether to perform decoding on the bits following the two bits.

The three bits 2g-15 or 2g-20 may indicate an absolute value rather than a relative value. Here, at least the absolute value is not identical with default value. The absolute value may be derived from a multiple of the default value.

In the present disclosure, it may be possible to update other parameters than the DRX cycle and drx-Inactivity-Timer using the multiple value information or absolute values. In this case, it may be possible to increase the number of bits of the MAC CE for other parameters, decrease the number of bits for relative multiple value information indication filed to 2 bits to carry the multiple value information for the other DRX parameters, or use one of the DRX cycle and drx-InactivityTimer indication fields for other DRX parameters.

Option B—2-Byte Structure

The second method is to use a 2-byte (16-bit) MAC CE format as shown in lower part of FIG. 2G. The 16-bit MAC CE format carries relative values of the DRX cycle and drx-InactivityTimer.

In detail, the first bit 2g-25 of the first byte indicates whether the MAC CE carries a relative DRX cycle value. For example, this bit is set to 0 for indicating no inclusion of the relative DRX cycle value or 1 for indicating inclusion of the relative DRX cycle value.

Also, the first bit 2g-35 of the second byte indicates whether the MAC CE carries a relative drx-InactivityTimer value. For example, this bit is set to 0 for indicating no inclusion of the relative drx-InactivityTimer value or 1 for indicating inclusion of the relative drx-InactivityTimer value.

In this way, the eNB may configure the DRX cycle and drx-InactivityTimer values respectively. The 7 remaining bits 2g-40 of the first byte is used to carry the relative DRX cycle value. Here, the index indicating a multiple value (multiple value information) may be carried in the 7 bits. The 7 bits may carry an absolute value rather than the relative value.

Also, the 7 remaining bits 2g-45 of the second byte is used to carry the relative drx-InactivityTimer value. Here, the index indicating a multiple value (multiple value information) may be carried in the 7 bits. The 7 bits may carry an absolute value rather than the relative value.

As described above, if the first bits of the first and second bytes which are designated for use in determining whether the MAC CE carries the relative DRX cycle and drx-InactivityTimer values are all set to 0, this may indicate initialization to the default values.

The bit positions designated for the respective purposes may be changed in the 2-byte structure. The reason for use of the most significant bits 2g-25 and 2g-35 of the first and second bytes for the purpose of indicating inclusion/non-inclusion of the relative DRX cycle and drx-InactivityTimer values in the MAC CE format is to determine with priority whether to perform decoding on the bits following the two bits.

In the present disclosure, it may be possible to update other parameters than the DRX cycle and drx-Inactivity-Timer using the multiple value information or absolute values. In this case, it may be possible to increase the number of bits of the MAC CE for other parameters, decrease the number of bits for relative multiple value information indication filed to 2 bits to carry the multiple value information for the other DRX parameters, or use one of the DRX cycle and drx-InactivityTimer indication fields for other DRX parameters.

Figure 2H:
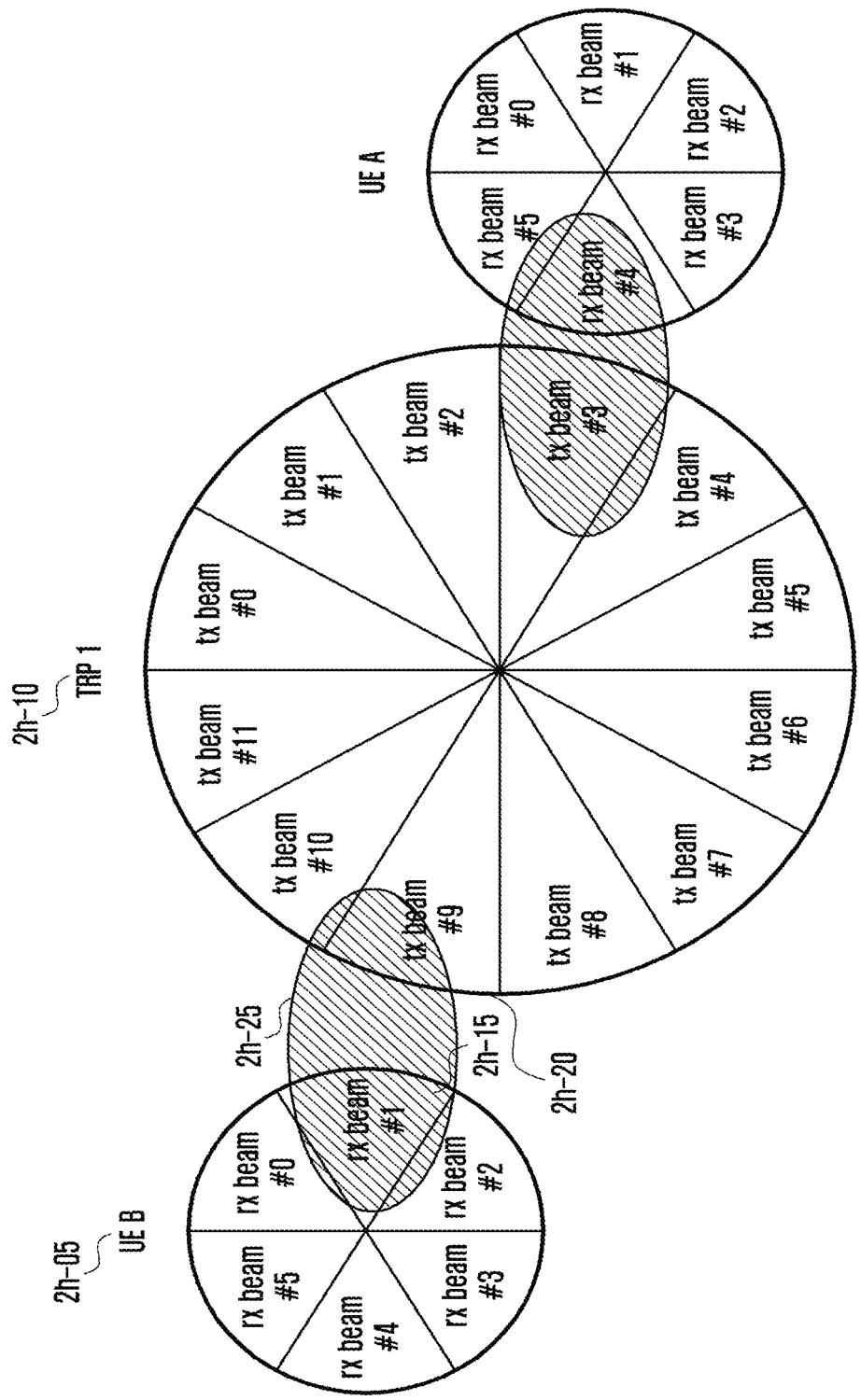
FIG. 2H illustrates a best beam pair according to the present disclosure.

FIG. 2H illustrates a best beam pair according to the present disclosure.

In the next generation mobile communication system, it may be possible to use a beam antenna optimized for very narrow frequency bandwidth. The beamforming may be used by a UE 2h-05 as well as an eNB 2h-10. It may be possible to form multiple beams at different angles to transmit/receive signals in respective directions. The eNB and UEs ignore all but the beams formed for transmitting and receiving signals thereto and therefrom. Although beams are formed in other directions for transmitting/receiving data, it is difficult to expect any performance improvement because of very low beam antenna gain. Instead, the beams forming in other directions are likely to cause interference to other UEs and/or eNBs.

In the present disclosure, one of the eNB and the UE has to form a beam in a direction to the other for data transmission/reception, and these beams are called best beam pair.

In reference to FIG. 2H, it is expected that the largest beam antenna gain is achieved with the first beam 2h-15 of the UE B which is formed towards the eNB and the ninth beam 2h-20 of the eNB which is formed towards the UE B. In this case, it can be told that the two beams are in the state of the best beam pair as denoted by reference number 2h-25.

Meanwhile, as the UE moves, the best beam pair may be changed. In order to maximize the data communication efficiency, it is required to maintain the best beam pair regardless of the movement of the UE. The best beam pair is determined through beam measurement performed by the UE or eNB performs on its own beam or counterpart's beam.

That is, the UE transmits beam measurement information about the beam with the largest signal strength gain to the eNB, and the eNB transmits beam configuration information (BCC) to the UE to notify the UE of the best beam pair for data communication. If the best beam pair changes as the UE moves, the eNB may notify the UE of the changed best beam pair. Here, the best beam pair reconfiguration procedure should be completed as soon as possible to protect against performance degradation.

However, if the UE is in the DRX mode, the best beam pair reconfiguration procedure may be delayed.

Figure 2I:
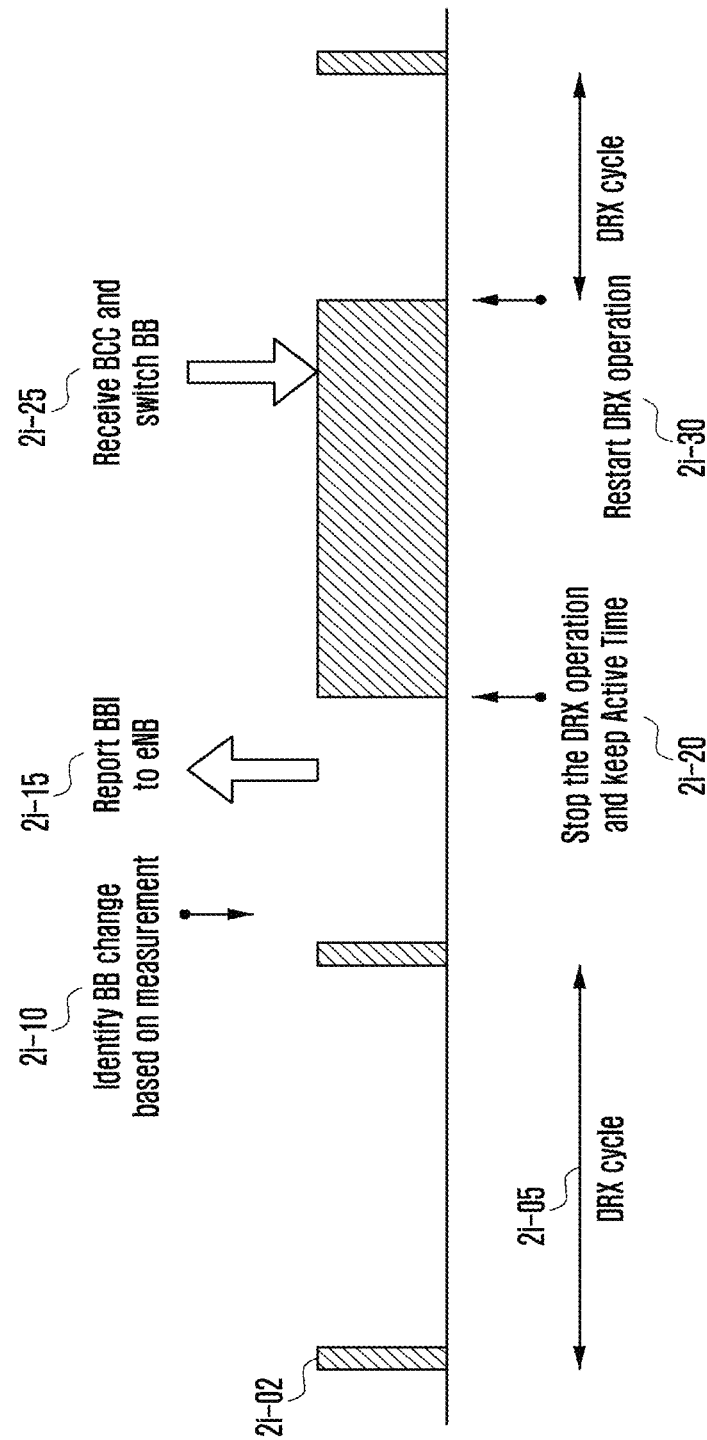
FIG. 2I illustrates a DRX operation in the beam measurement result report process according to the present disclosure.

FIG. 2I illustrates a DRX operation in the beam measurement result report process according to the present disclosure.

The UE performs beam measurement during the onDuration period 2*i*-02 within one DRX cycle 2*i*-05 for power saving.

The UE may identify that the current beam pair is not the best beam pair for data communication as denoted by reference number 2*i*-10.

If the UE becomes aware that the current beam pair is not the best beam pair for data communication, it has to report this to the eNB. Since the best beam pair reconfiguration should be completed as soon as possible, the UE reports a new beam measurement result (best beam) to the eNB immediately ignoring the DRX cycle as denoted by reference number 2*i*-15. That is, the UE may stop the DRX operation and report the beam measurement result to the eNB in the active state.

The eNB is supposed to reconfigure the best beam pair upon receipt of the report, the UE waits for the best beam pair reconfiguration. If the eNB provides the UE with the beam reconfiguration information in line with the DRX cycle, this may cause a delay as much as the maximum DRX cycle. The present disclosure makes it possible for the UE to report the beam measurement result to the eNB regardless of the DRX cycle. The beam measurement result may include the information indicating that the best beam has been changed or the changed best beam information (BBI). If it is scheduled to receive beam configuration information from the eNB, the UE stops or suspends the DRX operation during a predetermined time period or until a predetermined event occurs, e.g., the beam configuration information is received from the eNB as denoted by reference number 2*i*-25. During the DRX operation suspension period, the UE remains in the Active Time state.

While the Active Time state is maintained, the UE may perform the beam measurement regardless of the DRX cycle. The predetermined time period may be configured by the eNB or predetermined. The time period is determined in consideration of the RTT and the processing time of the eNB so as to be a value longer than the RTT.

If the predetermined time period expires or if the predetermined event occurs, the UE resumes the DRX operation immediately or at a predetermined time point as denoted by reference number 2*i*-30. Here, the predetermined event may be the event of receiving the beam configuration information, and the UE may determine the best beam based on the beam configuration information and resume the DRX operation immediately or at a predetermined time point.

Figure 2J:
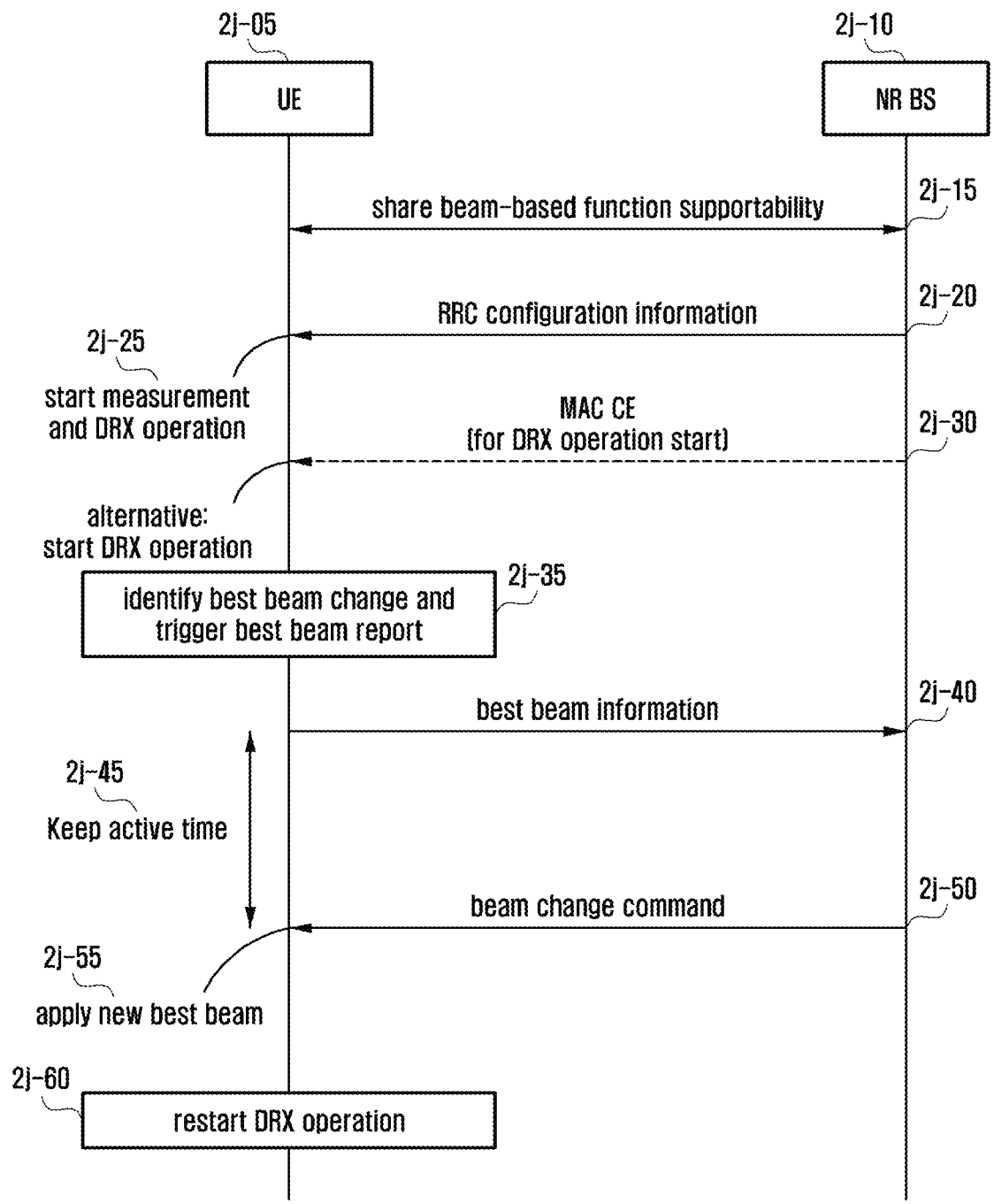
FIG. 2J illustrates a beam measurement result report procedure according to the present disclosure.

FIG. 2J illustrates a beam measurement result report procedure according to the present disclosure.

The UE 2*j*-05 and the eNB 2*j*-10 check for beam-based function supportability at step 2*j*-15.

In detail, the UE 2*j*-05 reports its beam-based function capability in a predetermined RRC message to the eNB 2*j*-10. For example, the UE may transmit UE capability information (UECapability information) in the RRC message to the eNB 2*j*-10.

Also, the eNB 2*j*-10 may broadcast its beam-based function supportability in the system information to the UEs within its service area.

The eNB 2*j*-10 transmits to the UE 2*j*-01 at least one of beam-based measurement configuration information and DRX configuration information in an RRC message at step 2*j*-20.

Upon receipt of the RRC message, the UE applies the configuration information to perform beam measurement and DRX operations at step 2*j*-25.

As described above, the DRX operation may start after receiving a predetermined MAC CE at step 2*j*-30. However, the present disclosure is not limited thereto but may include starting, at the UE 2*j*-05, the DRX operation after a predetermined time period (a predetermined number of frames) after the receipt of the DRX configuration.

The UE 2*j*-05 performs measurement on multiple beams form the eNB 2*j*-10. It may be determined that the current beam pair is not the best beam pair based on the beam measurement result.

Accordingly, the UE 2*j*-05 may identify the change of the best beam pair bases on the beam measurement result at step 2*j*-35. The UE may adjust the current beam pair to maintain the best beam pair and report best beam information (best beam indication) to the eNB 2*j*-10 at step 2*j*-40.

Then the UE 2*j*-05 suspends the DRX operation and remains in the Active Time state at step 2*j*-45. The UE 2*j*-05 reports the best beam information to the eNB 2*j*-10 and stops the currently-running DRX operation.

Next, the UE 2*j*-05 may receive new beam configuration information (or beam change command) from the eNB 2*j*-10 at step 2*j*-50. If a predetermined time period expires or the new beam configuration information is received from the eNB 2*j*-10 at step 2*j*-50, the UE 2*j*-05 may apply the new best beam pair at step 2*j*-55.

Then, the UE 2*j*-05 resumes the DRX operation at step 2*j*-60.

Figure 2K:
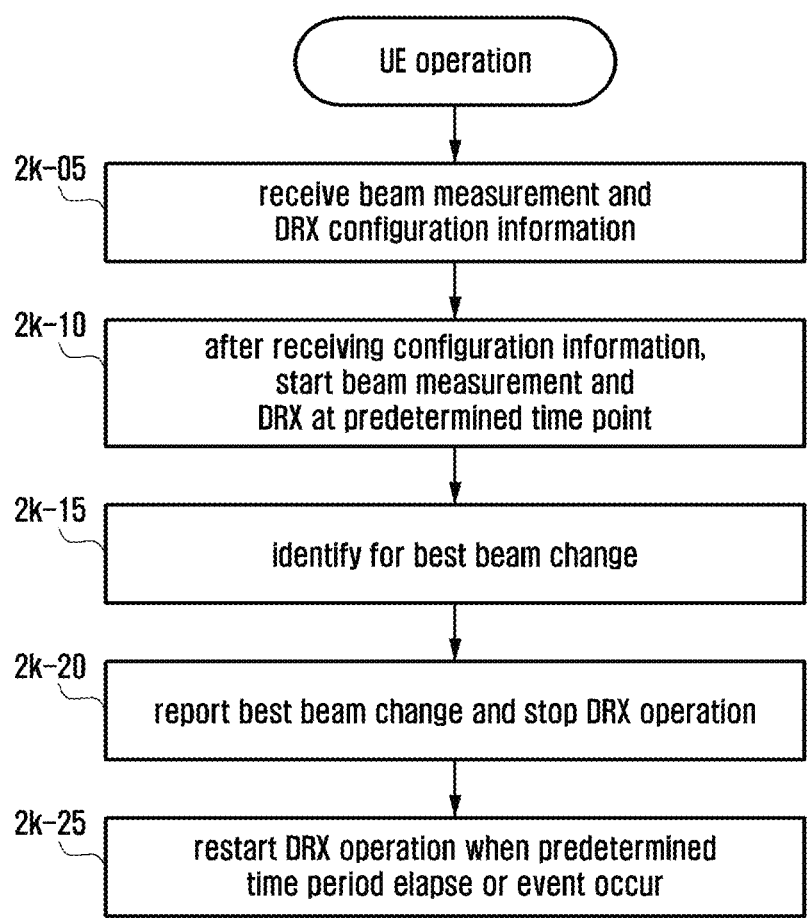
FIG. 2KA illustrates UE operations in the beam measurement result report procedure according to the present disclosure.
Figure 2K:
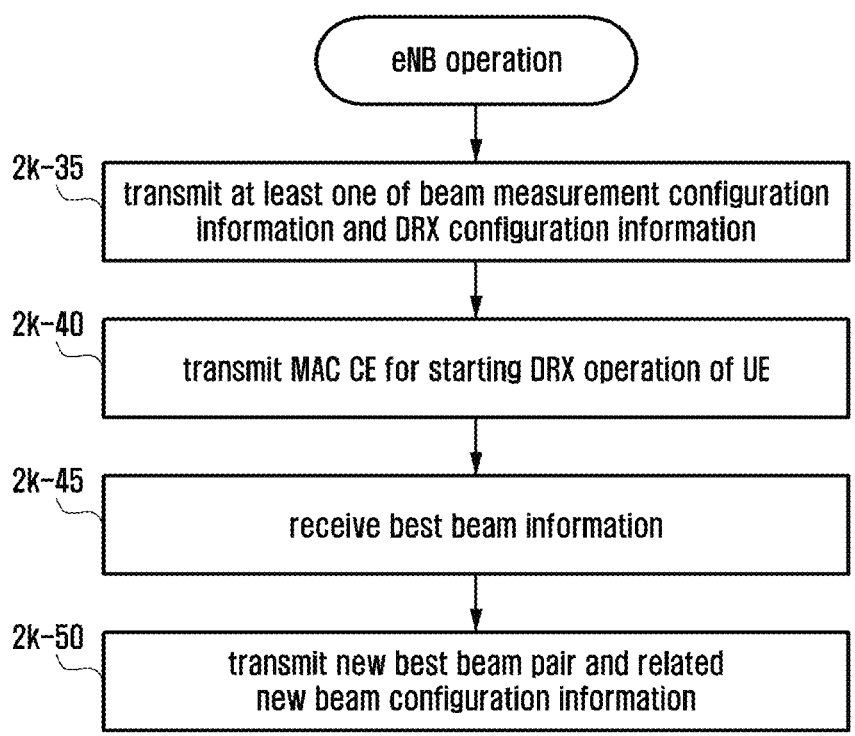

FIG. 2KA illustrates UE operations in the beam measurement result report procedure according to the present disclosure.

The UE may transmit an RRC message including the UE capability information to the eNB to notify the eNB of its beam-based function capability. The UE may acquire the beam-based function supportability of the eNB from the system information broadcast by the eNB. In this way, the UE and the eNB may check for the beam-based functions they can support.

The UE may receive at least one of the beam measurement configuration information and DRX configuration information from the eNB at step 2*k*-05. The UE may acquire the configuration information from an RRC message transmitted by the eNB.

The UE receives the configuration information and starts beam measurement and DRX operations immediately or at a predetermined time point at step 2*k*-10. The information on the beam measurement and DRX operation start time point may be included in the configuration information. The UE may start the beam measurement and DRX operation after receipt of a MAC CE.

Next, the UE perform beam measurement periodically to check for change of the best beam pair at step 2*k*-15.

The UE may report the change of the best beam pair to the eNB, suspend the currently running DRX operation, and maintain the Active Time at step 2*k*-20. Here, the UE may transmit the best beam information to the eNB. The UE may also transmit to the eNB the information indicating that the best beam pair has been changed.

The UE maintains the Active Time during a predetermined time period or until a predetermined even occurs and then resumes the DRX operation immediately or at a predetermined time point at step 2k-25.

As described above, the predetermined event may be receiving the new beam configuration information from the eNB. The UE may receive the information on the new best beam pair from the eNB and resume the DRX operation.

The information on the predetermined time period concerning the resume of the DRX operation may be included in the DRX configuration information, and the UE may resume the DRX operation after the predetermined time period expires.

FIG. 2KB illustrates eNB operations in the beam measurement result report procedure according to the present disclosure.

The eNB may acquire the UE capability information from an RRC message transmitted by the UE to check for the beam-based function capability of the UE. The eNB may broadcast its beam-based function supportability in the system information.

The eNB may transmit at least one of the beam measurement configuration information and the DRX configuration information at step 2k-35. The eNB may transmit the configuration information in an RRC message.

Then, the eNB may transmit a MAC CE for triggering a DRX operation of the UE at step 2k-40. However, the step of transmitting the MAC CE may be omitted if the information on the DRX start time point is included in the DRX configuration information or predetermined.

If the best beam pair is changed, the eNB may receive the information on the best beam at step 2k-45. The eNB may also receive the information indicating that the best beam pair has been changed.

Then, the eNB may transmit new beam configuration information indicating the new best beam pair to the UE at step 2k-50.

Figure 2L:
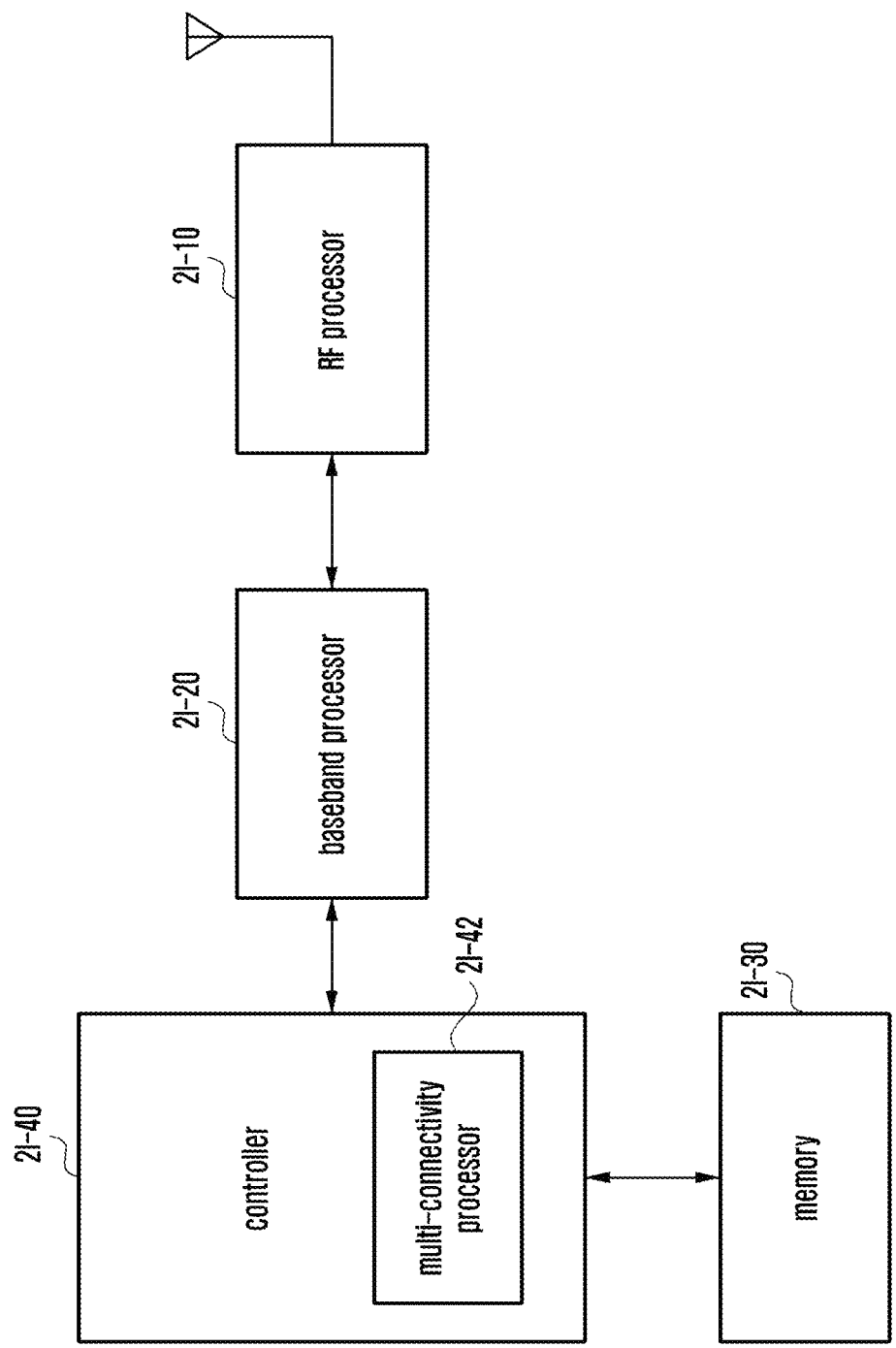
FIG. 2L illustrates a configuration of a UE according to the present disclosure.

FIG. 2L illustrates a configuration of a UE according to the present disclosure.

In reference to FIG. 2L, the UE includes an RF processing unit 2l-10, a baseband processing unit 2l-20, a memory 2l-30, and a controller 2l-40. In the present invention, the controller 2l-40 may be interchangeably referred to as a circuit, an application-specific integrated circuit, and at least one processor and the controller may be coupled with the transceiver.

The RF processing unit 2l-10 may perform the same function as the RF processing unit 1j-10 of FIG. 1J and thus detailed description thereof is omitted herein.

The baseband processing unit 2l-20 may perform the same functions as the baseband processing unit 1j-20 of FIG. 1J and thus detailed description thereof is omitted herein.

The baseband processing unit 2l-20 and the RF processing unit 2l-10 are involved in signal transmission and reception as described above. Accordingly, the baseband processing unit 2l-20 and the RF processing unit 2l-10 may be referred to as a transmit unit, a receive unit, a transceiver, or a communication unit. The detailed description thereof has been described with reference to FIG. 1J and thus omitted herein. The memory 2l-30 may be identical in functionality with the memory 1j-30 as described with reference to FIG. 1J and thus detailed description thereof is omitted herein.

The controller 2l-40 controls overall operations of the UE. For example, the controller 2l-40 transmits/receives signals by means of the baseband processing unit 2l-20 and the RF processing unit 2l-10. The controller 2l-40 writes and reads data to and from the memory 2l-40. For this purpose, the controller 2l-40 may include at least one processor and the controller may be coupled with the transceiver. For example, the controller 2l-40 may include a Communication Processor (CP) for controlling communication and an Application Processor (AP) for controlling higher layer application programs.

In detail, the controller 2l-40 may control the UE to transmit an RRC message including the UE capability information to the eNB to notify the eNB of its beam-based function capability. The controller 2l-40 may also control the UE to acquire the information on the beam-based function supportability of the eNB from the system information broadcast by the eNB. In this way, the UE and the eNB may check for the beam-based functions which they support. The controller 2l-40 may control the UE to receive DRX configuration information.

The controller 2l-40 may control the UE to start a DRX operation immediately upon receipt of the DRX configuration information or at a predetermined time point after the receipt of the DRX configuration information. The controller 2l-40 may also control the UE to perform the DRX operation immediately upon receipt of the MAC CE or at a predetermined time point after the receipt of the MAC CE.

The controller 2l-40 may also control the UE to receive a DRX MAC CE (or DRX reconfiguration information). The DRX MAC CE may include configuration information for changing DRX parameters. This MAC CE may include a multiple of at least one of the DRX cycle and DRX-related timer values or new DRX cycle and drx-InactivityTimer values.

If the new DRX reconfiguration information is received, the controller 2l-40 may stop the currently running onDurationTimer and drx-InactivityTimer.

The controller 2l-40 applies the new parameter values immediately upon receipt of the MAC CE or at a predetermined time point. Afterward, the controller 2l-40 applies the default values or newly selected values when a predetermined time period expires or a predetermined event occurs. In detail, the UE may apply the default DRX period and default DRX-related timer value when the predetermined time period expires. Also, the UE may transmit a MAC CE, and the UE may update or initialize the DRX cycle and DRX-related timer to default values based on the information included in the MAC CE.

According to an alternative embodiment, the controller 2l-40 may control the UE to receive at least one of the beam measurement configuration information and the DRX configuration information from the eNB.

The controller 2l-40 controls the UE to start beam measurement and DRX operation immediately upon receipt of the configuration information or at a predetermined time point after the receipt of the configuration information. The controller 2l-40 may perform beam measurement periodically to check for change of the best beam pair.

The controller 2l-40 may control the UE to report the change of the best beam pair to the eNB, suspend the currently running DRX operation, and maintain the Active Time. Here, the controller 2l-40 may control the UE to send the eNB the information on the best beam. The controller 2l-40 may also control the UE to transmit to the eNB the information indicating that the best beam pair has been changed.

The controller 2l-40 maintains the Active Time during a predetermined time period or until a predetermined even occurs and then resumes the DRX operation immediately or at a predetermined time point. As described above, the predetermined event may be receiving the new beam configuration information from the eNB. The controller 2*l*-40 may control the UE to receive the information on the new best beam pair from the eNB and resume the DRX operation.

The information on the predetermined time period concerning the resume of the DRX operation may be included in the DRX configuration information, and the controller 2*l*-40 may control UE to resume the DRX operation after the predetermined time period expires.

Figure 2M:
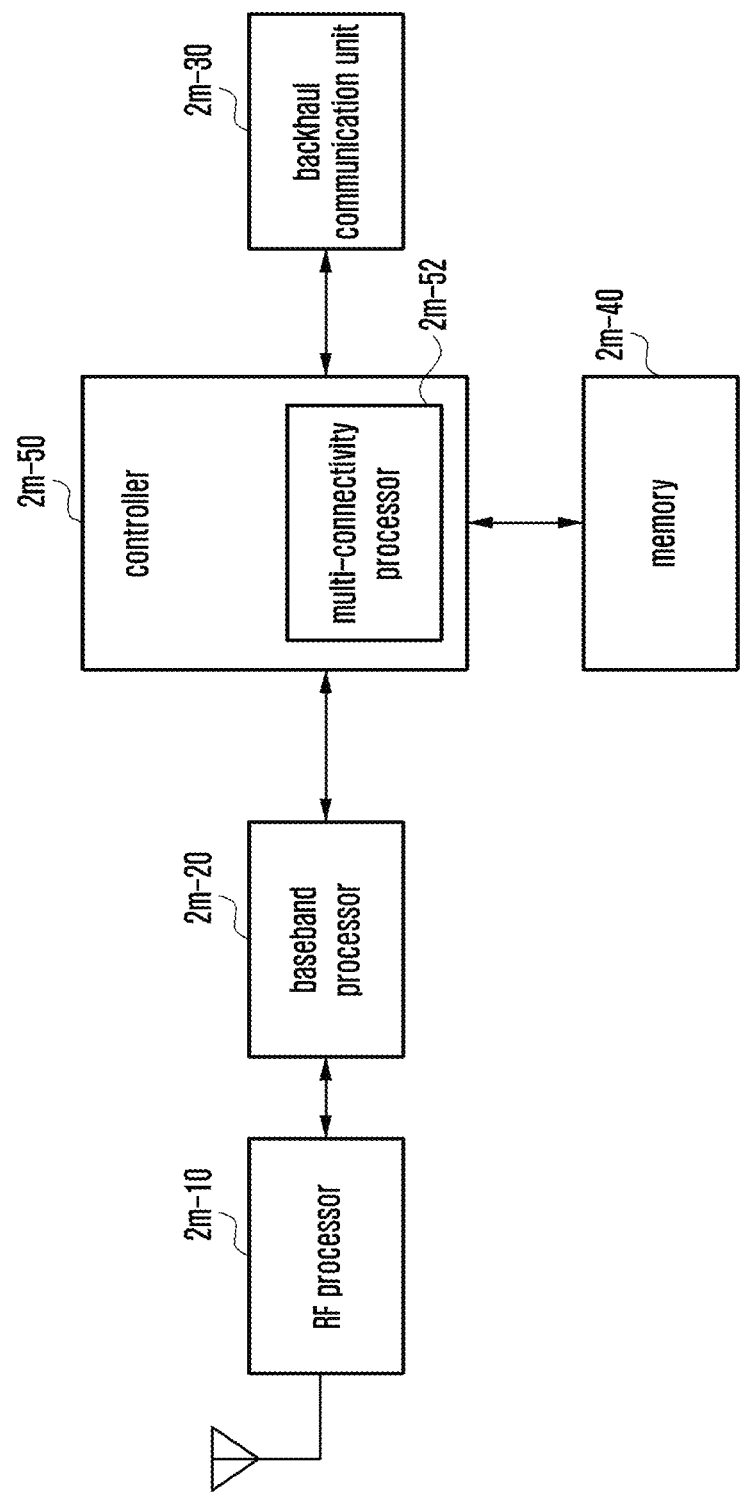
FIG. 2M illustrates a configuration of an eNB according to the present disclosure.

FIG. 2M illustrates a configuration of an eNB according to the present disclosure.

As shown in FIG. 2M, the eNB includes an RF processing unit 2*m*-10, a baseband processing unit 2*m*-20, a backhaul communication unit 2*m*-30, a memory 2*m*-40, and a controller 2*m*-50. In the present disclosure, the controller 2*k*-50 may be interchangeably referred to as a circuit, an application-specific integrated circuit, and at least one processor and the controller may be coupled with the transceiver.

The RF processing unit 2*m*-10 may perform the same function as the RF processing unit 1*k*-10 of FIG. 1K and thus detailed description thereof is omitted herein.

The baseband processing unit 2*m*-20 may perform the same functions as the baseband processing unit 1*k*-20 of FIG. 1K and thus detailed description thereof is omitted herein.

The baseband processing unit 2*m*-20 and the RF processing unit 2*m*-10 are involved in signal transmission and reception. For this reason, the baseband processing unit 2*m*-20 and the RF processing unit 2*m*-10 may be referred to as a transmit unit, a receive unit, a transceiver, or a communication unit.

The backhaul communication unit 2*m*-30 may perform the same functions of the backhaul communication unit 1*k*-30 of FIG. 1K and thus detailed description thereof is omitted herein.

The memory 2*m*-40 may perform the same function as the memory 1*k*-40 of FIG. 1K and thus detailed description thereof is omitted herein.

The controller 2*m*-50 controls overall operations of the primary eNB. For example, the controller 2*m*-50 transmits/receives signals by means of the baseband processing unit 2*m*-20 and the RF processing unit 2*m*-10. The controller 2*m*-50 writes and reads data to and from the memory 2*m*-40. For this purpose, the controller 2*m*-50 may include at least one processor and the controller may be coupled with the transceiver.

In detail, the controller 2*m*-50 controls the eNB to transmit DRX configuration information to the UE. The controller 2*m*-50 may calculate the best DRX parameters (DRX cycle and drx-InactivityTimer) values based on various informations such as DRB characteristics, traffic pattern, buffer status, and frame structure.

The controller 2*m*-50 may control the eNB to transmit a DRX MAC CE (or DRX configuration information) to the UE. This MAC CE may include the configuration information for updating DRX parameters. This MAC CE may include a multiple of at least one of the DRX cycle and DRX-related timer values or new DRX cycle and drx-InactivityTimer values.

The controller 2*m*-50 may control the eNB to transmit a MAC CE to the UE to change the DRX configuration information or initializes the DRX parameters to the default DRX parameter values.

It may be considered for the controller 2*m*-50 controls the eNB to transmit the DRX configuration information including two or more timer values for updating the DRX-related timer and instruct the UE to select and use one of the timer values by transmitting a MAC CE.

According to another embodiment of the present disclosure, the controller 2*m*-50 may check the beam-based function capability of the UE based on the UE capability information included in an RRC message transmitted by the UE. The controller 2*m*-50 may notify the UE of its beam-based function supportability using the system information it broadcasts.

The controller 2*m*-50 may control the eNB to transmit at least one of the beam measurement configuration information and the DRX configuration information. The controller 2*m*-50 may control the eNB to transmit a MAC CE for triggering a DRX operation of the UE. However, the MAC CE may not be transmitted if the information on the DRX start time point is included in the DRX configuration information or predetermined.

If the best beam pair is changed, the controller 2*m*-50 may control the eNB to receive the information on the best beam. The controller 2*m*-50 may also control the eNB to receive the information indicating that the best beam pair has been changed.

The controller 2*m*-50 may control the eNB to transmit new beam configuration information indicating the new best beam pair to the UE.

Third Embodiment

Figure 3A:
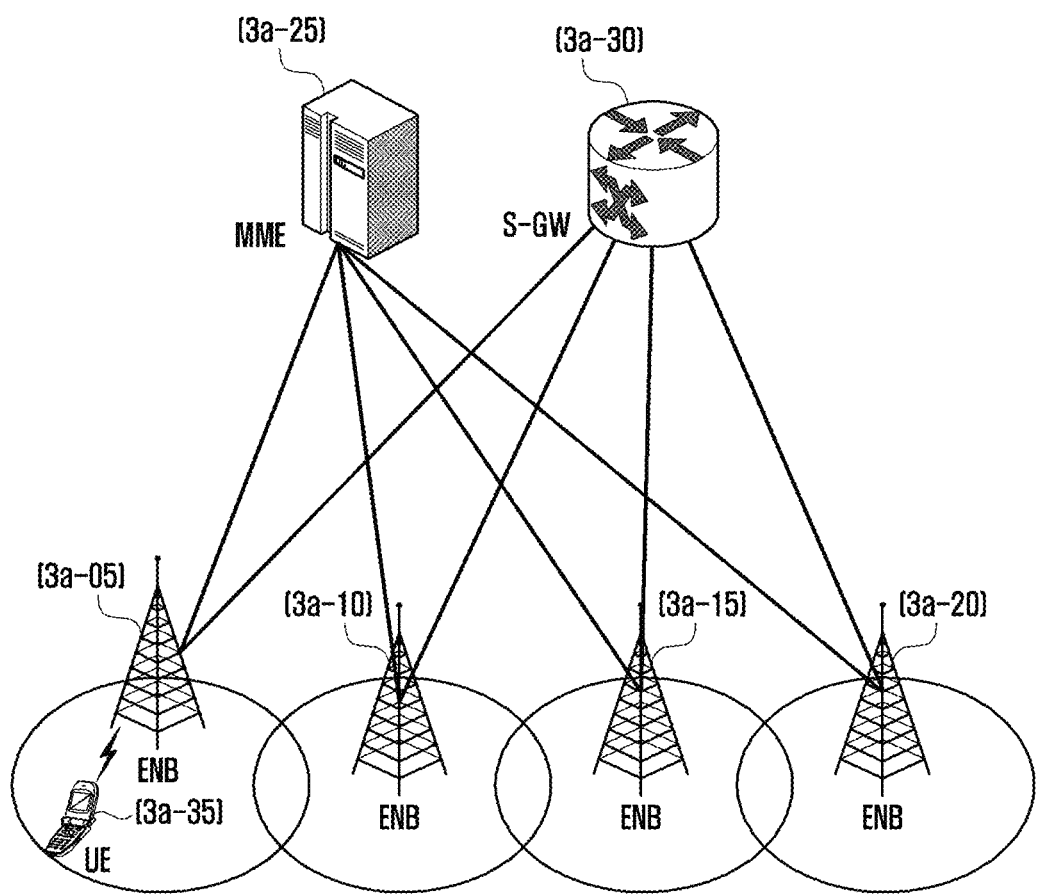
FIG. 3A illustrates an LTE system architecture.

FIG. 3A illustrates architecture of an LTE system. The detailed description of the LTE system architecture has been made already with reference to FIG. 1A and thus is omitted herein.

Figure 3B:
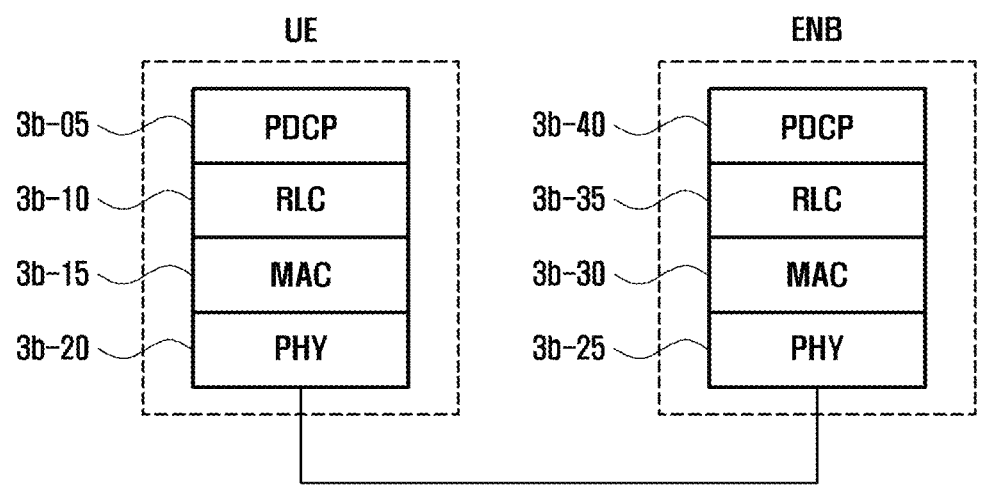
FIG. 3B illustrates a protocol stack of an interface between a UE and an eNB in the LTE system.

FIG. 3B illustrates a protocol stack of an interface between a UE and an eNB in the LTE system.

In reference to FIG. 3B, the protocol stack of the interface between the UE and the eNB in the LTE system includes a PDCP layer denoted by reference numbers 3*b*-05 and 3*b*-40, an RLC layer denoted by reference numbers 3*b*-10 and 3*b*-35, a MAC layer denoted by reference numbers 3*b*-15 and 3*b*-30, and a PHY layer denoted by reference numbers 3*b*-20 and 3*b*-25.

The PDCP layer denoted by reference numbers 3*b*-05 and 3*b*-40 takes charge of compressing/decompressing an IP header, and the RLC layer denoted by reference numbers 3*b*-10 and 3*b*-35 takes charge of segmenting a PDCP PDU into segments of appropriate size.

The MAC layer denoted by reference number 3*b*-15 and 3*b*-30 allows for connection of multiple RLC entities established for one UE and takes charge of multiplexing RLC PDUs from the RLC layer into a MAC PDU and demultiplexing a MAC PDU into RLC PDUs.

The PHY layer denoted by reference numbers 3*b*-20 and 3*b*-25 takes charge of channel-coding and modulation on higher layer data to generate and transmit OFDM symbols over a radio channel, and demodulating and channel-decoding on OFDM symbols received over the radio channel, the decoded data being delivered to the higher layers. The PHY layer denoted by reference numbers 220 and 225 uses Hybrid Automatic Repeat Request (HARQ) for additional error correction by transmitting 1-bit information indicating positive or negative acknowledgement about data packet, the acknowledgement being transmitted from the receiver to the transmitter. The 1-bit information is referred to as acknowledgement/negative acknowledgement (ACK/NACK). The downlink HARQ ACK/NACK corresponding to an uplink transmission may be transmitted in Physical Hybrid-ARQ Indicator Channel (PHICH), and the uplink HARQ ACK/NACK corresponding to a downlink transmission may be transmitted in Physical Uplink Control Channel (PUCCH) or Physical Uplink Shared Channel (PUSCH).

Typically, HARQ schemes are categorized into two types: asynchronous HARQ and synchronous HARQ. The asynchronous HARQ is characterized in that the retransmission timing is not fixed, while the synchronous HARQ is characterized in the retransmission time is fixed (e.g., 8 ms). For one UE, multiple transmissions may be performed simultaneously in downlink and uplink, and the transmissions are identified with respective HARQ process identifiers.

Since the retransmission timing is not fixed in the asynchronous HARQ, the eNB send the UE the HARQ process identifier (ID) and information on whether the current transmission is a new transmission or a retransmission through a Physical Downlink Control Channel (PDCCH). In detail, the HARQ process ID is included in a HARQ Process ID field of the PDCCH and the information on whether the current transmission is a new transmission or a retransmission is indicated by a New Data Indicator (NDI) bit of the PDCCH, the NDI bit being toggled for retransmission or not toggled for new transmission relative to the previous transmission. Accordingly, the UE checks for the detail of the corresponding transmission based on the resource allocation information included in the PDCCH transmitted by the eNB to receive downlink data through a Physical Downlink Shared Channel (PDSCH) and transmit uplink data through a Physical Uplink Shared Channel (PUSCH).

Although now shown in the drawing, a Radio Resource Control (RRC) layer resides above the PDCP layer in both the UE and the eNB, which may exchange connection and measurement-related RRC control messages.

Figure 3C:
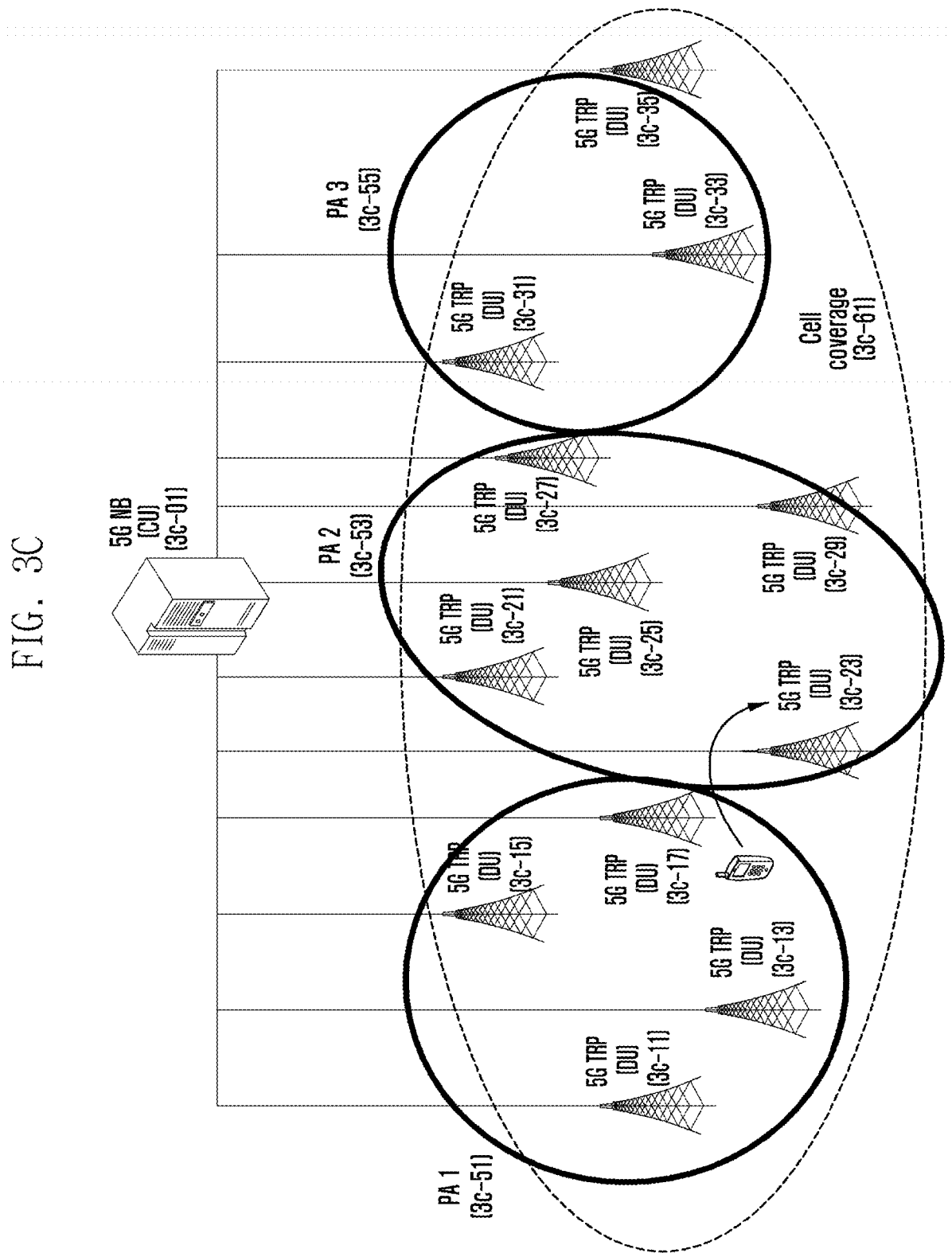
FIG. 3C illustrates a network environment to which the present disclosure is applied.

FIG. 3C illustrates a network environment to which the present disclosure is applied.

In FIG. 3C, a cell is managed by a Central Unit (CU) 3c-01, and one CU controls one or more Distributed Units (DUs) 3c-11, 3c-13, 3c-15, 3c-17, 3c-21, 3c-23, 3c-25, 3c-27, 3c-29, 3c-31, 3c-33, and 3c-35. A cell may have a very large coverage 3c-61, and this means that the paging area is too large to transmit a paging message efficiently to wake up a terminal in the idle mode when data destined for the terminal arrives.

In the present disclosure, a cell is divided into a plurality of paging areas 3c-51, 3c-53, and 3c-55 such that the network broadcasts the paging message within the paging area where the target terminal is located.

For example, if a terminal is located close to a transmission/reception antenna (or transmission/reception port; TRP) 3c-11 or receives different TRP identifiers (TRP IDs) from multiple TRPs, it reports this to the network, which broadcasts the paging message within the corresponding paging area, i.e., paging area 1 3c-51.

Figure 3D:
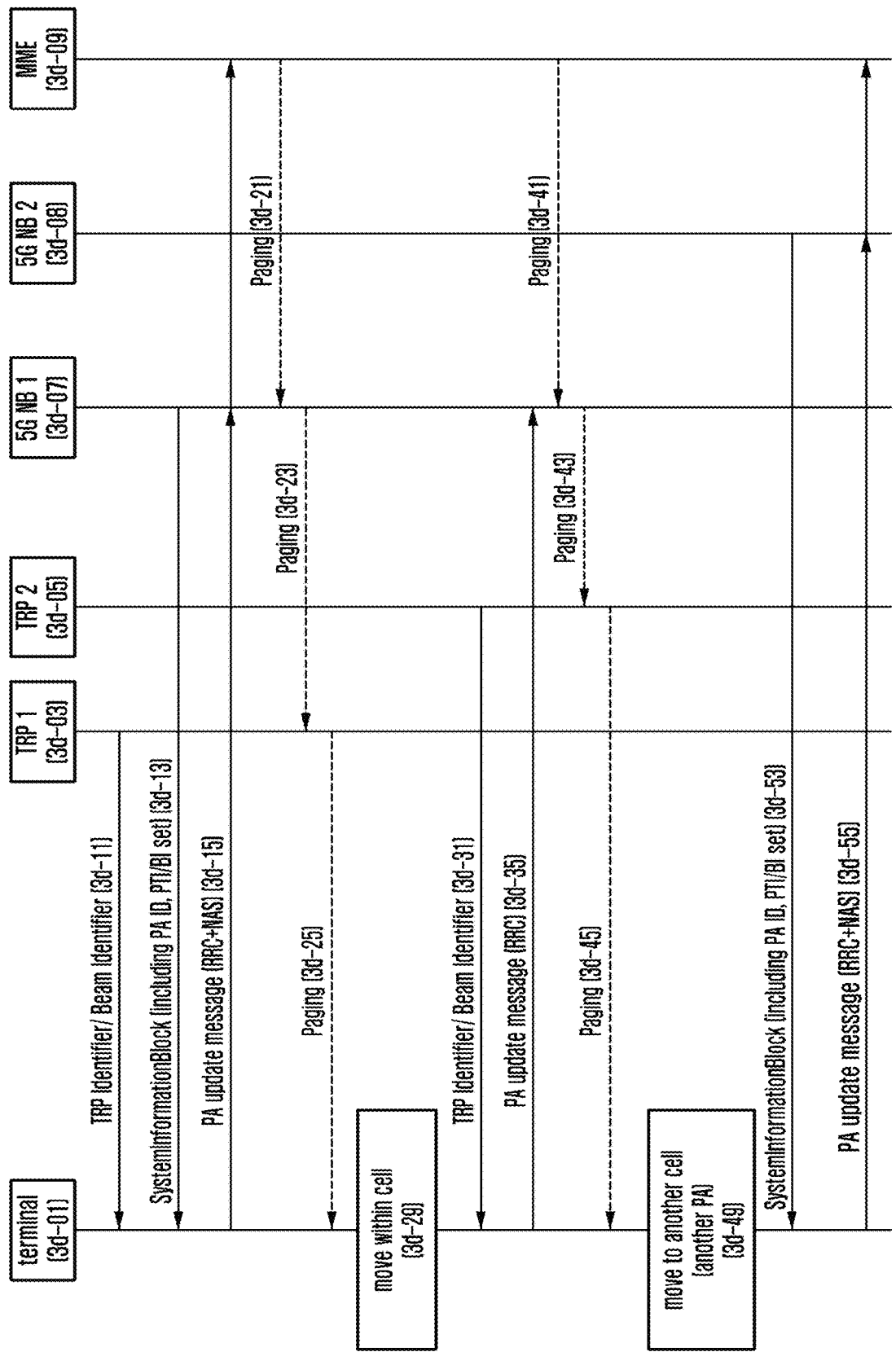
FIG. 3D illustrates a proposed paging procedure between a terminal and a network according to the present disclosure.

FIG. 3D illustrates a proposed paging procedure between a terminal and a network according to the present disclosure.

In exemplary situation of FIG. 3D, it is assumed that the terminal 3d-01 is in the idle mode and close to the TRP 1 3d-03. Accordingly, the terminal 3d-01 receives a TRP ID or a Beam Identifier (BI) transmitted by the TRP 1 3d-03 at step 3d-11.

The terminal 3d-01 may receive a system information block broadcast by the 5G NB 1 (or CU) 3d-07 at step 3d-13. The system information block is equivalent to SystemInformationBlock of LTE for use in broadcasting cell-specific information to the terminals within a cell. The system information block includes paging area identifiers (corresponding to Tracking Area Code in LTE) and a set of TRP IDs (or BIs) for the TRPs forming a paging area.

The terminal 3d-01 may identify the paging area (e.g., paging areas 3c-51, 3c-53, and 3c-55 if FIG. 3C) based on the system information block. In the exemplary situation of FIG. 3C, the 5G NB may broadcast the information on the TRPs belonging to the respective paging areas 3c-51, 3c-53, and 3c-55; if the terminal is located in the paging area 1 3c-51, the 5G NB may inform that the paging area 1 3c-51 is formed with the TRPs 3c-11, 3c-13, 3c-15, and 3c-17.

After receiving the system information block, if its location has not been registered with the network for receiving a paging message, the terminal 3d-01 transmits a paging area update message to register its location with the network at step 3d-15. In this exemplary situation, it is assumed that the terminal is located close to the TRP 3c-17 as shown in FIG. 3C for convenience of explanation.

The paging area update message may be transmitted to the 5G NB 3d-07 and an MME 3d-09 (equivalent to MME in LTE). Accordingly, it may be necessary for the terminal to register it location with the 5 g NB and MME, which broadcast a paging message to notify the terminal of the arrival of packets destined therefor. If a packet destined to the terminal arrives, the MME 3d-09 may send a paging message to the 5G NB 1 3d-07 at step 3d-21, the 5G NB 1 3d-07 may send the paging message to the TRP 1 3d-03 belonging to the corresponding paging area at step 3d-23, and then the TRP 1 3d-03 broadcasts the paging messages at step 3d-25.

In the exemplary situation of FIG. 3D, the terminal 3d-01 moves from one paging area to another at step 3d-29. In the following description, it is assumed that the terminal moves close to the TRP 3c-23 as shown in FIG. 3C for convenience of explanation.

The terminal 3d-01 receives a TRP ID from the TRP 2 3d-05 belonging to the new paging area at step 3d-31. The terminal 3d-01 may be aware that it has moved close to the TRP 2 3d-05 belonging to the new paging area based on the TRP ID received at step 3d-31. Next, the terminal 3d-01 transmits a paging area update message to register its current location with the network at step 3d-35.

In this case, since the terminal 3d-01 has changed the paging area within a cell, it registers its location with the 5G NB 1 3d-07 at step 3d-31 without transmitting any signal to the MME 3d-09. That is, the terminal 3d-01 may transmit the paging update message to the 5G NB 1 3d-07.

In the case that the terminal 3d-01 moves within the same cell link this, the MME 3d-09 may transmit the pacing message to the same 5G NB, i.e., 5G NB 1 3d-07 at step 3d-41. However, since the UE has moved to a new paging area, the 5G NB 1 3d-07 sends the paging message to the TRP 2 3d-05 belonging to the new paging area at step 3d-43, and the TRP 2 3d-05 broadcasts the paging message at step 3d-45.

In LTE, however, if a UE in the light connected mode moves from one paging area to another, it transitions to the connected mode to transmit a paging update message. Here, it may be expressed that the UE in the light connected mode is in the inactive state in which the UE is connected to the eNB in the state that the eNB has not deleted the UE (e.g., UE context). However, this may cause a problem in that the UE transitions to the connected mode unnecessarily even though there is no data to transmit or receive.

Accordingly, the UE in the light connected mode may transition back to the inactive state rather than the connected mode even when it is necessary to transmit the paging area update message.

The information indicating the change of the paging area may be included in, but not limited to, a paging area update message or a resume request message, and the name of the message transmitted from the UE to the eNB may be changed.

In the exemplary situation of FIG. 3D, the terminal 3d-01 moves to another 5G NB, i.e., 5G NB 2 3d-08 having other paging areas at step 3d-49.

After having moved to the 5G NB 2 3d-08, the terminal 2d-01 may receive a system information block from the 5G NB 2 3d-08 at step 3d-53. As described above, the system information block may include paging area identifiers and a set of TRP IDs (or BIs) of the TRPs forming a paging area.

The terminal 3d-01 may make a paging area update determination for receiving a paging message to a new cell based on the 5G NB/cell identifier and paging area identifier included in the system information block. The terminal 3d-01 may transmit a paging area update message to the 5G NB 2 3d-08 and the MME 3d-09 to register its location therewith at step 3d-55.

Afterward, if a packet destined for the terminal 3d-01 arrives at the network, the paging message can be broadcast in the correct paging area.

Figure 3E:
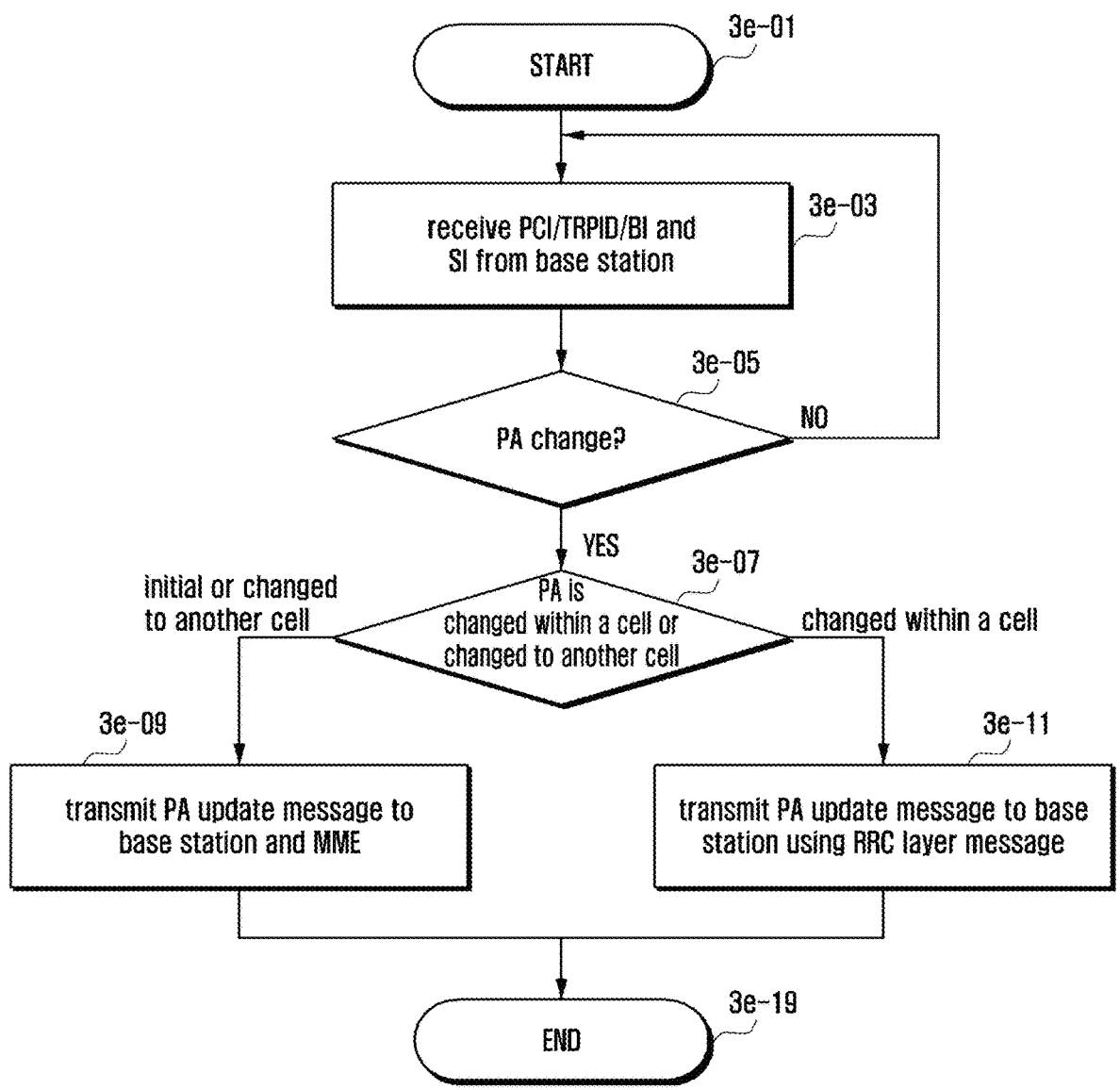
FIG. 3E illustrates a paging area update procedure of a terminal according to the present disclosure.

FIG. 3E illustrates a paging area update procedure of a terminal according to the present disclosure.

A terminal may receive a cell-specific information and a system information block from a TRP of a 5G NB at step 3e-03. The cell specific information may include at least one of a cell identifier and a TRP ID (or BI).

The system information block is equivalent to SystemInformationBlock of LTE for use in broadcasting cell-specific information to the terminals within a cell. The system information block includes paging area identifiers (corresponding to Tracking Area Code in LTE) and a set of TRP IDs (or BIs) for the TRPs forming a paging area.

If the above information is received, the terminal determines at step 3e-05 whether it has initially registered its location with the network or the paging area has been changed.

If the paging area has been changed, the terminal may determine whether the paging area change is an intra-5G NB/cell paging area change or an inter-5G NB/cell paging area change at step 3e-07. In other words, the terminal determines whether the paging area is changed within a cell or to another cell.

If it is determined that the terminal has initially registered its location or the paging area change is the inter-5G NB/cell paging area change, the terminal transmits a paging area update message to the serving 5G ND and the MME (e.g., MME 3d-09 of FIG. 3D) at step 3e-09.

Otherwise, if it is determined that paging area change is the intra-5G NB/cell paging area change, the terminal transmits the paging area update message to only the 5G NB at step 3e-11.

Figure 3F:
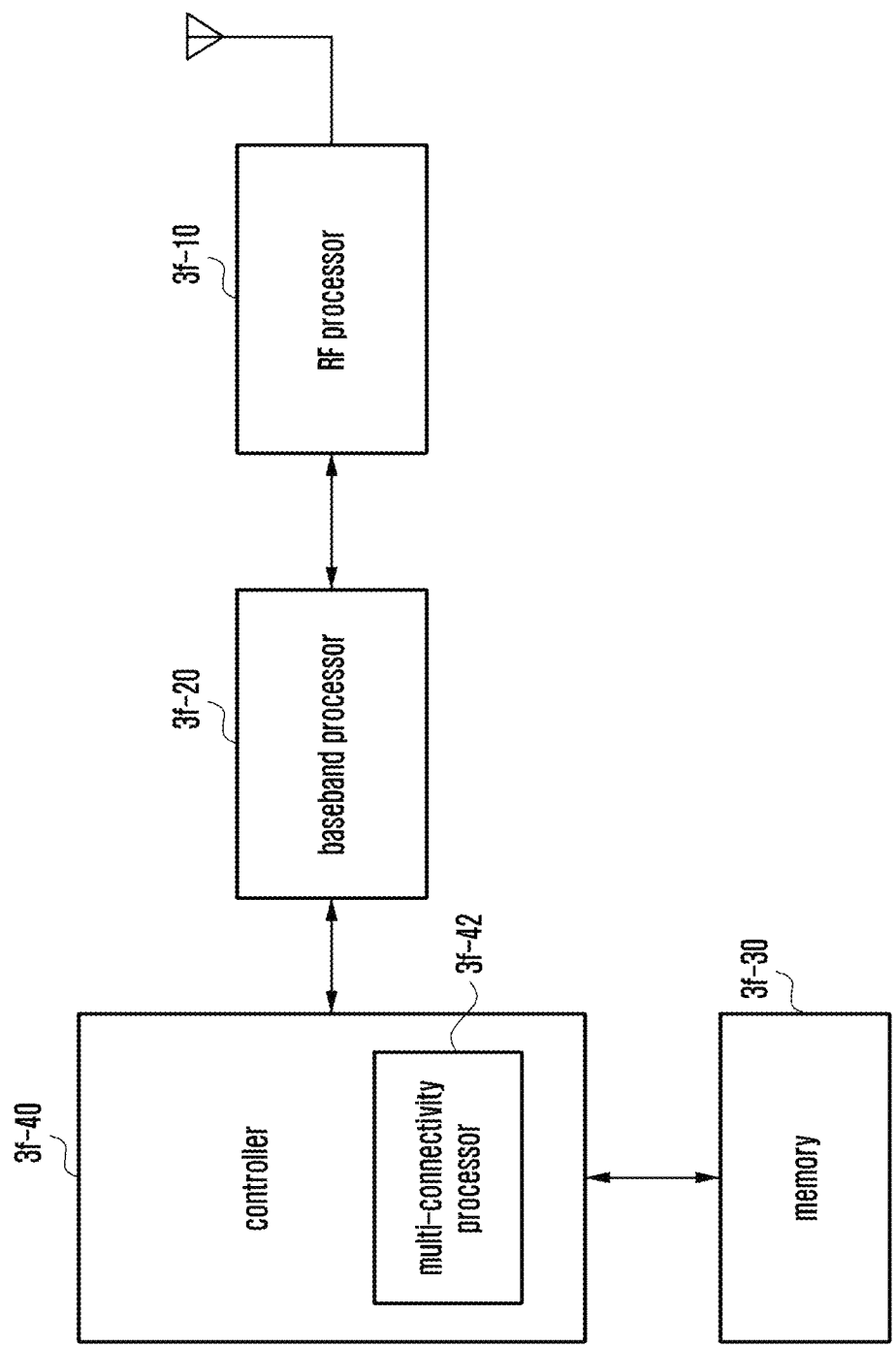
FIG. 3F illustrates a configuration of a terminal according to the present disclosure.

FIG. 3F illustrates a configuration of a terminal according to the present disclosure.

In reference to FIG. 3F, the terminal includes an RF processing unit 3f-10, a baseband processing unit 3f-20, a memory 3f-30, and a controller 3f-40. In the present invention, the controller 2l-40 may be interchangeably referred to as a circuit, an application-specific integrated circuit, and at least one processor and the controller may be coupled with the transceiver.

The RF processing unit 3f-10 may perform the same function as the RF processing unit 1j-10 of FIG. 1J and thus detailed description thereof is omitted herein.

The baseband processing unit 3f-20 may perform the same functions as the baseband processing unit 1j-20 of FIG. 1J and thus detailed description thereof is omitted herein.

The baseband processing unit 3f-20 and the RF processing unit 3f-10 are involved in signal transmission and reception as described above. Accordingly, the baseband processing unit 3f-20 and the RF processing unit 3f-10 may be referred to as a transmit unit, a receive unit, a transceiver, or a communication unit. The detailed description thereof has been described with reference to FIG. 1J and thus omitted herein. The memory 3f-30 may be identical in functionality with the memory 1j-30 as described with reference to FIG. 1J and thus detailed description thereof is omitted herein.

The controller 3f-40 controls overall operations of the UE. For example, the controller 3f-40 transmits/receives signals by means of the baseband processing unit 3f-20 and the RF processing unit 3f-10. The controller 3f-40 writes and reads data to and from the memory 3f-40. For this purpose, the controller 3f-40 may include at least one processor. For example, the controller 3f-40 may include a Communication Processor (CP) for controlling communication and an Application Processor (AP) for controlling higher layer application programs. According to an embodiment of the present disclosure, the controller 3f-40 includes a multi-connectivity processing unit 3f-42 for the operation in the multi-connectivity mode. For example, the controller 3f-40 may control the terminal to perform the operations of the procedure of FIG. 3E.

According to an embodiment of the present disclosure, the controller 3f-40 makes a paging update determination based on the system information block, cell identifiers and TRP IDs received from the 5G NB and transmits the paging area update message to both the 5G NB and MME or only the 5G NB as described with reference to FIG. 3E.

Fourth Embodiment

Figure 4A:
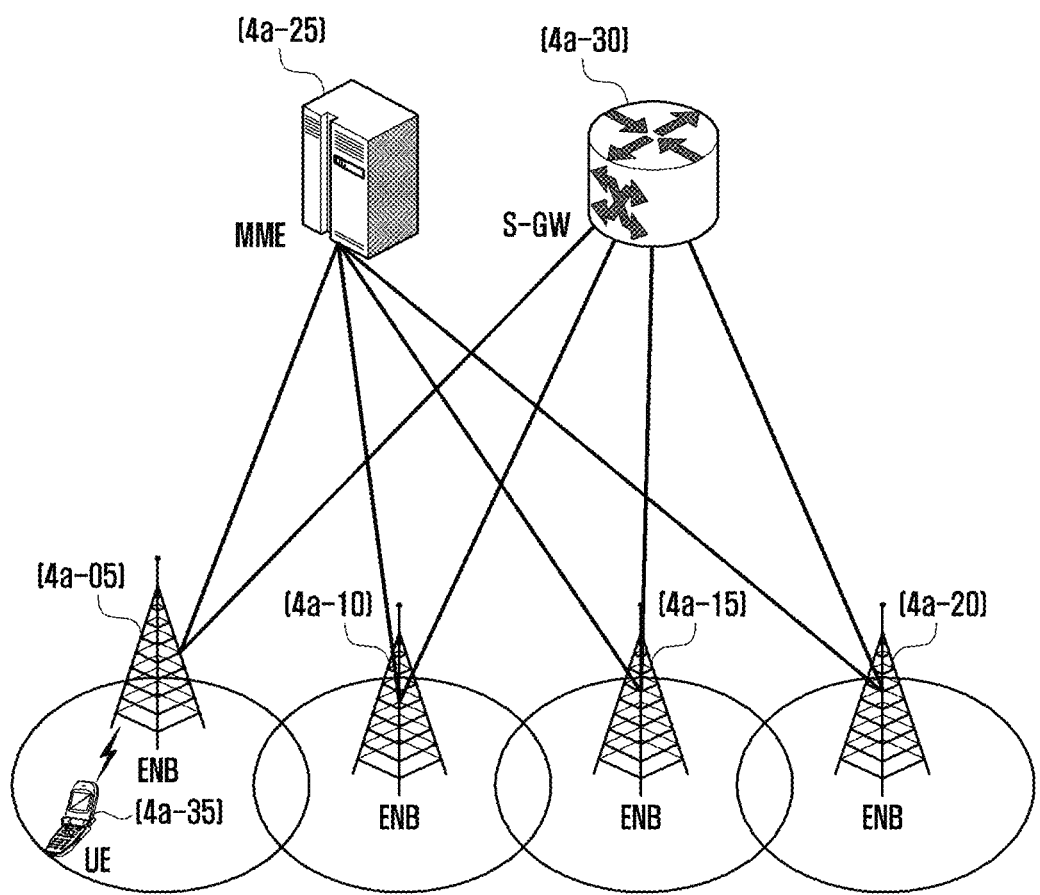
FIG. 4A illustrates an LTE system architecture.

FIG. 4A illustrates architecture of an LTE system to which the present disclosure is applied. The detailed description of the LTE system architecture has been made already with reference to FIG. 1A and thus is omitted herein.

Figure 4B:
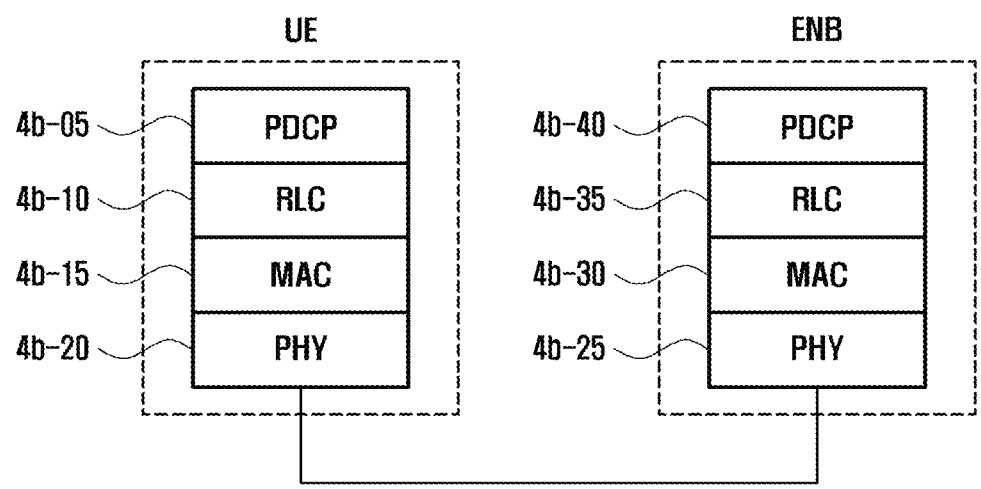
FIG. 4B illustrates a protocol stack of an interface between a terminal and an eNB in the LTE system.

FIG. 4B illustrates a protocol stack of an interface between a terminal and an eNB in the LTE system. The detailed description of the protocol stack has been made already with reference to FIGS. 2B and 3B and thus is omitted herein.

Figure 4C:
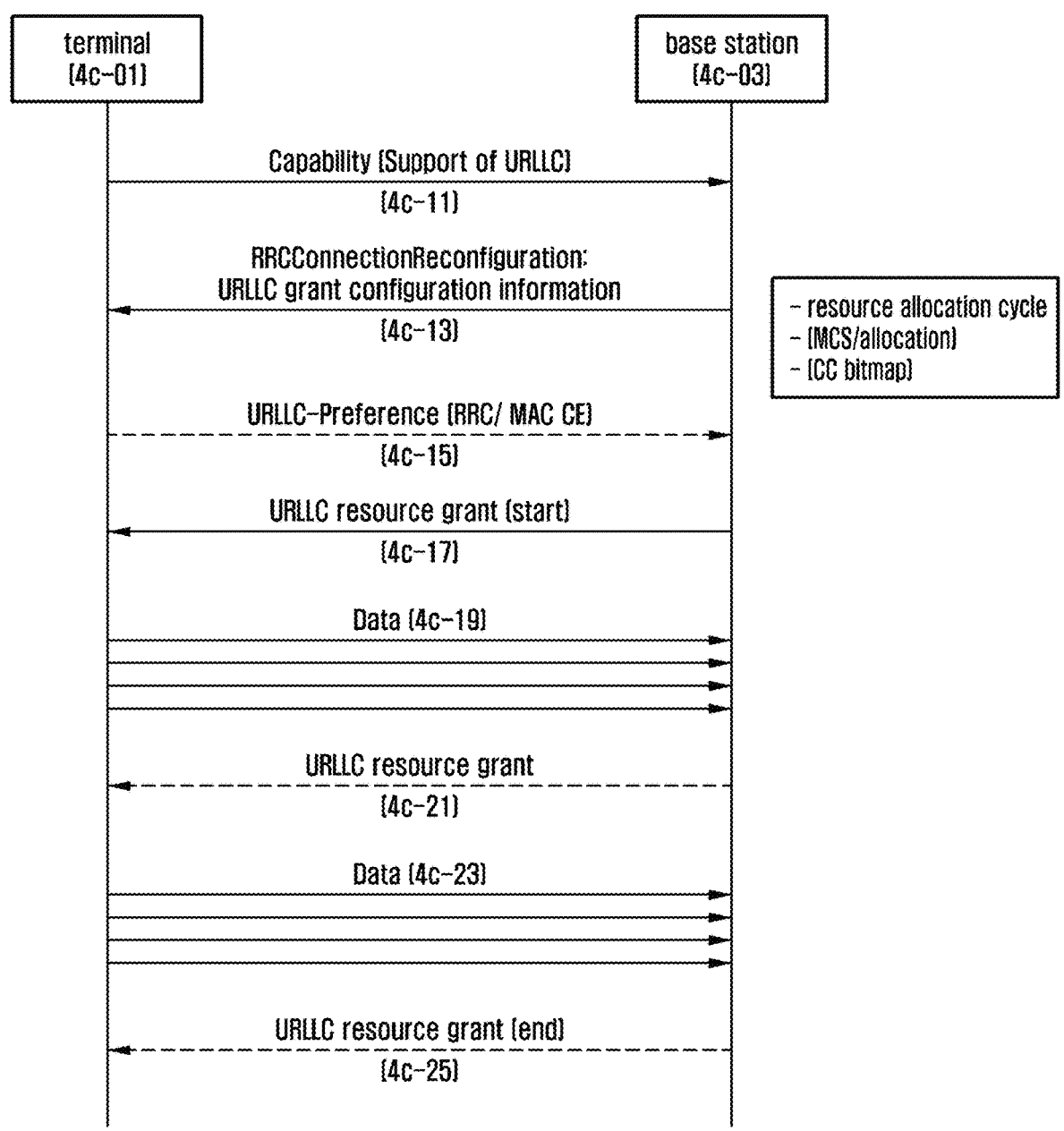
FIG. 4C illustrates signal flows between a terminal and a base station in a signal transmission method proposed in the present disclosure.

FIG. 4C illustrates signal flows between a terminal and a base station in a signal transmission method proposed in the present disclosure.

Although FIG. 4C is directed to the uplink data transmission of the terminal (i.e., data transmission from a terminal to a base station), it may also be possible to apply the method to a downlink data transmission.

In the transmission method of the present disclosure, the terminal 4c-01 may transmit its capability information to the base station 4c-03 at step 4c-11. The capability information may include UECapability carried in an RRC message. The capability information may include the information indicating whether the terminal supports the method proposed in the present disclosure. The present disclosure proposes a redundant data transmission over multiple resources for providing a URLLC service to be described later. Accordingly, the capability information may include the information indicating whether the terminal supports the redundant data transmission over multiple resources. The capability information may also include the information indicating whether the terminal supports the URLLC service.

The base station 4c-03 may transmit configuration information to the terminal 4c-01 at step 4c-13. The base station 4c-03 may transmit the configuration information for allowing the use of the transmission method proposed in the present disclosure, and the configuration information may include URLLC grant configuration information. The configuration information may be transmitted in an RRC message to the terminal 4c-01.

The message transmitted from the base station 4c-03 to the terminal 4c-01 may include at least one of resource allocation periodicity (grant periodicity), physical resource position and transmission scheme (Modulation and Coding Scheme (MCS)), and information on carriers for use in transmission. The grant periodicity is the information indicating the indicating initial transmission resource for semi-persistent resource allocation to be described later and, if this information is included, it is not necessary for the base station to transmit the resource allocation message for every transmission (e.g., data transmission at step 4c-23).

If the configuration message is received, the terminal 4c-01 may notify the base station of the use of the corresponding transmission method for the uplink transmission of the terminal (or the downlink transmission of the base station) at step 4c-15. The configuration message may be a MAC layer message or an RRC layer message for use in LTE. This message may be referred to as URLLC preference message and, if this message is received, the base station may allocate resources according to the method proposed in the present disclosure.

Upon receipt of the configuration message or a notification message, the base station 4c-03 may start resource allocation according to the method proposed in the present disclosure. The corresponding transmission method is characterized in that the UE 4c-01 transmits data at steps 4c-19 and 4c-23 according to the resource allocation message (URLLC resource grant) which the eNB 4c-03 transmits at steps 4c-17 and 4c-21; the detailed description thereof is made with reference to FIG. 4D.

The resource allocation message may include at least one of physical resource position and transmission scheme (Modulation and Coding Scheme (MCS)), information on the carriers for use in transmission (e.g., in the form of a bitmap), transmission pattern. For example, if the terminal uses 4 carriers for data transmission among the total 10 component carriers configured by the base station, the message may include the information on the 4 carrier frequencies (in the format of a bitmap). The physical resource position and transmission scheme (MCS) information may be transmitted per carrier frequency or as a common information for 4 carrier frequencies. If multiple transmission patterns are configured as to be described later, the resource allocation message may include the pattern information.

However, the base station may include the resource allocation information as a part of the RRC configuration information. The base station may transmit part of the resource allocation information (physical resource position, transmission method, information on the carriers for use in transmission, and transmission pattern) through an RRC message and the remaining part through a resource allocation message transmitted on PDCCH. For example, the base station may transmit to the terminal the transmission pattern information through an RRC message and notify the terminal of the resource position for data transmission using a resource allocation message in the PDCCH. The base station may transmit the above-described information through one of the RRC message and the resource allocation message on PDCCH. For example, if the resource allocation information is carried in the RRC message, the terminal may transmit data according to the predetermined transmission pattern and physical resource position. If the base station transmits the resource allocation information using the resource allocation message, the terminal may transmit data based on the resource dynamically allocated using the resource allocation information.

In correspondence to the notification message, the base station 4c-03 may transmit a message indicating that the use of the configured transmission method is stopped at step 4c-25.

Figure 4D:
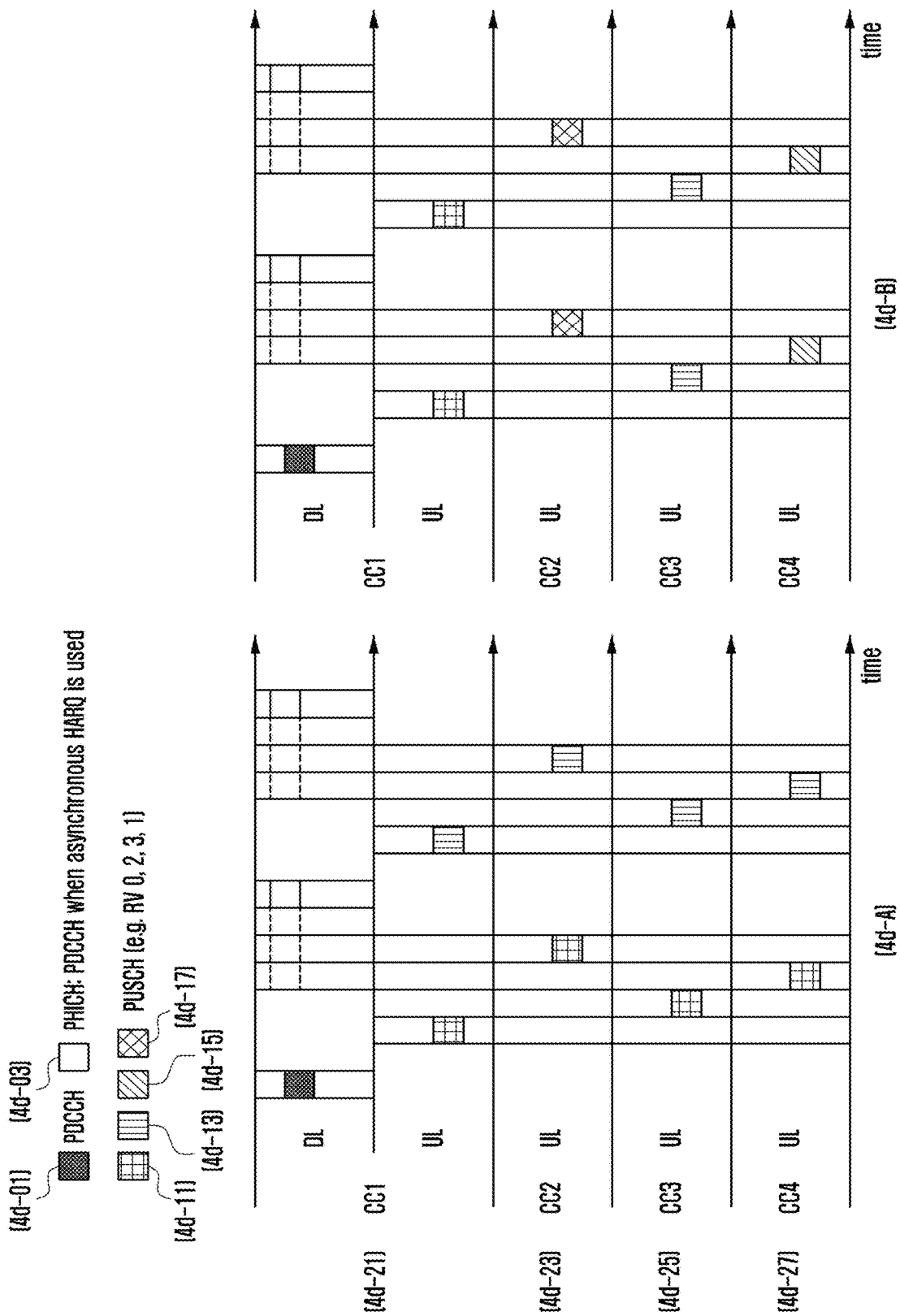
FIG. 4DA illustrates a transmission scheme proposed in the present disclosure.
Figure 4D:
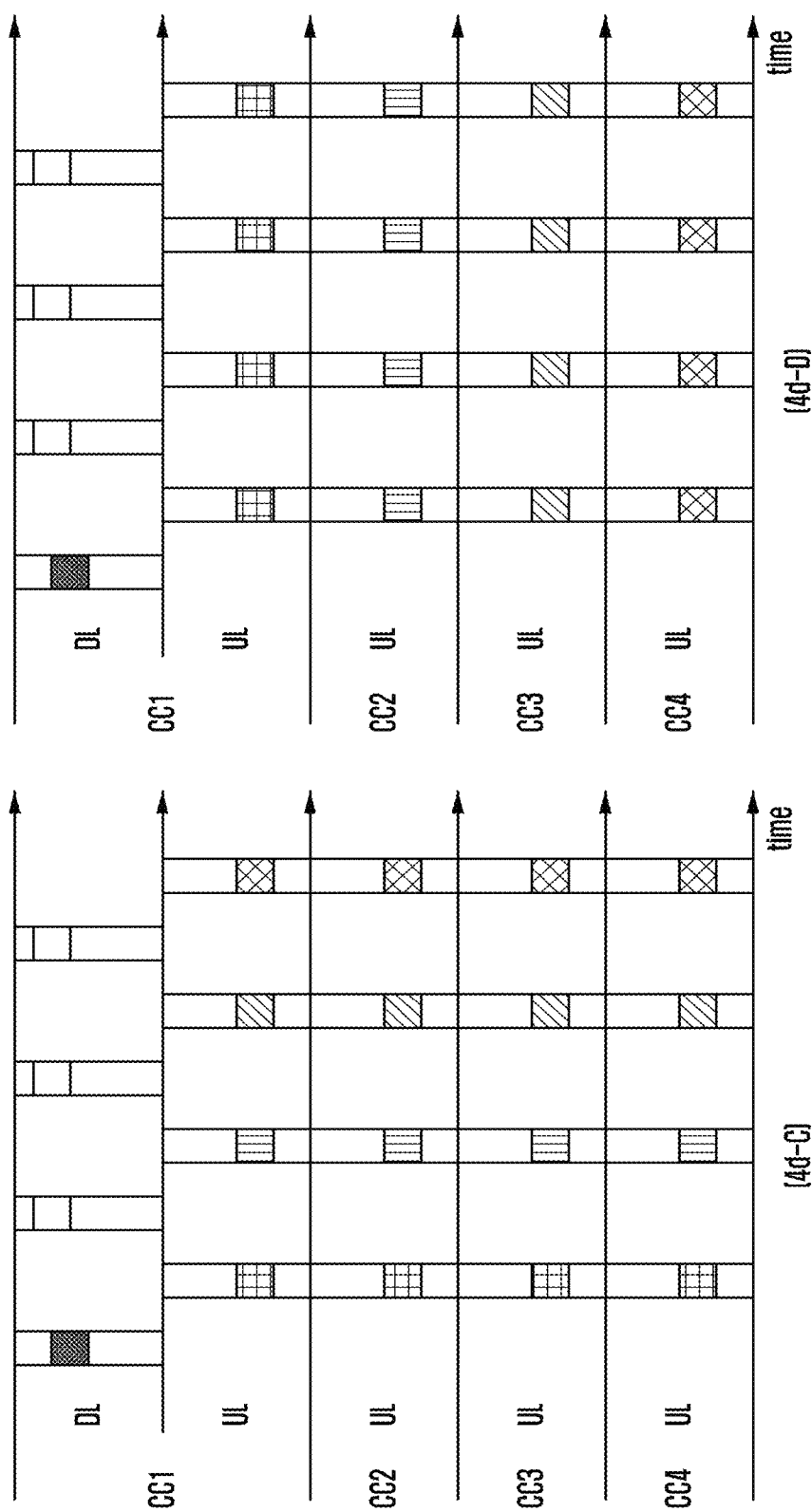
Figure 4D:
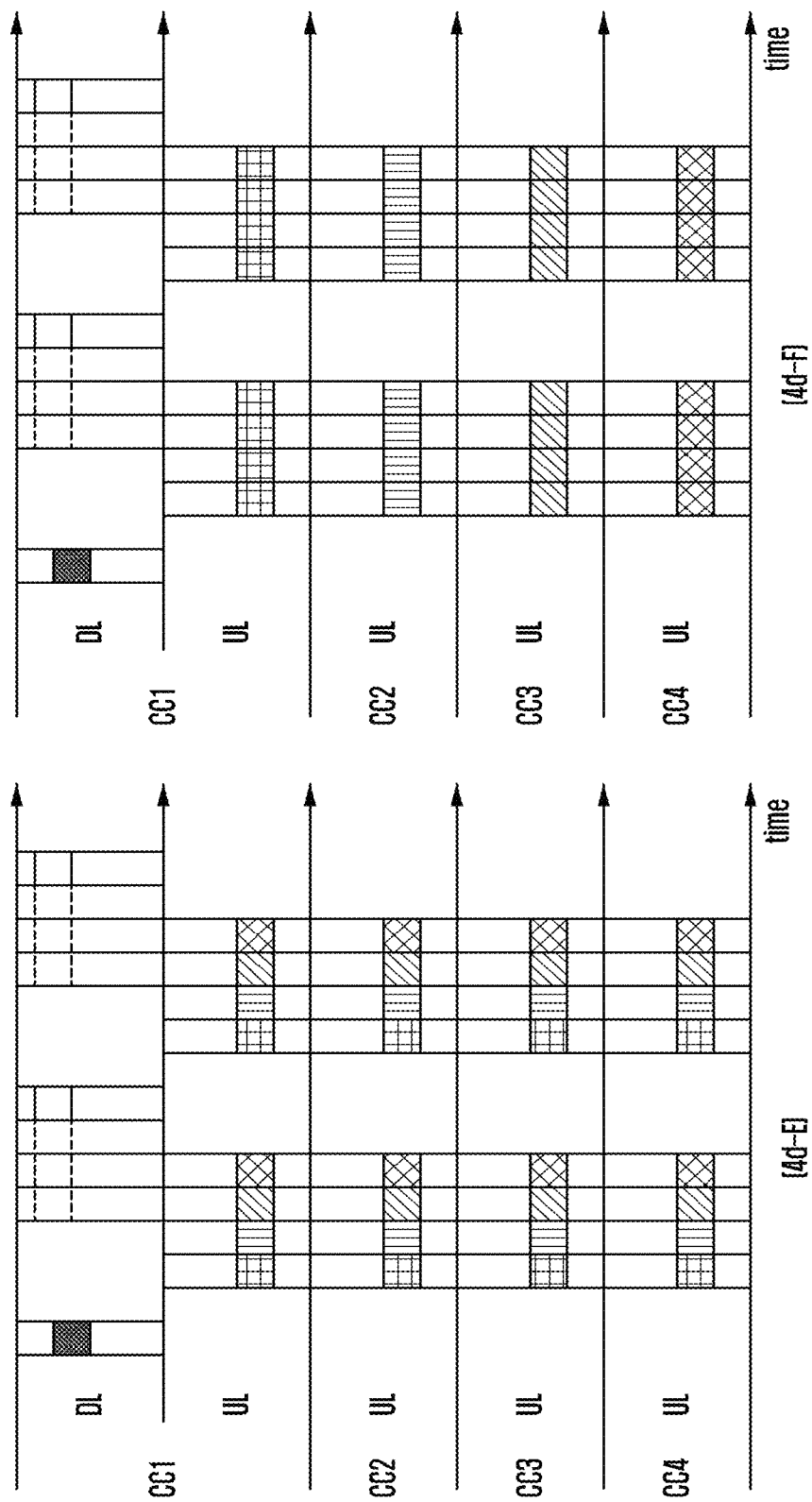

FIGS. 4DA, 4DB, and 4DC illustrate a transmission method according to the present disclosure.

Although the drawings are directed to uplink transmission of a UE, the same method may be applied to downlink transmission.

In FIGS. 4DA to 4DC, the horizontal axis time, and the vertical axis denotes frequency; the drawings depict the concept of resource allocation to a terminal in the time domain for data transmission of the terminal. Reference number 4d-01 denotes the resources allocated by a base station and is equivalent to PDCCH in LTE. The base station allocates the resources 4d-01 to the terminal, and the resource 4d-01 may include at least one of physical resource position and modulation scheme (MCS) for data transmission, carriers for use in data transmission (e.g., in the form of a bitmap), and transmission pattern.

The terminal transmits data to the base station based on the above information in a pattern as denoted by reference numbers 4d-11, 4d-13, 4d-15, and 4d-17. Reference numbers 4d-11, 4d-13, 4d-15, and 4d-17 denote data being transmitted through PUSCH in LTE, i.e., Redundancy Versions (RVs) of the same data but encoded in different channel coding schemes on the physical layer. A receiver (base station in the drawings) combines the RV(s) accumulatively to increase the successful data reception probability.

A receiver (base station in the drawings) receives the PUSCH and then acknowledges whether the data are received successively through a predetermined channel. Reference number 4d-03 denotes this channel which corresponds to Physical Hybrid ARQ Indicator Channel (PHICH) in LTE.

The drawings depict scenarios of transmitting data over 4 Component Carriers (CCs) as denoted by reference numbers 4d-21, 4d-23, 4d-25, and 4d-27.

FIG. 4DA illustrates a transmission method proposed in the present disclosure.

Parts (4d-A) and (4d-B) of FIG. 4DA show scenarios in which a terminal transmit data continuously but hopping among the CCs in the resources allocated by the base station.

That is, the terminal is allocated resources through the PDCCH 4d-01 and transmits data continuously but hopping among the CCs according to a predetermined pattern or a pattern configured by the base station.

Part (4d-A) of FIG. 4DA exemplifies a case where the same RVs are consecutively transmitted, and part (4d-B) of FIG. 4DA exemplifies a case where the different RVs are consecutively transmitted. As shown in the drawing, the frequency resource positions are fixed on each CC and this contributes to reduction of resource allocation overhead.

As described above, the base station may notify the terminal of the transmission pattern (or resource pattern) as shown in part (4d-A) or (4d-B) of FIG. 4DA using an RRC message or resource allocation information conveyed on PDCCH such that the terminal transmits data in the transmission pattern. The base station may also transmit a bitmap indicating the transmission position on the respective CCs and RV mapping scheme to the terminal using an RRC message or the resource allocation information conveyed on PDCCH.

For example, the base station may notify the UE of the transmission pattern as shown in part (4*d*-A) or (4*d*-B) of FIG. 4DA and the RV mapping scheme in an RRC message and of the data transmission start position of the terminal in the resource allocation information conveyed on PDCCH.

The above method for transmitting resource allocation information to the terminal may be applied throughout the present disclosure including the embodiments of FIGS. 4B and 4C.

Afterward, the receiver (base station in the embodiment) may transmit an acknowledgement signal 4*d*-03 corresponding to the data. The base station may transmit the acknowledgement per every transmission including the initial transmission or corresponding to the last one of the consecutive data transmissions.

FIG. 4DB illustrates a transmission method proposed in the present disclosure.

Parts (4*d*-C) and (4*d*-D) of FIG. 4DB show scenarios in which a terminal transmit the same data over multiple CCs simultaneously in the resources allocated by the base station.

Part (4*d*-C) of FIG. 4DB exemplifies a case where the same RV of data is transmitted over the multiple CCs simultaneously, and Part (4*d*-B) of FIG. 4DB exemplifies a case where the different RVs are transmitted over the multiple CCs simultaneously. As shown in the drawing, the frequency resource positions are fixed on each CC and this contributes to reduction of resource allocation overhead.

Afterward, the receiver (base station in this embodiment) may transmit an acknowledgement 4*d*-03 corresponding to the data.

FIG. 4DC illustrates a transmission method proposed in the present disclosure.

Parts (4*d*-E) and (4*cd*-F) of FIG. 4DC show scenarios in which a terminal transmit the same data over multiple CCs simultaneously in the resources allocated by the base station.

Part (4*d*-E) of FIG. 4DC exemplifies a case where one RV of the data is transmitted over the multiple CCx simultaneously and another RV is transmitted over the multiple CCs simultaneously, and Part (4*d*-F) of FIG. 4DC exemplifies a case where different RVs are transmitted over the multiple CCs simultaneously in a consecutive manner. As shown in the drawing, the frequency resource positions are fixed on each CC and this contributes to reduction of resource allocation overhead.

Afterward, the receiver (base station in this embodiment) may transmit an acknowledgement 4*d*-03 corresponding to the data. The base station may transmit the acknowledgement per every transmission including the initial transmission or corresponding to the last one of the consecutive data transmissions.

Figure 4E:
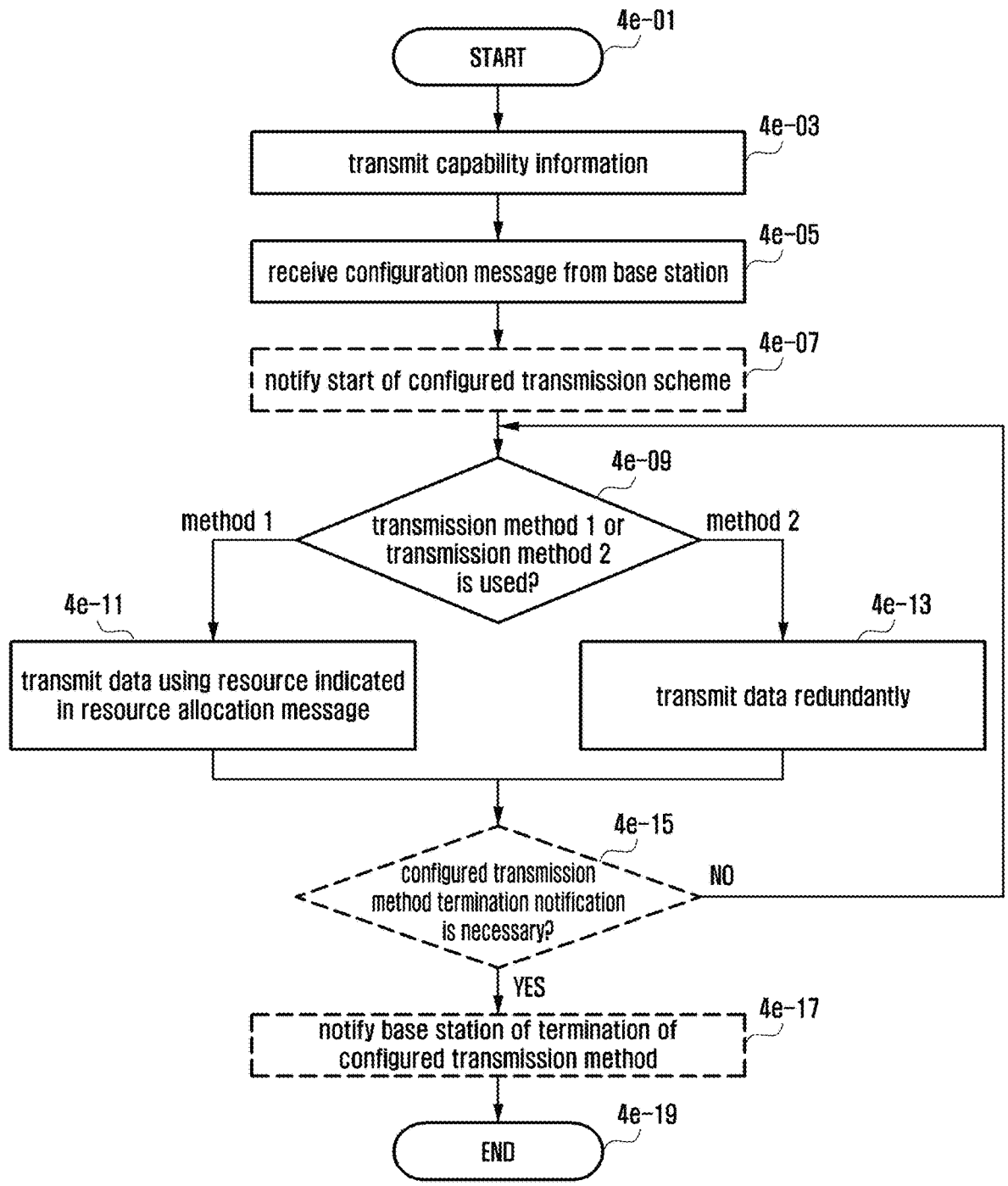
FIG. 4EA illustrates a terminal operation according to the present disclosure.
Figure 4E:
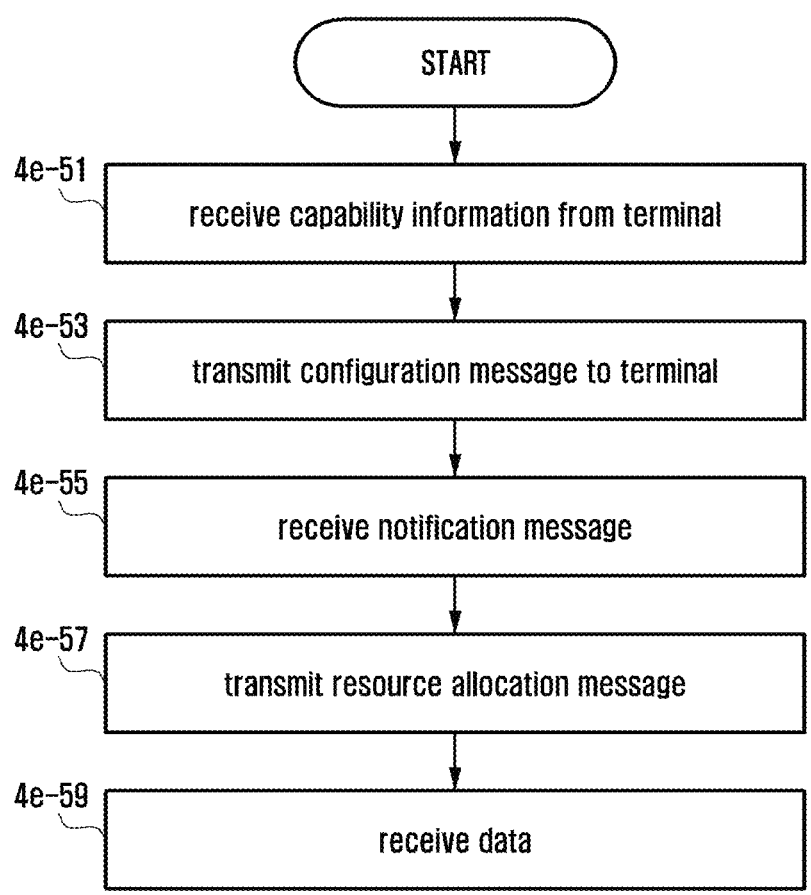

FIG. 4EA is a flowchart illustrating a terminal operation according to the present disclosure.

The terminal may transmit capability information to the base station at step 4*e*-03. The capability information may include UECapability carried in an RRC message. The capability information may include the information indicating whether it supports the method proposed in the present disclosure. As described above, the capability information may include the information indicating whether the terminal supports the redundant data transmission over multiple resources. The capability information may also include the information on whether the terminal supports the URLLC service. That is, the terminal transmits to the base station the information indicating whether it supports the transmission method proposed in the present disclosure at step 4*e*-03.

The base station may configure the transmission method (or transmission scheme or transmission mode) proposed in the present disclosure for the terminal based on the above information.

The terminal receives a configuration message from the base station at step 4*e*-05. The configuration message may include at least one of a resource allocation period, physical resource position and transmission scheme (MCS), and information on carriers for use in transmission (e.g., in the form of a bitmap). The configuration information may be transmitted in an RRC message to the terminal.

The terminal may apply the proposed transmission method immediately upon receipt of the configuration message or transmit a predetermined message to the base station to notify the base station that it wants to use the corresponding transmission method at the uplink transmission timing at step 4*e*-07. This message may be equivalent to a MAC layer or an RRC layer message in LTE. In the case of applying the transmission method upon receipt of the configuration message, the terminal may transmit data based on the resource allocation information included in the configuration message. In this case, step 4*e*-07 may be omitted.

In order to notify the base station of the interest in use of the proposed transmission method, the terminal may transmit an URLLC preference message to the base station.

If the configuration message or notification message is received, the base station may configure the proposed transmission method for the terminal using a resource allocation message (corresponding to a message conveyed on PDCCH in LTE).

That is, the base station transmits to the terminal the resource allocation message including a predetermined indicator indicating one of transmission method 1 and transmission method 2 proposed in the present disclosure.

The terminal may receive a resource allocation message and determine at step 4*e*-09 whether to use transmission method 1 or transmission method 2 based on the information included in the resource allocation message.

If the base station has instructed to use transmission method 1, the terminal transmits data once based on the designated resource information in the resource allocation message at step 4*e*-11.

If the base station has instructed to use transmission method 2, the terminal may transmit data using a predetermined method or a method indicated in the information received at step 4*e*-05 on the basis of the information included in the resource allocation message. The terminal may also transmit data based on the resource allocation information including in the configuration information received at step 4*e*-05 and the information included in the resource allocation information.

For example, the terminal may transmit the data over multiple resources redundantly (repeatedly or duplicately) based on the transmission pattern indicated in the information received at step 4*e*-05 and the data transmission timing information included in the resource allocation message.

The terminal may transmit data according to one of the transmission methods exemplified in FIGS. 4DA to 4DC at step 4*e*-13. That is, the terminal may transmit data redundantly over multiple resources for the URLLC service. In other words, the terminal may transmit same data in multiple resources. The redundant data transmission over multiple resources may be performed with one of the transmission patterns depicted in FIGS. 4DA to 4DC. The pattern information may be carried in an RRC configuration information or a resource allocation message conveyed on PDCCH.

In order to apply one of the patterns exemplified in FIGS. 4DA to 4DC, the receiver may use one or more buffers for receiving data. For example, the receiver may receive data in such a way of buffering data being received over multiple component carriers in a signal buffer or in carrier-specific buffers (for low implementation complexity) and combining the buffered data and, if the data is received successfully, it may acknowledge the successful receipt to the transmitter (base station in this embodiment).

The terminal may determine at step 4e-15 whether to stop using the configured uplink transmission method. If it is determined to stop using the configured uplink transmission method, the terminal transmits to the base station a message indicating that the configured transmission method is terminated at step 4e-17.

FIG. 4EB is a flowchart illustrating a base station operation according to the present disclosure.

The base station may receive capability information from the terminal at step 4e-51. The capability information may include UECapability carried in an RRC message, and the terminal may include information indicating whether it supports the transmission method proposed in the present disclosure in the capability information. The transmission method proposed in the present disclosure may be the redundant data transmission over multiple resources.

The base station may instruct the terminal to activate the proposed transmission method based on the capability information.

The base station transmits a configuration message to the terminal at step 4e-53. may include at least one of a resource allocation period, physical resource position and transmission scheme (MCS), and information on carriers for use in transmission (e.g., in the form of a bitmap). The configuration information may be transmitted in an RRC message to the terminal.

The base station may receive a predetermined message at an uplink transmission timing of the terminal at step 4e-55 so as to check that the terminal wants to use the configured transmission method. The terminal may start transmission immediately upon receipt of the configuration message and, in this case, step 4e-55 may be omitted.

The base station may transmit a resource allocation message to the terminal at step 4e-57. The base station may instruct the terminal to UE the proposed transmission method using the resource allocation message.

The base station may receive data in the resources allocated to the terminal at step 4e-59.

Here, the base station may receive data transmitted in one of the methods exemplified in FIGS. 4DA to 4DC. That is, the base station may receive the data transmitted in the transmission method of redundant data transmission over multiple resources. The terminal performs the redundant data transmission over multiple resources in one of the transmission patterns depicted in FIGS. 4DA to 4DC. The pattern information may be carried in an RRC configuration information or a resource allocation message conveyed on PDCCH.

Figure 4F:
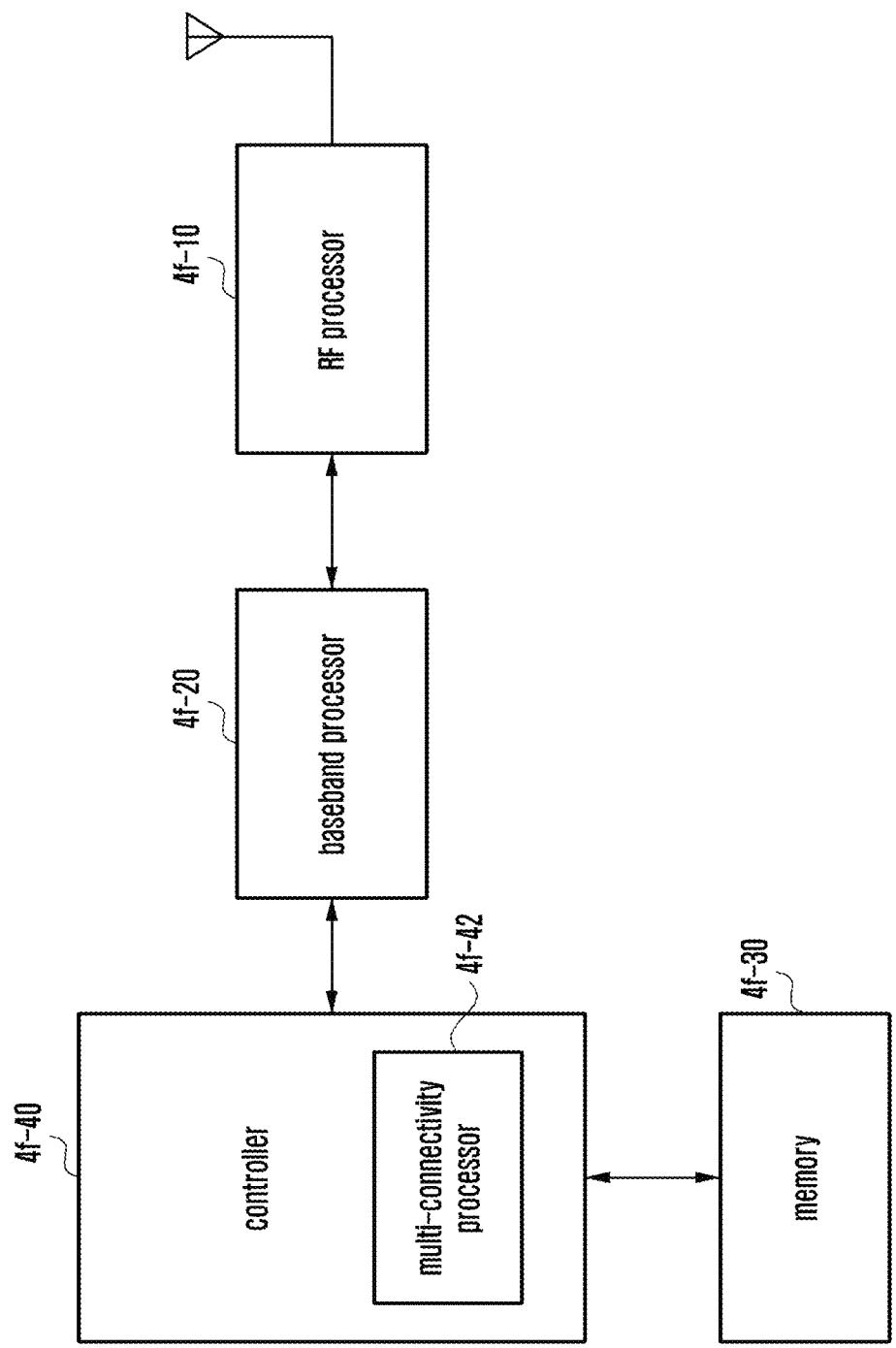
FIG. 4F illustrates a configuration of a terminal according to an embodiment of the present disclosure.

FIG. 4F illustrates a configuration of a terminal according to an embodiment of the present disclosure.

In reference to FIG. 4F, the terminal includes an RF processing unit 4f-10, a baseband processing unit 4f-20, a memory 4f-30, and a controller 4f-40. In the present invention, the controller 2l-40 may be interchangeably referred to as a circuit, an application-specific integrated circuit, and at least one processor and the controller may be coupled with the transceiver.

The RF processing unit 4f-10 may perform the same function as the RF processing unit 1j-10 of FIG. 1J and thus detailed description thereof is omitted herein.

The baseband processing unit 4f-20 may perform the same functions as the baseband processing unit 1j-20 of FIG. 1J and thus detailed description thereof is omitted herein.

The baseband processing unit 4f-20 and the RF processing unit 4f-10 are involved in signal transmission and reception as described above. Accordingly, the baseband processing unit 4f-20 and the RF processing unit 4f-10 may be referred to as a transmit unit, a receive unit, a transceiver, or a communication unit. The detailed description thereof has been described with reference to FIG. 1J and thus omitted herein. The memory 4f-30 may be identical in functionality with the memory 1j-30 as described with reference to FIG. 1J and thus detailed description thereof is omitted herein. The controller 4f-40 controls overall operations of the UE. For example, the controller 4f-40 transmits/receives signals by means of the baseband processing unit 4f-20 and the RF processing unit 4f-10. The controller 4f-40 writes and reads data to and from the memory 4f-40. For this purpose, the controller 4f-40 may include at least one processor. For example, the controller 4f-40 may include a Communication Processor (CP) for controlling communication and an Application Processor (AP) for controlling higher layer application programs. According to an embodiment of the present disclosure, the controller 4f-40 includes a multi-connectivity unit 4f-42 for the operation in the multi-connectivity mode. For example, the controller 4f-40 may control the terminal to perform the operations in the procedure of FIG. 4EA.

According to an embodiment of the present disclosure, the controller 4f-40 controls the terminal to transmit data in the proposed transmission method based on the configuration information received from the base station.

Figure 4G:
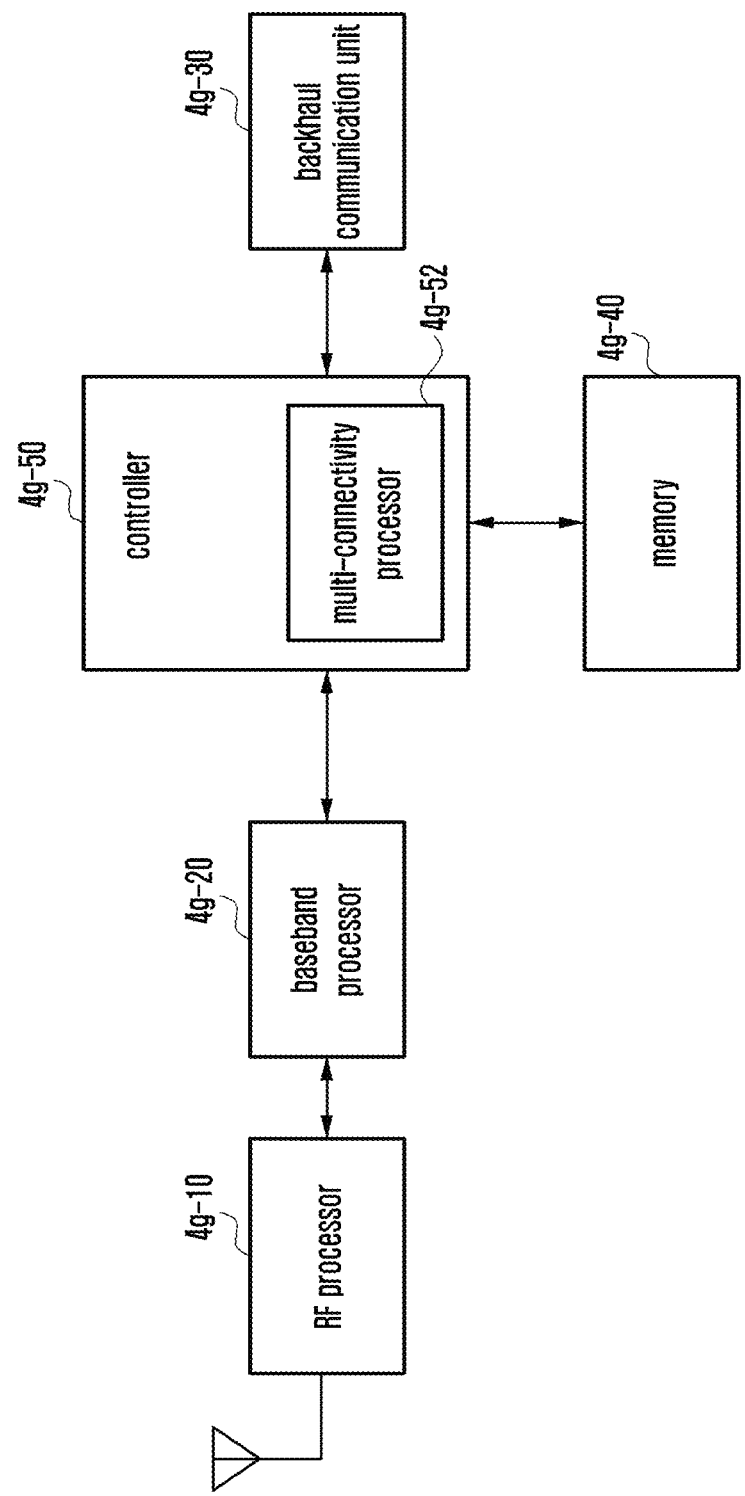
FIG. 4G illustrates a configuration of a base station according to an embodiment of the present disclosure.

FIG. 4G illustrates a configuration of a base station according to an embodiment of the present disclosure.

As shown in FIG. 4G, the base station includes an RF processing unit 4g-10, a baseband processing unit 4g-20, a backhaul communication unit 4g-30, a memory 4g-40, and a controller 4g-50. In the present disclosure, the controller 4g-50 may be interchangeably referred to as a circuit, an application-specific integrated circuit, and at least one processor and the controller may be coupled with the transceiver.

The RF processing unit 4g-10 may perform the same function as the RF processing unit 1k-10 of FIG. 1K and thus detailed description thereof is omitted herein.

The baseband processing unit 4g-20 may perform the same functions as the baseband processing unit 1k-20 of FIG. 1K and thus detailed description thereof is omitted herein.

The baseband processing unit 4g-20 and the RF processing unit 4g-10 are involved in signal transmission and reception. For this reason, the baseband processing unit 4g-20 and the RF processing unit 4g-10 may be referred to as a transmit unit, a receive unit, a transceiver, or a communication unit.

The backhaul communication unit 4g-30 may perform the same functions of the backhaul communicating unit 1k-30 of FIG. 1K and thus detailed description thereof is omitted herein. The memory 4g-40 may perform the same function as the memory 1k-40 of FIG. 1K and thus detailed description thereof is omitted herein.

The controller 4g-50 controls overall operations of the base station. For example, the controller 4g-50 transmits/receives signals by means of the baseband processing unit 4g-20 and the RF processing unit 4g-10. The controller 4g-50 writes and reads data to and from the memory 4g-40. For this purpose, the controller 4g-50 may include at least one processor and the controller may be coupled with the transceiver.

According to an embodiment of the present disclosure, the controller 4g-50 determines whether the terminal supports the proposed transmission method and, if so, configures the transmission for the terminal. That is, the base station may allocate resources to the terminal for use of the proposed transmission method and instruct the terminal to use the proposed transmission method using the resource allocation message. The detailed description thereof has been made above and thus is omitted herein. The baseband processing unit 4g-20 manage one or more buffers for receiving data and acknowledges whether the data is received successfully.

Fifth Embodiment

Figure 5A:
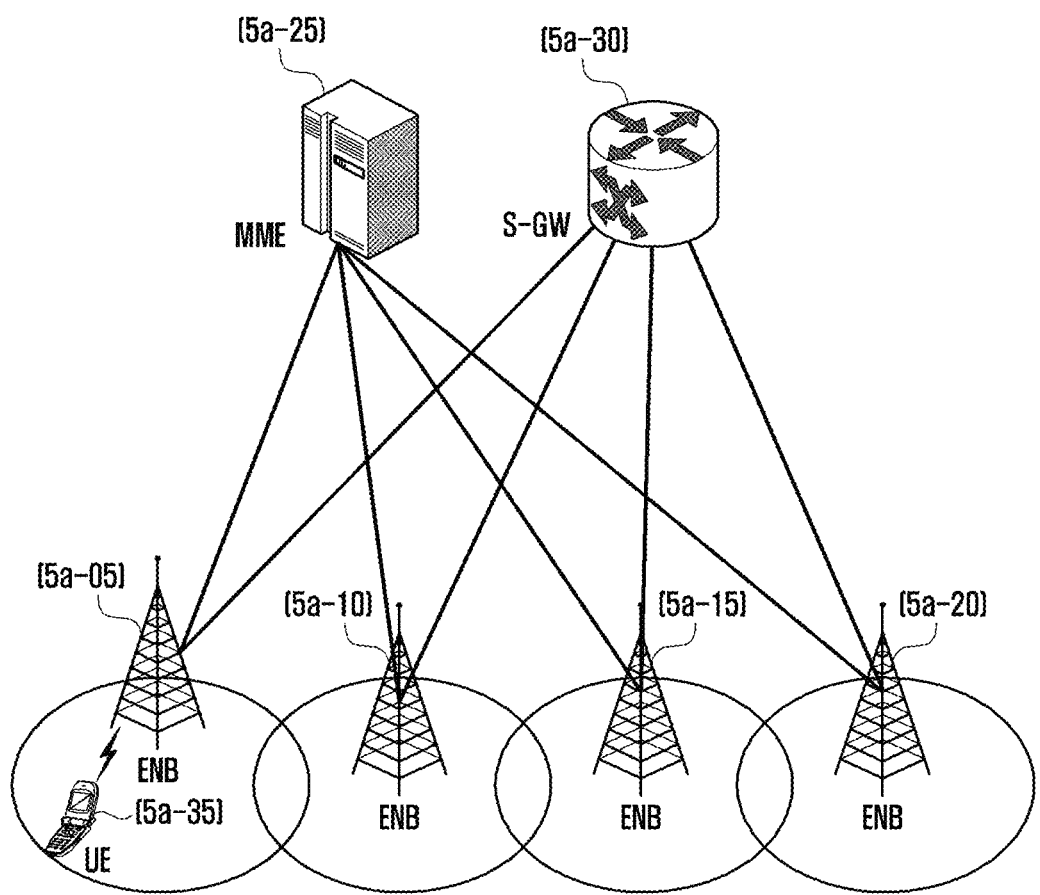
FIG. 5A illustrates an LTE system architecture.

FIG. 5A illustrates architecture of an LTE system.

The detailed description of the LTE system architecture has been made already with reference to FIG. 1A and thus is omitted herein.

Figure 5B:
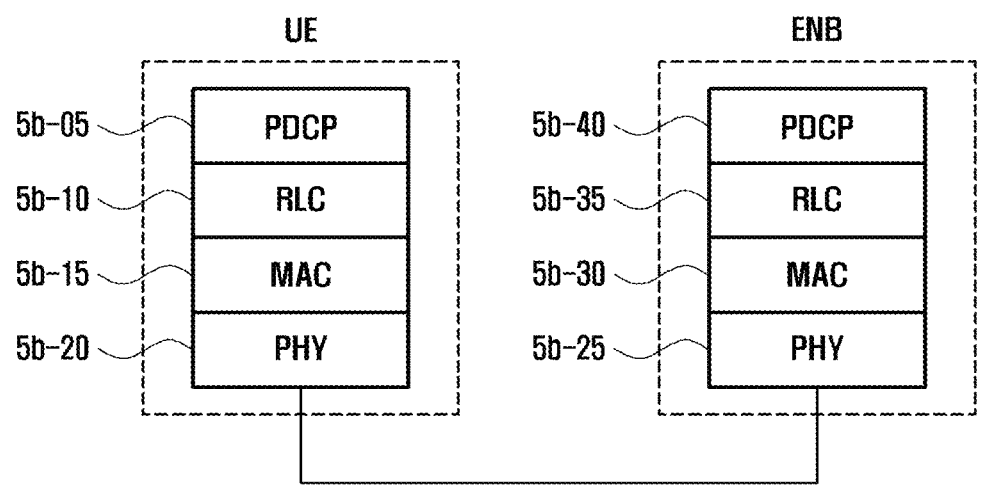
FIG. 5B illustrates a protocol stack of an interface between a UE and an eNB in the LTE system.

FIG. 5B illustrates a protocol stack of an interface between a UE and an eNB in the LTE system.

The detailed description of the protocol stack has been made already with reference to FIGS. 2B and 3B and thus is omitted herein.

FIG. 5C illustrates a handover procedure in a legacy LTE system.

The UE 5c-01 in the connected mode transmits a measurement report to a source eNB 5c-02 at step 5c-05 periodically or when a predetermined event occurs.

The source eNB 5c-02 determines whether to trigger handover of the UE 5c-01 to a neighboring eNB. Typically, a handover decision is made for a UE in the connected mode to hand over the control from one eNB to another.

If the source eNB has made the handover decision for the UE 5c-01, it transmits a handover (HO) request message to another eNB, i.e., target eNB 5c-03, to serve the UE 5c-01 at step 5c-10.

If the target eNB 5c-03 accepts the handover request, it transmits a HO request acknowledgement (Ack) to the source eNB 5c-02 at step 5c-15.

If the HO request Ack is received, the source eNB 5c-02 transmits an HO command to the UE 5c-01 at step 5c-20. The HO command may be carried in the RRC Connection Reconfiguration message transmitted from the source eNB 5c-02 to the UE 5c-01. If the RRC Connection Reconfiguration message is received, the UE 5c-01 stops data communication with the source eNB 5c-02 and starts a T304 timer. The T304 timer is used for the UE 5c-01 to restore the previous settings and transition to the RRC idle state when the UE 5c-01 fails handover to the target eNB 5c-03 in a predetermined time duration.

The source eNB 5c-02 transmits Sequence Number (SN) status information of uplink/downlink data to the target eNB 5c-03 at step 5c-30 and, if downlink data exists, forwards the downlink data to the target eNB 5c-03 at step 5c-35.

Afterward, the UE 5c-01 attempts random access to the target eNB 5c-03 at step 5c-40. The random access is attempted to notify the target eNB 5c-03 of the handover thereto and achieve uplink synchronization. For the random-access attempt, the UE 5c-01 transmits to the target eNB 5c-03 a preamble corresponding to a preamble ID provided by the source eNB 5c-02 or selected randomly.

After a predetermined number of subframes since the preamble transmission, the UE 5c-01 monitors for a Random Access Response (RAR). The monitoring time period is referred to as RAR window. If the RAR is received in a predetermined time period at step 5c-45, the UE 5c-01 transits to the target eNB 5c-03 an HO complete message in the RRC Connection Reconfiguration Complete (RRCConnectionReconfigurationComplete) message at step 5c-55. If the RAR is received successfully, the UE 5c-01 stops the T304 timer at step 5c-50.

The target eNB 5c-03 may transmit a path switching request message to the MME/S-GW 5c-04 to switch the bearer established towards the source eNB 5c-02 to a bearer established towards the target eNB 5c-03 at step 5c-60 and receive a path switching request ACK from the MME/S-GW 5c-04 at step 5c-65. Upon receipt of the path switching request ACK, the target eNB 5c-03 transmits a UE context release message to the source eNB 5c-02 at step 5c-70. The UE attempts receiving data from the target eNB 5c-03 at the time point of the RAR window and starts transmission to the target eNB 5c-03 after transmitting the RRCConnectionReconfigurationComplete message since the receipt of the RAR.

In the LTE handover procedure of FIG. 5C, the UE cannot transmit/receive data during the period between the time point when the HO command message (RRCConnectionReconfiguration) is received and the time point when the UE transmits the HO complete message (RRCConnectionReconfigurationComplete), i.e., the handover to the target eNB has been completed. Such data transmission suspension causes data transmission/reception delay. The present disclosure proposes a method for minimizing the data transmission suspension time and elaborate operation to achieve the desired result.

The data transmission suspension time minimization method of the present disclosure is called RACH-less handover. The RACH-less handover method is characterized in that the handover of a UE from a source eNB to a target eNB is performed without the legacy random access procedure by allowing the UE to transmit the RRCConnectionReconfigurationComplete message immediately on the uplink resources pre-allocated by the target eNB. For this reason, the RACH-less handover method of the present disclosure may also be called random access-free handover. There can be various embodiments of the RACH-less handover method. The RACH-less handover may be implemented with any of various embodiments of the present disclosure. The embodiments of the present disclosure are described hereinafter.

Figure 5D:
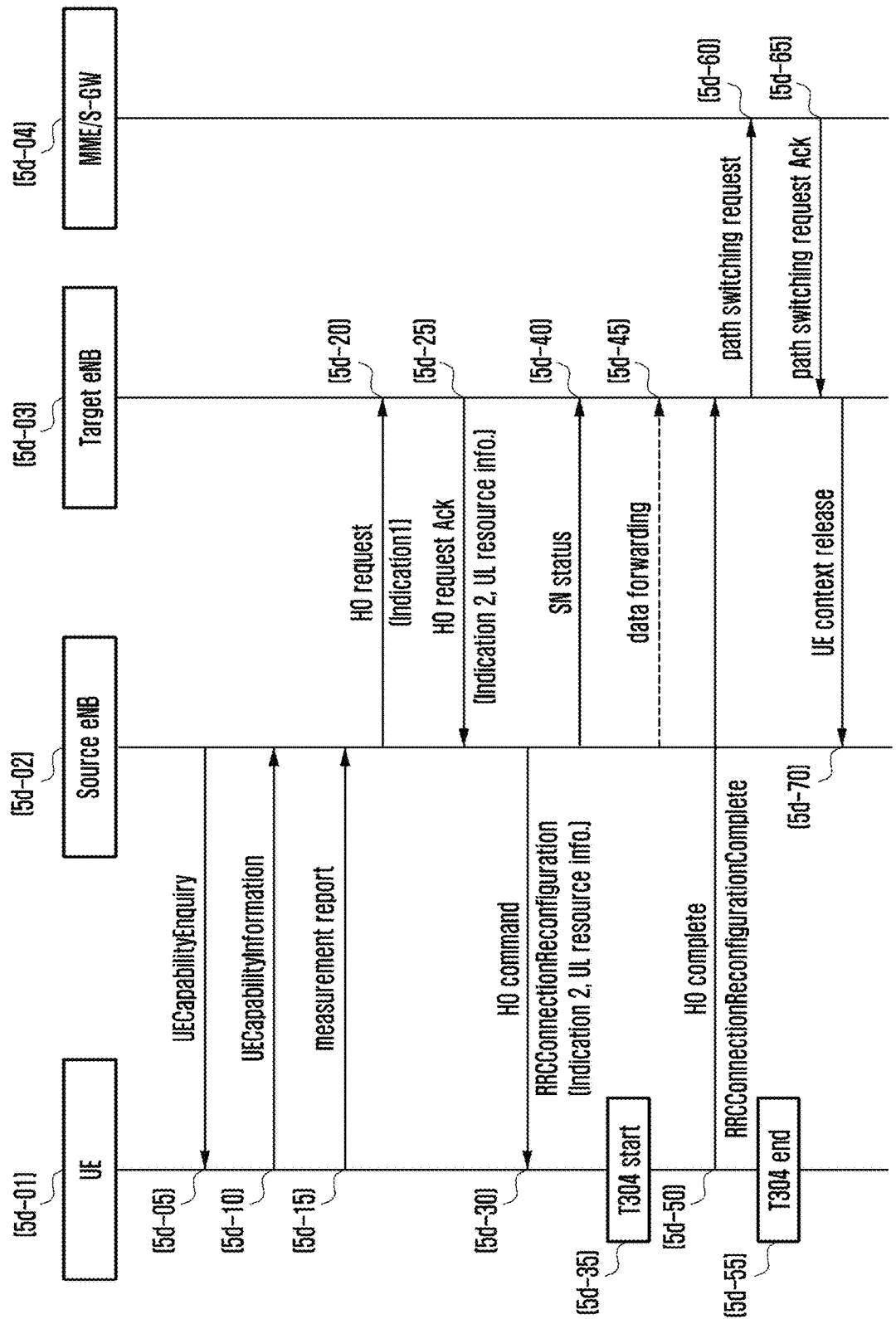
FIG. 5D illustrates an RACH-less handover method proposed in the present disclosure.

FIG. 5D illustrates an RACH-less handover method proposed in the present disclosure.

In FIG. 5D, the source eNB 5d-02 may transmit a UECapabilityEnquiry message to the UE 5d-01 to request for UE capability information at step 5d-05.

The UE 5d-01 may transmit a UECapabilityInformation message to the source eNB 5d-02 to report per-band or per-bandcombination RACH-less handover capability at step 5d-10. If the source eNB 5d-02 supports the per-band or per-bandcombination RACH-less handover, the RACH-less handover can be performed.

The UE 5d-01 in the connected mode transmits cell measurement information (Measurement Report) to the source eNB 5d-02 at step 5d-15, the measurement information being transmitted periodically or when a predetermined event occurs. The source eNB 5d-02 makes a handover decision based on the measurement information. If the handover decision is made, the source eNB 5d-02 transmits a handover request message to the target eNB 5d-03 at step 5d-20.

The source eNB 5d-02 may further determine whether to perform the RACH-less handover for the UE 5d-01. In this case, the source eNB 5d-02 requests to the target eNB 5d-03 for the RACH-less handover at step 5d-20. In order to request for the RACH-less handover, the source eNB 5d-02 may include an RACH-less handover indicator (Indication 1) in the handover request message.

If the target eNB 5d-03 accepts the handover request, it transmits an HO request Ack message to the source eNB 5d-02 at step 5d-25. The HO request Ack message include target eNB configuration information for use in the handover procedure. If the target eNB 5d-03 supports the RACH-less handover, the configuration information may include at least one of an indicator indicating supportability of RACH-less handover (Indication 2) and information on the uplink resources for use in transmitting an RRC message (RRCConnectionReconfigurationComplete) from the UE 5d-01 to the target eNB 5d-03. Here, the indicator (Indication 2) indicating that the target eNB 5d-03 supports the RACH-less handover may be referred to as RACH-less handover indicator or RACH-less handover activation information.

The configuration information may also include timing advance or timing adjustment information and, if the timing advance or timing adjustment information is not included, the UE 5d-01 may apply the same timing advance or timing advancement information as the source eNB 5d-02. Meanwhile, the HO request Ack message being transmitted from the target eNB 5d-03 to the source eNB 5d-02 may not include the information on the uplink transmission resources. That is, the HO request Ack message may include the information on the uplink transmission resource optionally.

If the HO request Ack message includes uplink transmission resource information, this may mean that the UE 5d-01 has already acquired the uplink transmission resource through an RRC message.

If the HO request Ack message includes no uplink transmission resource information (if the UE 5d-01 receives no uplink transmission resource information, the UE 5d-01 may monitor PDCCH of the target eNB 5d-03 for the control information including the uplink resource information. The detailed description thereof is made later.

The source eNB 5d-02 transmits the RRCConnectionReconfiguration message including an HO command to the UE 5d-01 at step 5d-30. The RRCConnectionReconfiguration message may include the RACH-less handover indicator (Indication 2) and information on the uplink transmission resources for use in transmitting an RRC message (RRCConnectionReconfigurationComplete) from the UE 5d-01 to the target eNB 5d-03. If the handover command is received, the UE 5d-01 stops data communication with the source eNB 5d-02 and starts a T304 timer at step 5d-35. The T304 timer value may be included in the RRCConnectionReconfiguration message transmitted by the source eNB 5d-02. The T304 timer may be a timer for use in determining whether the handover fails.

If the handover to the target eNB 5d-03 is not completed before the T304 timer expires, the UE 5d-01 restores the previous settings and transitions to the RRC idle state.

As to be described later, the target eNB 5d-03 may include a separate timer value (second timer) in the HO request Ack message in addition to the T304 timer value (first timer) for use in determination whether the handover is successful. The second timer may be used for the UE to receive the uplink resource information through PDCCH when the HO request Ack message transmitted by the target eNB includes no uplink resource information.

The source eNB 5d-02 may include the second timer value in the HO command message in order for the UE 5d-01 to start the second timer and, if no control information is received through PDCCH until the second timer expires, perform a random-access procedure. The detailed description thereof is made later.

The source eNB 5d-02 transmits Sequence Number (SN) status information of uplink/downlink data to the target eNB 5d-03 at step 5d-40 and, if there is downlink data to transmit, forwards the downlink data to the target eNB 5d-03 at step 5d-45.

If the RACH-less handover indicator is received at step 5d-30, the UE 5d-01 performs the RACH-less handover operation. That is, the UE 5d-01 transmits the RRCConnectionReconfigurationComplete message to the target eNB 5d-03 at step 5d-50 using the uplink resource indicated in the RRCConnectionReconfiguration message received at step 5d-30 instead of performing the random access procedure, i.e., steps 5c-40 and 5c-45 of FIG. 5C. If the RRCConnectionReconfiguration message received at step 5d-30 includes no RACH-less handover indicator, the UE 5d-01 performs the handover operations as described with reference to FIG. 5C.

If the handover is completed successfully, the UE 5d-01 stops the T304 timer at step 5d-55. The target eNB 5d-03 transmits a path switching request to the MME/S-GW at step 5d-60, receives a path switching request Ack from the MME/S-GW at step 5d-65, and transmits a UE context release message to the source eNB at step 5d-70.

Figure 5E:
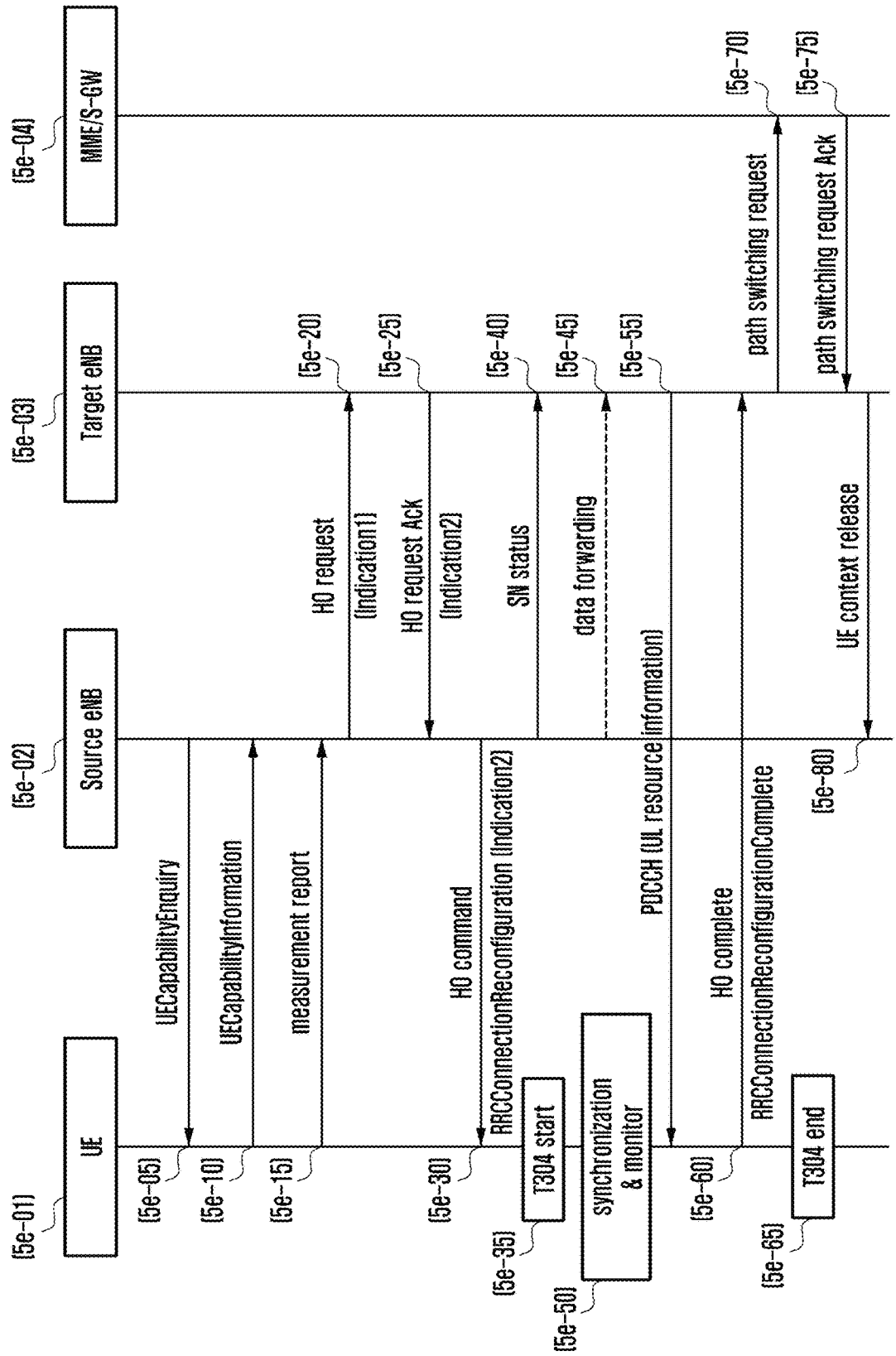
FIG. 5E illustrates another RACH-less handover method proposed in the present disclosure.

FIG. 5E illustrates another RACH-less handover method proposed in the present disclosure.

In FIG. 5E, the source eNB 5e-02 may transmit a UECapabilityEnquiry message to the UE 5e-01 to request for UE capability information at step 5e-05.

The UE 5e-01 may transmit a UECapabilityInformation message to the source eNB 5e-02 to report per-band or per-bandcombination RACH-less handover capability at step 5d-10. If the source eNB 5e-02 supports the per-band or per-bandcombination RACH-less handover, the RACH-less handover can be performed.

The UE 5e-01 in the connected mode transmits cell measurement information (Measurement Report) to the source eNB 5e-02 at step 5e-15, the measurement information being transmitted periodically or when a predetermined event occurs. The source eNB 5e-02 makes a handover decision based on the measurement information. If the handover decision is made, the source eNB 5e-02 transmits a handover request message to the target eNB 5e-03 at step 5e-20.

The source eNB 5e-02 may further determine whether to perform the RACH-less handover for the UE 5e-01. In this case, the source eNB 5e-02 requests to the target eNB 5e-03 for the RACH-less handover at step 5e-20. In order to request for the RACH-less handover, the source eNB 5e-02 may include an RACH-less handover indicator (Indication 1) in the handover request message.

If the target eNB 5e-03 accepts the handover request, it transmits an HO request Ack message to the source eNB 5e-02 at step 5e-25. The HO request Ack message include target eNB configuration information for use in the handover procedure. If the target eNB 5e-03 supports the RACH-less handover, the configuration information may an RACH-less handover (Indication 2). Here, the indicator (Indication 2) indicating that the target eNB 5*d*-03 supports the RACH-less handover may be referred to as RACH-less handover indicator.

As described above, the HO request Ack message may not include any uplink resource information.

The source eNB 5*e*-02 transmits the RRCConnectionReconfiguration message including an HO command to the UE 5*e*-01 at step 5*e*-30. The RRCConnectionReconfiguration message may include the RACH-less handover indicator (Indication 2). If the RRCConnectionReconfiguration message is received, the UE 5*e*-01 stops data communication with the source eNB 5*e*-02 and starts a T304 timer at step 5*e*-35. The T304 timer value may be included in the RRCConnectionReconfiguration message transmitted by the source eNB 5*e*-02.

The T304 timer is used for the UE 5*e*-01 to recover the previous settings and transition to the RRC idle state when the handover is not completed until the T304 timer expires.

The source eNB 5*e*-02 transmits Sequence Number (SN) status information of uplink/downlink data to the target eNB 5*e*-03 at step 5*e*-40 and, if there is downlink data to transmit, forwards the downlink data to the target eNB 5*e*-03 at step 5*e*-45.

If the RACH-less handover indicator is received at step 5*e*-30, the UE 5*e*-01 performs the RACH-less handover operation. That is, the UE 5*e*-01 may perform a synchronization process with the target eNB 5*e*-03 instead of the random access procedure, i.e., steps 5*c*-40 and 5*c*-45 and then monitors PDCCH for uplink resource allocation information at step 5*e*-55.

Here, the UE 5*e*-01 has already received the handover command from the source eNB 5*e*-02, it camps on the target cell 5*e*-03 to achieve synchronization and monitors PDCCH of the target eNB 5*e*-03.

The target eNB 5*e*-03 allocates uplink resources to the UE through PDCCH in order for the UE 5*e*-01 to complete the handover procedure at step 5*e*-55. If the UE 5*e*-01 is allocated the uplink resources, it transmits the RRCConnectionReconfigurationComplete message using the allocated resources at step 5*e*-60.

As described above, the target eNB 5*e*-03 may include the second timer value in the handover request Ack message in addition to the first timer value (T304) for use in determining whether the handover is completed successfully. If the control information is not received through PDCCH until the second timer expires, the UE 5*e*-01 may trigger the random access procedure. The detailed description thereof is made layer.

If the RRCConnectionReconfiguration message received at step 5*e*-30 includes no RACH-less handover indicator, the UE 5*e*-01 performs the handover operation as described with reference to FIG. 5C. If the handover procedure is completed successfully, the UE 5*e*-01 stops the T304 timer at step 5*e*-65. The target eNB may transmit a path switching request message to the MME/S-GW 5*e*-04 to switch the bearer established towards the source eNB 5*e*-02 to a bearer established towards the target eNB 5*e*-03 at step 5*e*-70, receive a path switching request ACK from the MME/S-GW 5*e*-04 at step 5*e*-75, and transmit a UE context release message to the source eNB 5*e*-02 at step 5*e*-80.

Meanwhile, if the UE 5*e*-01 cannot be not allocated uplink resources towards the target eNB 5*e*-03 for any reason in the RACH-less handover procedure, it has to wait until the T304 timer expires. The T304 timer may run for a long time because its smallest value is 100 ms and thus the elongated transmission suspension time may cause data transmission interruption phenomenon. The present disclosure proposes a method for configuring a UE-initiated timer (timer 1) or a network-initiated timer (timer 2) in order to reduce the data transmission suspension time. As described above, the T304 timer may be called first timer, and the UE-initiated or network-initiated timer (timer 2) for use in reducing data transmission suspension time may be called second timer.

Figure 5F:
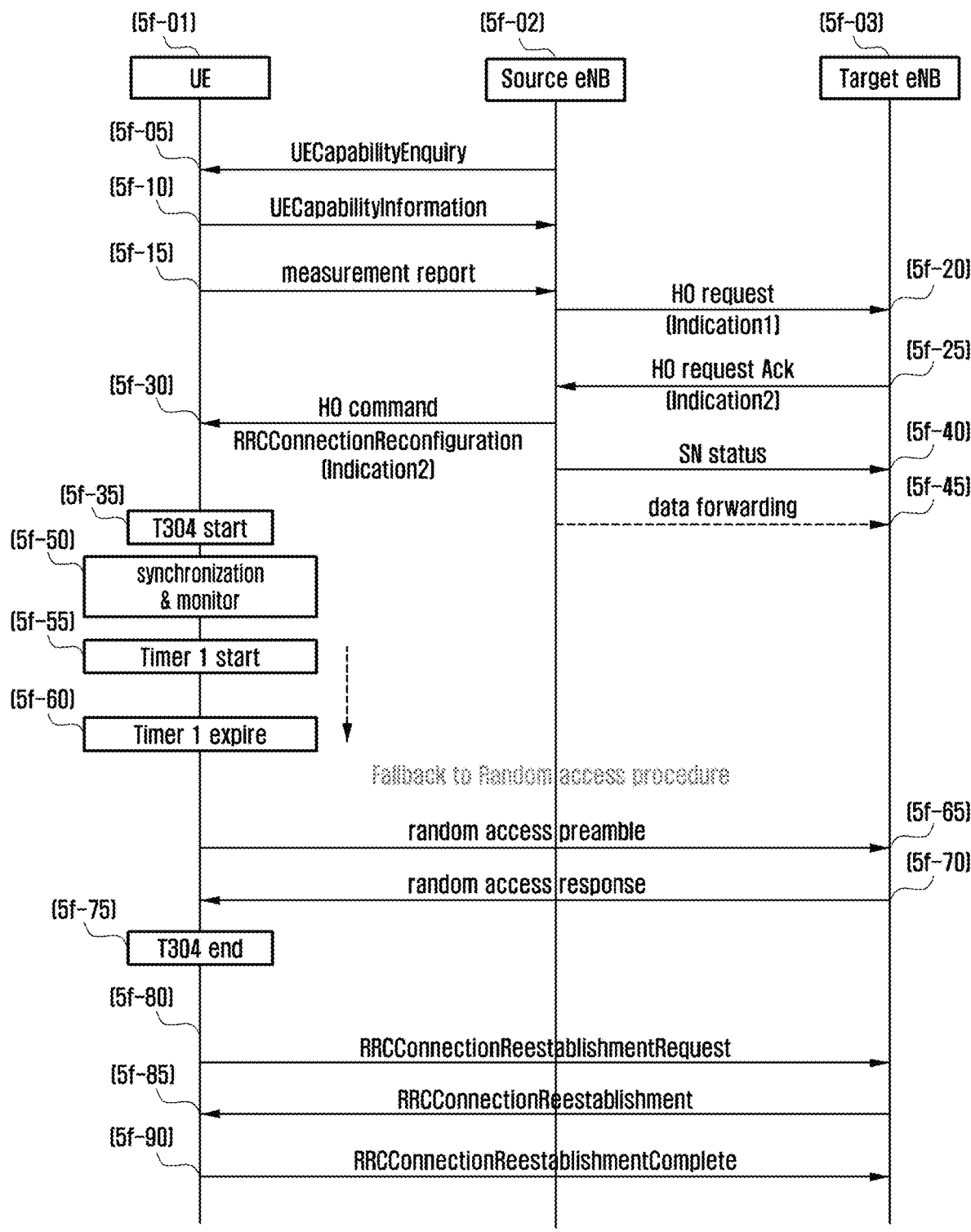
FIG. 5F illustrates an RACH-less handover procedure for reducing data transmission suspension time by configuring a UE-initiated timer (Timer 1) especially when a UE cannot be allocated uplink resources for transmission to a target eNB for any reason.

FIG. 5F illustrates an RACH-less handover procedure for reducing data transmission suspension time by configuring a UE-initiated timer (Timer 1) especially when a UE cannot be allocated uplink resources for transmission to a target eNB for any reason.

The handover procedure of FIG. 5F is similar to that of FIG. 5E. Steps 5*f*-05 to 5*f*-45 of FIG. 5F are identical with steps 5*e*-05 to 5*e*-45 of FIG. 5E and thus detailed descriptions thereof are omitted herein.

If an RRCConnectionReconfiguration message including the RACH-less handover indicator (Indication 2) is received at step 5*f*-30, the UE 5*f*-01 may achieve synchronization with the target eNB 5*f*-03 at step 5*f*-50.

If the synchronization has been achieved, the UE 5*f*-01 starts Timer 1 at step 5*f*-55. Timer 1 is running on the UE 5*f*-01 and may be set to a value less than the T304.

As to be described later, the UE 5*f*-01 may receive a second timer value less than the timer T304 from the target eNB 5*f*-03 and start a timer set to the second timer value. For example, the target eNB 5*f*-03 may transmit the timer value using the handover request Ack message.

Accordingly, the UE 5*f*-01 may receive the second timer value (e.g., 50 ms) from the target eNB 5*f*-03 in addition to the legacy T304 timer value and starts the second timer. The UE 5*f*-01 may use this timer value for its own timer or use the T304 timer.

Also, the T304 timer value may be included in the MobilityControlInfo of the RRCConnectionReconfiguration message, i.e., the handover command message, transmitted from the source eNB 5*f*-02 to the UE 5*f*-01. For example, the T304 timer may be set to 100 ms for normal handover or 50 ms for RACH-less handover.

If it fails to receive uplink resource allocation information from the target eNB 5*f*-03 for any reason before the timer 1 expires at step 5*f*-60, the UE 5*f*-01 triggers the random access procedure (fallback to the random access procedure) by transmitting a random access preamble at step 5*f*-65. If a random access response is received in response to the random access preamble at step 5*f*-70, the UE 5*f*-01 stops the T304 timer at step 5*f*-75. Then the UE 5*f*-01 performs an RRC connection reestablishment procedure with the target eNB 5*f*-03 at steps 5*f*-80, 5*f*-85, and 5*f*-90.

Figure 5G:
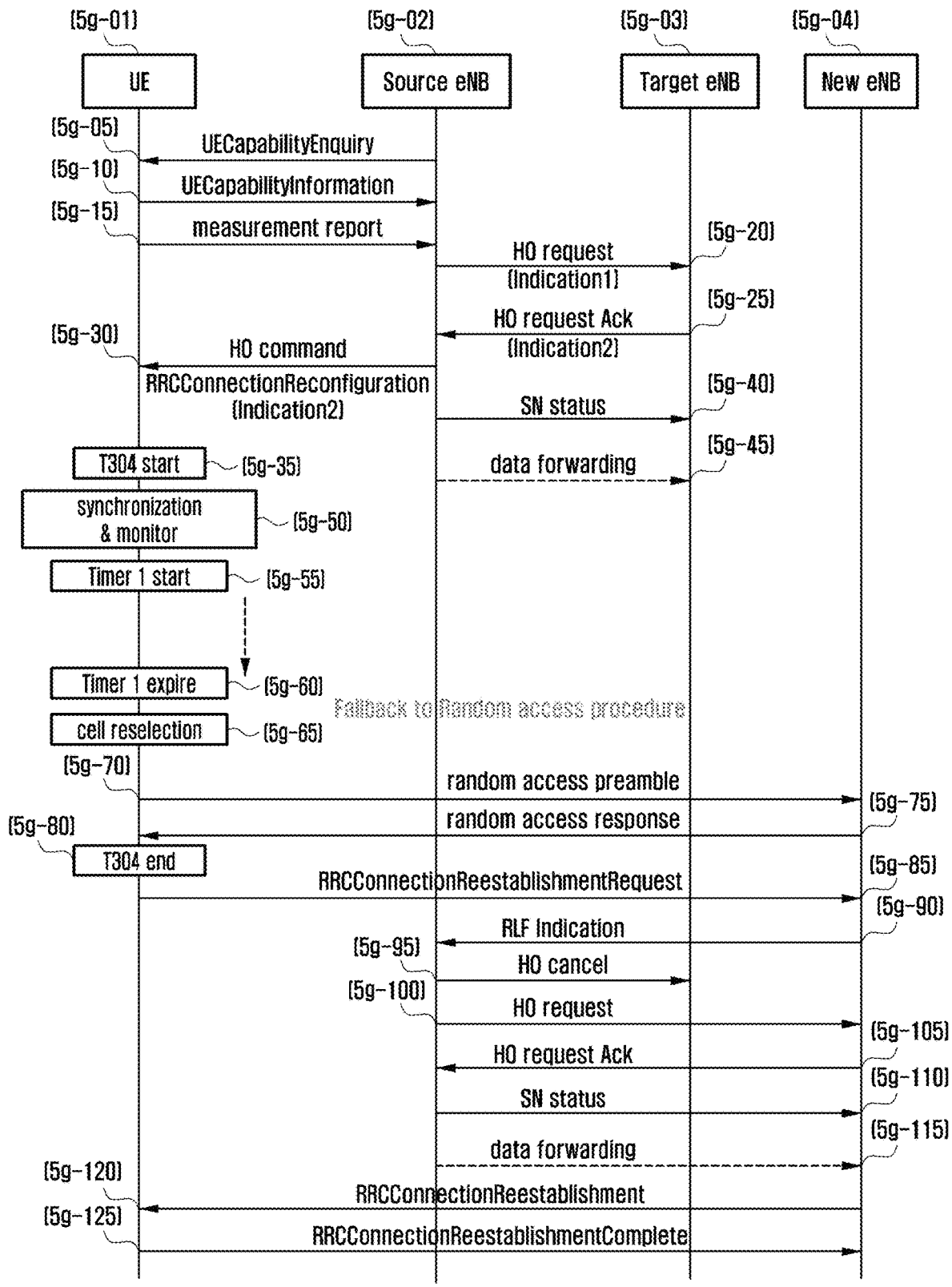
FIG. 5G is illustrates another RACH-less handover procedure for reducing data transmission suspension time by configuring a UE-initiated timer especially when a UE cannot be allocated uplink resources for transmission to a target eNB for any reason.

FIG. 5G illustrates another RACH-less handover procedure for reducing data transmission suspension time by configuring a UE-initiated timer especially when a UE cannot be allocated uplink resources for transmission to a target eNB for any reason.

The handover procedure of FIG. 5G is similar to that of FIG. 5E. Steps 5*f*-05 to 5*f*-45 of FIG. 5G are identical with steps 5*e*-05 to 5*e*-45 of FIG. 5E and thus detailed descriptions thereof are omitted herein.

If an RRCConnectionReconfiguration message including the RACH-less handover indicator (Indication 2) is received at step 5*g*-30, the UE 5*g*-01 may achieve synchronization with the target eNB 5*g*-03 at step 5*g*-50.

If the synchronization has been achieved, the UE 5*g*-01 starts Timer 1 at step 5*g*-55. Timer 1 is running on the UE 5*g*-01 and may be set to a value less than the T304.

As described above, the UE 5g-01 may receive a second timer value from the target eNB 5f-03 and start a timer set to the second timer value. The detailed description thereof has been made above and thus is omitted herein.

If it fails to receive uplink resource allocation information from the target eNB 5g-03 for any reason before timer 1 expires at step 5g-60, the UE 5g-01 triggers the random access procedure (fallback to the random access procedure). If no uplink resource is allocated by the target eNB 5g-03, the target eNB 5g-03 may not be the best eNB.

Accordingly, the UE 5g-01 performs a cell reselection procedure to search for the best eNB at step 5g-65. Then the UE 5g-01 performs the random access procedure with the newly found eNB 5g-04 at step 5g-70 and 5g-75.

If the random access response is successfully received from the new target eNB 5g-04, the UE 5g-01 stops the T304 timer at step 5g-80. If the random access procedure has been successfully completed, the UE 5g-01 performs the RRC connection reestablishment procedure with the new target eNB 5g-04. That is, if a random access response is successfully received at step 5g-75, the UE 5g-01 transmits a RRCConnectionReestablishmentRequest message to the new target eNB 5g-04 at step 5g-85.

If the RCCConnectionReestablishmentRequest message is received, the new target eNB 5g-04 transmits a Radio Link Failure (RLF) indicator to the source eNB 5g-02 at step 5g-90, and the source eNB 5g-02 transmits a handover cancel message to the old target eNB 5g-03 at step 5g-95.

Then, the source eNB 5g-02 transmits a handover request message to the new target eNB 5g-04 at step 5g-100, and the new target eNB 5g-04 transmits a handover request Ack message to the source eNB 5g-02 at step 5g-105.

Afterward, the source eNB 5g-02 transmits Sequence Number (SN) status information to the new target eNB 5g-04 at step 5g-110 and, if there is downlink data to transmit, forwards the data to the new target eNB 5g-04 at step 5g-115. If the SN status information and data are received at steps 5g-110 and 5g-115, the new target eNB 5g-04 transmits an RCCConnectionReestablishment message to the UE 5g-01 at step 5g-120, and the UE 5g-01 transmits an RRCConnectionReestablishmentComplete message at step 5g-125, thereby completing RRC connection reestablishment.

The procedures of FIGS. 5F and 5G are directed to the use of UE-initiated timer (Timer 1) to reduce data transmission suspension time. However, by taking notice that the uplink resource allocation for the UE to be handed over is made by the target eNB, it may be possible for the target eNB to determine more suitable timer value. Accordingly, the present disclosure proposes a network-initiated timer (Timer 2) configuration method in which the target eNB determines the timer value.

Figure 5H:
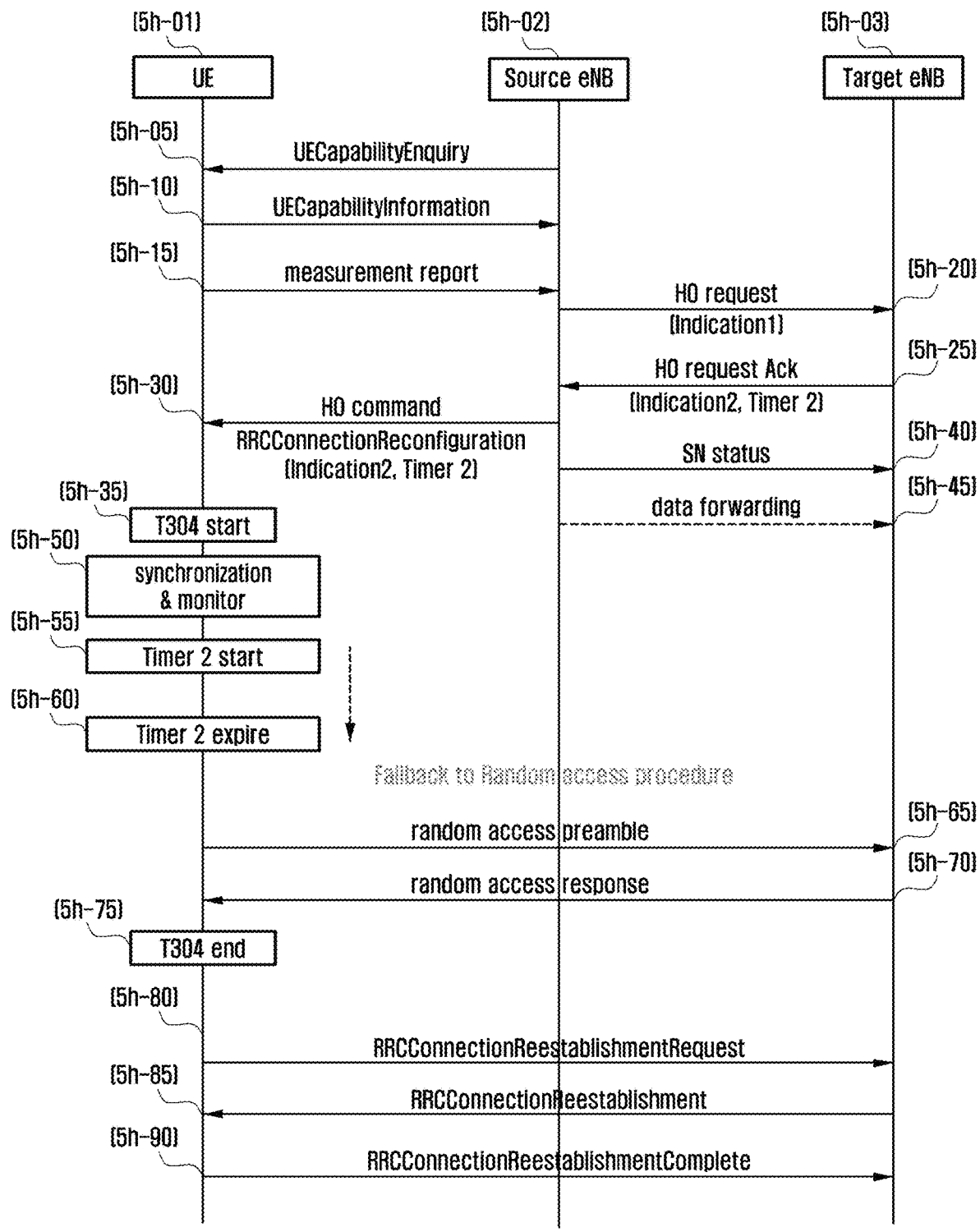
FIG. 5H illustrates an RACH-less handover procedure for reducing data transmission suspension time by configuring a network-initiated timer (Timer 2) especially when a UE cannot be allocated uplink resources for transmission to a target eNB for any reason.

FIG. 5H illustrates an RACH-less handover procedure for reducing data transmission suspension time by configuring a network-initiated timer (Timer 2) especially when a UE cannot be allocated uplink resources for transmission to a target eNB for any reason.

The handover procedure of FIG. 5H is similar to that of FIG. 5E.

In this handover procedure, the target eNB 5h-03 may transmit to the source eNB 5h02 an HO request Ack message including the second timer value (Timer 2) at step 5h-25. Here, the second timer value may be less than the timer value of T304, i.e., 100 ms, because the smallest value of T304 is 100 ms.

The UE 5h-01 may acquire the RACH-less handover indicator (Indication 2) and Timer 2 from the RRCConnec-tionReconfiguration message transmitted by the source eNB 5h-02 at step 5h-30. Afterward, the UE 5h-01 may achieve synchronization with the target eNB 5h-03 at step 5h-50. The handover-related steps of FIG. 5H are identical with those of FIG. 5E. That is, steps 5h-05 to 5h-45 of FIG. 5H are identical with steps 5e-05 to 5e-45 of FIG. 5E.

If the synchronization has been achieved, the UE 5h-01 starts Timer 2 at step 5h-55. Timer 2 is set to the value recommended by the target eNB 5h-03, and the Timer 2 value may be less than the T304 timer value.

If it fails to receive uplink resource allocation information from the target eNB 5h-03 for any reason before Timer 2 expires at step 5h-60, the UE triggers a random access procedure by transmitting a random access preamble at step 5h-65 (fallback to random access procedure). If a random access response is successfully received from the target eNB 5h-03 in response to the random access preamble, the UE 5h-01 stops the T304 timer at step 5h-75. Then, the UE 5h-01 performs an RRC connection reestablishment procedure with the target eNB 5h-03 at steps 5h-80, 5h-85, and 5h-90.

In this procedure, the source eNB 5h-02 may reuse the T304 timer rather than Timer 2. That is, the source eNB 5h-02 may set the T304 timer to the Timer 2 value received from the target eNB 5h-03 at step 5h-25.

Figure 5I:
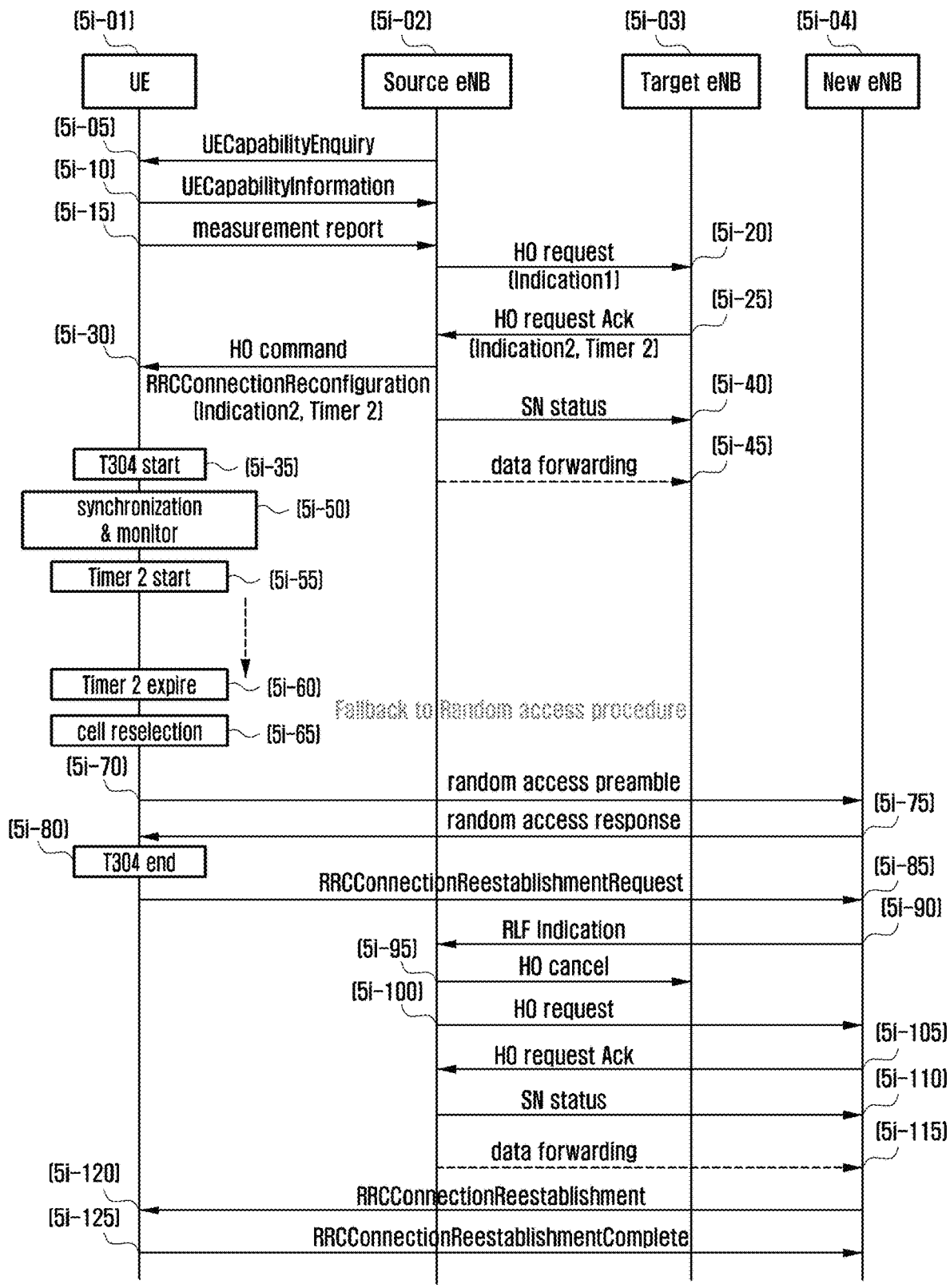
FIG. 5I illustrates another RACH-less handover procedure for reducing data transmission suspension time by configuring a network-initiated timer (Timer 2) especially when a UE cannot be allocated uplink resources for transmission to a target eNB for any reason.

FIG. 5I illustrates another RACH-less handover procedure for reducing data transmission suspension time by configuring a network-initiated timer (Timer 2) especially when a UE cannot be allocated uplink resources for transmission to a target eNB for any reason.

The handover procedure of FIG. 5I is similar to that of FIG. 5E.

In this handover procedure, the target eNB 5i-03 may transmit to the source eNB 5h02 an HO request Ack message including the second timer value (Timer 2) at step 5h-25. Here, the second timer value may be less than the T304 timer value, i.e., 100 ms, because the smallest value of T304 is 100 ms.

The UE 5i-01 may acquire the RACH-less handover indicator (Indication 2) and Timer 2 from the RRCConnec-tionReconfiguration message transmitted by the source eNB 5i-02 at step 5i-30. Afterward, the UE 5i-01 may achieve synchronization with the target eNB 5i-03 at step 5i-50. The handover-related steps of FIG. 5i are identical with those of FIG. 5E. That is, steps 5i-05 to 5i-45 of FIG. 5i are identical with steps 5e-05 to 5e-45 of FIG. 5E.

If the synchronization has been achieved, the UE 5i-01 starts Timer 2 at step 5i-55. Timer 2 is set to the value recommended by the target eNB 5h-03, and the Timer 2 value may be less than the T304 timer value.

If it fails to receive uplink resource allocation information from the target eNB 5i-03 for any reason before Timer 2 expires at step 5i-60, the UE 5i-01 triggers the random access procedure (fallback to the random access procedure). If no uplink resource is allocated by the target eNB 5i-03, the target eNB 5i-03 may not be the best eNB.

Accordingly, the UE 5i-01 performs a cell reselection procedure to search for the best eNB at step 5i-65. Then the UE 5i-01 performs the random access procedure with the newly found eNB 5i-04 at step 5i-70 and 5i-75. If the random access response is successfully received from the new target eNB 5i-04, the UE 5i-01 stops the T304 timer at step 5i-80. If the random access procedure has been successfully completed, the UE 5i-01 performs the RRC connection reestablishment procedure with the new target eNB 5i-04. That is, if a random access response is successfully received at step 5*i*-75, the UE 4*i*-01 transmits a RRCConnectionReestablishmentRequest message to the new target eNB 5*i*-04 at step 5*i*-85.

If the RCCConnectionReestablishmentRequest message is received, the new target eNB 5*i*-04 transmits a Radio Link Failure (RLF) indicator to the source eNB 5*i*-02 at step 5*i*-90, and the source eNB 5*i*-02 transmits a handover cancel message to the old target eNB 5*i*-03 at step 5*i*-95.

Then, the source eNB 5*i*-02 transmits a handover request message to the new target eNB 5*i*-04 at step 5*i*-100, and the new target eNB 5*i*-04 transmits a handover request Ack message to the source eNB 5*i*-02 at step 5*i*-105.

Afterward, the source eNB 5*i*-02 transmits Sequence Number (SN) status information to the new target eNB 5*i*-04 at step 5*i*-110 and, if there is downlink data to transmit, forwards the data to the new target eNB 5*i*-04 at step 5*i*-115. If the SN status information and data are received at steps 5*i*-110 and 5*i*-115, the new target eNB 5*i*-04 transmits an RCCConnectionReestablishment message to the UE 5*i*-01 at step 5*i*-120, and the UE 5*i*-01 transmits an RRCConnectionReestablishmentComplete message at step 5*i*-125, thereby completing RRC connection reestablishment.

In this procedure, the source eNB 5*i*-02 may reuse the T304 timer rather than Timer 2. That is, the source eNB 5*i*-02 may set the T304 timer to the Timer 2 value received from the target eNB 5*i*-03 at step 5*i*-25. In the proposed RACH-less handover procedure of the present disclosure, when it fails to receive uplink resource allocation information from the target eNB, the UE may store and report the failure information to the network for use later. Even when the UE fails to receive uplink resource allocation information from the target eNB and then attempts a random access procedure to connect a new target eNB, it may store and report the related information to the network for use later.

Figure 5J:
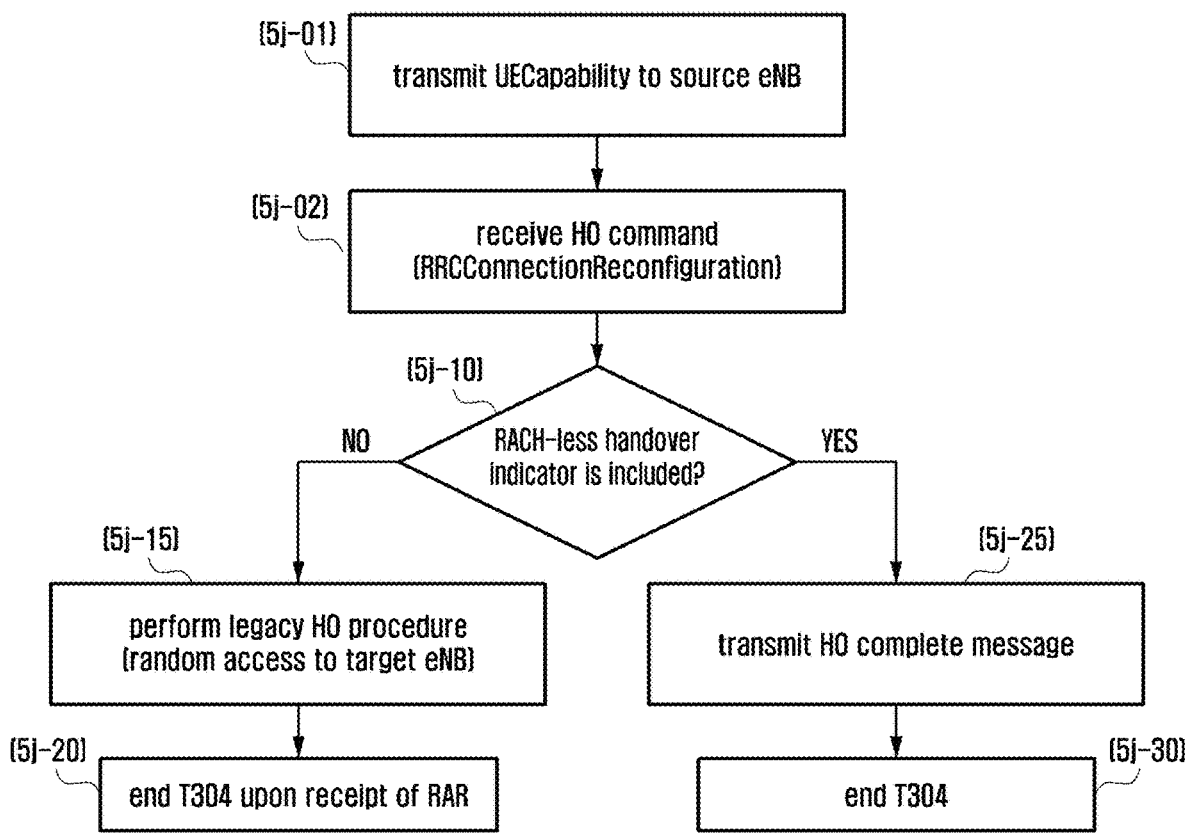
FIG. 5J illustrates a UE operation according to the present disclosure.

FIG. 5J illustrates a UE operation according to the present disclosure.

In FIG. 5J, the UE may receive a UECapabilityEnquiry message from the source eNB. In response to the UECapabilityEnquiry message, the UE may transmit UE capability information (UECapability) to the source eNB at step 5*j*-01.

The UE capability information may include per-band or per-bandcombination RACH-less handover capability.

The UE may transmit cell measurement information to the source eNB periodically or when a predetermined event occurs, and the source eNB may make a handover decision based on the measurement information.

If the handover decision has been made positively, the UE may receive a handover command message (RRCConnectionReconfiguration) from the source eNB at step 5*j*-02. Upon receipt of the handover command message at step 5*j*-02, the UE may start a T304 timer.

The UE determines at step 5*j*-10 whether the handover command message includes an RACH-less handover indicator. If it is determined that the RACH-less handover indicator is not included in the handover command message, the UE performs the legacy LTE handover procedure at step 5*j*-15. That is, the UE triggers a random access procedure to the target eNB. If a Random Access Response (RAR) is successfully received from the target eNB, the UE stops the T304 timer at step 5*j*-20.

If it is determined that the RACH-less handover indicator is included in the handover command message, the UE establishes a connection to the target eNB by transmitting a handover complete message (RRCConnectionReconfigurationComplete) using the uplink resources indicated in the message at step 5*j*-25. If the connection to the target eNB is successfully configured, the UE stops the T304 timer at step 5*j*-30.

Here, the uplink resource allocation information may be included in the handover command message. Accordingly, the UE may transmit the handover complete message to the target eNB using the resources indicated by the uplink resource allocation information in the handover command message.

If the handover command message includes no uplink resource allocation information, the UE may monitor PDCCH of the target eNB for control information to acquire the uplink transmission resource information. The UE may transmit the handover complete message to the target eNB based on the uplink transmission resource information.

The handover command message may include the second timer value but not the uplink transmission resource information and, in this case, the UE may start a timer set to the second timer value to perform the random access procedure upon expiry of the timer.

Figure 5K:
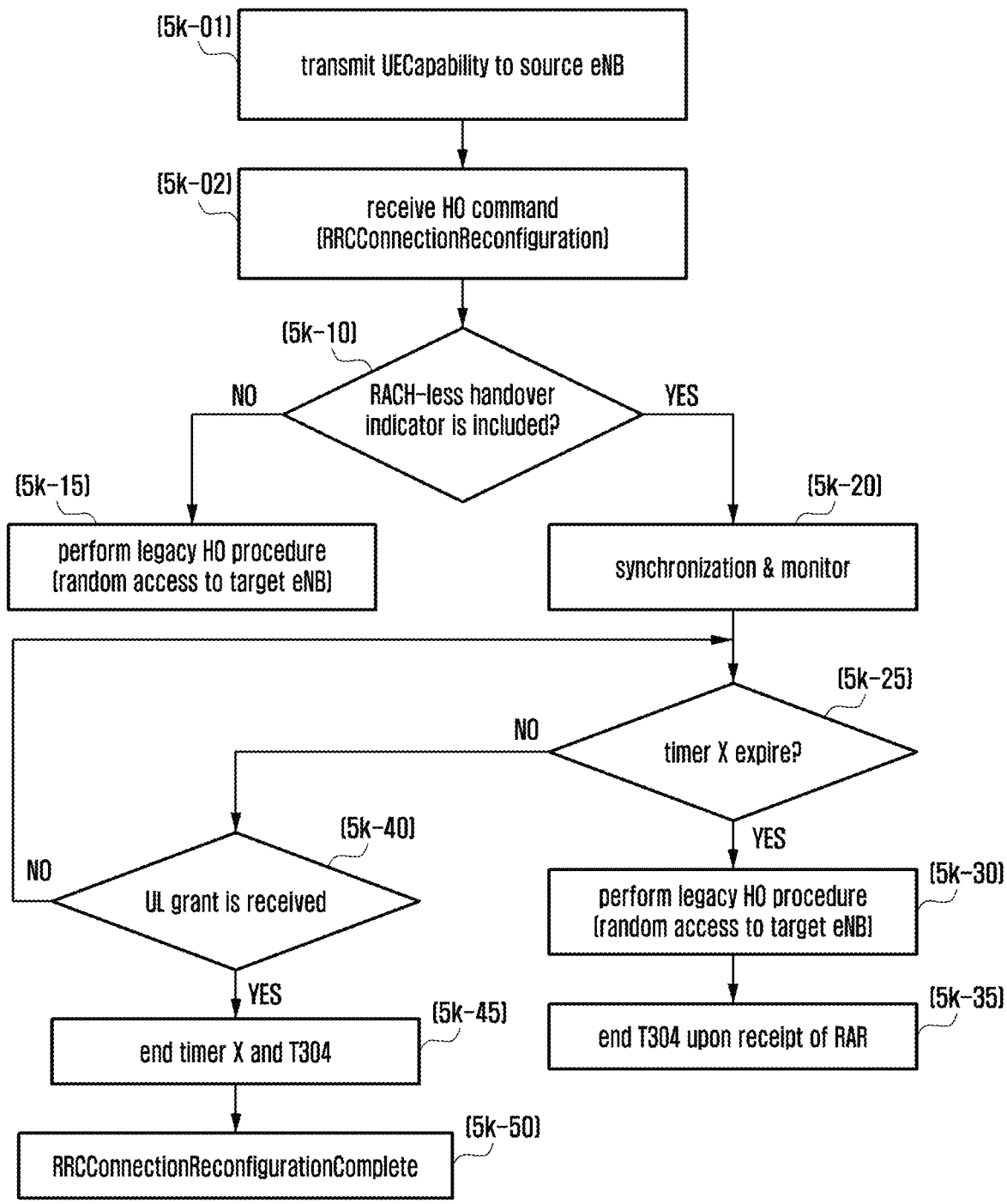
FIG. 5K illustrates another UE operation according to the present disclosure.

FIG. 5K illustrates another UE operation according to the present disclosure.

In FIG. 5K, the UE may receive a UECapabilityEnquiry message from the source eNB. In response to the UECapabilityEnquiry message, the UE may transmit UE capability information (UECapability) to the source eNB at step 5*k*-01.

The UE capability information may include per-band or per-bandcombination RACH-less handover capability.

The UE may transmit cell measurement information to the source eNB periodically or when a predetermined event occurs, and the source eNB may make a handover decision based on the measurement information.

If the handover decision has been made positively, the UE may receive a handover command message (RRCConnectionReconfiguration) from the source eNB at step 5*k*-02. Upon receipt of the handover command message at step 5*k*-02, the UE may start a T304 timer. The T304 timer value may be referred to as first timer value.

The UE determines at step 5*k*-10 whether the handover command message includes an RACH-less handover indicator. If it is determined that the RACH-less handover indicator is not included in the handover command message, the UE performs the legacy LTE handover procedure as described with reference to FIG. 5C at step 5*k*-15.

Otherwise, if it is determined that the RACH-less handover indicator is included in the handover command message, the UE may achieve synchronization with the target eNB and monitors PDCCH of the target eNB at step 5*k*-20. In this case, the UE starts Timer X set to the second timer value.

The second timer value may be configured by the UE as described with reference to FIG. 5F or by the target eNB as described with reference to FIG. 5H. If the second timer value is configured by the target eNB, it may be transmitted to the UE through the handover command message.

The UE may determine at step 5*k*-25 whether the Timer X has expired. If it is determined that the timer X has expired, the UE performs the legacy LTE handover procedure as described with reference to FIG. 5C at step 5*k*-30. That is, the UE triggers the random access procedure to the target eNB. If a RAR is successfully received from the target eNB, the UE stops the T304 timer at step 5*k*-35.

If it is determined at step 5*k*-25 that the timer X has not expired, the UE determines at step 5*k*-40 whether an uplink grant is received from the target eNB. If it is determined at step 5*k*-40 that the uplink grant is received, the UE stops the timer X and T304 timer at step 5*k*-45.

Then, the UE transmits an RRCConnectionReconfigurationComplete message to the target eNB using the uplink transmission resources indicated by the uplink grant to establishes a connection at step 5k-50. The T304 timer may expire after RRCConnectionReconfigurationComplete message has been transmitted.

Figure 5L:
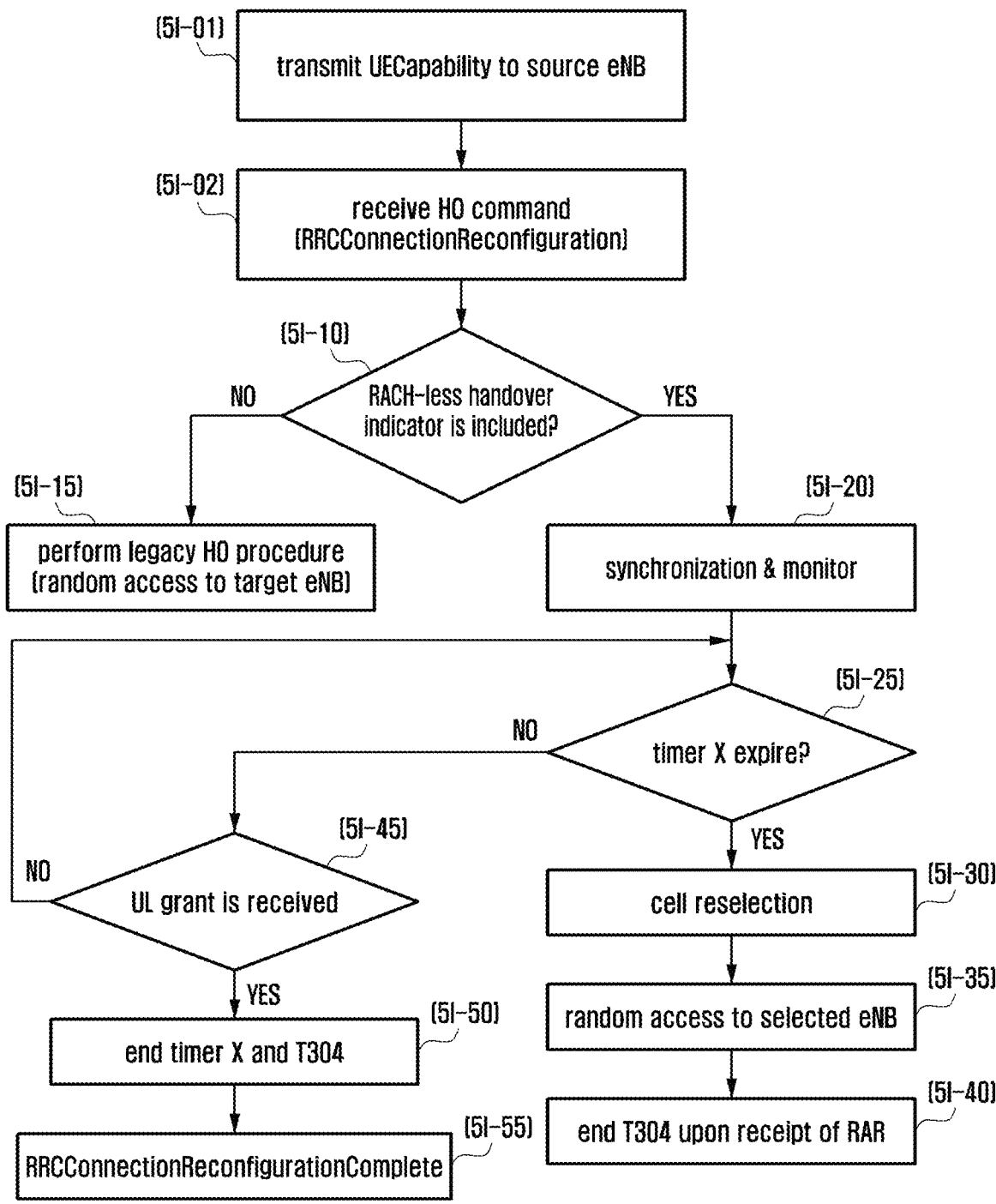
FIG. 5L illustrates another UE operation according to the present disclosure.

FIG. 5L illustrates another UE operation according to the present disclosure.

In FIG. 5L, the UE may receive a UECapabilityEnquiry message from the source eNB. In response to the UECapabilityEnquiry message, the UE may transmit UE capability information (UECapability) to the source eNB at step 5L-01.

The UE capability information may include per-band or per-bandcombination RACH-less handover capability.

The UE may transmit cell measurement information to the source eNB periodically or when a predetermined event occurs, and the source eNB may make a handover decision based on the measurement information.

If the handover decision has been made positively, the UE may receive a handover command message (RRCConnectionReconfiguration) from the source eNB at step 5l-02. Upon receipt of the handover command message at step 5l-02, the UE may start a T304 timer. The T304 timer value may be referred to as first timer value.

The UE determines at step 1l-10 whether the handover command message includes an RACH-less handover indicator. If it is determined that the RACH-less handover indicator is not included in the handover command message, the UE performs the legacy LTE handover procedure as described with reference to FIG. 5C at step 5l-15.

Otherwise, if it is determined that the RACH-less handover indicator is included in the handover command message, the UE may achieve synchronization with the target eNB and monitors PDCCH of the target eNB at step 5l-20. In this case, the UE starts Timer X set to the second timer value.

The second timer value may be configured by the UE as described with reference to FIG. 5F or by the target eNB as described with reference to FIG. 5H. If the second timer value is configured by the target eNB, it may be transmitted to the UE through the handover command message.

The UE may determine at step 5l-25 whether the Timer X has expired. If it is determined that the timer X has expired, the UE performs a cell reselection procedure at step 5l-30. At step 5l-35, the UE performs the random access procedure to the eNB with the best signal strength which has been selected through the cell reselection procedure. If a random access response (RAR) is successfully received from the target eNB, the UE stops the T304 timer at step 5l-40.

If it is determined at step 5l-25 that the timer X has not expired, the UE determines at step 5l-45 whether an uplink grant is received from the target eNB. If it is determined at step 5l-45 that the uplink grant is received, the UE stops the timer X and T304 timer at step 5l-50.

Then, the UE transmits an RRCConnectionReconfigurationComplete message to the target eNB using the uplink transmission resources indicated by the uplink grant to establishes a connection at step 5l-55. The T304 timer may expire after RRCConnectionReconfigurationComplete message has been transmitted.

Figure 5M:
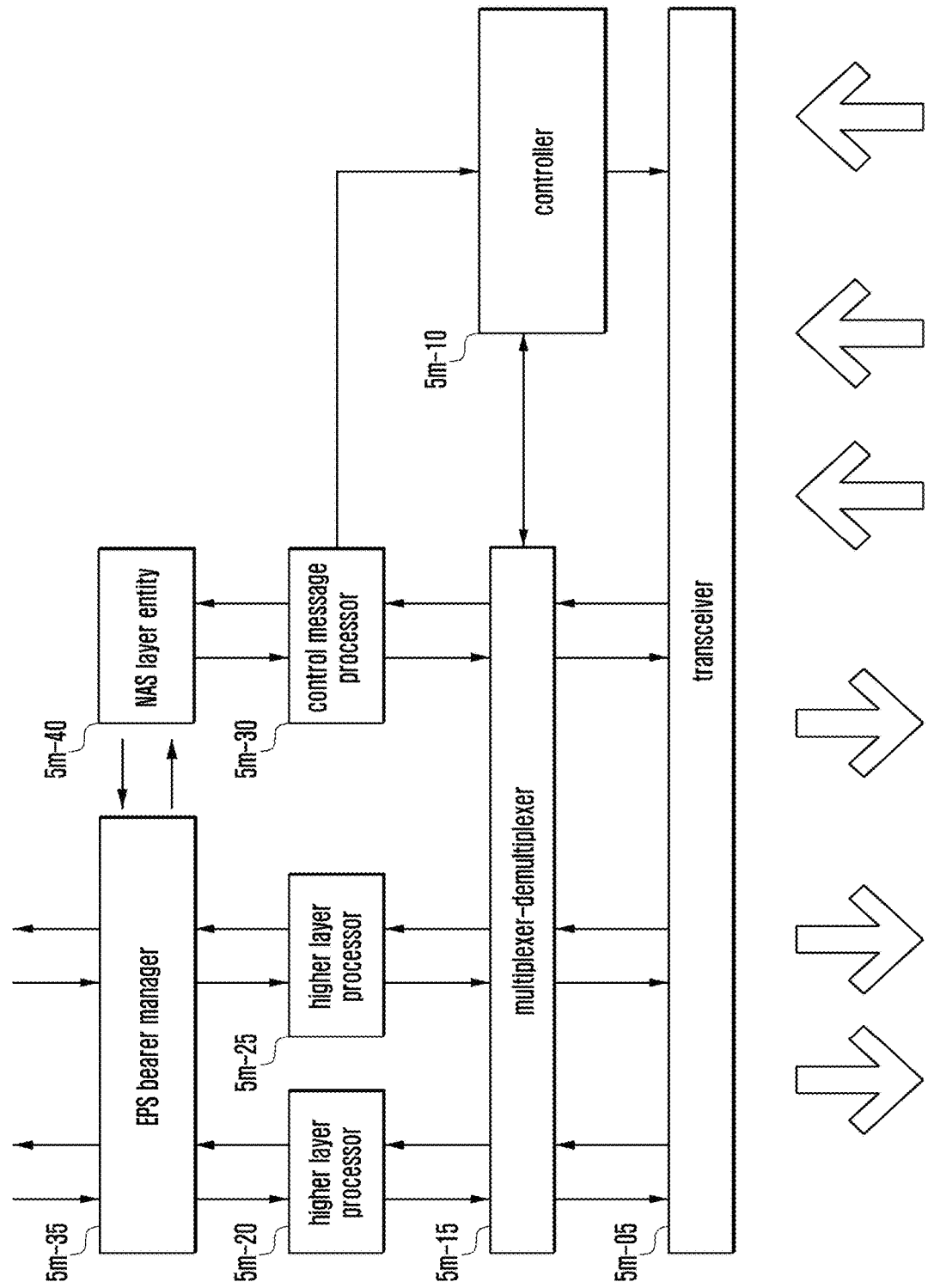
FIG. 5M illustrates a configuration of a UE according to an embodiment of the present disclosure.

FIG. 5M illustrates a configuration of a UE according to an embodiment of the present disclosure.

In reference to FIG. 5M, the UE includes transceiver 5m-05, a controller 5m-10, a multiplexer/demultiplexer 5m-15, a control message processor 5m-30, higher layer processors 5m-20 and 5m-25, an EPS bearer manager 5m-35, and a NAS layer entity 5m-40. In the present disclosure, the controller 5m-10 may be interchangeably referred to as a circuit, an application-specific integrated circuit, and at least one processor and the controller may be coupled with the transceiver.

The transceiver 5m-05 receives data and predetermined control signals through downlink channels of a serving cell and transmits data and predetermined control signals through uplink channels. In the case that multiple serving cells are configured, the transceiver 5m-05 may transmit and receive the data and control signals through the multiple serving cells.

The multiplexer/demultiplexer 5m-15 may multiplex the data generated by the higher layer processors 5m-20 and 5m-25 and the control message processor 5m-30 or demultiplex the data received by the transceiver 5m-05 and deliver the demultiplexed data to the corresponding higher layer processors 5m-20 and 5m-25 or the control message processor 5m-30.

The control message processor 5m-30 is an RRC layer entity for processing the control messages received from an eNB and take an operation according to the processing result. For example, if an RRC CONNECTION SETUP message is received, the control message processor 5m-3— configures a Signaling Radio Bearer (SRB) and a temporary Dedicated Radio Bearer (DRB).

The higher layer processor is a DRB entity which is established per service. The higher layer processors 5m-20 and 5m-25 process the user service data such as File Transfer Protocol (FTP) and Voice over Internet Protocol (VoIP) data and send the processing output to the multiplexer/demultiplexer 5m-15 or process the data from the multiplexer/demultiplexer 5m-15 and deliver the processing output to higher layer service applications. A service may be mapped to an EPS bearer and a higher layer entity one by one.

The controller 5m-10 checks for the scheduling command, e.g., uplink grants, received by the transceiver 5m-05 and controls the transceiver 5m-05 and the multiplexer/demultiplexer 5m-15 to perform uplink transmission with appropriate transmission resources at an appropriate timing.

In detail, the controller 5m-10 may control the signaling among the function blocks to accomplish the operations according to the procedures described with reference to the above flowcharts. In more detail, the controller 5m-10 may control the transceiver 5m-05 to receive a UE capability enquiry (UECapabilityEnquiry) message from the source eNB and transmit UE capability (UECapability) information to the source eNB.

The UE capability information may include a band-specific or a bandcombination-specific RACH-less handover indicator.

The controller 5m-10 may control the transceiver 5m-05 to receive a handover command message (RRCConnectionReconfiguration) from the source eNB. If the handover command message is received, the controller 5m-10 starts the T304 timer.

The controller 5m-10 also determines whether the handover command message includes an RACH-less handover indicator.

If the RACH-less handover indicator is included in the handover command message, the controller 5m-10 controls the transceiver 5m-05 to transmit a handover complete message (RRCConnectionReconfigurationComplete) using the uplink resources indicated in the handover command message. If the connection to the target eNB is successfully configured, the controller 5m-10 stops the T304 timer Here, the uplink resource allocation information may be included in the handover command message. Accordingly, the controller 5*m*-05 may control the transceiver 5*m*-05 to transmit the handover complete message to the target eNB using the resources indicated by the uplink resource allocation information in the handover command message.

If the handover command message includes no uplink resource allocation information, the controller 5*m*-10 may control the UE to monitor PDCCH of the target eNB for control information to acquire the uplink transmission resource information. The controller 5*m*-10 may control the transceiver 5*m*-05 to transmit the handover complete message to the target eNB based on the uplink transmission resource information.

The handover command message may include the second timer value but not the uplink transmission resource information and, in this case, the controller 5*m*-10 may start a timer set to the second timer value to perform the random access procedure upon expiry of the timer.

The controller 5*m*-10 may also control other operations of the UE as proposed in the present disclosure.

Figure 5N:
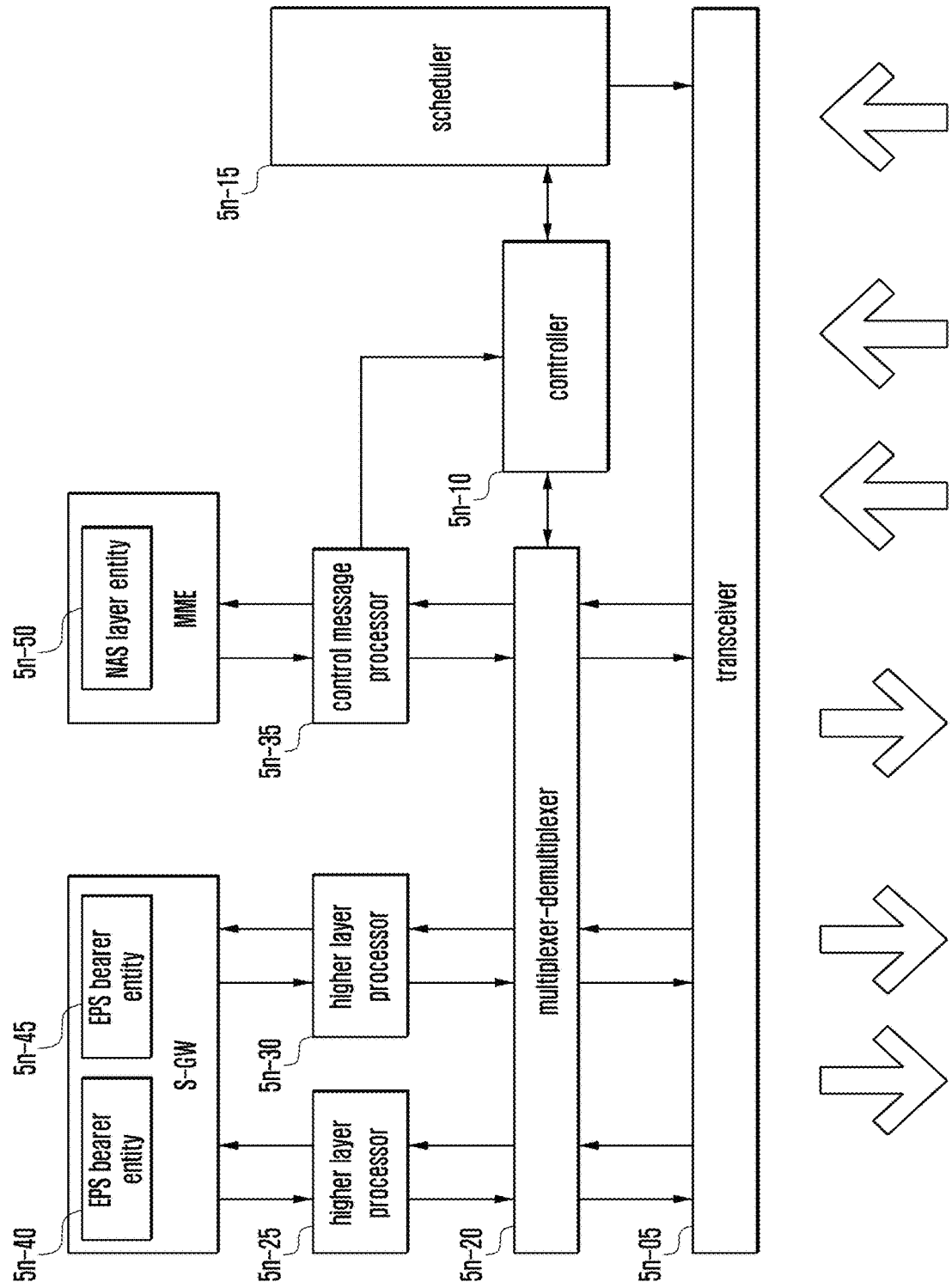
FIG. 5N illustrates a configuration of an eNB including an MME part and a S-GW part according to an embodiment of the present disclosure.

FIG. 5N illustrates a configuration of an eNB including a MME part and a S-GW part according to an embodiment of the present disclosure, and the eNB includes transceiver 5*n*-05, a controller 5*n*-10 a multiplexer/demultiplexer 5*n*-20, a control message processor 5*n*-35, higher layer processors 5*n*-25 and 5*n*-30, a scheduler 5*n*-15, EPS bearer entities 5*n*-40 and 5*n*-45, and a NAS entity 5*n*-50.

The transceiver 5*n*-05 transmits data and predetermined control signals through downlink channels of a serving cell and receives data and predetermined control signals through uplink channels. In the case that multiple serving cells are configured, the transceiver 5*n*-05 may transmit and receive the data and control signals through the multiple serving cells.

The multiplexer/demultiplexer 5*n*-20 may multiplex the data generated by the higher layer processors 5*n*-25 and 5*m*-30 and the control message processor 5*n*-35 or demultiplex the data received by the transceiver 5*n*-05 and deliver the demultiplexed data to the corresponding higher layer processors 5*n*-2*n* and 5*n*-30 or the control message processor 5*n*-35. The control message processor 5*n*-35 processes the control messages received from a UE to take an operation according to the processing result and generates a control message to be transmitted to the UE to the lower layers.

The higher layer processor may be established per EPS bearer; the higher layer processors 5*n*-25 and 5*n*-30 process the data from the corresponding EBS bearer entities 5*n*-40 and 5*n*-45 to generate RLC PDUs to the multiplexer/demultiplexer 5*n*-20 or processes the RLC PDUs from the multiplexer/demultiplexer 5*n*-20 into PDCP SDUs to the corresponding EPS bearer entities 5*n*-40 and 5*n*-45.

The scheduler allocates transmission resources to the UE for uplink transmission at appropriate timing based on UE's buffer status and channel condition and assists the transceiver 5*n*-05 to process the signals received from the UE and to be transmitted to the UE.

The EPS bearer entity is established per EPS bearer; the EPS bearer entities 5*n*-40 and 5*n*-45 process the data delivered by the corresponding higher layer processors 5*n*-25 and 5*n*-30 into a format to be transmitted to the next network node.

The higher layer processors 5*n*-25 and 5*n*-30 and the EPS bearer entities 5*n*-40 and 5*n*-45 are mutually connected through S1-UE bearers. A higher layer processor corresponding to a common DRB is connected to an EPS bearer entity established the common DRB through a common S1-U bearer.

The NAS layer entity 5*n*-50 processes IP packets contained in a NAS message and transfers the processing output to an S-GW.

The controller 5*n*-10 may controls signaling among the function blocks to accomplish the operations in the procedures described with above. In detail, as a controller of a first eNB (source eNB), the controller 5*n*-10 may control the transceiver 5*n*-05 to transmit a UE capability enquiry (UE-CapabilityEnquiry) message to a UE and receive UE capability information (UECapability) from the UE.

The UE capability information may include a band-specific or a bandcombination-specific RACH-less handover indicator.

The controller 5*n*-10 may control the transceiver 5*n*-05 to transmit a handover request message to a target eNB and receive a handover request Ack message from the target eNB. The handover request Ack message may include at least one of RACH-less handover capability indicator (or RACH-less handover configuration indicator or RACH-less handover indicator), uplink resource allocation information, and a timer value.

The controller 5*n*-10 may also control the transceiver 5*n*-05 to transmit a handover command message (RRCConnectionReconfiguration) to the UE. The handover command message may include the information contained in the handover request Ack message.

If the handover command message includes the RACH-less handover indicator, the UE may transmit a handover complete message to the target eNB using the uplink resource with no random access procedure.

The UE may use the uplink resource information included in the handover command message. if the handover command message includes no uplink resource information, the UE may monitor PDCCH of the target eNB for control information to acquire the uplink transmission resource information. The UE may transmit the handover complete message using the uplink resources indicated by the uplink transmission resource information.

As a controller of the second eNB (target eNB), the controller 5*n*-10 may control the transceiver 5*n*-05 to receive a handover request message from a source eNB and transmit a handover request Ack message to the source eNB. The handover request Ack message may include at least one of RACH-less handover capability indicator (or RACH-less handover configuration indicator or RACH-less handover indicator), uplink resource allocation information, and a timer value.

The controller 5*n*-10 may also control the transceiver 5*n*-05 to receive a handover complete message based on the uplink resource information.

The controller 5*n*-10 may control the transceiver 5*n*-05 to receive the handover complete message based the uplink resource information included in the handover command message.

If the handover command message includes not uplink resource information. the controller 5*n*-10 may control the transceiver 5*n*-05 to transmit the control information including uplink resource information through PDCCH.

The control unit 5*n*-10 may include the timer value in the handover request Ack message; and, if the UE fails to receive the control information through PDCCH before expiry of the timer set to the time value, it triggers the random access procedure. Here, the timer value may be less than the timer value (T304) configured for determining handover failure.

Sixth Embodiment

The present disclosure proposes a method and apparatus for a normal terminal or a terminal operating in an extended coverage mode (hereinafter, interchangeably referred to as NB-IoT UE, Bandwidth reduced Low complexity (BL) UE, UE in Coverage Enhancement (CE), and enhanced Machine Type Communication (eMTC) UE) to transition to a large paging area preference mode autonomously and update paging area to reduce battery power consumption.

Figure 6A:
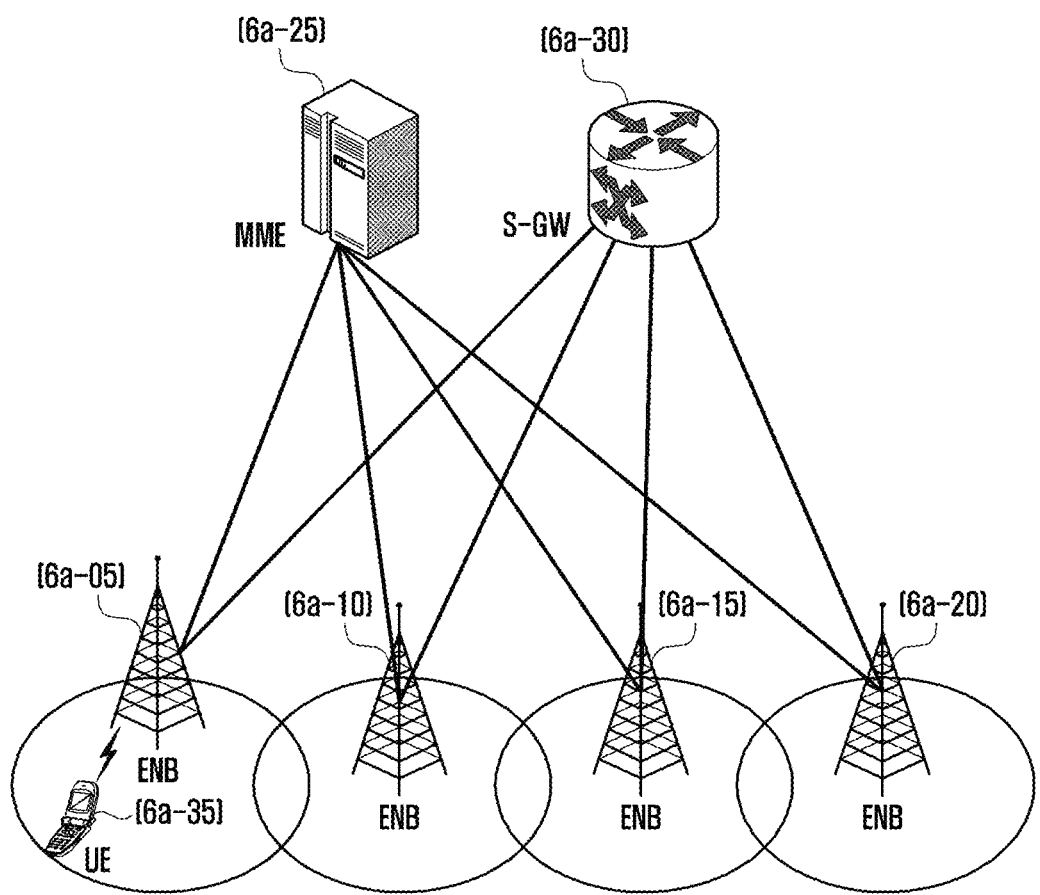
FIG. 6A illustrates an LTE system architecture.

FIG. 6A illustrates architecture of an LTE system.

The detailed description of the LTE system architecture has been made already with reference to FIG. 1A and thus is omitted herein.

Figure 6B:
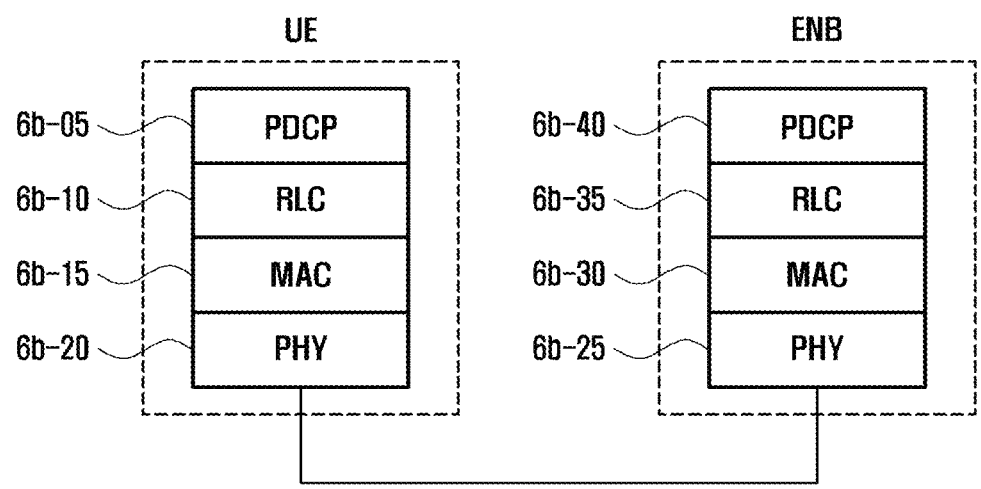
FIG. 6B illustrates a protocol stack of an interface between a UE and an eNB in the LTE system.

FIG. 6B illustrates a protocol stack of an interface between a UE and an eNB in the LTE system.

The detailed description of the protocol stack has been made already with reference to FIGS. 2B and 3B and thus is omitted herein.

Figure 6C:
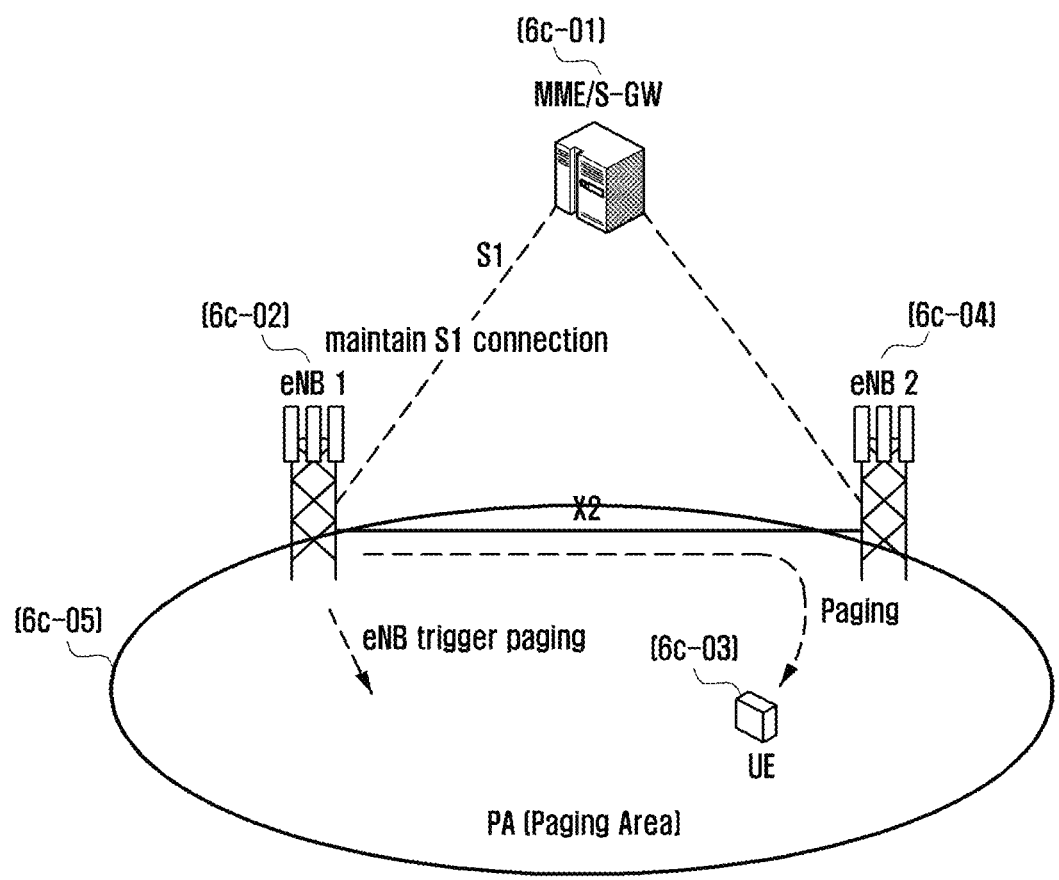
FIG. 6C illustrates the concept of light connection.

FIG. 6C illustrates the concept of light connection.

The light connection technique is introduced along with definition of a new UE operation mode in addition to the legacy idle and connected modes to reduce signaling overhead caused by legacy handover and paging operations. The newly defined mode may be referred to as light connected mode, inactive mode, or the like (hereinafter, referred to light connected mode).

The UE 6c-03 in the light connected mode is characterized by the S1 connections kept between the MME 6c-01 and the eNBs 6c-02 and 6c-04 and in that one of the MME 6c-01 and the eNBs 6c-02 and 6c-04 may trigger paging.

The MME 6c-01 assumes that the UE in the light connected mode is operating in the connected mode; thus, if there is any data to transmit to the UE, the MME 6c-01 transmits the data to the eNB without triggering a paging procedure. If the data is received, the eNB transmits a paging message to all eNBs within the Paging Area (PA) 6c-05 such that the eNBs broadcast the paging message.

The present disclosure proposes UE and network operations capable of reducing battery consumption and signaling overhead of the UE in consideration of the above-described characteristics of a light connection.

Figure 6D:
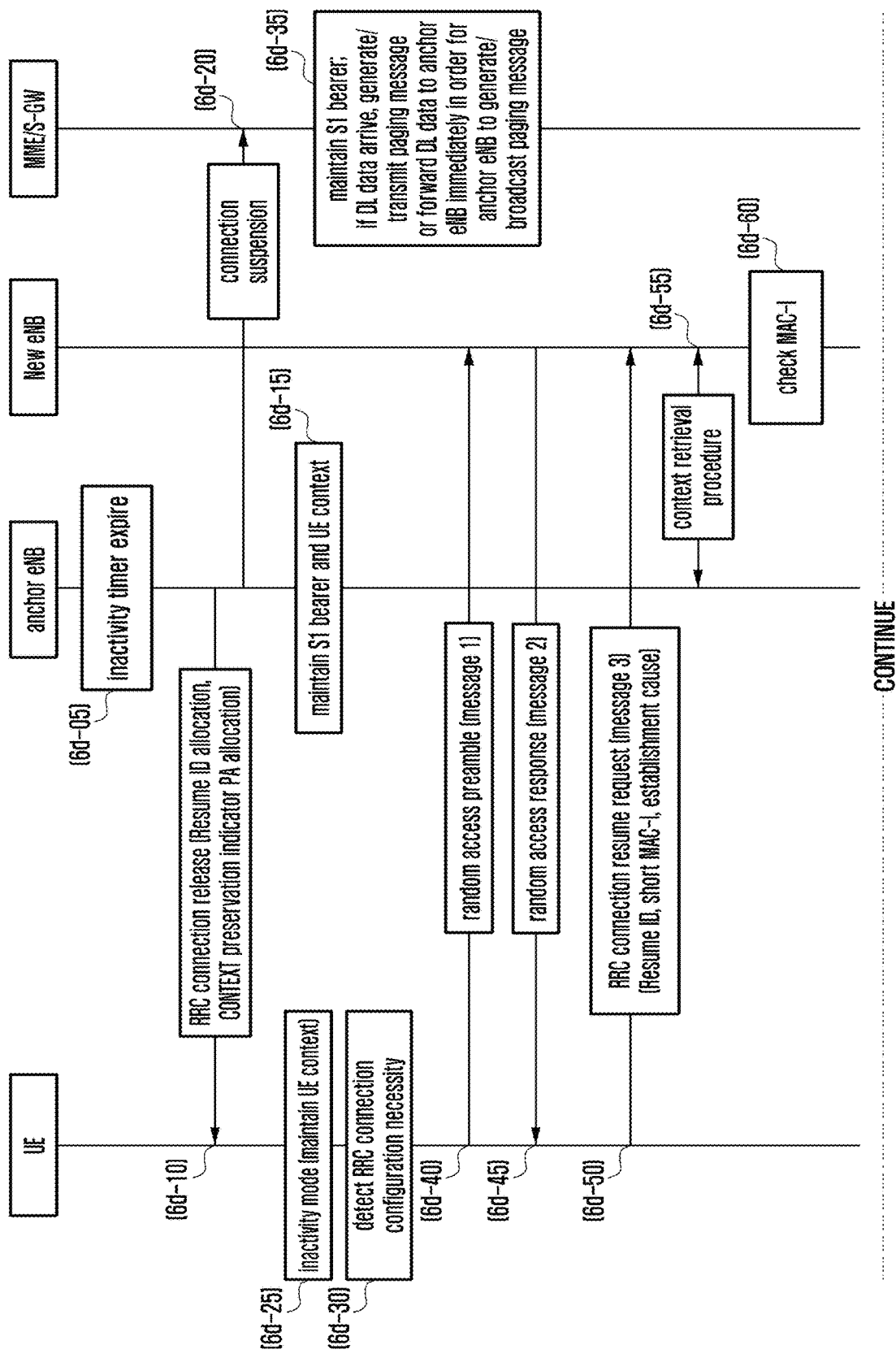
FIGS. 6DA and 6DB illustrate signal flows among a UE, an anchor eNB, a new eNB, and an MME for UE context and S1 bearer reuse in light connection procedure according to the present disclosure.

FIGS. 6DA and 6DB illustrate signal flows among a UE, an anchor eNB, a new eNB, and an MME for UE context and S1 bearer reuse in light connection procedure according to the present disclosure.

In FIGS. 6DA and 6DB, it is assumed that the UE in the RRC connected mode has been communicating data with the anchor eNB. If the data communication is stopped, the anchor eNB starts a predetermined timer and, if data communication is not resumed before expiry of the timer at step 6d-05, determines to release the RRC connection of the UE.

The eNB stores UE context and transmits to the UE a control message instructing release of the RRC connection (RRC connection release message) at step 6d-10.

The control message may include a Resume ID and paging area information. That is, the eNB allocates a Resume ID to the UE and configure a PA in which the UE in the light connected mode to report mobility.

The PA may be comprised of one or more cells. The eNB may transmit to the UE a list of IDs of the cells constituting the PA of the eNB, and the UE may determine whether the PA is updated by comparing the cell ID broadcast by the eNB with the cell IDs contained in cell ID list.

It may also be possible for the eNB to transmit a PA identifier to configure a PA for the UE. The network or the eNB may configure a PA with at least one cell and allocates a PA identifier per PA. Accordingly, if a PA identifier is received, the UE may check the PA identifier for the list of the cells and make a paging area update determination based on the cell ID being received, on the move, from the eNBs and the PA ID. Detailed description thereof is made later.

The cell list or the PA identifier may be transmitted to the UE through RRC signaling or broadcast in an SIB.

The UE may be aware of the necessity of preserving the UE context based on the Resume ID allocation. It may also be possible for the eNB to transmit a control message including a context preservation indicator to instruct the UE to preserve the UE context. This control message may include context preservation period or a cell list for use in an RRC connection reconfiguration procedure of the UE during a valid period.

Even after releasing the RRC connection for the UE, the anchor eNB maintains the UE context and S1 bearer at step 6d-15.

The S1 bearer includes the S1-control plane bearer for use in exchanging controls signal between the eNB and the MME and the S1-user plane bearer for use in exchanging user data between the eNB and the S-GW. By maintain the S1 bearer, it may be possible to skip the S1 bearer configuration procedure while the UE tries to establish an RRC connection in the same cell or eNB. If the valid period expires, the eNB may delete the UE context and release the S1 bearer.

If the RRC connection release message is received, the UE transitions to the light connected mode at step 6d-25.

The eNB transmits to the MME a control message requesting for suspending the connection temporarily at step 6d-20. If this temporarily connection suspension request message is received, the MME instructs the S-GW to hold transmitting downlink data for the UE and triggers a paging procedure, and the S-GW operates based on the instruction at step 6d-35. Or, the S-GW may forward the downlink data to the anchor eNB, and the anchor eNB may generate and transmit a paging message to the neighboring eNBs. If downlink data is received, the anchor eNB buffers the data in a buffer and triggers the paging procedure. The anchor eNB is the eNB which maintains the UE context and maintains the S1-U bearer.

If the RRC connection release message including the context preservation indicator and Resume ID is received at step 6d-10, the UE releases the RRC connection and starts a timer corresponding to the valid period. The UE writes the valid cell list in the memory and maintain the UE context in the memory t step 6-25.

The UE context may the RRC connection-related information of the UE such as Signaling Radio Bearer (SRB) configuration information, Data Radio Bearer (DRB) configuration information, and security key information.

Afterward, it becomes necessary to establish an RRC connection for any reason at step 6d-30. A UE for which neither a Resume ID is allocated nor a context preservation is not indicated in the previous RRC connection release procedure may initiate the legacy RRC connection setup procedure.

However, a UE for which a Resume ID is allocated in the previous RRC connection release procedure may attempts an RRC connection resume procedure using the maintained UE context.

In detail, the UE may transmit message 1 including a preamble to trigger a random access procedure at step 6d-40.

If it is determined that resource allocation is available based on the preamble included in message 1, the eNB transmits message 2 to allocate uplink resources to the UE at step 4c-45. The message 2 may be a Random Access Response (RAR) message.

Upon receipt of the RAR message, the UE transmits a Resume request message including a Resume ID selected based on the uplink resource information to a new eNB at step 6d-50. The Resume request message may be a modified RRCConnectionRequest message or a newly defined message (e.g., RRCConnectionResumeRequest).

If the UE which has transitioned from the connected mode to the light connected mode camps on a cell of a new eNB, the new eNB may receive the Resume ID of the UE and identifies the previous serving eNB of the UE based on the Resume ID.

If the new eNB receives the Resume ID successfully, it performs a procedure for retrieving the UE context from the source eNB (Context Retrieve Procedure) at step 6d-55. The new eNB may retrieve the UE context form the source eNB through an S1 or X2 interface. If the new eNB receives the Resume ID successfully but fails to identify the UE, it has to transmit a RRCConnectionSetup message to the UE to perform the legacy RRC connection establishment procedure.

The new eNB checks for the MAC-I based on the UE context retrieved from the source eNB at step 6d-60. The MAC-I is a message authentication code computed by the UE using the control message by applying the security information (i.e., security key and security counter) of the retrieved UE context.

The eNB checks for the integrity of the message using the MAC-I of the message and the security key and security counter included in the UE context. The new eNB generates RRC configuration information to be applied to the UE and transmits the RRC connection resume (RRCConnectionResume) message including the configuration information to the UE at step 6d-65.

The RRC connection resume message may be a modified RRC connection request message including the information indicating "RRC context reuse" (REUSE INDICATOR). The RRC connection resume message may include the RRC connection configuration information for the UE like the RRC connection setup message.

Unlike the UE which has received a normal RRC connection setup (RRCConnectionSetup) message configures the RRC Connection based on the configuration information included in the RRC connection setup message, a UE which has received the RRC connection resume message configures an RRC connection in consideration of both the maintained configuration information and the configuration information included in the RRC connection resume message (delta configuration).

For example, if the RRC connection resume message is received, the UE stores the configuration information contained in the RRC connection resume message and checks the configuration information for delta information to update the configuration information or UE context. For example, if the RRC connection resume message include SRB configuration information, the UE configures an SRB based on the SRB configuration information; if the RRC connection resume message include no SRB configuration information, the UE configures an SRB based on the SRB configuration information included in the UE context.

The UE configures an RRC connection based on the updated UE context and the configuration information and transmits an RRC connection resume complete message to the new eNB at step 6d-70.

The new eNB transmits to the MME a control message requesting for releasing the temporary connection suspension and reconfiguring the S1 bearer to the new eNB at step 6d-75. If this control message is received, the MME instructs the S-GW to reconfigure the S1 bearer with the new eNB and handle the data for the UE normally.

If the RRC connection reconfiguration procedure has been completed, the UE resumes data communication through the corresponding cell at step 6d-80. In the above procedure, if the UE in the light connected mode moves but not much and thus comps on the cell of the source eNB again, the source eNB may retrieve the UE context based on the Resume ID included in message 3 and configured the connection based on the UE context in a procedure like those described above.

If the data communication is stopped, the eNB starts a predetermined timer and, if data transmission is not resumed before expiry of the timer at step 6d-85, determines to release the RRC connection of the UE.

In this case, the eNB may store UE context and transmit to the UE a control message instructing release of the RRC connection (RRC connection release message) at step 6d-90. The eNB allocates a Resume ID to the UE and configure a PA in which the UE in the light connected mode to report mobility. That is, the eNB may include the Resume ID and PA information in the RRC connection release message. The PA configuration method is similar to that described above and thus detailed description thereof is omitted herein. If the RRC connection release message is received, the UE transitions to the light connected mode at step 6d-95.

As described above, the UE may transition to the light connected mode (or inactive mode) upon receipt of the RRC connection release message and, if it moves out of the paging area in the light connected mode, updates the PA.

Figure 6E:
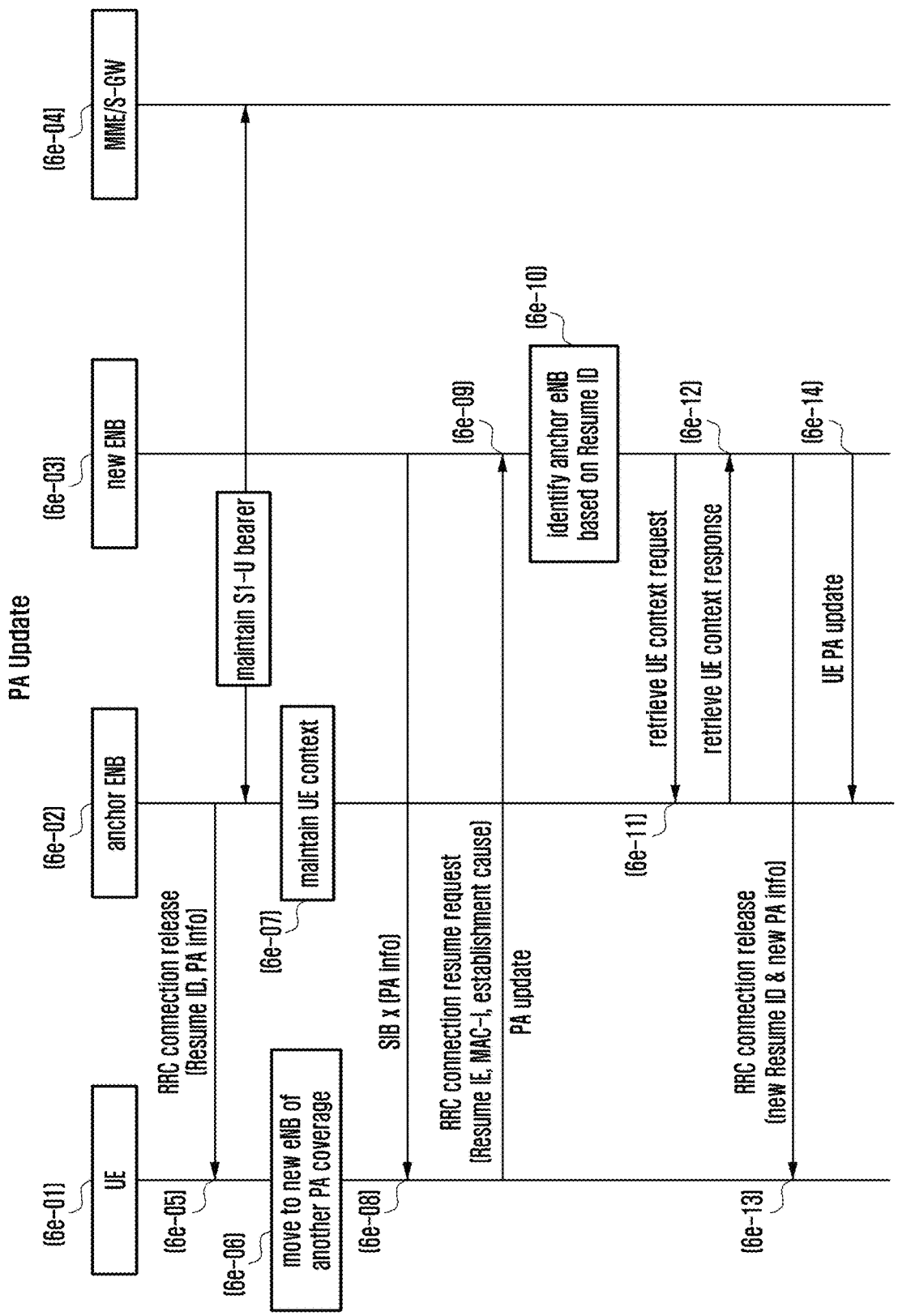
FIG. 6E illustrates a PA update procedure for a UE in a network supporting a light connection technique according to the present disclosure.

FIG. 6E illustrates a PA update procedure for a UE in a network supporting a light connection technique according to the present disclosure. FIG. 6E depicts the PA update procedure in the present disclosure. The UE e-01 connected to the anchor eNB 6e-02 receives an RRC connection release (RRCConnectionRelease) message from the anchor eNB 6e-02 at step 6e-05.

The RRC connection release message may include a Resume ID and PA information. The UE 6e-01 is allocated the Resume ID and configures the PA based on the RRC connection release message.

The PA may be comprised of one or more cells. The anchor eNB 6e-02 may transmit to the UE 6e-01 a list of IDs of the cells constituting the PA of the eNB or a PA identifier predetermined in the network to configure the PA for the UE 6e-01.

The UE 6e-01 may check the list of the cell IDs or the cell list included in the paging area ID and determine on the move whether the PA has been updated by comparing the cell ID broadcast by the eNB and the cell IDs included in the list.

If there is no data transmission/reception for the UE 6e-01 over a predetermined time period, the anchor eNB 6e-02 configures the UE to operate in the light connected mode. That is, the anchor eNB 6e-02 may transmit an RRC connection release message including a Resume ID and PA information to the UE 6e-01 such that the UE 6e-01 enters the light connected mode.

If the RRC connection release message is received, the UE 6e-01 transitions to the light connected mode. The anchor eNB 6e-01 maintains the UE context at step 6e-07. The anchor eNB 6e-01 may also maintain the S1 bearer with the core network.

Meanwhile, the UE 6e-01 may move close to another eNB within another PA at step 6e-06. In this embodiment, the anchor eNB may be interchangeably referred to as first eNB, and the other eNB may be interchangeably referred to as second eNB.

The eNBs broadcast the cell-specific identifiers or PA identifiers of their own PAs using a predetermined system information block (SIB) at step 6e-08. As described above, the PA information may be provided in such a way the eNB broadcasts cell IDs of the cells constituting the PA or a PA ID predetermined for use in the network.

If the system information is received, the UE 6e-01 may determine whether the eNB on which is has camped belongs to the same PA as the eNB which has transmitted the RRC connection release message (RRCConnectionRelease). If the eNBs mismatch, the UE 6e-01 transmits an RRC connection resume message (RRCConnectionResumeRequest) to the new eNB 6e-03 on which it has camped to update the PA at step 6e-09.

The RRC connection resume request message may include an establishment cause which is newly defined for use in requesting for PA update. It may also be possible to one of reserved bits of the legacy RRC connection request message to indicate PA update request. The RRC connection resume request message may include at least one of Resume ID, MAC-I, and establishment cause.

If the RCCConnectionResumeRequest message is received, the second eNB 6e-03 may identify the anchor eNB 6e-02 which has previously served the UE 6e-01 based on the Resume ID at step 6e-10.

The second eNB 6e-03 may transmit a retrieve UE context request message to the anchor eNB 6e-02 to request for UE context at step 6e-11. The second eNB 6e-03 may receive a retrieve UE context response message from the anchor eNB at step 6e-12 and acquires the UE context information from the retrieve UE context response message.

The second eNB 6e-03 may perform security check using the retrieved UE context information. If not necessary, the UE context retrieve procedure of steps 6e-11 and 6e-12 may be omitted.

The second eNB 6e-03 transmits an RRCConnectionRelease message to the UE 6e-01 at step 6e-13. The RRCConnectionRelease message may include a new Resume ID and PA information. As described above, the PA may be comprised of one or more cells. As described above, the anchor eNB 6e-02 may transmit to the UE 6e-01 a list of IDs of the cells constituting the PA of the eNB or a PA identifier predetermined for use in the network to configure the PA for the UE 6e-01.

The UE 6e-01 may acquire the PA information and determine on the move whether the PA has been updated by comparing the cell ID broadcast by the eNB and the PA information.

After transmitting the RRCConnectionRelease message, the second eNB 6e-03 transmits a UE PA update message to the anchor eNB 6e-02 to update the PA for the UE 6e-01 at step 6e-14. This aims to make it possible for the anchor eNB 6e-02 to generate a paging message appropriately to page the UE 6e-01 when downlink data for the UE 6e-01 arrives afterward.

Figure 6F:
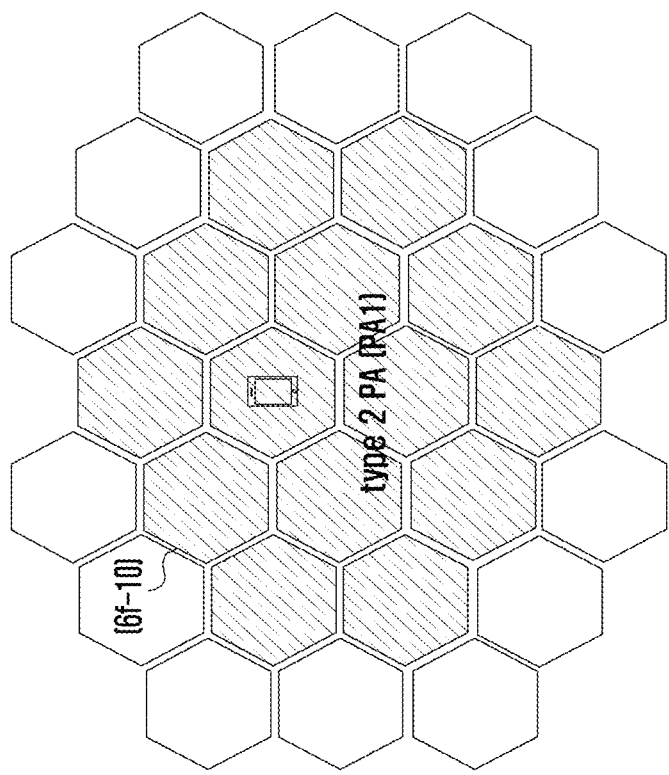
FIG. 6F illustrates diverse types of PA according to the present disclosure.
Figure 6F:
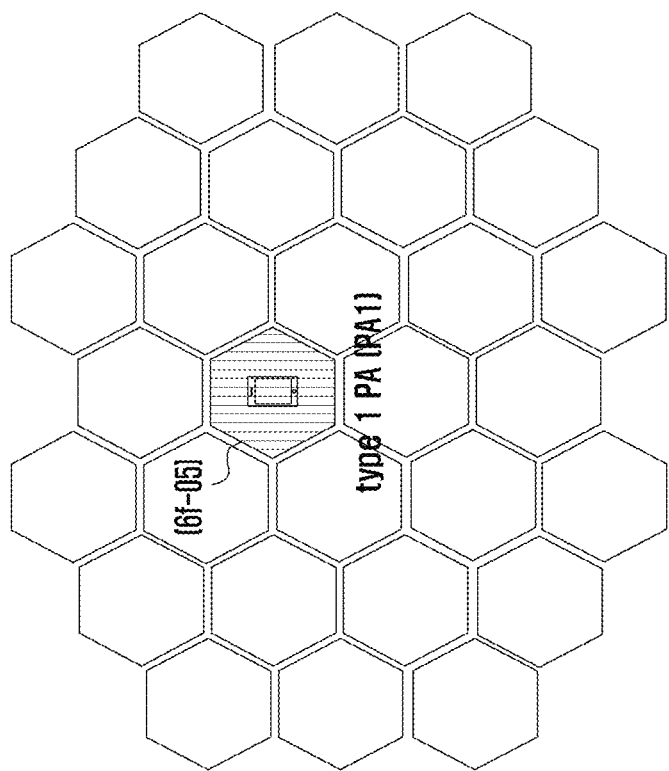

FIG. 6F illustrates various types of PA according to the present disclosure.

An eNB configures a PA for a UE by transmitting the RRCConnectionRelease message for transiting the operation mode of the UE from the RRC connected mode to the light connected mode as described at step 6e-05 of FIG. 6E.

If a small PA is configured for the UE as a Type 1 PA (PA1) as denoted by reference number 6f-05, the UE is likely to report its location frequently because the UE should update PA whenever PA is changed as the UE moves, resulting in signaling overhead. The frequent signaling may also drain battery quickly. However, this facilitates for the eNB or MME to page the UE to transmit downlink data to the UE.

In contrast, if a large PA is configured for the UE as a Type 2 PA (PA2) as denoted by reference number 6f-10, the location registration for PA update is performed relatively scarcely, resulting in reduction of battery consumption. However, this complicate the paging procedure for downlink data transmission to the UE in the light connected mode in view of the eNB and MME and may cause paging signaling overhead. The present disclosure proposes a paging method capable of saving battery power and reducing paging signaling overhead in such a way the UE in the light connected mode which is disconnected from the eNB reports its mobility in a small paging area and, after a predetermined time period elapses, in the small paging area. That is, the UE changes PA type after a predetermined time period.

Although the description is directed to the exemplary case where the change is made in a two step-wise fashion from a small PA to a large PA, the PA change can be made in three or more step-wise fashion. That is, in the present disclosure, it may be possible to define a plurality of PA types and to change the PA type in a step-wise fashion as time progresses.

In the present disclosure, it is assumed that a Type 1 PA (PA1) is a PA small in size (small PA), and a Type 2 PA (PA2) is a PA large in size (large PA). The type 1 PA may be comprised of one or more cells. The type 2 PA may be comprised of two or more cells. The type 1 or type 2 PA may consist of a cell or a group of cells. The type 1 or 2 PA may be identified by a list of cell identifiers or a PA identifier predetermined for use in the network.

Figure 6G:
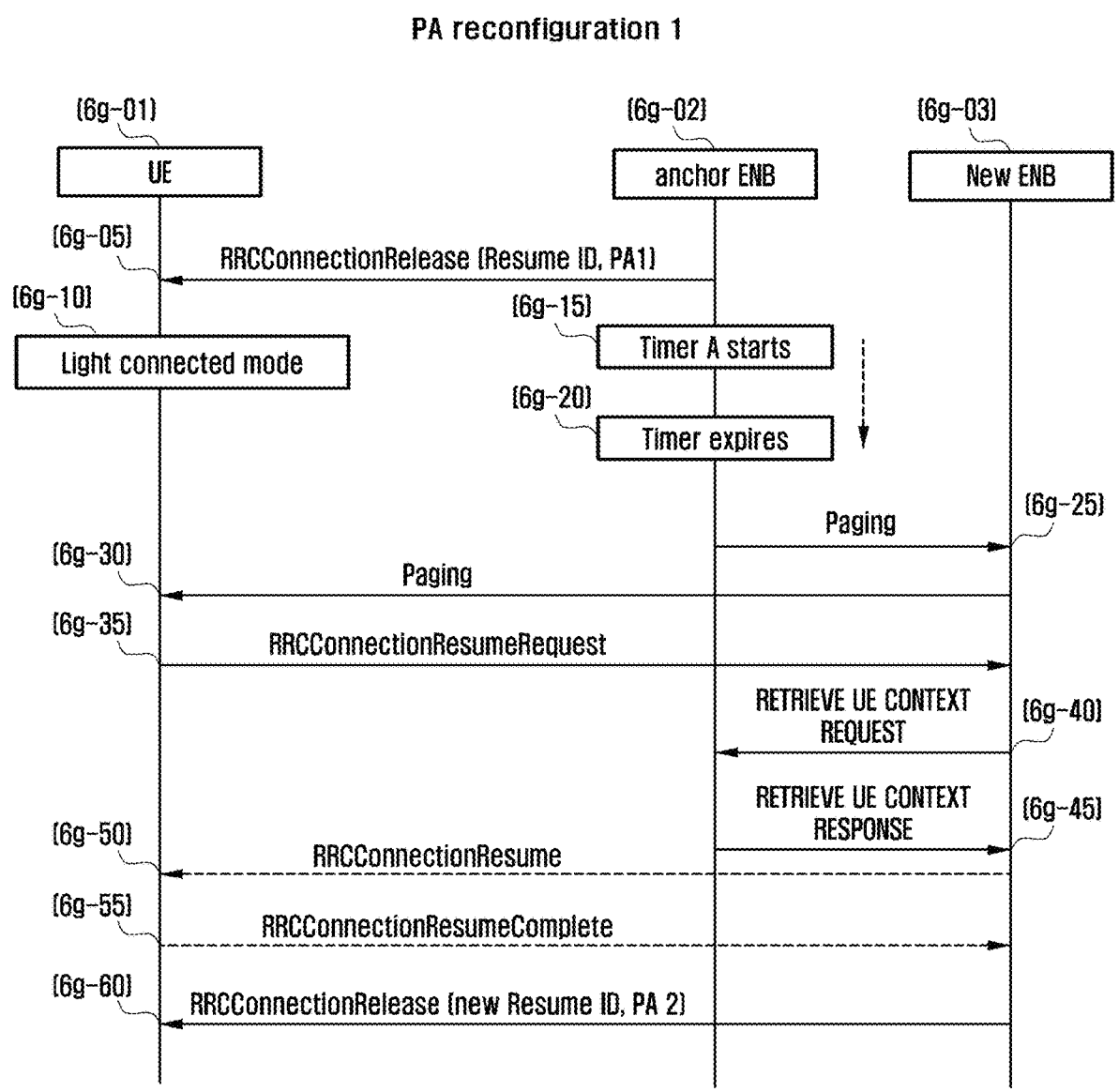
FIG. 6G illustrates signal flows between a UE and eNBs in a PA reconfiguration procedure according to the present disclosure.

FIG. 6G illustrates signal flows between a UE and eNBs in a PA reconfiguration procedure according to the present disclosure.

In FIG. 6G, if data communication between the UE 6g-01 in the RRC connected mode and the anchor eNB 6g-02 stops, the eNB 6g-02 starts a predetermined timer and, if the communication is not resumed until the timer expires, determines to release the RRC connection with the UE 6g-01.

If it is determined to release the RRC connection with the UE 6g-01, the anchor eNB 6g-02 transmits a control message (RRCConnectionRelease) to the UE 6g-01 at step 6g-05. The eNB 6g-02 may allocates a Resume ID to the UE 6g-01 and configure type 1 PA for mobility report in the light connected mode using the control message. For this purpose, the control message includes a Resume ID and a PA1 indicator. The type 1 PA may be comprised of at least one cell, and the number of cells constituting the type 1 PA is determined by the anchor eNB 6g-02. The anchor eNB 6g-02 may determine the number of cells to form the type 1 PA. The PA configuration method has already been described above and thus is omitted herein.

The UE is aware of the necessity of preserving UE context based on the fact that the Resume ID is allocated. Alternatively, the anchor eNB 6g-02 may transmit a context preservation indicator for instructing the UE 6g-01 to maintain the UE context using the control message (RRCConnectionRelease).

If the RRC connection release message including the context preservation indicator or the resume ID is received at step 6g-05, the UE 6g-01 releases the RRC connection and may start a timer corresponding to a valid period. The UE 6g-01 may store a valid cell list in memory and maintain the current UE context in the memory.

The anchor eNB 6g-02 starts a UE-specific timer (hereinafter, timer A) upon release of the connection with the UE

6g-01. The timer A is used for PA type change and may be referred to as a PA change timer.

The timer A defines the mobility report time period in type 1 PA for the connection-released UE 6g-01, and the anchor eNB 6g-02 may transmit a paging message to the UE 6g-01 upon expiry of the timer A to configure a type 2 PA to the UE 6g-01.

Accordingly, the eNB 6g-02 transmits the RRC connection release message to the UE 6g-01 and then starts the timer A at step 6g-15. The UE in the light connected mode may performs mobility report in the type 1 PA until the timer A expires.

If the timer A expires at step 6g-20, the anchor eNB 6g-02 transmits the paging message to a new eNB 6g-03 which has updated PA for the moving UE 6g-01 at step 6g-25. In the present disclosure, the anchor eNB 6g-02 may be interchangeably referred to as first eNB, and the new eNB 6g-03 may be interchangeably referred to as second eNB.

The new eNB 6g-03 transmits the paging message to the UE 6g-01 at step 6g-30. If the UE 6g-01 moves but not much and thus is located in the PA of the anchor eNB 6g-02, the anchor eNB 6g-02 may transmit the paging message to the UE 6g-01 directly.

If the paging message is received, the UE 6g-01 transmits to the new eNB 6g-03 an RRC connection resume message including the Resume ID allocated during the RRC connection release procedure and the maintained UE context at step 6g-35.

If the UE in the connected mode after being disconnected from the source eNB 6g-02 has moved and camped on a cell of the new eNB (second eNB) 6g-03, the new eNB 6g-03 may receive the RRC connection resume request message and identify the anchor eNB 6g-02 as the previous serving eNB of the UE 6g-01 based on the Resume ID included in the RRC connection resume request message.

If the new eNB 6g-03 receives and identifies the Resume ID successfully, it can retrieve the UE context from the source eNB 6g-02 (context retrieve procedure) at step 6g-40 and 6g-45. The new eNB 6g-03 may receive the UE context from the source eNB 6g-02 through a S1 or X2 interface. If the new eNB 6g-03 receives the resume ID but not identifies the terminal, it may transmit an RRCConnectionSetup message to trigger the legacy RRC connection establishment procedure with the UE 6g-01.

The new eNB 6g-03 checks for the MAC-I based on the retrieved UE context. The MAC-I is a message authentication code computed the security information (i.e., security key and security counter) of the retrieved UE context.

The new eNB 6g-03 checks for the integrity of the message using the MAC-I of the message and the security key and security counter included in the UE context. The new eNB 6g-03 may generate RRC configuration information to be applied to the UE 6g-01 and transmit the RRC connection resume (RRCConnectionResume) message including the configuration information to the UE 6g-01 at step 6g-50.

The UE 6g-01 configures the RRC connection based on the updated UE context and configuration information and transmits an RRC connection resume complete message to the new eNB 6g-03 at step 6g-55.

The new eNB 6g-03 configures a type 2 PA mode to the UE 6g-01, allocates a new resume ID, and releases the connection at step 6g-60. That is, the new eNB 6g-03 may transmit a connection release message including the new Resume ID and type 2 PA information to the UE 6g-01 at step 6g-60. In the procedure of FIG. 6G, the RRC Connection resume request message transmitted at step 6g-35 may include a newly defined establishment cause or have one reserved bit designated for PA update and, in this case, steps 6g-50 and 6g-55 may be omitted.

Figure 6H:
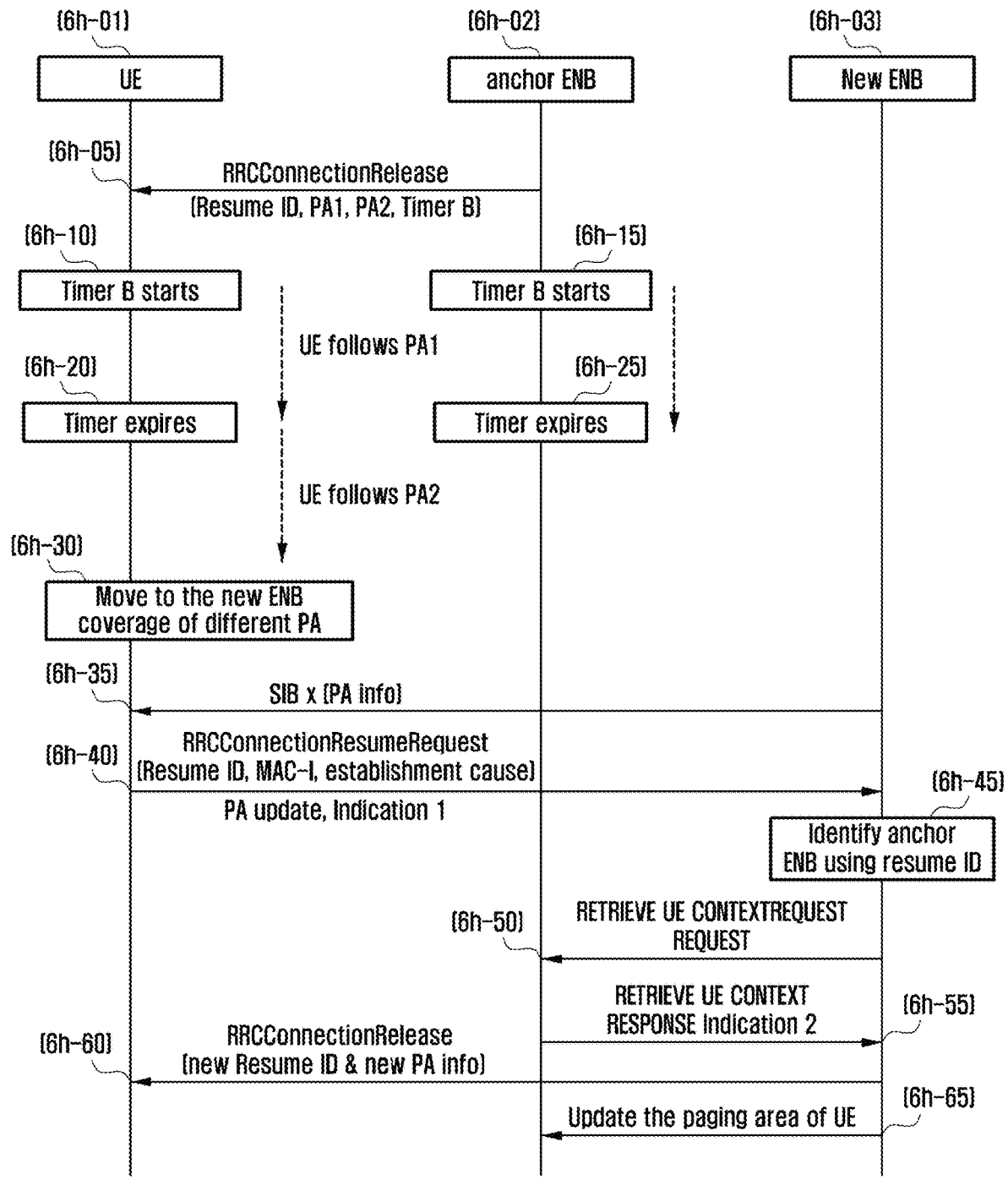
FIG. 6H illustrates another procedure for PA reconfiguration for a UE according to the present disclosure.

FIG. 6H illustrates another procedure for PA reconfiguration for a UE according to the present disclosure.

In FIG. 6H, if data communication between the UE 6h-01 in the RRC connected mode and the anchor eNB 6h-02, the anchor eNB 6h-02 starts a predetermined timer, and if the communication is not resumed until the timer expires, determines to release the RRC connection with the UE 6h-01.

If it is determined to release the RRC connection with the UE 6h-01, the anchor eNB 6h-02 transmits a control message (RRCConnectionRelease) to the UE 6h-01 at step 6h-05. The eNB 6h-02 allocates a Resume ID to the UE 6h-01 and configure Timer B for the UE 6h-01 and type 1 and 2 PAs for mobility report in the light connected mode using the control message. For this purpose, the control message includes a Resume ID, a type 1 PA (PA1) indicator, and a type 2 PA (PA2) indicator. A PA may be comprised of at least one cell, and the number of cells for forming the PA is determined by the eNB. That is, the numbers of cells for forming the type 1PA and type 2 PA may be changed according to the configuration of the eNB. The PA configuration method has already been described above and thus is omitted herein.

The UE is aware of the necessity of preserving UE context based on the fact that the Resume ID is allocated. Alternatively, the anchor eNB 6h-02 may transmit a context preservation indicator for instructing the UE 6h-01 to maintain the UE context using the control message (RRCConnectionRelease).

If the RRC connection release message including the context preservation indicator or the resume ID is received at step 6h-05, the UE 6h-01 releases the RRC connection and may start a timer corresponding to a valid period. The UE 6h-01 may store a valid cell list in memory and maintain the current UE context in the memory.

The RRC connection release message may include a timer value for Timer B.

Like Timer A, Timer B is used for PA type change and may be referred to as a PA change timer.

The timer B defines the mobility report time period in type 2 PA for the UE 6h-01, and the anchor eNB 6h-02 and the UE 6h-01 start the same timer B at step 6h-10 and 6h-15.

If the timer B expires, the UE 6h-01 performs mobility report in the type 2 PA mode characterized by large PA, and the anchor eNB 6h-02 assumes that the UE 6h-01 changes the PA for the type 2 PA.

The type 1 PA may be comprised of one or more cells. The type 2 PA may be comprised of two or more cells. The type 1 or type 2 PA may be equivalent to one cell or a set of one or more cells. The type 1 or type 2 PA may be configured in the form of a list of cell IDs or a PA ID predetermined for use in the network. FIG. 6F depicts exemplary type 1 and type 2 PAs.

In detail, the anchor eNB 6h-02 transmits the RRCConnectionRelease message to the UE 6h-01 at step 6h-05 and starts Timer B at step 6h-15. Also, the UE 6h-01 starts Timer B set to the timer value included in the RRCConnectionRelease message at step 6h-10. The start time of the Timer B may be included in the RRCConnectionRelease message transmitted to the UE 6h-01.

The UE 6h-01 performs mobility report in the type 1 PA mode until the timer B expires. If the timer B expires at step 6h-20, the UE changes the type 1PA mode to the type 2 PA mode. Since then, the UE 6h-01 performs mobility report in the type 2 PA mode.

If the UE performs mobility report in the type 2 PA mode characterized by large PA, this means battery power conservation. The timer B of the anchor eNB 6h-02 expires at the time when the timer B of the UE 6h-01 expires. If the timer B of the anchor eNB 6h-02 expires at step 6h-25, the anchor eNB 6h-25 assumes that the UE is in the type 2 PA mode without explicit signaling.

Meanwhile, if the UE 6h-01 moves to another PA as at step 6e-06 of FIG. 6E, the UE performs the PA update procedure as described with reference to FIG. 6E.

Here, it is assumed that the UE 6h-01 moves to another eNB (second eNB or new eNB) 6h-03 in another PA.

The new eNB 6h-03 may broadest its PA information in the system information, and the UE 6h-01 may determine whether the eNB on which it has camped is identical with the eNB which has transmitted the RRC connection release message.

If the eNBs mismatch, the UE 6h-01 may transmit an RRC connection resume request message to the second eNB 6h-03 at step 6h-40.

When the UE 6h-01 performs the paging update procedure to be allocated a PA, there is a need of being allocated a large PA, i.e., type 2 PA.

Accordingly, it may be necessary for the UE 6h-01 to notify the new eNB 6h-03 that the UE 6h-1 performs the mobility report in is operating in the type 2 PA mode. For this purpose, it may be possible to define an establishment cause in the RRC connection resume request message being transmitted at step 6h-40 or to use one of the reserved bits of the RRC connection resume request message as a type 2 PA mode indicator (Indication 1). The RRC connection resume request message generated by the UE 6h-01 may include the newly defined establishment cause or the type 2 PA mode indicator (Indication 1). In the present disclosure, this indicator may be referred to as PA type indicator.

In the case that two PA types are defined as described above, a UE may notify an eNB of the PA type using a 1-bit indicator.

However, the present disclosure is not limited thereby but may be include various modifications. For example, if two or more PA types are defined, the UE may use multi-bit indicator rather than 1-bit indicator.

If the RRC connection resume request message is received, the new eNB 6h-03 may identify the anchor eNB 6h-02 which has previously served the UE 6h-01 based on the Resume ID at step 6h-45.

Then, the second eNB 6h-03 transmits a retrieve UE context request message to the anchor eNB 6h-02 to request for the UE context at step 6h-50. The anchor eNB 6h-02 transmits a retrieve UE context response message including the UE context to the second eNB 6h-03 at step 6h-55.

In order to notify the new eNB 6h-03 that the UE 6h-01 performs mobility report in the type 2 PA mode characterized by large PA, it may be possible to include the PA type indicator in the retrieve UE context response message transmitted by the old eNB 6h-02 at step 6h-55 instead of the RRC connection resume request message transmitted by the UE 6h-01 at step 6h-40.

The new eNB 6h-03 configures a new PA mode such as type 2 PA mode characterized by large PA to the UE 6h-01 using the RRC connection release message at step 6h-60. Finally, the new eNB 6h-03 reports the updated PA mode to the anchor eNB 6h-02 using a UE PA update message at step 6h-65.

Figure 6I:
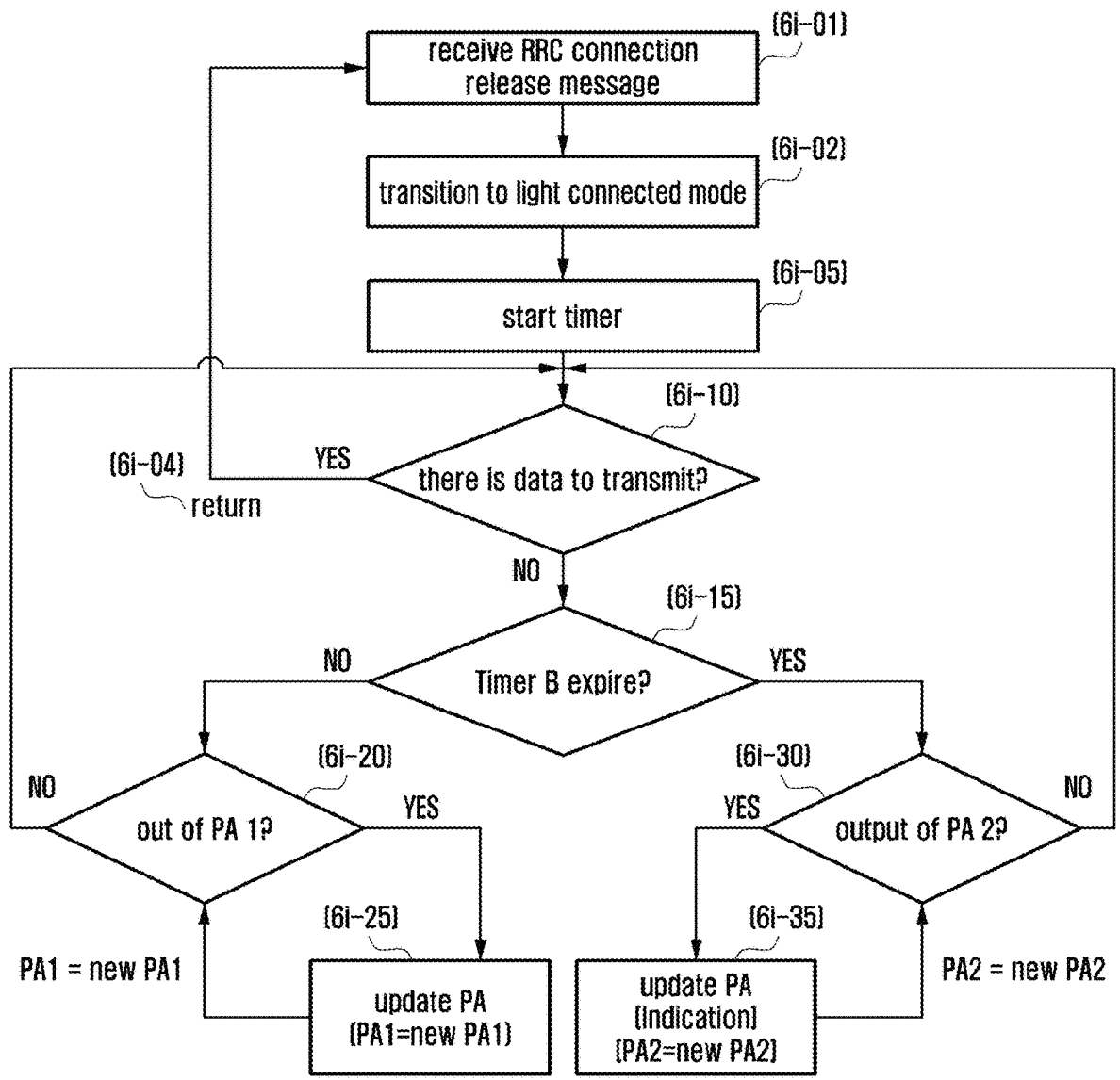
FIG. 6I illustrates an autonomous PA reconfiguration procedure of a UE according to the present disclosure.

FIG. 6I illustrates an autonomous PA reconfiguration procedure of a UE according to the present disclosure.

In FIG. 6I, if data communication between a UE in the RRC connected mode and an eNB, the eNB starts a predetermined timer, and if the communication is not resumed until the timer expires, transmit an RRC connection release message to the UE to release the RRC connection with the UE. The eNB releases the RRC connection with the UE, stores the UE context, and transmits the RRC connection release message according to a predetermined rule; the RRC connection release message includes a Resume ID, a timer B, and type 1 PA (PA1) and type 2 PA (PA2) information for use by the UE to transition to the light connected mode.

The UE receives the RRC connection release message at step 6i-01. As described above, the RRC connection release message may include at least one of the Resume ID, Timer B, and type 1 PA and type 2 PA information.

If the RRC connection release message is received, the UE may transition to the light connected mode at step 6i-02.

Next, the UE starts the timer B included in the RRC connection release message at step 6i-05. The RRC connection release message may also include the information on the start time point of the timer B.

The timer B defines the mobility report time period fin type 1 PA mode, and the eNB also starts the timer B simultaneously. If the timer B expires, the UE performs mobility report in the type 2 PA mode characterized by large PA, and the eNB assumes that the UE is in the type 2 PA mode.

The UE in the light connected mode starts the timer B and determines at step 6i-10 whether there is data to transmit.

If there is data to transmit, the UE performs the RRC connection resume procedure as described with reference to FIG. 6D at step 6i-04 so as returns the procedure to step 6i-01 to transmit data in the RRC connected mode.

If there is no data to transmit, the UE determines at step 6i-15 whether the timer B has expired while performing the cell reselection procedure.

If the timer B has not expired, the UE determines at step 6i-20 whether the suitable cell found in the cell reselection procedure belongs to the type 1 PA. That is, the UE may determine whether it is out of the type 1 PA. If the cell belongs to the type 1 PA (or if the UE is within the type 1 PA), the UE returns procedure to step 6i-10 to determine whether there is data to transmit.

If the cell does not belong to the type 1 PA, the UE performs the PA update procedure as described with reference to FIG. 6E to receive a new type PA at step 6i-25 and updates the old type 1 PA with the new type 1 PA at step 6i-25.

If the timer B has expired, the UE may transition from the type 1 PA mode to the type 2 PA mode. Then, the UE may perform mobility report in the type 2 PA mode.

If the timer B has expired, the UE determines at step 6i-30 whether the suitable cell found in the cell reselection procedure belongs to the type 2 PA. That is, the UE determines whether it is out of the configured PA.

If the cell belongs to the type 2 PA (i.e., if the UE is within the configured PA), the UE returns the procedure to step 6i-10 to determine whether there is data to transmit.

If the cell does not belong to the type 2 PA (i.e., if the UE is out of the configured PA), the UE perform the PA update procedure as described with reference to FIG. 6E. In this case, it may be necessary to notify the new eNB that the UE perform mobility report in the type 2 PA mode characterized by large PA. For this purpose, it may be possible to define an establishment cause in the RRC connection resume request message being transmitted at step 6*h*-40 of FIG. 6H or to use one reserved bit of the RRC connection resume request message as a type 2 PA mode indicator (Indication 1).

This indicator may be referred to as PA type indicator, and the detailed description thereof has been made above and thus is omitted herein.

Alternatively, it may be possible to include an indicator indicating the expiry of the timer B of the UE and mobility report in the type 2 PA mode in the retrieve UE context response message transmitted from the old eNB to the new eNB at step 6*h*-55 of FIG. 6H instead of including the PA type indicator in the RRC connection resume request message transmitted from the UE to the new eNB at step 6*h*-55 of FIG. 6H (Indication 2). This indicator may also be referred to as PA type indicator.

The UE perform the PA update procedure with this indicator to receive a new type 2 PA at step 6*i*-35 and updates the old type 2 PA with the new type 2 PA at step 6*i*-30.

Figure 6J:
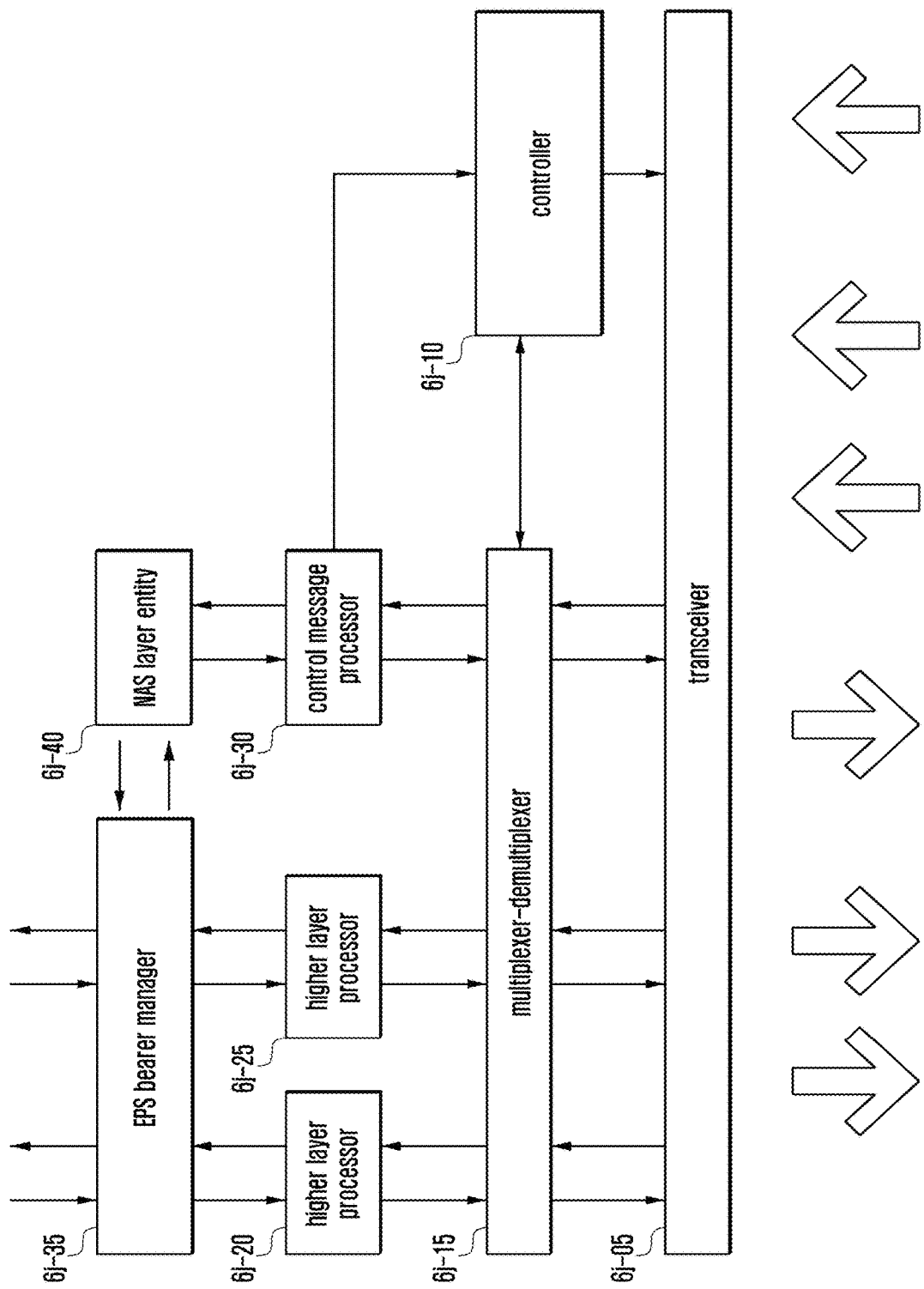
FIG. 6J illustrates a configuration of a UE according to an embodiment of the present disclosure.

FIG. 6J illustrates a configuration of a UE according to an embodiment of the present disclosure.

In reference to FIG. 6J, the UE includes transceiver 6*j*-05, a controller 6*j*-10, a multiplexer/demultiplexer 6*j*-15, a control message processor 6*j*-30, higher layer processors 6*j*-20 and 6*j*-25, an EPS bearer manager 6*j*-35, and a NAS layer entity 6*j*-40. In the present disclosure, the controller 6*j*-10 may be interchangeably referred to as a circuit, an application-specific integrated circuit, and at least one processor and the controller may be coupled with the transceiver.

The transceiver 6*j*-05 is identical in functionality with the transceiver 5*m*-05 of FIG. 5M and thus detailed description thereof is omitted herein. The multiplexer/demultiplexer 6*j*-15 is identical in functionality with the multiplexer/demultiplexer 5*m*-15 of FIG. 5M and thus detailed description thereof is omitted herein.

The control message processor 6*j*-30 is identical in functionality with the control message processor 5*m*-30 of FIG. 5M and thus detailed description thereof is omitted herein. The higher layer processors 6*j*-20 and 6*j*-25 are identical in functionality with the higher layer processors 5*m*-20 and 5*m*-25 of FIG. 5M and thus detailed description thereof is omitted herein.

The controller 6*j*-10 checks for the scheduling command, e.g., uplink grants, received by the transceiver 5*m*-05 and controls the transceiver 6*j*-05 and the multiplexer/demultiplexer 6*j*-15 to perform uplink transmission with appropriate transmission resources at an appropriate timing.

The controller 6*j*-10 may control the signaling among the function blocks to accomplish the operations according to the procedures described with reference to the above flowcharts. In detail, the controller 6*j*-10 may control receiving an RRC connection release message. As described above, the RRC connection release message may include at least one of a Resume ID, a timer B, and type 1 PA and type 2 PA information. The controller 6*j*-10 may control transitioning to the light connected mode.

The controller 6*j*-10 may also starts a timer indicated in the RRC connection release message. The RRC connection release message may also include the information on the start time point of the timer.

The timer defines a predetermined period for mobility report in the type 1 PA mode, and the eNB also starts the same timer. If the timer expires, the controller 6*j*-10 may control the UE to perform mobility report in the type 2 PA mode characterized by large PA, and the eNB assumes that the UE operates in the type 2 PA mode.

The controller 6*j*-10 starts the timer and performs a cell reselection procedure, monitoring for expiry of the timer.

If the timer expires, the controller 6*j*-10 may control the UE transitions from the type PA mode characterized by small PA to the type 2 PA mode characterized by large PA. Afterward, the UE may perform the mobility report in the type 2 PA mode.

If the UE moves out of the configured PA, the controller 6*j*-10 controls the UE to perform a PA update procedure. In this situation, it may be necessary to notify the new eNB that the UE performs mobility report in the type 2 PA mode. For this purpose, it may be possible to define an establishment cause in the RRC connection resume request message (see step 6*h*-40 of FIG. 6H) or to use one of the reserved bits of the RRC connection resume request message as a type 2 PA mode indicator (Indication 1).

This indicator may be referred to as PA type indicator, and detailed description thereof is omitted herein.

Alternatively, it may be possible to include an indicator indicating the expiry of the timer B of the UE and mobility report in the type 2 PA mode in the retrieve UE context response message transmitted from the old eNB to the new eNB (see 6*h*-55 of FIG. 6H) instead of including the PA type indicator in the RRC connection resume request message transmitted from the UE to the new eNB (see 6*h*-55 of FIG. 6H) (Indication 2). This indicator may also be referred to as PA type indicator.

The controller 6*j*-10 controls the PA update procedure with this indicator to receive a new type 2 PA and updates the old type 2 PA with the new type 2 PA.

FIG. 6K illustrates a configuration of an eNB including an MME part and an S-GW part according to an embodiment of the present disclosure, and the eNB includes transceiver 6*k*-05, a controller 6*k*-10 a multiplexer/demultiplexer 6*k*-20, a control message processor 6*k*-35, higher layer processors 6*k*-25 and 6*k*-30, a scheduler 6*k*-15, EPS bearer entities 6*k*-40 and 6*k*-45, and a NAS entity 6*k*-50. In the present disclosure, the controller 6*k*-10 may be interchangeably referred to as a circuit, an application-specific integrated circuit, and at least one processor and the controller may be coupled with the transceiver. The EPS bearer entities may be resided in the S-GW, and the NAS layer entity may be resided in the MME.

The transceiver 6*k*-05, the multiplexer/demultiplexer 6*k*-20, the higher layer processors 6*k*-25 and 6*k*-30, the scheduler 6*k*-15, the EPS bearer entities 6*k*-40 and 6*k*-45, and the NAS layer entity 6*k*-50 are identical in functionality with those described with reference to FIG. 5N, detailed descriptions thereof are omitted herein.

The controller 6*k*-10 may controls signaling among the function blocks to accomplish the operations in the procedures described above. In detail, the controller 6*k*-10 of the first eNB (source eNB or anchor eNB) may control the eNB to transmit an RRC connection release message including a resume ID, a timer value, and an PA configuration information. The controller 6*k*-10 may control transmitting PA configuration information or at least one PA type configuration information according to the PA update scheme of the present disclosure.

In the case of receiving a retrieve UE context request message from another eNB according to an embodiment of the present disclosure, the controller 6*k*-10 may control to transmit a retrieve UE context response message including a PA type indicator for use by the UE in mobility report.

The controller 6*k*-10 of the second eNB (new eNB on which the UE has camped) may receive an RRC connection resume request message including the newly defined establishment cause or the PA type indicator from the UE. Accordingly, the controller 6k-10 may configure a PA type to the UE according to the PA type indicator during the PA update procedure.

Seventh Embodiment

The present disclosure proposes an operation mode transition method and apparatus for transitioning a normal terminal or a terminal operating in an extended coverage mode (hereinafter, interchangeably referred to as NB-IoT UE, Bandwidth reduced Low complexity (BL) UE, UE in Coverage Enhancement (CE), and enhanced Machine Type Communication (eMTC) UE) using a paging message in a network supporting the light connection technique.

Figure 7A:
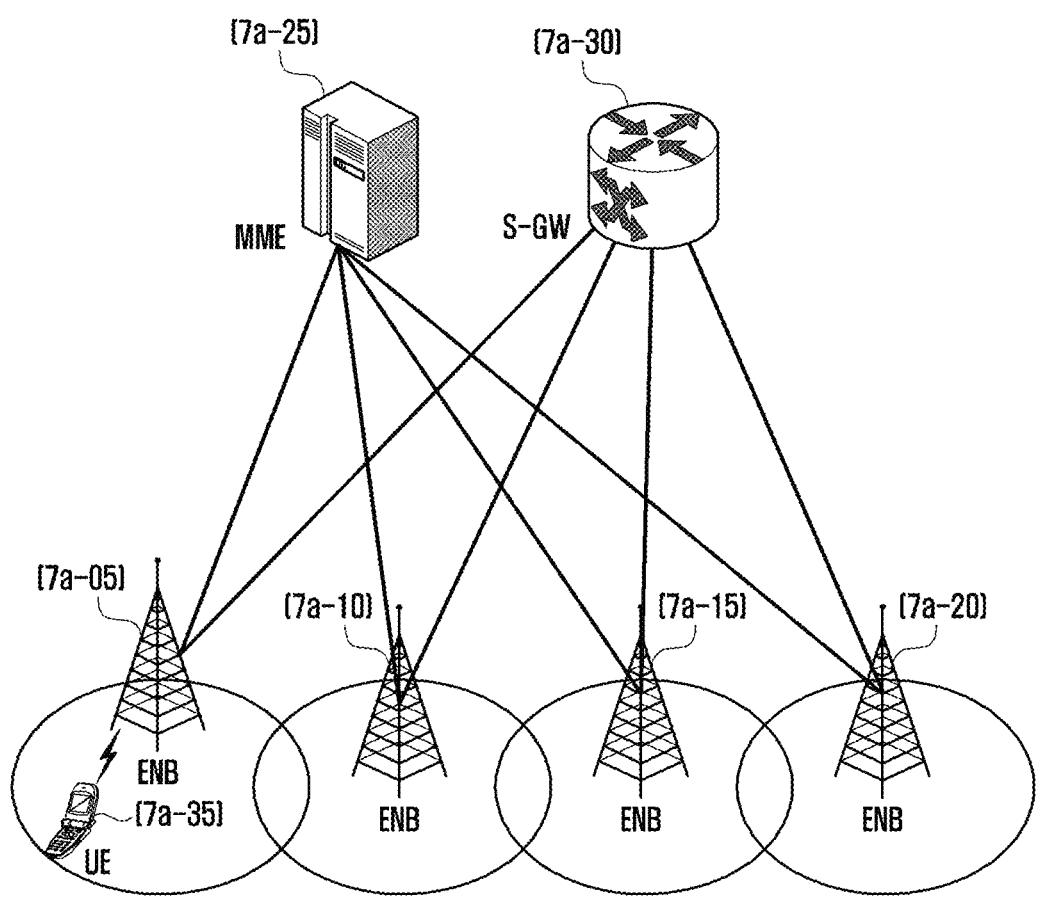
FIG. 7A illustrates an LTE system architecture.

FIG. 7A illustrates architecture of an LTE system.

The detailed description of the LTE system architecture has been made already with reference to FIG. 1A and thus is omitted herein.

Figure 7B:
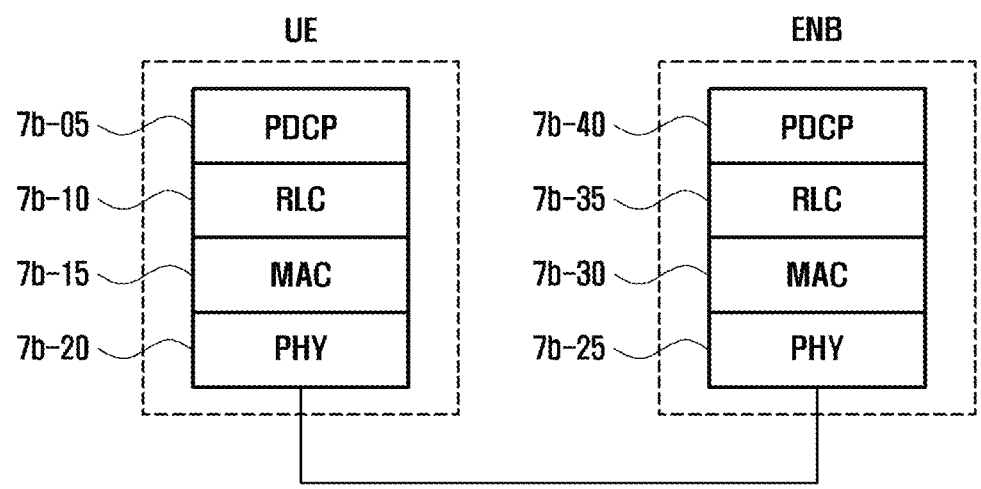
FIG. 7B illustrates a protocol stack of an interface between a UE and an eNB in the LTE system.

FIG. 7B illustrates a protocol stack of an interface between a UE and an eNB in the LTE system.

The detailed description of the protocol stack has been made already with reference to FIGS. 2B and 3B and thus is omitted herein.

Figure 7C:
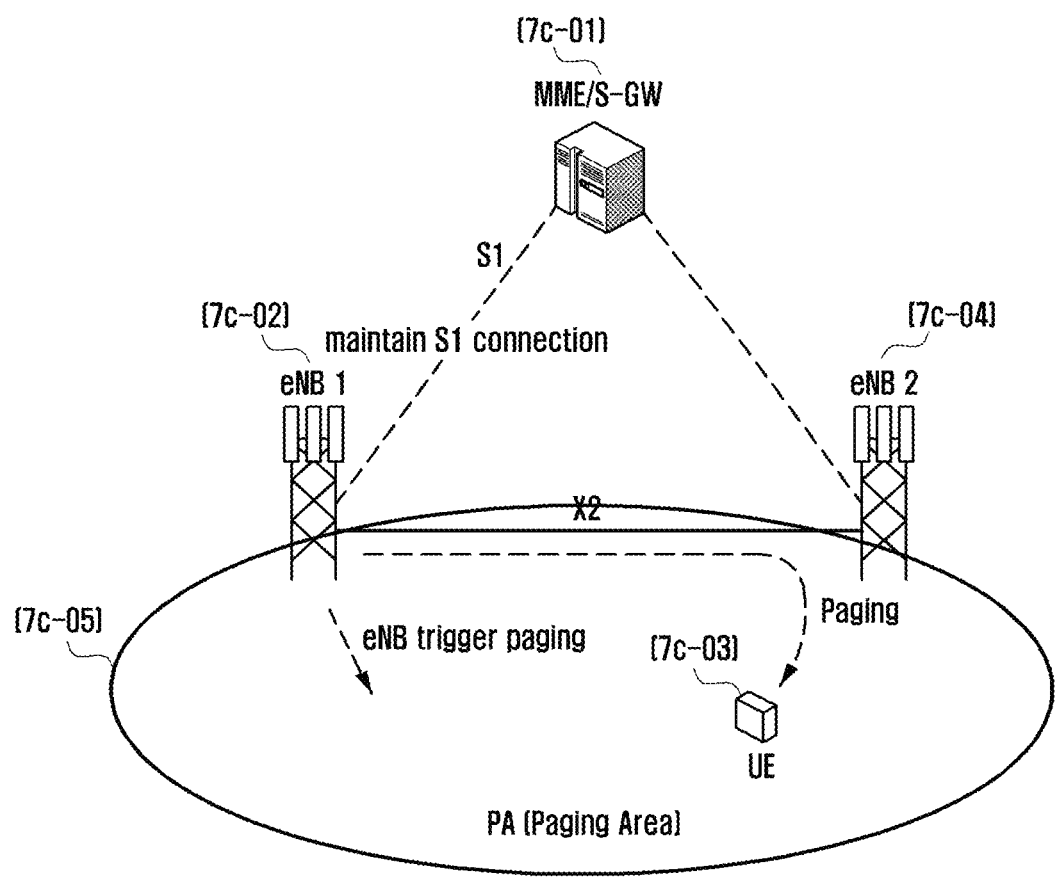
FIG. 7C illustrates the concept of light connection.

FIG. 7C illustrates the concept of light connection.

The detailed description of the concept of light connection has been made already with reference to FIG. 6C and this omitted herein.

Figure 7D:
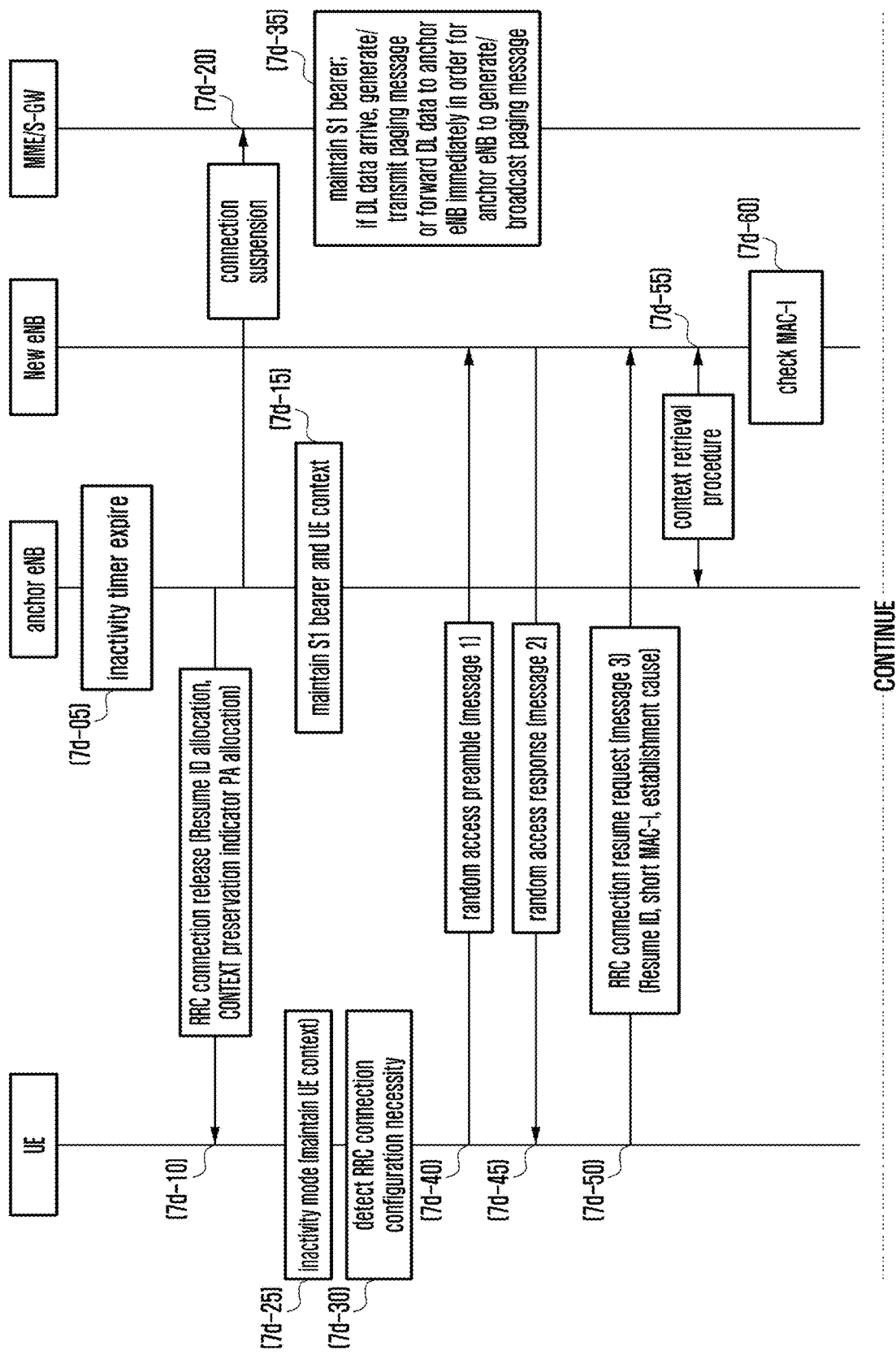
FIGS. 7DA and 7DB illustrate signal flows among a UE, an anchor eNB, a new eNB, and an MME for UE context and S1 bearer reuse in light connection procedure according to the present disclosure.
Figure 7D:
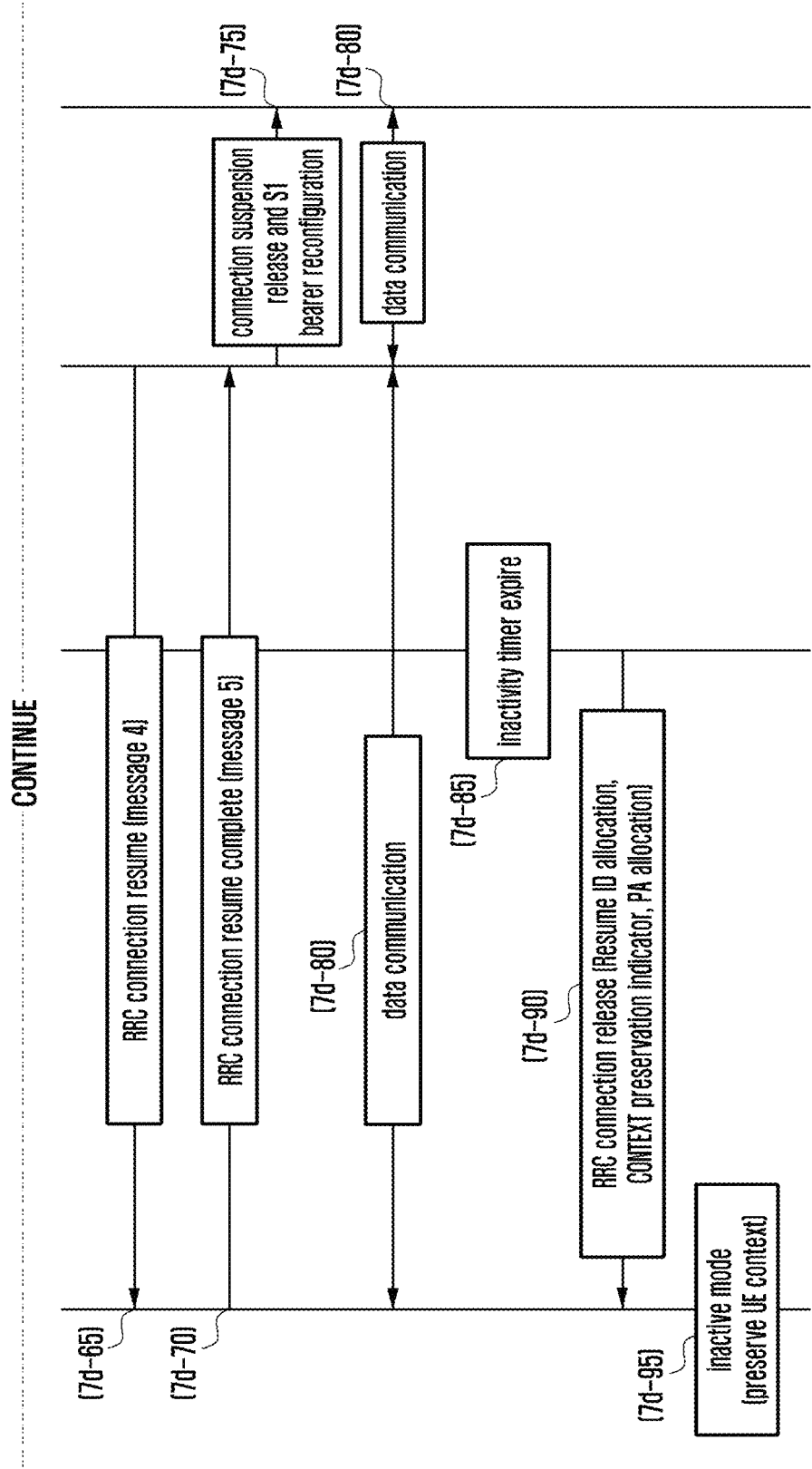

FIGS. 7DA and 7DB illustrate signal flows among a UE, an anchor eNB, a new eNB, and an MME for UE context and S1 bearer reuse in light connection procedure according to the present disclosure.

The light connection procedure of FIGS. 7DA and 7DB is identical with that of FIGS. 6DA and 6DB and thus detailed description thereof is omitted herein.

If an RRC connection release message is received from an eNB, the UE transitions from the RRC connected mode to the light connected mode and performs mobility report in a PA configured for the UE in the light connected mode. For the UE in the light connected mode, the network has to maintain the UE context and maintain the S1-U bearer. However, it may be difficult for the network to maintain the UE contexts and maintain S1-U bearers for all UEs persistently. Accordingly, there is a need of transitioning the UEs in the light connected mode to the RRC idle mode and releasing the S1-U bearers for the UEs.

Figure 7E:
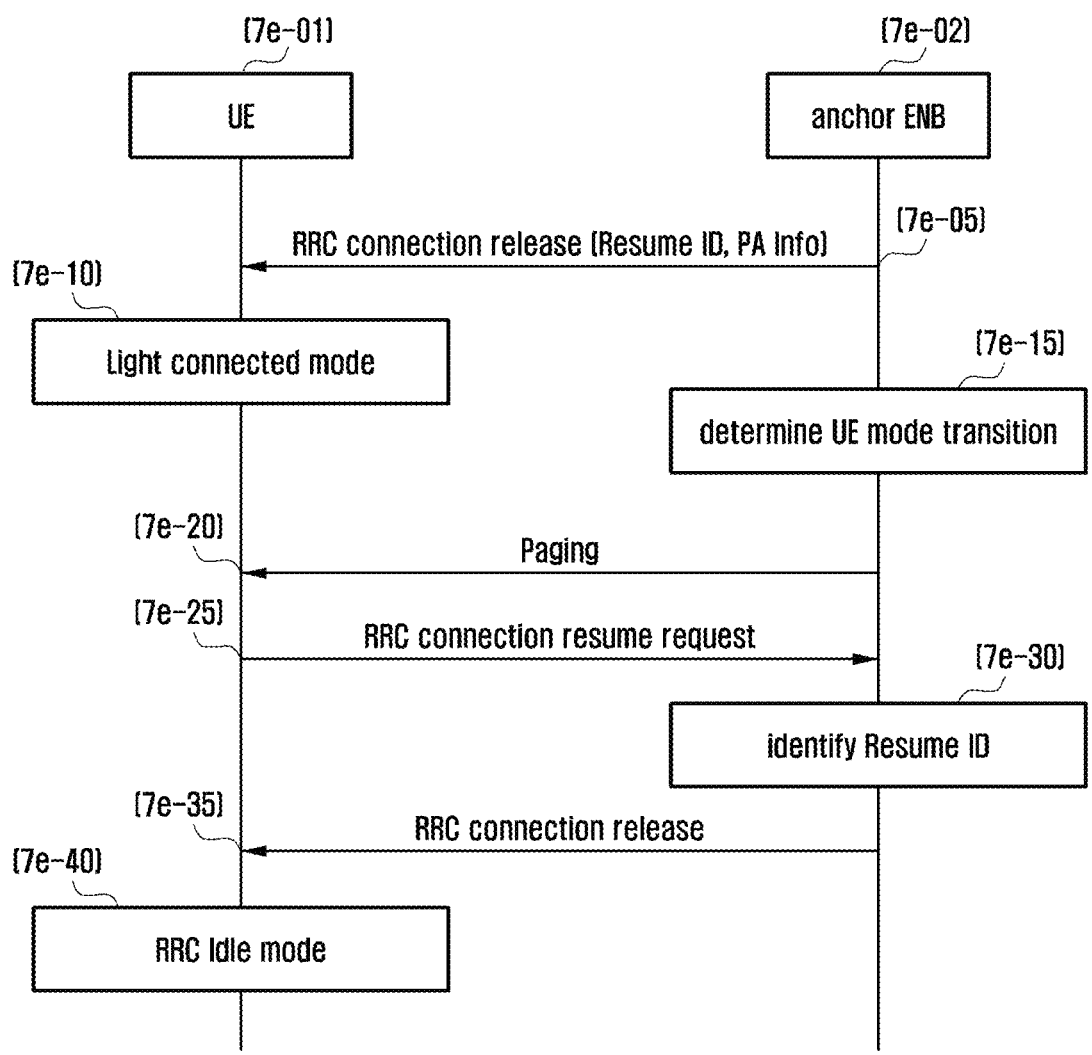
FIG. 7E illustrates a method for an eNB to transition a UE in the light connected mode to the RRC idle mode according to the present disclosure.

FIG. 7E illustrates a method for an eNB to transition a UE in the light connected mode to the RRC idle mode according to the present disclosure.

In FIG. 7E, the UE 7e-01 in the RRC connected mode is communicating data with the eNB 7e-02. If the data communication stops, the eNB 7e-02 starts a predetermined time and, if data communication is not resumed before expiry of the timer, determines to release the RRC connection of the UE 7e-01.

The eNB 7e-02 may maintain the UE context and transmit an RRC connection release message to instruct the UE 7e-01 to release the RRC connection. The eNB 7e-02 allocates a Resume ID to the UE 7e-01 and configures a PA for mobility report in the light connected mode using the RRC connection release message. That is, the RRC connection release message may include the resume ID and PA information. The PA configuration method has been described above and thus detailed description thereof is omitted herein.

If the RRC connection release message is received, the UE 7e-01 transitions to the light connected mode (or inactive mode) and is aware that it has to maintain the UE context based on the fact that the resume ID is allocated or on an explicit context preservation indicator included in the RRC connection release message. The RRC connection release message may include a list of cells for use of the maintained UE context in RRC connection reconfiguration during the context preservation period of the eNB or the context validity period of the UE. The eNB 7e-02 maintains the UE context and maintains the S1 bearer for the UE after the RRC connection is released.

If the RRC connection release message is received at step 7e-05, the UE 7e-01 transitions to the light connected mode at step 7e-10. The anchor eNB 7e-02 may transition the UE in the light connected mode to the RRC idle mode. The transition from the light connected mode from the RRC idle mode may be determined by a validity period timer or triggered by a predetermined cause. The anchor eNB 7e-02 is an eNB which maintains the UE context and maintains the S1-U bearer for the UE 7e-01.

The anchor eNB 7e-02 may determine to transition the UE 7e-01 in the light connected mode to the RRC idle mode at step 7e-15. If it is determined to transition the UE 7e-01 to the RRC idle mode, the anchor eNB 7e-02 transmits a paging message to the UE 7e-01 at step 7e-20. Upon receipt of the paging message, the UE 7e-01 transitions to the RRC connected mode.

The UE 7e-01 in the RRC connected mode transmits an RRC connection resume request message to the anchor eNB 7e-02 at step 7e-25.

If the RRC connection request message is received, the anchor eNB 7e-02 identifies the RRC connection resume message for the resume ID at step 7e-30.

The anchor eNB 7e-02 may identify the UE 7e-01 which is supposed to transitioned to the RRC idle mode based on the Resume ID.

Accordingly, the anchor eNB 7e-02 transmits an RRC connection release message to the UE 7e-01 to transition the UE 7e-01 to the RRC idle mode at step 7e-35. Upon receipt of the RRC connection release message, the UE 7e-01 transitions to the RRC idle mode at step 7e-40.

Figure 7F:
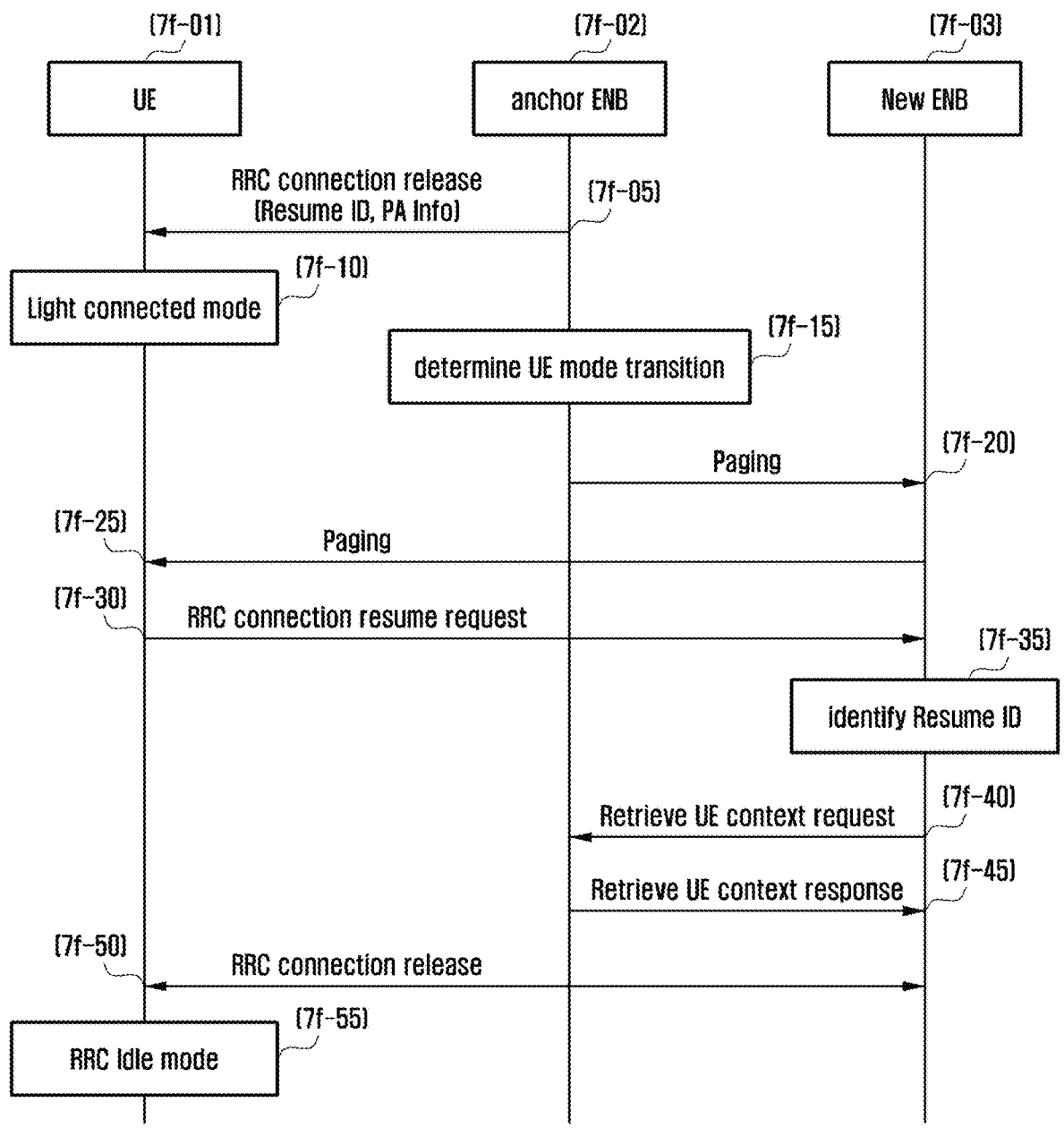
FIG. 7F illustrates a method for an eNB to transition a UE in the light connected mode to the RRC idle mode, when the UE moves to a PA of another eNB, according to the present disclosure.

FIG. 7F illustrates a method for an eNB to transition a UE in the light connected mode to the RRC idle mode, when the UE moves to a PA of another eNB, according to the present disclosure.

In FIG. 7F, the UE 7f-01 in the RRC connected mode is communicating data with the eNB 7f-02. If the data communication stops, the anchor eNB 7f-02 starts a predetermined timer and, if data communication is not resumed before expiry of the timer, determines to release the RRC connection of the UE 7f-01.

The eNB 7f-02 may maintain the UE context and transmit an RRC connection release message to instruct the UE 7f-01 to release the RRC connection. The eNB 7f-02 allocates a Resume ID to the UE 7f-01 and configures a PA for mobility report in the light connected mode using the RRC connection release message. That is, the RRC connection release message may include the resume ID and PA information. The PA configuration method has been described above and thus detailed description thereof is omitted herein.

If the RRC connection release message is received, the UE 7f-01 transitions to the light connected mode (or inactive mode) and is aware that it has to maintain the UE context based on the fact that the resume ID is allocated or on an explicit context preservation indicator included in the RRC connection release message. The RRC connection release message may include a list of cells for use of the maintained UE context in RRC connection reconfiguration during the context preservation period of the eNB or the context validity period of the UE. The eNB 7f-02 maintains the UE context and maintains the S1 bearer for the UE after the RRC connection is released.

If the RRC connection release message is received at step 7f-05, the UE 7f-01 transitions to the light connected mode at step 7f-10. The anchor eNB 7f-02 may transition the UE in the light connected mode to the RRC idle mode. The transition from the light connected mode from the RRC idle mode may be determined by a validity period timer or triggered by a predetermined cause. The anchor eNB 7f-02 is an eNB which maintains the UE context and maintains the S1-U bearer for the UE 7f-01.

The anchor eNB 7f-02 may determine to transition the UE 7f-01 in the light connected mode to the RRC idle mode at step 7f-15. If it is determined to transition the UE 7f-01 to the RRC idle mode, the anchor eNB 7f-02 transmits a paging message to a new eNB at step 7f-20 to the UE 7f-01 at step 7f-25. Upon receipt of the paging message, the UE 7f-01 transitions to the RRC connected mode.

The anchor eNB 7f-02 may have the information on the PA for the UE 7f-01 because the UE 7f-01 reports the PA whenever the PA is updated as the UE 7f-01 moves.

If the paging message is received, the UE 7f-01 transmits an RRC connection resume request message to the new eNB 7f-03 at step 7f-30.

If the RRC connection resume request message is received, the new eNB 7f-03 may identify the RRC connection resume message for the resume ID at step 7f-35.

Next, the second eNB 7f-03 performs a UE context retrieval procedure with the anchor eNB 7f-02 at steps 7f-40 and 7f-45. During this procedure, the anchor eNB 7f-02 may notify the new eNB 7f-03 that the UE 7f-01 is supposed to transition to the RRC idle mode. The new eNB 7f-03 transmits an RRC connection release message to the UE 7f-01 at step 7f-50 and, upon receipt of the RRC connection release message, the UE 7f-01 transitions to the RRC idle mode at step 7f-55.

Figure 7G:
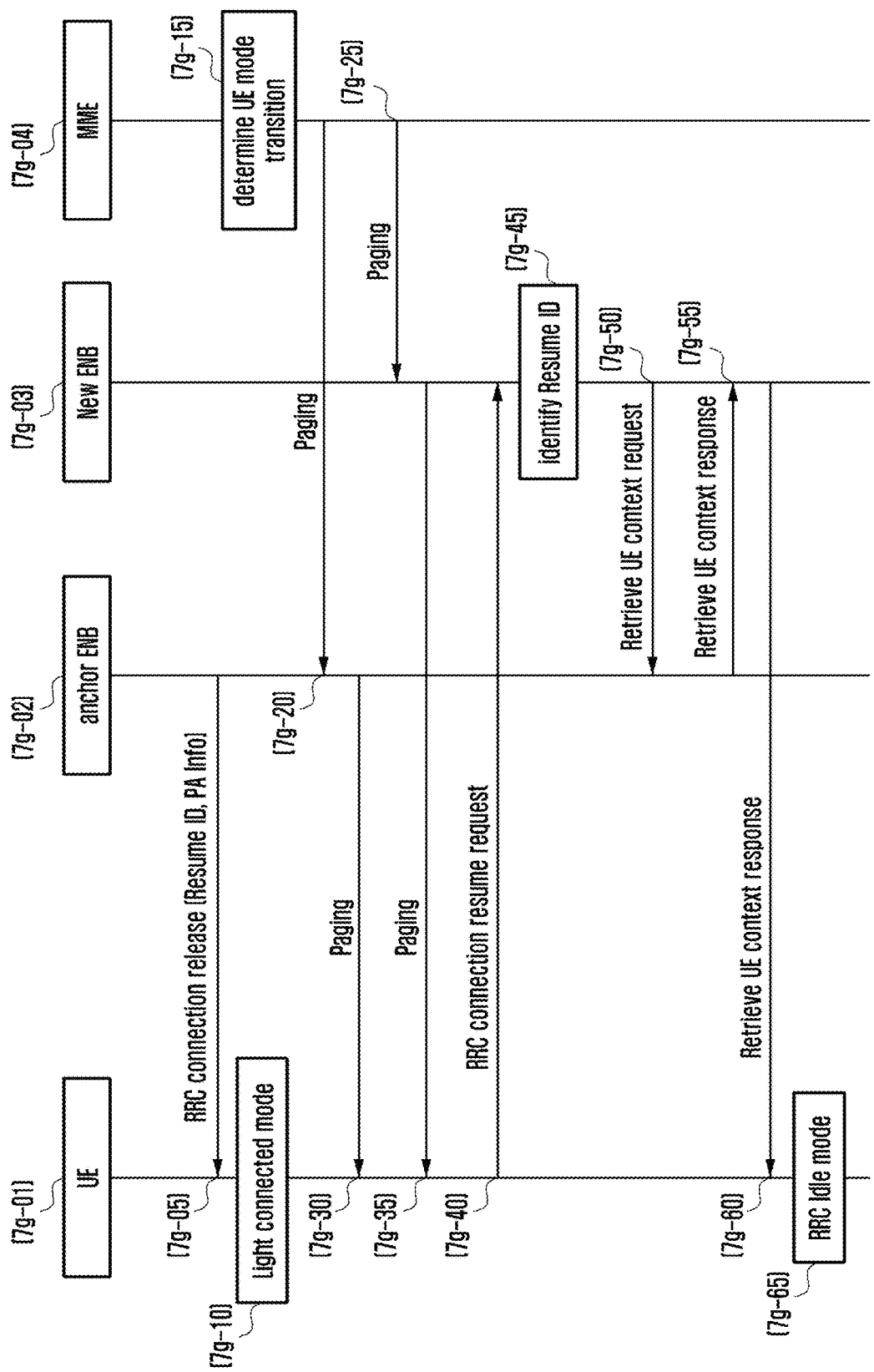
FIG. 7G illustrates another procedure for transitioning a UE in the light connected mode to the RRC idle mode according to the present disclosure.

FIG. 7G illustrates another procedure for transitioning a UE in the light connected mode to the RRC idle mode according to the present disclosure.

In reference to FIG. 7G, in a situation where the UE moves to a PA of another eNB, the MME makes a determination for UE's operation mode transition from the light connected mode to the RRC idle mode and, as in LTE, triggers paging of the UE instead of anchor eNB.

In FIG. 7G, the UE 7g-01 in the RRC connected mode is communicating data with the anchor eNB 7g-02. If the data communication stops, the anchor eNB 7g-02 starts a predetermined time and, if data communication is not resumed before expiry of the timer, determines to release the RRC connection of the UE 7g-01.

The eNB 7g-02 may maintain the UE context and transmit an RRC connection release message to instruct the UE 7g-01 to release the RRC connection. The eNB 7g-02 allocates a Resume ID to the UE 7g-01 and configures a PA for mobility report in the light connected mode using the RRC connection release message. That is, the RRC connection release message may include the resume ID and PA information. The PA configuration method has been described above and thus detailed description thereof is omitted herein.

If the RRC connection release message is received, the UE 7g-01 transitions to the light connected mode (or inactive mode) and is aware that it has to maintain the UE context based on the fact that the resume ID is allocated or on an explicit context preservation indicator included in the RRC connection release message. The RRC connection release message may include a list of cells for use of the maintained UE context in RRC connection reconfiguration during the context preservation period of the eNB or the context validity period of the UE. The eNB 7g-02 maintains the UE context and maintains the S1 bearer for the UE after the RRC connection is released.

If the RRC connection release message is received at step 7g-05, the UE 7g-01 transitions to the light connected mode at step 7g-10. The MME 7g-04 may transition the UE in the light connected mode to the RRC idle mode. The transition from the light connected mode to the RRC idle mode may be determined by a validity period timer or triggered by a predetermined cause.

The MME 7g-04 may determine to transition the UE 7g-01 in the light connected mode to the RRC idle mode at step 7g-15. If it is determined to transition the UE 7g-01 to the RRC idle mode, the MME 7g-04 transmits a paging message to the anchor eNB 7g-02 and a new eNB 7g-03 at steps 7g-20 and 7g-25 and then the anchor eNB 7g-02 and the new 7g-03 broadcast the paging message at steps 7g-30 and 7g-35. Upon receipt of the paging message, the UE 7g-01 transitions to the RRC connected mode.

The MME 7g-04 may have the information on the PA for the UE 7f-01 because the UE 7g-01 reports the PA whenever the PA is updated as the UE 7g-01 moves.

If the paging message is received, the UE 7g-01 transmits an RRC connection resume request message to the new eNB 7g-03 at step 7g-40.

If the RRC connection resume request message is received, the new eNB 7f-03 may identify the RRC connection resume message for the resume ID at step 7g-45.

Next, the second eNB 7g-03 performs a UE context retrieval procedure with the anchor eNB 7g-02 at steps 7g-50 and 75-55.

The paging message generated by the MME 7g-04 may include the information indicating that the UE 7g-01 is supposed to transition to the RRC idle mode. This information may be included in the paging message in the form of an indicator. This indicator may be newly defined in the paging record, or 1 bit of the paging message may be used as this indicator. This indicator may be referred to as a UE mode transition indicator. The UE 7g-01 may be preconfigured so as to transition to the RRC idle mode if the paging of the UE in the light connected mode is triggered by the MME 7g-04.

If new eNB 7g-03 receives the paging message including the UE mode transition indicator from the MME 7g-04, it assumes that the UE 7g-01 operates in the RRC idle mode.

The UE mode transient procedures of FIGS. 7E, 7F, and 7G for transitioning the UE from the light connected mode to the RRC idle mode may cause signaling overhead. In order to reduce such signaling overhead, it may be necessary to define a new indicator in the paging message. This indicator indicating the transition from the light connected mode to the RRC idle mode may be newly defined in the paging recode of the paging message, or 1 bit of the paging message may be designated as this indicator. This indicator may be referred to as a UE mode transition indicator. This indicator may be identical with or different from the indicator transmitted from the MME to the eNBs.

Figure 7H:
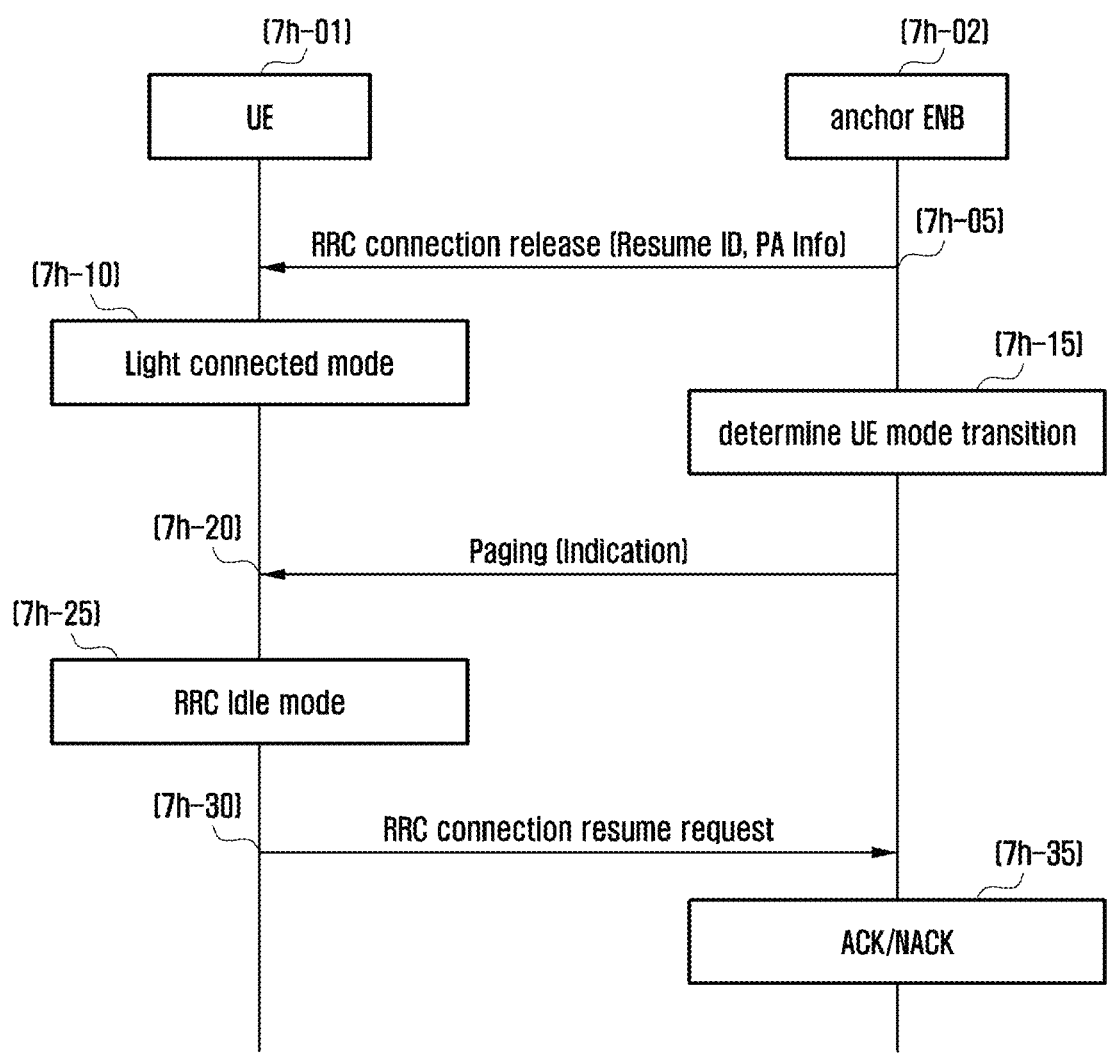
FIG. 7H illustrates a method for an eNB to transition a UE in the light connected mode to the RRC idle mode using a paging message including an RRC idle mode transition indicator.

FIG. 7H illustrates a method for an eNB to transition a UE in the light connected mode to the RRC idle mode using a paging message including an RRC idle mode transition indicator.

In FIG. 7H, the UE 7h-01 in the RRC connected mode is communicating data with the anchor eNB 7h-02. If the data communication stops, the eNB 7h-02 starts a predetermined time and, if data communication is not resumed before expiry of the timer, determines to release the RRC connection of the UE 7h-01.

The eNB 7h-02 may maintain the UE context and transmit an RRC connection release message to instruct the UE 7h-01 to release the RRC connection. The eNB 7h-02 allocates a Resume ID to the UE 7h-01 and configures a PA for mobility report in the light connected mode using the RRC connection release message. That is, the RRC connection release message may include the resume ID and PA information. The PA configuration method has been described above and thus detailed description thereof is omitted herein.

If the RRC connection release message is received, the UE 7h-01 transitions to the light connected mode (or inactive mode) and is aware that it has to maintain the UE context based on the fact that the resume ID is allocated or on an explicit context preservation indicator included in the RRC connection release message. The RRC connection release message may include a list of cells for use of the maintained UE context in RRC connection reconfiguration during the context preservation period of the eNB or the context validity period of the UE. The eNB 7h-02 maintains the UE context and maintains the S1 bearer for the UE after the RRC connection is released.

If the RRC connection release message is received at step 7h-05, the UE 7h-01 transitions to the light connected mode at step 7h-10. The anchor eNB 7h-02 may transition the UE in the light connected mode to the RRC idle mode. The transition from the light connected mode from the RRC idle mode may be determined by a validity period timer or triggered by a predetermined cause. The anchor eNB 7h-02 is an eNB which maintains the UE context and maintains the S1-U bearer for the UE 7h-01.

The anchor eNB 7h-02 may determine to transition the UE 7h-01 in the light connected mode to the RRC idle mode at step 7h-15.

If it is determined to transition the UE 7h-01 to the RRC idle mode, the anchor eNB 7h-02 is capable of transmitting a paging message including an indicator indicating mode transition to the RRC idle mode to the UE 7h-01. Accordingly, the anchor eNB 7h-02 transmits a paging message including the mode transition indicator to the UE 7h-02 at step 7h-20.

Upon receipt of the paging message, the UE 7h-01 checks the paging message for the mode transition indicator and transitions to the RRC idle mode directly at step 7h-25.

The mode transition indicator included in the paging message is the information instructing the UE to transition to the RRC idle mode directly. This indicator may be newly defined in the paging record of the paging message, or 1 bit of the paging message may be used as this indicator. This indicator may be referred to as a UE mode transition indicator.

After transitioning to the RRC idle mode, the UE 7h-01 transmits to the anchor eNB 7h-02 an RRC connection resume request message to notify the anchor eNB 7h-02 that the UE has successfully transitioned to the RRC idle mode at step 7h-30.

If the RRC connection resume request message is received, the anchor eNB 7h-02 checks the RRC connection resume request message for the resume ID to recognize that the UE 7h-01 has successfully transitioned to the RRC idle mode. The anchor eNB 7h-02 may start a predetermined timer after transmitting the paging message and, if an RRC connection resume request message is not received before expiry of the timer, determine that the paging message is lost 7h-35.

Figure 7I:
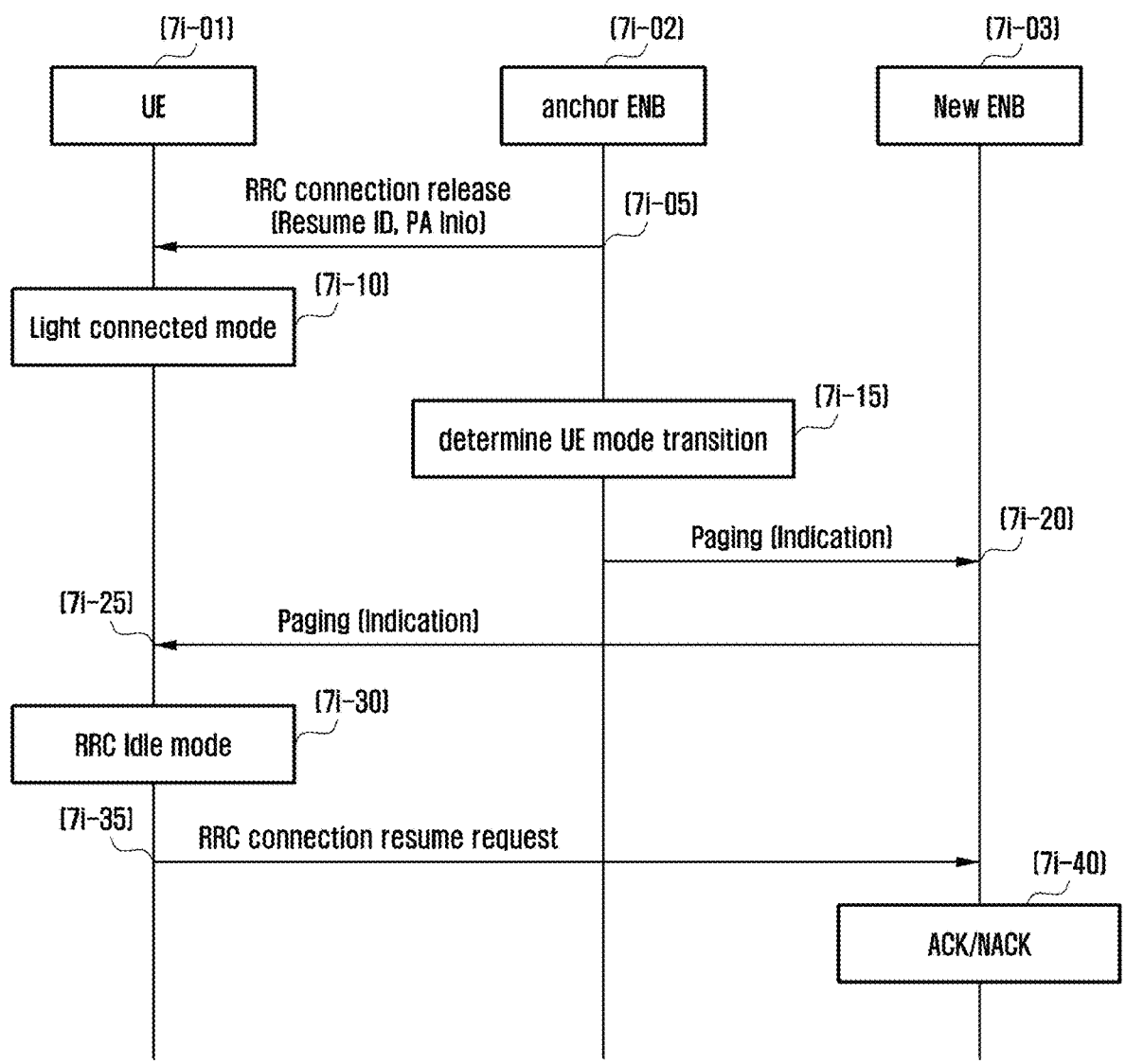
FIG. 7I illustrates a method for an eNB to transition a UE in the light connected mode to the RRC idle mode using a paging message including an RRC idle mode transition indicator, when the UE moves to a PA of another eNB, according to the present disclosure.

FIG. 7I illustrates a method for an eNB to transition a UE in the light connected mode to the RRC idle mode using a paging message including an RRC idle mode transition indicator, when the UE moves to a PA of another eNB, according to the present disclosure.

In FIG. 7I, the UE 7i-01 in the RRC connected mode is communicating data with the eNB 7i-02. If the data communication stops, the anchor eNB 7i-02 starts a predetermined timer and, if data communication is not resumed before expiry of the timer, determines to release the RRC connection of the UE 7i-01.

The eNB 7i-02 may maintain the UE context and transmit an RRC connection release message to instruct the UE 7i-01 to release the RRC connection. The eNB 7i-02 allocates a Resume ID to the UE 7i-01 and configures a PA for mobility report in the light connected mode using the RRC connection release message. That is, the RRC connection release message may include the resume ID and PA information. The PA configuration method has been described above and thus detailed description thereof is omitted herein.

If the RRC connection release message is received, the UE 7i-01 transitions to the light connected mode (or inactive mode) and is aware that it has to maintain the UE context based on the fact that the resume ID is allocated or on an explicit context preservation indicator included in the RRC connection release message. The RRC connection release message may include a list of cells for use of the maintained UE context in RRC connection reconfiguration during the context preservation period of the eNB or the context validity period of the UE. The eNB 7i-02 maintains the UE context and maintains the S1 bearer for the UE after the RRC connection is released.

If the RRC connection release message is received at step 7i-05, the UE 7i-01 transitions to the light connected mode at step 7i-10. The anchor eNB 7i-02 may transition the UE in the light connected mode to the RRC idle mode. The transition from the light connected mode from the RRC idle mode may be determined by a validity period timer or triggered by a predetermined cause. The anchor eNB 7i-02 is an eNB which maintains the UE context and maintains the S1-U bearer for the UE 7i-01.

The anchor eNB 7f-02 may determine to transition the UE 7i-01 in the light connected mode to the RRC idle mode at step 7i-15. If it is determined to transition the UE 7i-01 to the RRC idle mode, the anchor eNB 7i-02 is capable of transmitting a paging message including an indicator indicating mode transition to the RRC idle mode. The anchor eNB 7i-02 transmits a paging message including the mode transition indicator to a new a new eNB 7i-03 at step 7i-20, and the new eNB broadcasts the paging message to the UE 7i-01 at step 7i-25.

Upon receipt of the paging message, the UE 7i-01 checks the paging message for the mode transition indicator and transitions to the RRC idle mode immediately at step 7i-30.

The mode transition indicator included in the paging message is the information instructing the UE to transition to the RRC idle mode directly. This indicator may be newly defined in the paging record of the paging message, or 1 bit of the paging message may be used as this indicator. This indicator may be referred to as a UE mode transition indicator.

After transitioning to the RRC idle mode, the UE 7i-01 transmits to the anchor eNB 7i-02 an RRC connection resume request message to notify the new eNB 7i-03 that the UE has successfully transitioned to the RRC idle mode at step 7i-40.

Figure 7J:
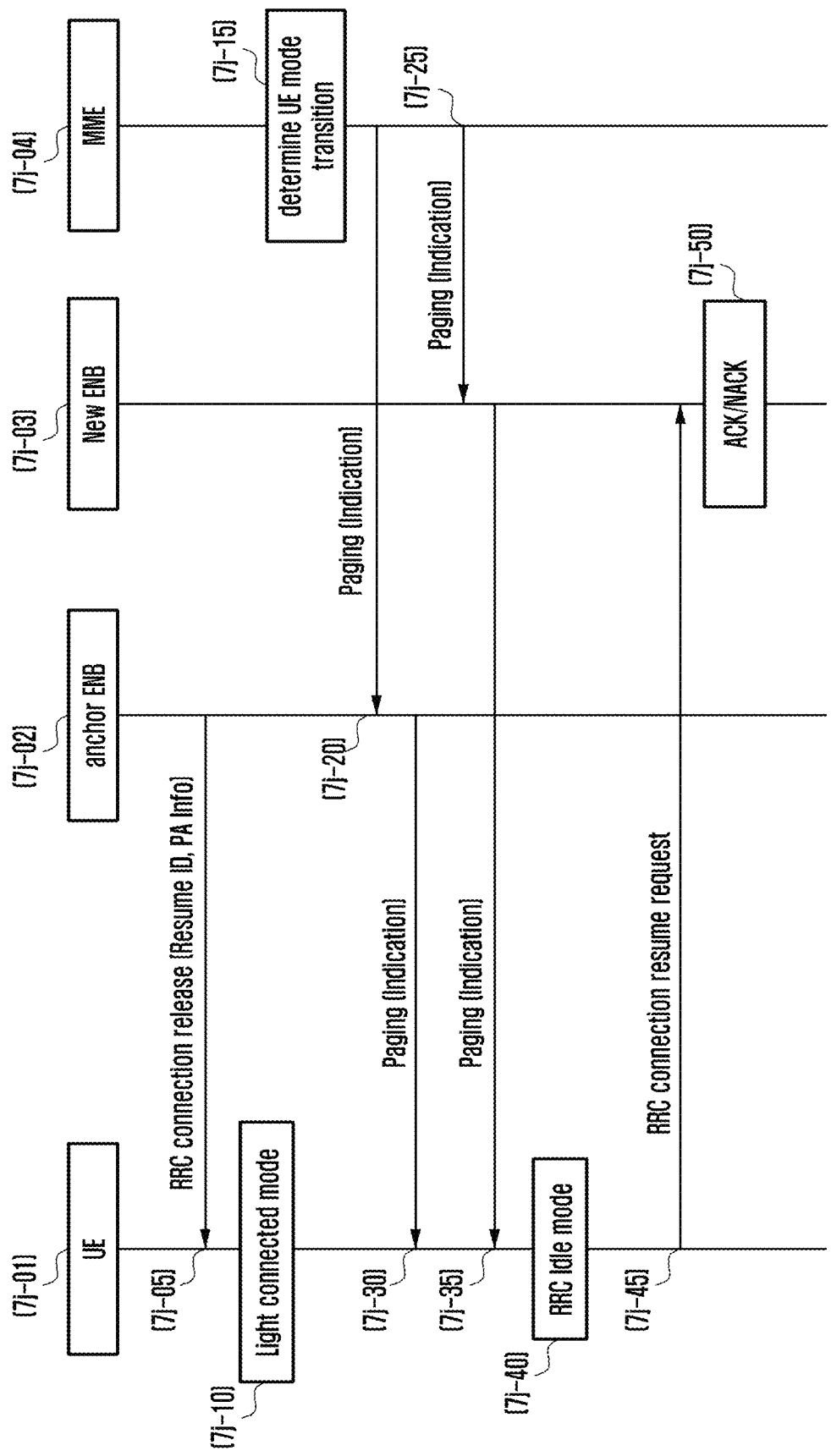
FIG. 7J illustrates another procedure for transitioning a UE in the light connected mode to the RRC idle mode according to the present disclosure.

If the RRC connection resume request message is received, the new eNB 7i-03 may check the RRC connection resume message for the resume ID and recognize that the UE 7h-01 has successfully transitioned to the RRC idle mode at step 7i-35. The new eNB 7h-03 may start a predetermined timer after broadcasting the paging message and, if an RRC connection resume request message is not received before expiry of the timer, determine that the paging message is lost 7i-40. FIG. 7J is a signal flow diagram illustrating another procedure for transitioning a UE in the light connected mode to the RRC idle mode according to the present disclosure.

In reference to FIG. 7J, in a situation where the UE moves to a PA of another eNB, the MME makes a determination for UE's operation mode transition from the light connected mode to the RRC idle mode and, as in LTE, triggers paging of the UE instead of anchor eNB; the paging message generated by the MME includes an indicator indicating transition of the UE in the light connected mode to the RRC idle mode.

In FIG. 7G, the UE 7j-01 in the RRC connected mode is communicating data with the anchor eNB 7j-02. If the data communication stops, the anchor eNB 7j-02 starts a predetermined time and, if data communication is not resumed before expiry of the timer, determines to release the RRC connection of the UE 7j-01.

The eNB 7j-02 may maintain the UE context and transmit an RRC connection release message to instruct the UE 7j-01 to release the RRC connection. The eNB 7j-02 allocates a Resume ID to the UE 7j-01 and configures a PA for mobility report in the light connected mode using the RRC connection release message. That is, the RRC connection release message may include the resume ID and PA information. The PA configuration method has been described above and thus detailed description thereof is omitted herein.

If the RRC connection release message is received, the UE 7j-01 transitions to the light connected mode (or inactive mode) and is aware that it has to maintain the UE context based on the fact that the resume ID is allocated or on an explicit context preservation indicator included in the RRC connection release message. The RRC connection release message may include a list of cells for use of the maintained UE context in RRC connection reconfiguration during the context preservation period of the eNB or the context validity period of the UE. The eNB 7g-02 maintains the UE context and maintains the S1 bearer for the UE after the RRC connection is released.

If the RRC connection release message is received at step 7j-05, the UE 7j-01 transitions to the light connected mode at step 7j-10. The MME 7j-04 may transition the UE in the light connected mode to the RRC idle mode. The transition from the light connected mode to the RRC idle mode may be determined by a validity period timer or triggered by a predetermined cause.

The MME 7j-04 may determine to transition the UE 7j-01 in the light connected mode to the RRC idle mode at step 7j-15. If it is determined to transition the UE 7j-01 to the RRC idle mode, the MME 7j-04 transmits a paging message including a mode transition indicator indicating transition to the RRC idle mode to the anchor eNB 7j-02 and a new eNB 7j-03 at steps 7j-20 and 7j-25. Next, the anchor eNB 7j-02 and the new 7j-03 broadcast the paging message at steps 7j-30 and 7j-35.

The MME 7j-04 may have the information on the PA for the UE 7j-01 because the UE 7j-01 reports the PA whenever the PA is updated as the UE 7j-01 moves.

If the paging message is received, the UE 7j-01 checks the paging message for the mode transition indicator and transitions to the RRC idle mode immediately at step 7j-40.

The mode transition indicator included in the paging message is the information instructing the UE to transition to the RRC idle mode directly. This indicator may be newly defined in the paging record of the paging message, or 1 bit of the paging message may be used as this indicator.

Figure 7K:
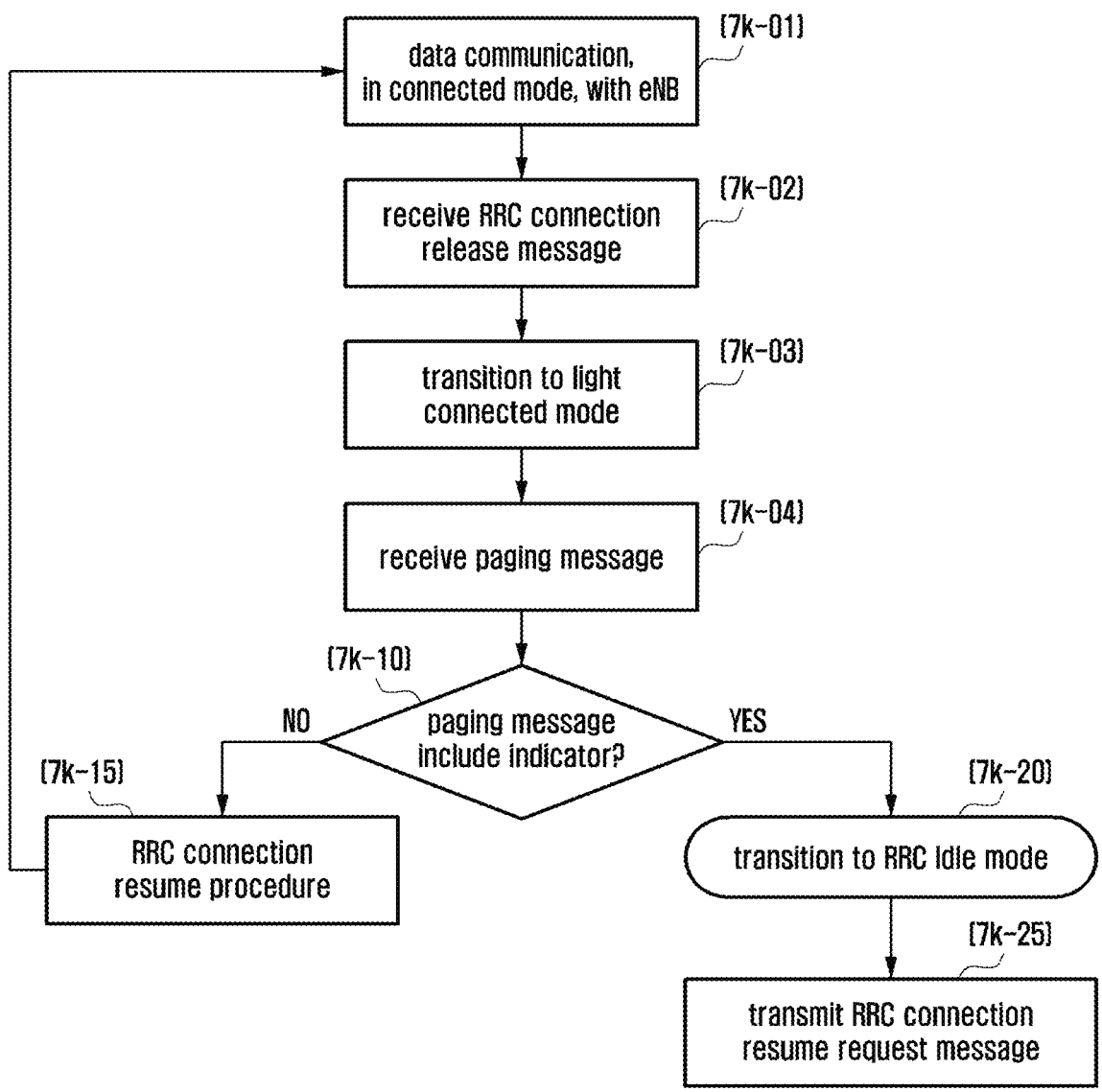
FIG. 7K illustrates a UE operation, when a paging message is received, according to the present disclosure.

After transitioning to the RRC idle mode, the UE 7j-01 transmits an RRC connection resume request message to the new eNB 7j-03 to inform that the UE 7j-01 has successfully transitioned to the RRC idle mode at step 7j-45. The new eNB 7j-03 may start a predetermined timer after broadcasting the paging message and, if an RRC connection resume request message is not received before expiry of the timer, determine that the paging message is lost 7i-50. FIG. 7K is a flowchart illustrating a UE operation, when a paging message is received, according to the present disclosure. In FIG. 7K, the UE in the RRC connected mode is communicating data with an eNB at step 7k-01.

If the data communication stops and does not resume before a predetermined time period elapses, the UE may receive an RRC connection release message at step 7k-02. The RRC connection release message may include at least one of a resume ID and PA information.

Next, the UE transitions to the light connected mode at step 7k-03. The UE stores the resume ID and UE context and, if a PA mode is configured, transitions to the light connected mode. The UE may report mobility to the network, when it moves along the configured PA area.

Afterward, the UE may receive a paging message at step 7k-04.

If the paging message is received, the UE determines at step 7k-10 whether the paging message include a mode transition indicator indicating transition to the RRC idle mode.

The mode transition indicator included in the paging message is the information instructing the UE to transition to the RRC idle mode directly. This indicator may be newly defined in the paging record of the paging message, or 1 bit of the paging message may be used as this indicator. In the present disclosure, this indicator may be referred to as a UE mode transition indicator.

If it is determined that the paging message includes no mode transition indicator, the UE triggers an RRC connection resume procedure at step 7k-15 to return the procedure to step 7k-01.

In the case that the eNB or the MME has transmitted the paging message including the mode transition indicator indicating transition to the idle mode, the UE may transition to the idle mode upon receipt of the RRC connection release message. In the case that the MME triggers paging of the UE, the MME may transmit the paging message including the UE mode transition indicator to the eNBs. If the MME triggers paging of the UE, it generates the paging message including the UE mode transition indicator.

If it is determined that the paging message includes the mode transition indicator, the UE transitions to the RRC idle mode immediately at step 7k-20. After transitioning to the RRC idle mode, the UE transmits an RRC connection resume request message to notify the eNB that the UE has successfully transitioned to the RRC idle mode at step 7k-25.

Figure 7L:
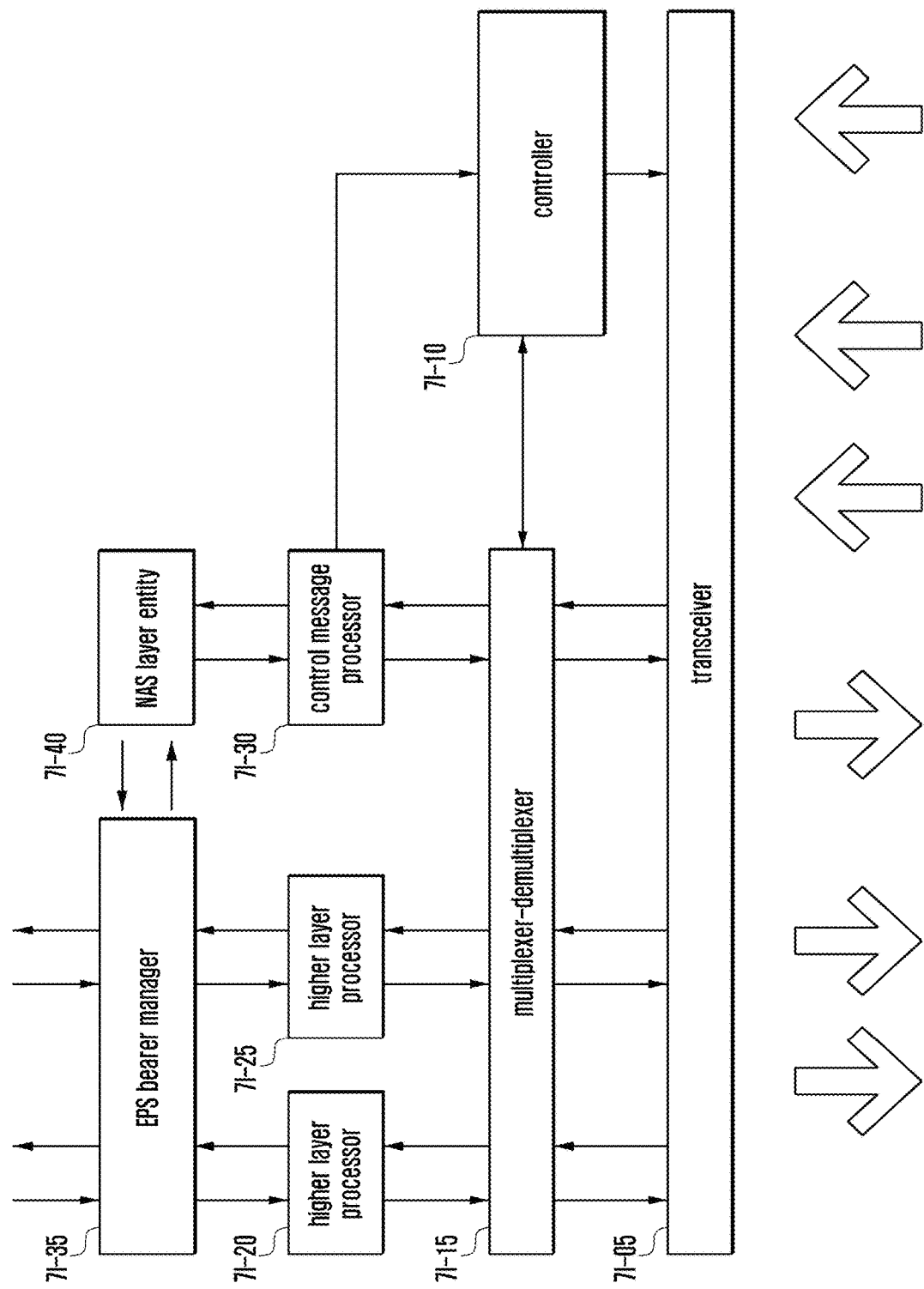
FIG. 7L illustrates a configuration of a UE according to an embodiment of the present disclosure.

FIG. 7L illustrates a configuration of a UE according to an embodiment of the present disclosure.

In reference to FIG. 7L, the UE includes transceiver 7l-05, a controller 7l-10, a multiplexer/demultiplexer 7l-15, a control message processor 7l-30, higher layer processors 7l-20 and 7*l*-25, an EPS bearer manager 7*l*-35, and a NAS layer entity 7*l*-40. In the present disclosure, the controller 7*l*-10 may be interchangeably referred to as a circuit, an application-specific integrated circuit, and at least one processor and the controller may be coupled with the transceiver.

The transceiver 7*l*-05, multiplexer/demultiplexer 7*l*-15, control message processor 7*l*-30, and higher layer processors 7*l*-20 and 7*l*-25 are identical in functionality with the those of FIG. 5M and thus detailed descriptions thereof are omitted herein.

The controller 7*l*-10 checks for the scheduling command, e.g., uplink grants, received by the transceiver 7*l*-05 and controls the transceiver 7*l*-05 and the multiplexer/demultiplexer 7*l*-15 to perform uplink transmission with appropriate transmission resources at an appropriate timing.

The controller 7*l*-10 may control the signaling among the function blocks to accomplish the operations according to the procedures described with reference to the above flowcharts. In detail, the controller 7*l*-10 may control the UE in the RRC connected UE to communicate data with an eNB.

The controller 7*l*-10 may starts a timer, when the data communication steps, and control the UE to receive an RRC connection release message if the data communication does not resume before expiry of the timer. The controller 7*l*-10 may control the UE to transition to the light connected mode. The controller 7*l*-10 may control the UE to receive the paging message.

If the paging message is received, the controller 7*l*-10 may check the aging message for the mode transition indicator indicating transition to the RRC idle mode.

The mode transition indicator included in the paging message is the information instructing the UE to transition to the RRC idle mode directly. This indicator may be newly defined in the paging record of the paging message, or 1 bit of the paging message may be used as this indicator. In the present disclosure, this indicator may be referred to as a UE mode transition indicator.

If it is determined that the paging message includes no mode transition indicator, the controller 7*l*-10 triggers an RRC connection resume procedure transition the UE back to the RRC connected mode.

In the case that the eNB or the MME has transmitted the paging message including the mode transition indicator indicating transition to the idle mode, the UE may transition to the idle mode upon receipt of the RRC connection release message.

If it is determined that the paging message includes the mode transition indicator, the controller 7*l*-10 controls the UE to transition to the RRC idle mode immediately. After transitioning the UE to the RRC idle mode, the controller 7*l*-10 controls UE to transmit an RRC connection resume request message to notify the eNB that the UE has successfully transitioned to the RRC idle mode.

Figure 7M:
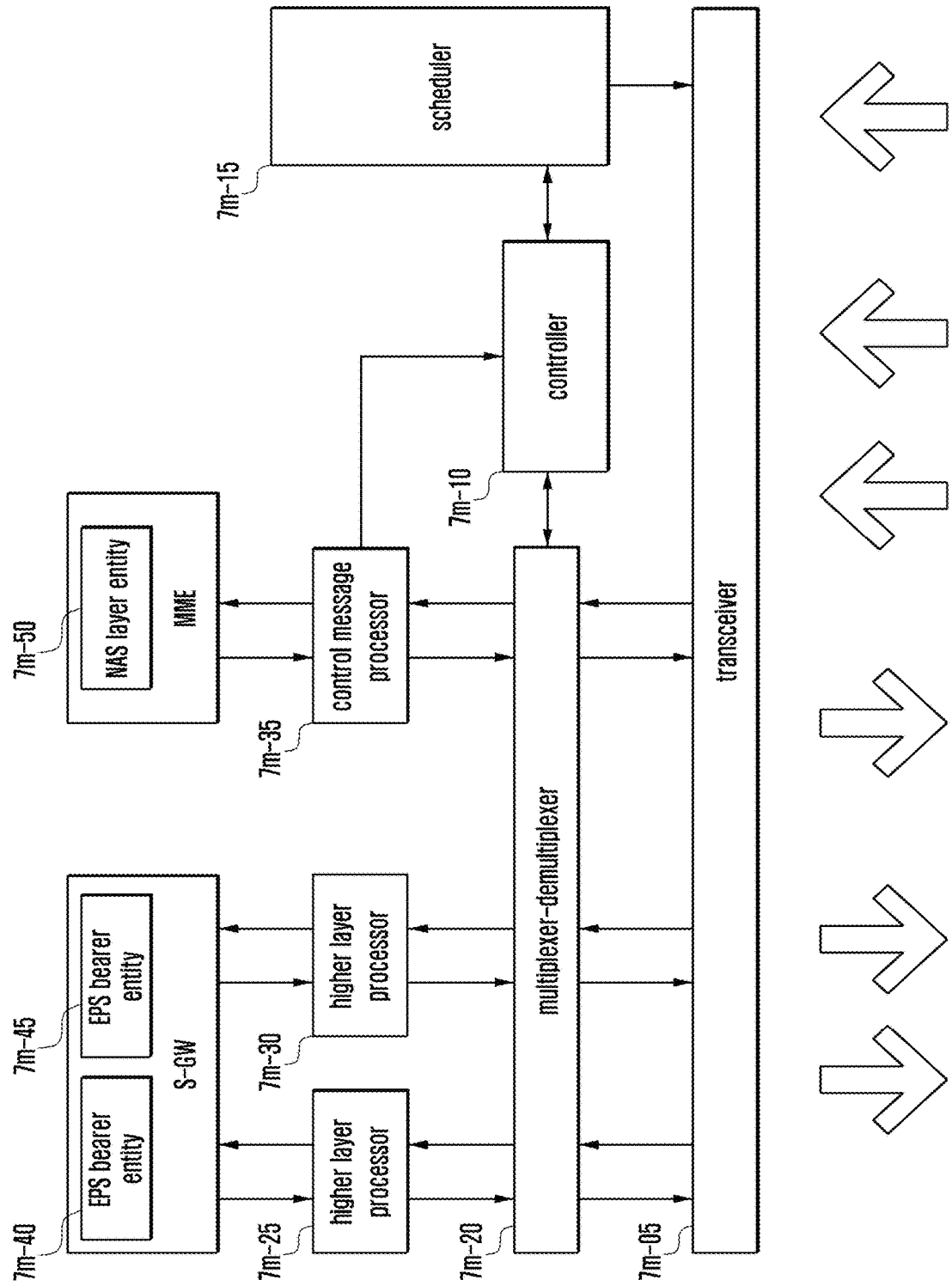
FIG. 7M illustrates a configuration of an eNB including an MME part and an S-GW part according to an embodiment of the present disclosure.

FIG. 7M illustrates a configuration of an eNB including an MME part and an S-GW part according to an embodiment of the present disclosure, and the eNB includes transceiver 7*m*-05, a controller 7*m*-10 a multiplexer/demultiplexer 7*m*-20, a control message processor 7*m*-35, higher layer processors 7*m*-25 and 7*m*-30, a scheduler 7*m*-15, EPS bearer entities 7*m*-40 and 7*m*-45, and a NAS entity 7*m*-50. In the present disclosure, the controller 7*m*-10 may be interchangeably referred to as a circuit, an application-specific integrated circuit, and at least one processor and the controller may be coupled with the transceiver. The EPS bearer entities may be resided in the S-GW, and the NAS layer entity may be resided in the MME.

The transceiver 7*m*-05, the multiplexer/demultiplexer 7*m*-20, the higher layer processors 7*m*-25 and 7*m*-30, the scheduler 7*m*-15, the EPS bearer entities 7*m*-40 and 7*m*-45, and the NAS layer entity 7*m*-50 are identical in functionality with those described with reference to FIG. 5N, detailed descriptions thereof are omitted herein.

The controller 7*m*-10 may controls signaling among the function blocks to accomplish the operations in the procedures described above. In detail, the controller 7*m*-10 may determine whether to transition the UE to the idle mode and transmits, if the mode transition determination is made, a paging message to transition the UE to the RRC connected mode and then transmits an RRC connection release message to transition the UE to the RRC idle mode.

The controller 7*m*-10 may include the UE mode transition indicator in the paging message to transition the UE to the idle mode.

If a paging message is received from the eNB, the controller 7-10 may determine whether to transition to the UE to the idle mode based on the mode transition indicator included in the paging message or according to a predetermined rule. In order to transition the UE to the idle mode, the controller 7*m*-10 may control the eNB to transmit a paging message to transition the UE to the RRC connected mode and then an RRC connection release message to transition the UE to the RRC idle mode or may control the eNB to transmit the paging message including the UE mode switching indicator.

As described above, the access control method of the present disclosure is advantageous in terms of reducing UE operation complexity by applying a single access control procedure Also, the access control method of the present disclosure is advantageous in that the eNB can configure the DRX operation of a UE efficiently by changing the DRX cycle dynamically.

Also, the access control method of the present disclosure is advantageous in terms of adjusting network overload by specifying the operation of paging within multiple areas of a cell in a heterogeneous environment including eNBs with different cell sizes.

Also, the access control method of the present disclosure is advantageous in terms of increasing successful reception probability and reducing latency in data transmission.

Also, the access control method of the present disclosure is advantageous in terms of protecting against data transmission interruption phenomenon and improving data communication efficiency by adopting a data interruption time reduction mechanism and specifying UE operation for failure of data interruption time reduction.

Also, the access control method of the present disclosure is advantageous in terms of saving battery power and reducing signaling overhead by transitioning the operation mode of the UE disconnected from the network supporting the light connection to a large paging area preference mode autonomously.

Also, the access control method of the present disclosure is advantageous in terms of reducing signaling overhead between the UE and the network by transitioning the UE in the light connected mode to the idle mode based on the paging message from the eNB.

The methods specified in claims and specification can be implemented by hardware, software, or a combination of them.

In the case of being implemented in software, it may be possible to store at least one program (software module) in a computer-readable storage medium. The at least one program stored in the computer-readable storage medium may be configured for execution by at least one processor embedded in an electronic device. The at least one program includes instructions executable by the electronic device to perform the methods disclosed in the claims and specifications of the present disclosure.

Such a program (software module or software program) may be stored in a non-volatile memory such as random access memory (RAM) and flash memory, Read Only Memory (ROM), Electrically Erasable Programmable Read Only Memory (EEPROM), a magnetic disc storage device, a Compact Disc-ROM (CD-ROM), Digital Versatile Discs (DVDs) or other type of optical storage device, and a magnetic cassette. It may also be possible to store the program in a memory device implemented in combination of part or whole of the aforementioned media. The memory may include a plurality of memories.

The program may be stored in an attachable storage device accessible through a communication network implemented as a combination of Internet, intranet, Local Area Network (LAN), Wireless LAN (WLAN), and Storage Area Network (SAN). The storage device may be attached to the device performing the methods according to embodiments of the present disclosure by means of an external port. It may also be possible for a separate storage device installed on a communication network to attach to the device performing the methods according to embodiments of the present disclosure.

It is to be appreciated that those skilled in the art can change or modify the embodiments without departing the technical concept of this disclosure. Accordingly, it should be understood that above-described embodiments are essentially for illustrative purpose only but not in any way for restriction thereto. Thus, the scope of the disclosure should be determined by the appended claims and their legal equivalents rather than the specification, and various alterations and modifications within the definition and scope of the claims are included in the claims.

In the above described embodiments of the present disclosure, the operations are selectively performed or omitted. In each embodiment of the present disclosure, the operations are not necessary to be performed in the sequential order as depicted but may be performed in a changed order.

Some or all of the disclosures described below are provided to help understand the present disclosure. Accordingly, the detailed descriptions of the disclosures are to express part of the method and apparatus proposed in the present disclosure. That is, it is preferred to approach the content of the specification semantically rather than syntactically.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a terminal in a communication system, the method comprising:
receiving a system information block (SIB) including barring configurations, at least one access category among access categories corresponding to one of the barring configurations;
identifying a value of an access category of an access attempt among the access categories; and
determining whether to bar the access attempt with a single access barring check based on the access category and a barring configuration corresponding to the access category,
wherein the access categories are determined based on a network slicing, and
wherein the access categories include an access category associated with an application, an access category associated with an emergency call, at least one access category associated with mobile originating (MO) signaling, and at least one access category associated with MO data.

2. The method of claim 1, wherein the SIB includes at least one of a barring configuration per public land mobile network (PLMN) or a common barring configuration.

3. The method of claim 2, wherein the common barring configuration includes at least one of the barring configurations.

4. A method performed by a base station in a communication system, the method comprising:
determining a system information block (SIB) including barring configurations, at least one access category among access categories corresponding to one of the barring configurations; and
transmitting, to a terminal, the SIB,
wherein a value of an access category of an access attempt and a barring configuration corresponding to the access category are used to determine whether to bar the access attempt with a single access barring check,
wherein the access categories are determined based on a network slicing, and
wherein the access categories include an access category associated with an application, an access category associated with an emergency call, at least one access category associated with mobile originating (MO) signaling, and at least one access category associated with MO data.

5. The method of claim 4, wherein the SIB includes at least one of a barring configuration per public land mobile network (PLMN) or a common barring configuration.

6. The method of claim 5, wherein the common barring configuration includes at least one of the barring configurations.

7. A terminal in a communication system, the terminal comprising:
a transceiver; and
a controller coupled with the transceiver and configured to:
receive, via the transceiver, a system information block (SIB) including barring configurations, at least one access category among access categories corresponding to one of the barring configurations;
identify a value of an access category of an access attempt among the access categories; and
determine whether to bar the access attempt with a single access barring check based on the access category and a barring configuration corresponding to the access category,
wherein the access categories are determined based on a network slicing, and wherein the access categories include an access category associated with an application, an access category associated with an emergency call, at least one access category associated with mobile originating (MO) signaling, and at least one access category associated with MO data.

8. The terminal of claim 7, wherein the SIB includes at least one of a barring configuration per public land mobile network (PLMN) or a common barring configuration.

9. The terminal of claim 8, wherein the common barring configuration includes at least one of the barring configurations.

10. A base station in a communication system, the base station comprising:
a transceiver; and
a controller coupled with the transceiver and configured to:
   determine a system information block (SIB) including barring configurations, at least one access category among access categories corresponding to one of the barring configurations; and
   transmit, via the transceiver, the SIB to a terminal,
wherein a value of an access category of an access attempt and a barring configuration corresponding to the access category are used to determine whether to bar the access attempt with a single access barring check,
wherein the access categories are determined based on a network slicing, and
wherein the access categories include an access category associated with an application, an access category associated with an emergency call, at least one access category associated with mobile originating (MO) signaling, and at least one access category associated with MO data.

11. The base station of claim 10, wherein the SIB includes at least one of a barring configuration per public land mobile network (PLMN) or a common barring configuration, and
wherein the common barring configuration includes at least one of the barring configurations.

* * * * *